US008965784B2

(12) United States Patent
Postrel

(10) Patent No.: US 8,965,784 B2
(45) Date of Patent: Feb. 24, 2015

(54) REWARD EXCHANGE METHOD AND SYSTEM IMPLEMENTING DATA COLLECTION AND ANALYSIS

(75) Inventor: Richard Postrel, Miami Beach, FL (US)

(73) Assignee: Signature Systems LLC, Miami Beach, FL (US)

( * ) Notice: Subject to any disclaimer, the term of this patent is extended or adjusted under 35 U.S.C. 154(b) by 791 days.

(21) Appl. No.: 13/076,216

(22) Filed: Mar. 30, 2011

(65) Prior Publication Data

US 2011/0251882 A1 Oct. 13, 2011

Related U.S. Application Data

(63) Continuation-in-part of application No. 12/942,710, filed on Nov. 9, 2010, now Pat. No. 8,533,037, which is a continuation-in-part of application No. 12/703,265, filed on Feb. 10, 2010, now Pat. No. 8,615,428, which is a continuation-in-part of application No. 12/687,423, filed on Jan. 14, 2010, now abandoned.

(60) Provisional application No. 61/144,733, filed on Jan. 14, 2009.

(51) Int. Cl.
*G06Q 30/00* (2012.01)
*G06Q 30/02* (2012.01)
*G05B 19/418* (2006.01)

(52) U.S. Cl.
CPC ........ *G06Q 30/0207* (2013.01); *G06Q 30/0224* (2013.01); *G06Q 30/0236* (2013.01); *G06Q 30/02* (2013.01)
USPC ............................. 705/14.25; 726/1; 382/115

(58) Field of Classification Search
None
See application file for complete search history.

(56) References Cited

U.S. PATENT DOCUMENTS

| | | | | |
|---|---|---|---|---|
| 6,199,077 | B1 | 3/2001 | Inala et al. | |
| 6,317,783 | B1 | 11/2001 | Freishtat et al. | |
| 6,412,073 | B1 | 6/2002 | Rangan | |
| 6,594,766 | B2 | 7/2003 | Rangan et al. | |
| 6,980,670 | B1 * | 12/2005 | Hoffman et al. | 382/115 |
| 8,132,226 | B1 * | 3/2012 | Bianco et al. | 726/1 |
| 2002/0095333 | A1 * | 7/2002 | Jokinen et al. | 705/14 |
| 2005/0192862 | A1 * | 9/2005 | Modi | 705/14 |

OTHER PUBLICATIONS

"Kmart ramps up POS efficiencies". Parks, Liz.. Drug Store News, v23, n4, p. 95. Mar. 26, 2001.*

* cited by examiner

*Primary Examiner* — Victoria Vanderhorst
(74) *Attorney, Agent, or Firm* — Barkume & Associates, P.C.

(57) ABSTRACT

A method of operating a data collection and analysis system. An exchange computer receives customer identification data associated with a customer. A quantitative analysis algorithm determines whether the exchange computer has received an amount of customer identification data sufficient for the customer to be uniquely identified, and if so, then a linking service computer or a plurality of remote database computers perform a qualitative analysis algorithm with the customer identification data to determine if the customer identification data is sufficient for the customer to be uniquely identified. If the qualitative analysis algorithm passes, then customer information may be retrieved from the remote databases and collated and analyzed at the exchange computer. The customer may automatically register with reward programs using already-entered user information. A data analysis embodiment enables offers to be generated that are tailored towards specific users.

108 Claims, 98 Drawing Sheets

200

600

1200

1400

2500

2600

2700

2800

2900

3100

3200

3700

4400

4600

4900

5000

5100

5300

5400

5500

5600

5800

5900

6000

6100

6300

6400

6500

6600

6700

6900

7000

0 points
$100

3,000 points
$70

6,000 points
$40

0 points
$100

3,000 points
$70

6,000 points
$40

0 points
$100

3,000 points
$70

6,000 points
$40

REWARD EXCHANGE METHOD AND SYSTEM IMPLEMENTING DATA COLLECTION AND ANALYSIS

CROSS-REFERENCE TO RELATED APPLICATIONS

This application is a continuation-in-part application of application Ser. No. 12/942,710 filed on Nov. 9, 2010, which is a continuation-in-part of application Ser. No. 12/703,265 filed on Feb. 10, 2010, which is a continuation-in-part application of application Ser. No. 12/687,423 filed Jan. 14, 2010, which claims the benefit of U.S. provisional application 61/144,733, filed on Jan. 14, 2009. This application is also related to copending application Ser. No. 12/703,243 filed on Feb. 10, 2010, entitled ONLINE REWARD POINT EXCHANGE METHOD AND SYSTEM.

TECHNICAL FIELD

This invention relates to reward systems, and in particular to a reward point exchange platform that enables users to exchange, redeem and manage reward points amongst various reward programs via an online exchange service.

BACKGROUND OF THE INVENTION

Users often may earn reward points as part of a transaction with a merchant or issued by a credit card company or a distributor. For example, a merchant and/or issuer may award a user one point for each dollar spent. In this case, a $100 purchase will result in the awarding of 100 reward points, which are tracked in a reward point account stored on a reward point server computer managed by the merchant, issuer or a third party service provider. In addition, credit card issuers may implement their own reward point system, such as AMERICAN EXPRESS MEMBERSHIP REWARDS. In this card issuer-based system, a user may be awarded one point for every dollar spent regardless of the merchant. For example, if a user spends a total of $2,465 in one month with his credit card, the issuer may award him with 2,465 points in a reward account. Often these merchant-based programs are implemented independently from a card issuer-based program, such that a user may be awarded with reward points in multiple accounts based on the same transaction. Airline frequent flyer programs operate similarly and may award points or miles based on the distance or cost of an airplane trip (or on the value of the customer to the airline rather than its distance or cost).

Many programs offer redemption programs in which the user may trade in, or redeem, his reward points in exchange for goods, services, or discounts. For example, a user may redeem 20,000 MEMBERSHIP REWARD points for a music player device, or he may redeem 50,000 AMERICAN AIRLINES points for a free flight or seat upgrade, etc. A major problem in this field is that redemption options are limited to only certain goods available from a certain merchant, issuer, or catalog. Also, users often have small amounts of points in several accounts, each of which provide no meaningful redemption options. My issued U.S. Pat. Nos. 6,594,640; 6,842,739; 6,820,061; 6,829,586; 6,947,898; 7,096,190; 7,512,551; 7,624,040; 7,624,041 relate to the exchange and/or combination of reward points from various user accounts so that the aggregated reward points provide greater redemption options to the user. This new invention is for a reward point exchange platform in which consumers (users), merchants, manufacturers, issuers and other partners may interoperate to the benefit of all parties.

In particular, it is desired to enable a new customer of the exchange system to be able to register with the exchange system as well as with partners of the exchange system by entering only a minimal amount of identification data, and also obtain reward account information from various reward accounts without requiring the user to enter all of his login information for those reward accounts. It is also desired to be able to collect information from various resources on the Internet and analyze that information in order to generate promotional offers on the exchange that are tailored towards that particular customer.

SUMMARY OF THE INVENTION

The present invention is therefore a method of operating a reward exchange system that implements data collection and analysis. In a first major embodiment, an exchange computer receives customer identification data associated with a customer and applies a quantitative analysis algorithm with the customer identification data. The quantitative analysis algorithm determines whether the exchange computer has received an amount of customer identification data sufficient for the customer to be uniquely identified. If the quantitative analysis algorithm passes, then the exchange computer sends the customer identification data to a linking service computer (which is a central repository of customer data), and the linking service computer applies a qualitative analysis algorithm with the customer identification data. The qualitative analysis algorithm determines if the customer identification data is sufficient for the customer to be uniquely identified. If the qualitative analysis algorithm passes, then the linking service computer accesses a customer database to retrieve from the customer database a customer record set associated with the customer identification data. The customer record set has a plurality of account information records, each of the account information records including account login data suitable for logging into an associated remote database. The linking service computer sends the customer record set to the exchange computer, which stores the customer record set and uses the account login data from each of the account information records from the customer record set to communicate with a remote database associated with the account login data and retrieve customer information from each of the remote databases.

The exchange computer may receive the customer identification data directly from a user via a user computing device, or indirectly from a partner portal web site. In the case of a partner portal web site, the user is interacting via a user computing device with the partner portal web site, and the user selects a link at partner portal web site that requests it to link to an exchange web site associated with the exchange computer. The partner portal web site then enables the user computing device and the exchange web site to connect for subsequent direct communications, and the partner portal web site sends the customer identification data to the exchange web site.

The quantitative analysis algorithm executed by the exchange computer in order to determine whether the exchange computer has received an amount of customer identification data sufficient for the customer to be uniquely identified may for example include a weighted entry algorithm in which each piece of the customer identification data is assigned a numerical value representing a relative weight, and wherein the total value of the relative weights must exceed a predetermined threshold in order for the quantitative analysis algorithm to pass. The quantitative analysis algorithm may alternatively include a minimum number of entries algorithm in which a predetermined minimum number of pieces of customer identification data must be present in order for the quantitative analysis algorithm to pass. The quantitative analysis algorithm may alternatively assign a category type to each piece of the customer identification data, wherein there is a requirement that a predetermined minimum number of categories is satisfied by the customer identification data.

If the quantitative analysis algorithm fails (e.g. not enough data has been provided), then the exchange computer sends a request to the user computing device for additional customer identification data and re-applies the quantitative analysis algorithm with the customer identification data and the additional customer identification data until the quantitative analysis algorithm passes.

The qualitative analysis algorithm executed by the linking service computer may include for example matching the customer identification data to a plurality of customer identification records, wherein a predetermined minimum number of pieces of the customer identification data must match a single customer identification record in order for the qualitative analysis algorithm to pass. If the qualitative analysis algorithm fails, then the linking service computer sends a request to the exchange computer for additional customer identification data. The exchange computer obtains additional customer identification data from the user computing device and sends the additional customer data to the linking service computer. The linking service computer re-applies the qualitative analysis algorithm with the customer identification data and the additional customer identification data until the qualitative analysis algorithm passes.

The customer record sent from the linking service computer to the exchange computer may include a customer key that uniquely identifies the customer record set in the customer database. In this case, the exchange computer may subsequently retrieve the customer key from storage and send the customer key to the linking service computer for periodic updating of the customer record set by the customer linking service to the exchange computer. Use of the customer key eliminates the need for the qualitative analysis algorithm in subsequent communications between the exchange computer and the linking service computer.

The customer information retrieved by the exchange computer from the remote databases may be collated into an account web page and sent to a user computing device for display by the user computing device. For example, at least one of the remote databases may be a reward account database operated by an associated reward issuing entity and having a plurality of customer reward accounts, wherein at least one of the customer reward accounts is associated with the customer identified by the customer identification data. The retrieved customer information includes reward account information for the customer including reward points previously accumulated by the customer. As such, the account web page includes a listing of a plurality of customer reward accounts accessed by the exchange computer for the customer and the number of reward points stored in the associated reward account for the customer.

In one example, when the exchange computer receives the customer identification data from a partner portal web site (rather than from the user computing device directly), the partner portal web site may be associated with a reward issuing entity that is a member of a predefined cluster of reward issuing entities. In this case, the account web page indicates which of the plurality of customer reward accounts accessed by the exchange computer for the customer are associated with a reward issuing entity that is a member of the cluster. The account web page may further include a listing of reward issuing entities with which the customer does not have an associated reward account and that are members of the cluster. An offer may be provided on the account web page for the customer to automatically register with at least one of the reward issuing entities with which the customer does not have an associated reward account and that are members of the cluster. An instruction may then be received from the user computing device to automatically register the customer with at least one of the reward issuing entities with which the customer does not have an associated reward account and that are members of the cluster. The exchange computer then sends a registration request on behalf of the customer to the reward account database associated with the designated reward issuing entity or entities.

In another aspect of the invention, a promotional analysis is performed on the customer information retrieved from each of the remote databases, wherein the promotional analysis may generate a plurality of offers to be made to the customer for items available via the exchange computer or via traditional brick and mortar channels. The promotional analysis may be accomplished by also accessing a local customer profile database to retrieve customer profile data to be used in the promotional analysis. Additionally, user data may be obtained from a user computing device, such that the promotional analysis also includes analyzing the user data received from the user computing device with the customer profile data and the retrieved customer information. The user data received from the user computing device may include web browsing data identifying web sites that have been loaded onto the user computing device. The user data received from the user computing device may also include web purchasing history data identifying items that have been purchased via the web on the user computing device.

The user data received from the user computing device may also include location data (such as GPS data) identifying the location of the user computing device. The promotional analysis may then be based at least partially on the location data received from the user device. Likewise, the promotional analysis may be associated at least partially on at least one merchant in proximity to the user computing device, and may result in an offer to the customer for an item from the at least one merchant in proximity to the user computer device that is determined by promotional analysis to be desired by the customer.

In a second major embodiment of this invention, the qualitative analysis is performed individually by each of a plurality of remote database computers (for example that may be partners of the exchange system) rather than by the centralized linking service computer. In this embodiment, an exchange computer receives customer identification data associated with a customer and applies a quantitative analysis algorithm with the customer identification data. The quantitative analysis algorithm determines whether the exchange computer has received an amount of customer identification data sufficient for the customer to be uniquely identified. If the quantitative analysis algorithm passes, then the exchange computer sends the customer identification data to one or more remote database computers, and the remote database computers each apply a qualitative analysis algorithm with the customer identification data. The qualitative analysis algorithm determines if the customer identification data is sufficient for the customer to be uniquely identified. If the qualitative analysis algorithm passes, then the remote database computers each access an associated customer database to retrieve a customer record set associated with the customer identification data that includes customer information. Each remote database computer then sends the retrieved customer information to the exchange computer, and the exchange computer stores the retrieved customer information. The remaining functionality of this embodiment is similar to that described above with respect to the embodiment that uses a centralized linking service computer to perform the qualitative analysis on the customer identification data in order to properly identify the customer and provide the remote database login information.

DESCRIPTION OF THE PREFERRED EMBODIMENTS

Figure 1A:
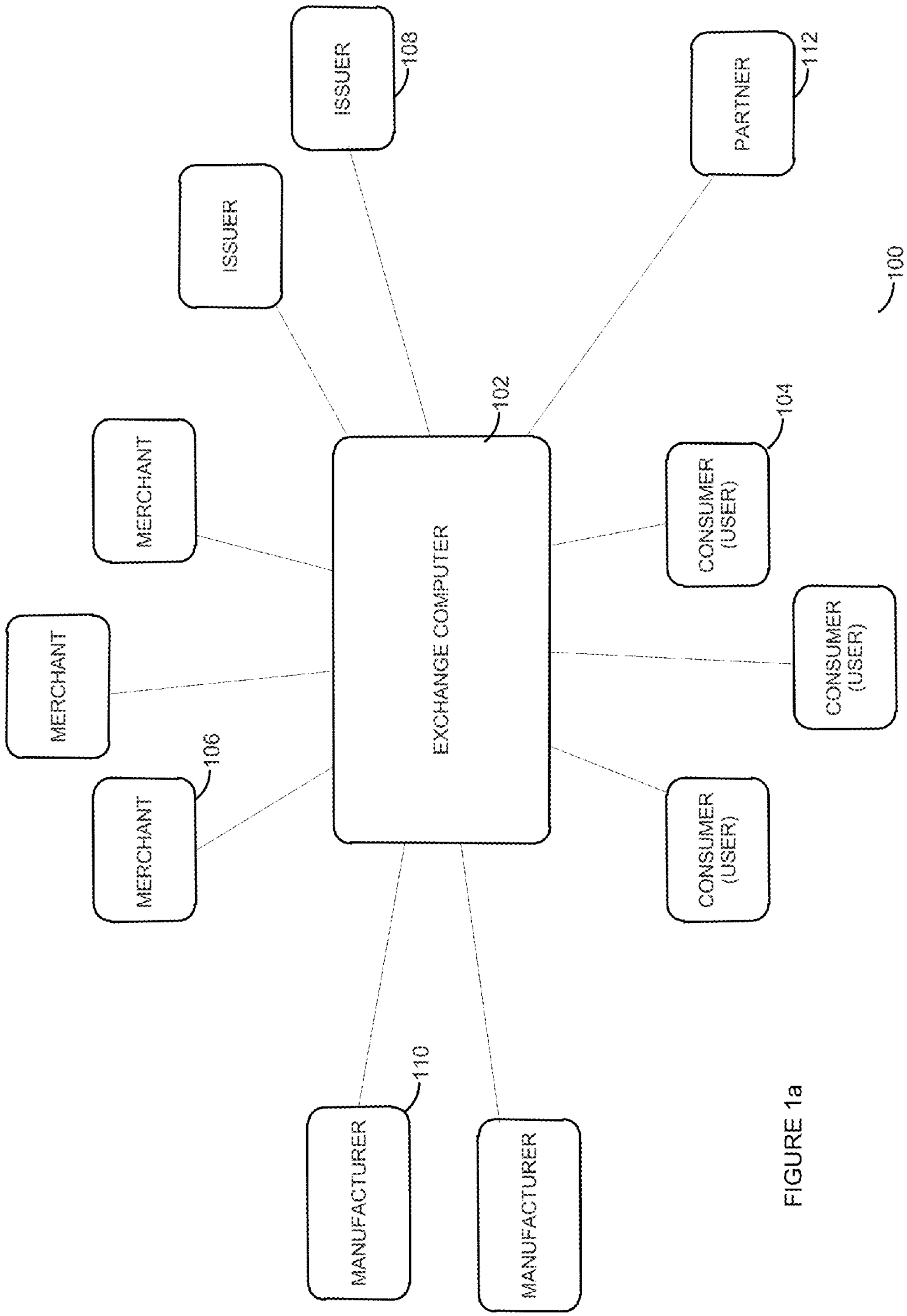
FIG. 1*a* is a top level block diagram of the system of the present invention.

The present invention includes a system that provides for and implements a "promotional wallet". For example, card issuers desire consumers to adopt and utilize (spend money with) their card. To achieve this, they offer an incentive system whereby they provide points or other value to the consumer (the "promotional wallet" of the issuer). The consumer collects this promotional wallet from numerous issuers, with the average American household being a member of fourteen reward programs. The consumer is able to aggregate their promotional wallet, based on a set of eligibility rules, which he trades in exchange for goods and services from the merchant by transferring his promotional wallet to the merchant. The merchant in turn transfers his promotional wallet in the form of a discount provided to the issuer. Thus, a complete cycle of the promotional wallets are transferred from the issuer to the consumer, from the consumer to the merchant, and from the merchant to the issuer, allowing the issuer to liquidate his liability at a discount, merchants to sell more and optimize their inventory, and consumers to purchase products and services from a much larger universe of offerings with greater frequency and ease. In addition a product manufacturer may operate in the same manner as a merchant by providing products for sale directly to the consumer or through a third party via the exchange of the present invention without using the merchant as a middleman; the manufacturer may also provide a portion of his promotional wallet to merchants and other participants in the wholesale-retail chain of distribution as an incentive for participating on the exchange in liquidating certain products and services designated by the manufacturer as a credit towards the purchase of "new inventory" for every item sold in the selected inventory for liquidation as designated by the manufacturer on the exchange. This helps to collapse the cycle time of bringing new products of the manufacturer to market and increases the sales volume of the merchants as well, without cannibalizing the cash wallet of the consumer. For the issuer, provided is an optimization methodology for the lifetime value of his reward points and frequent flyer miles.

The exchange of the present invention further provides for issuers to geometrically expand their merchant base and redemption offering opportunities to consumers in a seamless end-to-end solution which allows consumers to not only aggregate their reward points for a higher value redemption and a higher perceived value redemption, but more frequent redemption opportunities and solves the problem for issuers of not being able to manage large numbers of merchants in their reward program. Most reward programs have less than a thousand merchants who redeem points, the largest being AMERICAN EXPRESS with approximately 1500 merchants. Currently these merchant programs are managed by account managers. There is a limit to the number of accounts they can manage. Thus, only a limited number of merchants participate and this is generally confined to the largest merchants. Under this invention, the nearly 18 million merchants in the United States and millions of international merchants that accept credit cards would now be able to participate on reward programs. The system provides automated eligibility and trading capabilities for the issuers to enable the electronic management of the system. In so doing, this allows for a bidding system whereby millions of merchants may bid for access to issuers' card-members by offering a discount on the redeemed value of the issuers' points for that privilege, thereby driving the cost of redemption down and liquidating liability at meaningful discounts for the issuer.

By implementing the present invention, the merchant is provided with an inventory optimization system which is based upon an age discount progression algorithm whereby inventory is tracked according to age and assigned a discount based upon the algorithm. When the algorithm matches one or more of the trading relationships established with issuers, or meets a designated price, that inventory is transferred into the rewards server and is available for redemption on the exchange thereby creating an inventory optimization engine that dynamically connects the merchants' promotional wallet to the issuer with the sale discount on his selected merchandise according to his rules based algorithm.

In one embodiment, it is recognized that a major expense of a merchant is his differential discount from full price to cash price. When merchants get new inventory, it is put out for sale (whether in a brick and mortar store or an online store) at full price. If the products sell at an acceptable rate then the price will stay at full price. If, however, the merchandise does not sell at an acceptable rate, then the merchandise is discounted. Depending upon how poorly the merchandise sells, and how long it takes to sell, that merchandise is discounted at a greater degree. Under the present invention, this discount may be utilized as a promotional wallet and be transferred to the issuer. For example, a merchant may provide 60% off full price in his store, and have a relationship to provide 30% off in the exchange and earn an additional 30% on the sale of that product. Or, in the alternative, the merchant may opt to provide 30% off to the customer and 30% off to the issuer. In this scenario a $100 item would sell for a $70 price to the customer. The customer would redeem what he perceives to be a one hundred dollar item paid for with $70 worth of points from a selected issuer(s), which may be 7,000 points (with a perceived value of one cent per point). The merchant would provide a further 30% discount to the issuer, so the issuer would only pay the merchant $40 cash but would retire 7,000 of the customer's reward points in the transaction. By selling the inventory at less of a discount to the consumer ($30 rather than $60), brand devaluation is eliminated, and the consumer is glad to be able to purchase using his promotional wallet and preserving his cash. The exchange takes a transaction fee from individual constituents.

Thus, as more fully described herein, the present invention in one aspect is a method for operating an online reward exchange system. A user registers via a user computer over a computer network with an exchange computer via a web site by entering into the user computer user information comprising reward account information for at least one reward program in which the user is previously enrolled, the reward program operated by an issuer via an issuer computer and providing reward points to a reward account of the user stored in association with the issuer computer as a result of a transaction previously executed between the user and the issuer. A plurality of merchants also register with the exchange computer via the web site by using an associated merchant computer for providing merchant information comprising (i) product information that identifies at least one product to be offered for sale to the user via the exchange computer, and (ii) a designation of issuers registered with the exchange computer with which the merchant agrees to execute a reward redemption transaction when requested by the user. A plurality of issuers also register with the exchange computer via the web site, each of the issuers registering using an associated issuer computer for providing issuer information comprising a designation of merchants registered with the exchange computer with which the issuer agrees to execute a reward redemption transaction when requested by the user.

The exchange computer communicates with each of the issuer computers with which the user is enrolled with a reward account with the issuer computer. The exchange computer receives reward account information from each of the issuer computers for the user. The exchange computer then calculates a promotional wallet for the user, which comprises a total redeemable value for all of the user's reward accounts stored in the plurality of issuer computers. The exchange computer then displays to the user via the user computer the user's promotional wallet.

In one embodiment, an unregistered user views a web page from an issuer computer of a registered issuer, the unregistered user being previously enrolled in a reward program of the registered issuer. The unregistered user selects a link on the web page that automatically links the unregistered user computer to the exchange computer, and the exchange computer automatically registers the unregistered user by using reward account information transmitted from the issuer computer to the exchange computer. The user may then enter additional reward account information for a plurality of additional issuers with which the user is previously enrolled.

A reward redemption transaction may then be executed by a user selecting, via a web page served to the user computer by the exchange computer, an item for purchase from a merchant (for example by utilizing a dynamic search filter presented by the web page that enables the user to select a desired product category, manufacturer, and/or price range), the item to be purchased at least partially by the redemption of reward points from at least one issuer. The user selects via the web page at least one reward program previously registered in the exchange computer by the user and a quantity of reward points to be redeemed for the purchase of the item by the user. The exchange computer then causes a purchase transaction to be executed for the item selected by the user using at least the quantity of reward points from the reward program selected by the user.

The user may also select via the user computer a plurality of points of interest, which are tracked and analyzed by the exchange computer. The exchange computer then provides the user computer with a web page displaying products available for redemption determined as a result of analyzing the points of interest selected by the user. The exchange computer may also dynamically display to the user computer a quantity of products available for redemption that correspond to each of the points of interest selected by the user.

In one embodiment, the exchange computer causes the purchase transaction to be executed for the item selected by the user using at least the quantity of reward points from the reward program selected by the user by first requesting the issuer computer associated with the selected reward program to (I) reduce the reward account associated with the user by the quantity of reward points selected by the user for execution of the reward redemption transaction, and (II) convey consideration to the exchange computer corresponding to the quantity of reward points selected by the user for execution of the reward redemption transaction. The exchange computer then conveys consideration to the merchant computer selected by the user in exchange for the associated merchant providing to the user the selected item.

In another embodiment, the exchange computer causes the purchase transaction to be executed by requesting the merchant to execute the purchase transaction by first transmitting to the merchant computer (I) an identification of the item selected by the user and (II) an identification of the reward issuer selected by the user and the quantity of reward points selected by the user for redemption for the item. The merchant computer then requests the issuer computer associated with the selected reward program to (I) reduce the reward account associated with the user by the quantity of reward points selected by the user for execution of the reward redemption transaction, and (II) convey consideration to the merchant computer corresponding to the quantity of reward points selected by the user for execution of the reward redemption transaction. The issuer computer at some point (e.g. in real time or at a later time in batch mode) conveys consideration to the merchant in exchange for the merchant providing to the user the selected item.

The exchange computer may provide a proposed redemption solution to the user computer, which designates at least one reward program previously registered in the exchange computer by the user and a quantity of reward points to be redeemed for the purchase of the item by the user. The user may then either accept the proposed redemption solution, or modify the proposed redemption solution as desired.

The exchange computer determines the proposed redemption solution by any or all of: (1) referencing a user profile stored in an associated user profile database that indicates user preferences as to which of a plurality of reward programs is desired to be used for reward redemption, (2) analyzing prior reward redemptions by the user stored in an associated reward redemption database to ascertain a preferred reward program, (3) ascertaining by reference to a merchant profile database a preferred redemption partner of the merchant from which the user is making the product purchase, (4) referencing an exchange rules profile stored in an exchange rules profile database that indicates exchange preferences as to which of a plurality of reward programs is desired to be used for reward redemption, (5) referencing an issuer rules profile stored in an issuer rules profile database that indicates issuer preferences as to which of a plurality of reward programs is desired to be used for reward redemption. In the case of the issuer rules profile, the issuer preferences may comprise (1) a preference to redeem the reward points of a primary issuer before redeeming reward points of issuers other than the primary issuer, (2) a preference to redeem the reward points of a primary issuer after redeeming reward points of issuers other than the primary issuer, (3) a preference to redeem the reward points of a primary issuer up to a specified amount, after which the points of issuers other than the primary issuer will be redeemed, or (4) a preference to redeem the reward points of a issuers other than a primary issuer up to a specified amount, after which the points of the primary issuer will be redeemed.

In one aspect, the user may bid on a reward redemption transaction by selecting via a web page served by the exchange computer to the user computer an item for purchase from a merchant, the item to be purchased at least partially by the redemption of reward points from at least one issuer; then the user selects via the web page at least one reward program previously registered in the exchange computer by the user and a quantity of reward points to be bid to be redeemed for the purchase of the item by the user. The user computer submits to the exchange computer a bid comprising a quantity of reward points that the user is offering for redemption for purchase of the item. The exchange computer submits the bid received from the user computer to the merchant computer, and the merchant computer either accepts or rejects the bid for purchase of the product. In the alternative, the exchange computer submits the bid received from the user computer to the issuer computer, and the issuer computer either accepts or rejects the bid for purchase of the product.

In another aspect of the invention, a merchant and an issuer may execute a trading agreement. The merchant may create a bid by selecting via the merchant computer a desired issuer from a group of issuers that are registered with the exchange, and entering into the merchant computer a desired redemption discount offer, the desired redemption discount offer being the amount that the merchant is willing to provide in a transaction with the selected issuer. The merchant submits the bid to the exchange computer, which then forwards the bid to the issuer computer of the desired issuer selected by the merchant in the bid. The issuer accepts the bid, rejects the bid, or counter proposes a modified bid in which a modified redemption discount is submitted to the exchange computer for forwarding to the merchant computer. In the alternative, the issuer may create a bid by selecting with the issuer computer a desired merchant from a group of merchants that are registered with the exchange, and entering into the web page a desired redemption discount offer, the desired redemption discount offer being the amount that the issuer is willing to accept in a transaction with the selected merchant. The issuer submits the bid to the exchange computer, which then forwards the bid to the merchant computer of the desired merchant selected by the issuer in the bid. The merchant accepts the bid, rejects the bid, or counter proposes a modified bid in which a modified redemption discount is submitted to the exchange computer for forwarding to the issuer computer.

In another aspect of the invention, a merchant may submit to the exchange computer any or all of the following: (1) a price discount schedule that specifies price discounts to be automatically generated by the exchange computer as a function of elapsed time that a specified product is available for purchase; (2) a redemption schedule that specifies redemption discounts to be automatically generated by the exchange computer as a function of elapsed time that a specified product is available for purchase; and/or (3) a transacted value discount schedule that specifies transacted value discounts to be automatically generated by the exchange computer as a function of elapsed time that a specified product is available for purchase.

In yet another aspect of the invention, a user profile is built for storage in a user profile database associated with the exchange computer. A reward redemption offer is generated based on information in the user profile and then presented to the user via the user computer. The user profile may include information regarding the user's past reward redemptions and/or the user's past product viewing history. A merchant may access the user profile database in order to generate a product offer to a user that is targeted to that user based on the profile information of the user.

In another aspect of the invention, a product purchase transaction is executed by a user first selecting an item for purchase from a merchant. Then, the exchange computer determines the lowest price that is being charged by the plurality of merchants for the item selected by the user. The exchange computer also determines the lowest number of reward points that may be redeemed from the plurality of issuers for the item selected by the user. The determined lowest price and the determined lowest number of reward points are displayed to the user via the user computer, and the user selects a mode of purchase of the item with either the determined lowest price or the determined lowest number of reward points. Then, a purchase transaction is executed for the item selected by the user by the mode selected by the user.

In another embodiment, provided is a method of and system for executing a purchase transaction for an item at a point of sale, such as in a merchant retail store. Price information associated with an item to be purchased by a user is input into a point of sale device, such as a terminal associated with a cash register at a checkout counter of the store. A user ID associated the user is also input into the point of sale device, such as by swiping a credit card, loyalty card or the like. The user ID is then transmitted to an exchange computer via a computer network. The exchange computer sends back to the point of sale device a promotional wallet associated with the user ID, the promotional wallet indicating a redeemable value of reward points stored in at least one reward point account associated with the user and at least one issuer computer. The point of sale device receives the promotional wallet and displays it to the user. A redemption selection is input as a function of the promotional wallet, the redemption selection indicating a selection of reward points to be redeemed from at least one reward point account associated with the user and at least one issuer computer. The point of sale device then causes a purchase transaction to be executed for the item selected by the user by using the inputted redemption selection.

The point of sale device may cause the purchase transaction to be executed by transmitting an instruction to the exchange computer to request the at least one issuer computer to redeem the reward points selected by the user by (I) reducing the reward account associated with the user by the quantity of reward points selected by the user for execution of the purchase transaction, and (II) conveying consideration to the exchange computer corresponding to the quantity of reward points selected by the user for execution of the purchase transaction. The point of sale device may then receive confirmation from the exchange computer that the issuer computer has redeemed the reward points selected by the user and the user may take the item purchased.

Alternatively, the point of sale device may cause the purchase transaction to be executed by transmitting an instruction to the at least one issuer computer to request the at least one issuer computer to redeem the reward points selected by the user by (I) reducing the reward account associated with the user by the quantity of reward points selected by the user for execution of the purchase transaction, and (II) conveying consideration to a merchant computer associated with the point of sale device corresponding to the quantity of reward points selected by the user for execution of the purchase transaction. The point of sale device may then receive confirmation from the merchant computer that the issuer has redeemed the reward points selected by the user and the user may take the item purchased.

The promotional wallet indicates a total redeemable value of reward points stored in a plurality of reward point accounts associated with the user, wherein each of the plurality of the reward point accounts are associated with one of a plurality of issuer computers.

The redemption selection input to the point of sale device may indicate a combination of a first selection of reward points to be redeemed from a first reward point account and a second selection of reward points to be redeemed from a second reward point account, etc.

Price information associated with the item may be input by reading a machine-readable indicia associated with the item. The price information may be embedded in and obtained directly from the machine-readable indicia, or the machine-readable indicia may include an index that is used by the point of sale device to lookup the price information from an associated product database. The reading of the machine-readable indicia may be performed by scanning a bar code symbol with a bar scanning device associated with the point of sale device, or by reading an RFID tag with an RFID reader device associated with the point of sale device, or by manually entering the price information with a manual data entry device associated with the point of sale device. Alternatively, an item description may be entered, and the price looked up in a price lookup database. Further alternatively, a description of the item may be entered in lieu of the price, and the transaction may proceed on that information.

Thus, the system that is used to implement this embodiment includes an exchange computer, a merchant computer associated with a merchant and selectively interconnected to the exchange computer via a computer network, an issuer computer associated with a reward points issuer and selectively interconnected to the exchange computer via a computer network; and a point of sale device operably associated with the merchant computer. The point of sale device has at least one input device for inputting information from a user, a display, a data connection to the computer network; and a processor programmed to a) receive via the at least one input device price information associated with an item to be purchased by a user; b) receive via the at least one input device item a user ID associated the user; c) transmit the user ID to the exchange computer via the data connection; d) receive from the exchange computer via the data connection a promotional wallet associated with the user ID, the promotional wallet indicating a redeemable value of reward points stored in at least one reward point account associated with the user and at least one issuer computer; e) display the promotional wallet to the user; f) receive via the at least one input device a redemption selection as a function of the promotional wallet, the redemption selection indicating a selection of reward points to be redeemed from at least one reward point account associated with the user and at least one issuer computer; and g) cause a purchase transaction to be executed for the item selected by the user by using the inputted redemption selection.

In another aspect of the invention, controls may be placed on the relative amounts of rewards that may be redeemed for an item being purchased such that there may be a maximum allowable reward payment portion and/or a minimum allowable monetary consideration portion, the total value of which equals the price of the item being purchased. These controls may be designated by the merchant, the issuer, and/or an operator of the exchange system. In this aspect of the invention, purchase price information for an item for purchase is transmitted to a remote computing device such as a user computer, a point of sale device, a mobile phone, a tablet computing device, a web-enabled interactive television set, etc. The purchase price information includes (i) a purchase price for an item for purchase from a merchant, wherein the purchase price may be paid with a reward payment portion and a monetary consideration portion, with the reward payment portion equivalent to a value of rewards that may be redeemed by a user from at least one reward issuer towards payment of the purchase price for the item; and (ii) a maximum allowable reward payment portion amount for the reward payment portion of the purchase price. A purchase request for the item is made by the user and subsequently received from the remote computing device. The purchase request includes (i) a desired amount of the reward payment portion and (ii) a desired amount of the monetary consideration portion. The desired amount of the reward payment portion may not exceed the maximum allowable reward payment portion for the reward payment portion amount of the purchase price, and the total value of (A) the desired amount of the reward payment portion and (B) the desired amount of the monetary consideration portion is equivalent to the purchase price for the item. In one embodiment, a user interface instruction is transmitted to provide a slider control at the remote computing device, the slider control allowing a user to select along an axis the desired amount of the reward payment portion only up to the maximum allowable reward payment portion. The desired amount of the monetary consideration portion is then calculated as a function of the desired amount of the reward payment portion selected with the slider control. Alternatively, the user interface instruction provides for the display of the purchase price information at the remote computing device, and the user interface instruction also provides for an input box control element that is displayed to allow entry of the purchase request. The maximum allowable reward payment portion amount may be established by the merchant, the rewards issuer, or an operator of the exchange system. The maximum allowable reward payment portion amount may be established as a percentage of the purchase price, as a value, and/or as a number of reward points, as desired. In an alternative embodiment to this, the purchase price information includes a minimum allowable monetary consideration portion amount of the purchase price rather than a maximum allowable reward payment portion amount.

From the merchant's perspective, provided is a method for a merchant to provide an item for sale via the reward exchange system. The merchant establishes purchase price information for an item for sale; the purchase price including (i) a purchase price for the item for purchase, wherein the purchase price may be paid with a reward payment portion and a monetary consideration portion, with the reward payment portion equivalent to a value of rewards that may be redeemed by a user from at least one reward issuer towards payment of the purchase price for the item; and (ii) a maximum allowable reward payment portion amount for the reward payment portion of the purchase price. The merchant transmits the purchase price information for the item for sale; and the merchant sells the item for sale in accordance with the maximum allowable reward payment portion and the monetary consideration portion. In one embodiment, the merchant establishes the purchase price information for an item for sale by controlling a slider control provided at a merchant computer, the slider control allowing the merchant to select along an axis the maximum allowable reward payment portion. In an alternative embodiment to this, the purchase price information includes a minimum allowable monetary consideration portion amount of the purchase price rather than a maximum allowable reward payment portion amount.

From the reward issuer's perspective, provided is a method for a reward issuer to reduce a user's reward account and provide compensation to a merchant for selling an item to a user using rewards. The reward issuer establishes a maximum allowable reward payment portion for an item for sale by a merchant, the item for sale having a purchase price associated therewith, the purchase price and the maximum allowable reward payment portion constituting purchase price information. The reward issuer transmits the maximum allowable reward payment portion amount for the reward payment portion of the purchase price. The reward issuer subsequently provides compensation to a merchant towards the purchase of the item by a user, the compensation being equivalent to rewards redeemed by the user up to the maximum allowable reward payment portion established by the reward issuer. In one embodiment, the reward issuer establishes the maximum allowable reward payment portion by controlling a slider control provided at a reward issuer computer, the slider control allowing the reward issuer to select along an axis the maximum allowable reward payment portion. In an alternative embodiment to this, the reward issuer establishes a minimum allowable monetary consideration portion amount of the purchase price rather than a maximum allowable reward payment portion amount.

From the user's perspective, provided is a method for a user to purchase an item at least partially with rewards. A user-operated remote computing device receives purchase price information that includes a purchase price for an item for sale from a merchant, wherein the purchase price may be paid with a reward payment portion and a monetary consideration portion, the reward payment portion equivalent to a value of rewards that may be redeemed by a user from at least one reward issuer towards payment of the purchase price for the item; and a maximum allowable reward payment portion amount for the reward payment portion of the purchase price. The remote computing device transmits a purchase request for the item, the purchase request including a desired amount of the reward payment portion and a desired amount of the monetary consideration portion. The desired amount of the reward payment portion does not exceed the maximum allowable reward payment portion for the reward payment portion amount of the purchase price, and the total value of the desired amount of the reward payment portion and the desired amount of the monetary consideration portion is equivalent to the purchase price for the item. In one embodiment, the remote computing device receives a user interface instruction to provide a slider control at the remote computing device, the slider control allowing a user to select along an axis the desired amount of the reward payment portion only up to the maximum allowable reward payment portion. In an alternative embodiment to this, the reward issuer establishes a minimum allowable monetary consideration portion amount of the purchase price rather than a maximum allowable reward payment portion amount.

In another aspect of the invention, provided is a computer-implemented method for operating a reward exchange system. A search request is received from a remote computing device, the search request for items available for purchase from a merchant, wherein the purchase price may be paid with a reward payment portion and a monetary consideration portion, the reward payment portion equivalent to a value of rewards that may be redeemed by a user from at least one reward issuer towards payment of the purchase price for the item, wherein a maximum allowable reward payment portion amount has been established for the reward payment portion of the purchase price, wherein the search request specifies a desired minimum amount of rewards that may be redeemed by the user towards payment of the purchase price. A description of at least one item for sale meeting the search request is returned to the remote computing device, wherein the maximum allowable rewards payment portion is not less than the desired minimum amount of rewards specified in the search request.

In another aspect of the invention, provided is a method of purchasing an item by scanning with a mobile computing device a bar code associated with a desired item to obtain item identification information from the bar code; sending the item identification information to an exchange server computer; sending a purchase bid to the exchange server computer, the purchase bid comprising an offer to purchase an item identified by the item identification information with rewards having a bid value; accepting or rejecting the purchase bid at the exchange server computer; and communicating the rejection or acceptance of the purchase bid to the mobile computing device.

In another aspect of the invention, provided is a method of operating a reward exchange system by receiving from a merchant computer an instruction to provide a combined discount for the purchase of an item by a customer at least partially with rewards, the combined discount comprised of an issuer discount and a customer discount, the issuer discount indicating a discount amount off of a listed price for the item that is provided by the merchant to the issuer, and the customer discount indicating a discount amount off of a listed price for the item that is provided by the merchant to the customer; providing the combined discount for a purchase of the item by the customer from the merchant by providing the customer discount to the customer so that the customer pays for the item in rewards having a value to the customer equivalent to the listed price minus the customer discount; and providing the issuer discount to the issuer such that the issuer redeems rewards of the customer and pays the merchant the listed price minus the customer discount minus the issuer discount.

In another aspect of the invention, provided is a method for executing a reward redemption transaction by transmitting to a user computer a web page that provides for the display of a plurality of available search criteria, each of said available search criteria being independently selectable by a user for searching a database of items available for purchase; receiving from the user computer a search criteria selection obtained from the plurality of available search criteria; searching the database of items available for purchase to determine items matching or most closely resembling the search criteria selection; transmitting to the user a web page that provides for the display of a quantity of items matching or most closely resembling the search criteria selection; repeating steps the above steps as desired by the user whereby the quantity of items displayed match or most closely resemble all of the search criteria selections received from the user computer; receiving a request from the user computer to display descriptions of the items that match or most closely resemble all of the search criteria selections received from the user computer; and transmitting one or more web pages to the user computer that provide for the display of the descriptions of the items that match or most closely resemble all of the search criteria selections received from the user computer.

In addition, a purchase selection may then be received from the user computer indicative of an item desired to be purchased by the user using rewards as at least partial payment; a reward selection may be received from the user computer identifying the rewards to be used as at least partial payment, the identified rewards being from at least one user reward account stored on a reward account server computer; and a purchase transaction may be executed for the item desired to be purchased using at least the reward selection received from the user computer.

In another aspect of the invention, the present invention provides for automatic user login and registration in a computer-operated transaction system that is implemented with an exchange computer that interconnects over a computer network with a user computing device, a data linking service, a plurality of transactional databases, and a plurality of information databases. The exchange computer receives, from a user computing device, customer identification data that identifies a customer (e.g. a customer name, a customer address, and/or a customer telephone number). The exchange computer uses the customer identification data to access a customer database and retrieve from the customer database a customer record set, which includes a plurality of account information records. Each of the account information records is suitable for use in logging into an associated database (for example a transactional database or an information database). The exchange computer then uses each of the account information records to communicate with the database associated with the account information record and retrieve customer information. The retrieved customer information is then collated into an account web page, which is sent to the user computing device for display by the user computing device.

The transactional databases may for example be reward databases that are associated with reward server computers that are operated by an associated reward issuing entity. Each reward database stores a plurality of customer reward accounts, with at least one of the plurality of customer reward accounts being associated with the customer identified by the customer identification data. The retrieved customer information will include reward account information for the customer that includes the reward points previously accumulated by the customer. In this case, the account web page that is sent to the user computing device has a listing of the customer reward accounts that were accessed by the exchange computer for the customer and the number of reward points stored in the associated reward account for the customer.

In a further aspect of the invention, the exchange computer may also receive link source indication data from the user computing device, which indicates a link source web page from which the user computing device has linked in order to access the exchange computer. The link source web page is associated with a member of a predefined cluster of reward issuing entities. The account web page indicates which of the customer reward accounts accessed by the exchange computer for the customer are associated with a reward issuing entity that is a member of the cluster. The account web page may also include a listing of reward issuing entities with which the customer does not have an associated reward account and that are members of the cluster, as well as an offer for the customer to register with at least one of the reward issuing entities with which the customer does not have an associated reward account and that are members of the cluster. The user computing device may then send an instruction to register the customer with at least one designated reward issuing entity with which the customer does not have an associated reward account and that are members of the cluster, in which case the exchange computer will send a registration request on behalf of the customer to the reward account database associated with the designated reward issuing entity.

In order to implement the customer database of the customer record sets, a data linking service may be performed by a customer linking computer interconnected with the exchange computer via the computer network. In this case, the customer linking computer is programmed to assemble the customer record sets by collecting a plurality of customer account information from a plurality of sources; analyzing the collected customer account information to ascertain which of said customer account information is associated with a particular unique customer then for each of a plurality of unique customers, generating a unique customer record set associated with said unique customer, and then storing each of the plurality of unique customer record sets in the customer database.

With respect to the Figures described above, FIG. 1*a* is a top level block diagram of the system 100 of the present invention, which may be referred to as the online reward exchange system, or simply the exchange. Participants on the exchange may be grouped into five different types: consumers 104 (also referred to interchangeably herein as users), merchants 106, issuers 108, manufacturers 110, and partners 112. Also shown in FIG. 1*a* is an exchange computer 102, which is the central hub or gateway that mediates the entire exchange system 100. A consumer or user 104 is a participant who makes purchases, receives reward points, and ultimately exchanges or redeems reward points for goods or services. For example, a user 104 may redeem previously earned reward points for an item on the exchange. A merchant 106 is a participant who sells goods or services to a user 104 and who receives compensation in the form of cash and/or reward points (e.g. as a credit to an account). For example, a merchant 106 may be an electronics retailer such as BEST BUY which agrees to provide a television to a user 104 and receive a discounted price. An issuer 108 is a participant which issues reward points to users 104 as part of some type of transaction. For example, an issuer 108 may be CITICORP which provides a credit card account to a user 104 and issues THANKYOU reward points each time that user uses the credit card to make a purchase. A manufacturer 110 is similar to a merchant 106 in that it sells goods to a user, but in this case it is done directly and not through a retail environment. For example, SONY may be a manufacturer 110 that produces and sells radios to users 104 through the exchange. A partner 112 is a participant that performs some other function related to the exchange. For example, a points aggregator may be a partner 112 on the system, which may perform the function of aggregating reward points from different accounts for use in redeeming on the exchange. A processor such as FIRST DATA may act on the exchange in multiple functions on behalf of merchants and processing credit card transactions.

As used herein, the term "rewards" or "reward points" may include any type of rewards that are provided as an incentive or loyalty device as well known in the art, included but not limited to reward points, loyalty points, frequent flier miles or points, club points, rebates, coupons, and other incentives, as may be appropriate.

Any participant on the exchange may function as one or more of these types. For example, a participant may function as a merchant 106 (selling goods or services) and may function as an issuer 108 (issuing points in conjunction with the sale of goods or services). For convenience purposes we will refer to them as independent entities in the following description.

The exchange computer 102 is the central server that interoperates with each of the entities described above and shown in FIG. 1*b*. All of the entities in FIG. 1*a* interoperate with the exchange computer 102 over a wide area network 114, such as the Internet, in order to accomplish the functionality of the exchange as described herein. An existing network such as a credit card network may also be used. Communications are accomplished through computers such as server and/or client computers as well known in the art. Thus, when we refer to the interactions with a merchant, we are referring to such interactions that may take place with a merchant computer 128, and likewise for the issuers 108 with issuer computers 130. In most cases the user 104 will interact with the exchange computer 102 via a user computer 126 such as a desktop computer, laptop computer, smartphone, tablet, netbook, web-enabled television set and the like. In an alternative embodiment described further herein, the user 104 may use a point of sale device to accomplish the desired transaction.

Figure 1B:
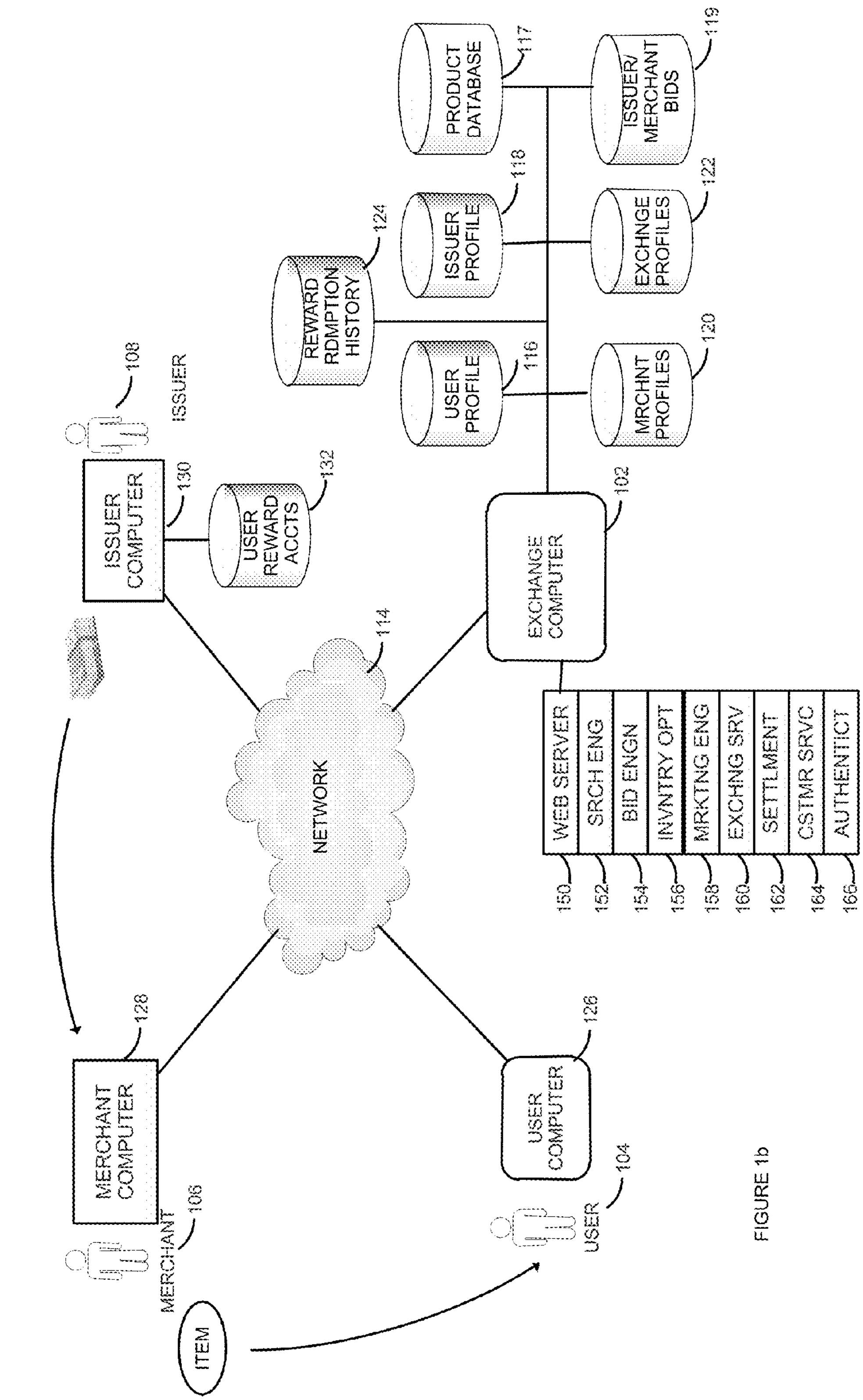
FIG. 1*b* is detailed diagram of the system of the present invention.

Also shown in FIG. 1*b*, and discussed further herein, is a user reward account database 132 that is associated with the issuer computer 130. As known in the art, users earn reward points through various transactions with the issuer 108, and those reward points are stored in a user reward point account in the database 132 for subsequent redemption. The present invention allows users to redeem their reward points in new ways heretofore unavailable.

Also shown in FIG. 1*b* are several databases that are associated with the exchange computer 102: a user profiles database 116, an issuer profiles database 118, a merchant profiles database 120, an exchange profiles database 122, a reward redemption history database 124, a product database 117, and an issuer/merchant bids database 119. These are also described in further detail below.

The exchange computer implements various programs and software modules in order to execute the functionalities as described herein. These programs include but are not limited to a web server 150, a search engine 152, a bidding engine 154, an inventory optimization engine 156, a marketing engine 158, an exchange service 160, a settlement service 162, a customer service 164, and authentication and authorization service 166, all of which are also shown in FIG. 1*b*. Theses programs/modules utilize the various databases described above in order to interoperate with the user computers, the issuer computers, and the merchant computers. The web server 150 will communicate with browser and other client programs executing on the user computers, the issuer computers, and the merchant computers in order for the users, issuers and merchants respectively to communicate with the exchange computer 102 as further described herein. Many of the web pages that are served by the web server 156 are illustrated in the remaining Figures and described throughout this specification. The web server 156 may be comprised of several web server programs as desired. The web server 156 therefore provides the graphical user interface (GUI) front end for the various parties that interoperate with the exchange computer 102. Other client/server software may be used instead of a web server in order for the various computers to interact if desired.

The search engine 152 is program code that enables searches of the various databases to be executed. In particular, the search engine 152 will utilize the product database 117 such that a user computer may request the display of certain products, such as all DSLR cameras, or those cameras that cost less than $500, or TVs that may be redeemed by reward points only, etc. The search engine will implement dynamic filters that are served to the user computer on search pages through the web server 156 as known in the art. The user may select search criteria on the search pages, return those to the search engine via the web server, and have the search engine return the desired results after searching the required databases.

The bidding engine 154 is a program that interoperates with the issuer/merchant bids database 119 in order to facilitate the bidding process between issuers and merchants as described further herein. The bidding engine 154 will facilitate the interaction and agreement of terms for discounts between issuers and merchants. Issuers and merchants can configure a series of auto accept or reject criteria to better manage pending bids. Bids whose state can't be determined with the criteria given by the issuer or merchant will be added to a pending queue and will be dealt with manually. Bids can be generated, countered, accepted or rejected within the engine. A complete history of all bids and their resulting audit trail will be kept. Accepted bids are fed into the inventory optimization engine.

Thus, a merchant may submit a bid to an issuer in which the merchant agrees to provide a specified discount for purchases by a user who proposes to utilize reward points of that issuer in the transaction. For example, a merchant may submit to the exchange computer a desired 20% discount bid applicable to reward points issued by CHASE. This bid is forwarded to CHASE, and if accepted by CHASE, then the merchant would only charge $80 for a $100 MSRP item, for example. As explained below, bids may be accepted, rejected, or negotiated until an agreement is reached by the issuer and merchant.

In addition, the bidding engine 154 manages a bidding process that is undertaken by a user in order to bid on products by offering a reduced number of reward points as tender for a desired product, as further described below.

The inventory optimization engine 156 shown in FIG. 1*b* facilitates the merchant's ability to control which products are available at a given discount. It allows a merchant to either directly control a given product's current discount or to setup an automated date driven discount schedule. In this way a merchant can schedule a progressive discount schedule to move product. The engine will determine the products in the exchange service that are available for reward point redemption. It does this by applying accepted bids to the merchant's products and finds those that match the accepted bids the merchant has with various issuers. This information feeds into the redemption solution the consumer can use for the merchant's products.

A history of products, their discount schedule and changes will be retained in a audit trail. Also data from the engine will be fed into the marketing engine for use in analytics.

The inventory optimization engine is therefore a program that enables the exchange computer 102 to provide an age discount progression algorithm whereby inventory is tracked according to age and assigned a discount based upon the algorithm. When the algorithm matches one or more of the trading relationships established with issuers, that inventory is transferred into the rewards server and is available for redemption on the exchange thereby creating an inventory optimization engine that dynamically connects the merchants' promotional wallet to the issuer with the sale discount on his selected merchandise according to his rules based algorithm.

The marketing engine 158 is a program executed by the exchange computer that provides for various marketing functions such as promotion programs, product and customer analytics, etc. The marketing engine facilitates insight into consumers, their behavior, and product sales. It allows the issuer's and merchant's to visualize the performance of various offerings and promotions based on consumer demographics. The engine manages the communication with consumers. In this way, issuers and merchants can set up promotions that will be communicated to consumers matching various parameters. Additional analytics are generated around product/service performance. This enables issuers and merchants to hone in on the products that consumers want and the effectiveness of promotions. General system reporting for all parties will also be included in the engine.

The exchange service 160 facilitates the customers purchase of products and services with reward points and other monetary consideration such as cash or credit. The merchants and products available may be determined by the inventory optimization engine. Products are arranged in various categories and hierarchies. These can be easily searched and navigated by the consumer. A wish list for consumers to store interesting products will be kept. When the consumer wishes to purchase a product, they will be presented with a redemption solution interface that will present a default redemption solution as well as enable to consumer to edit the solution using available issuer programs as determined by the inventory optimization engine. Once a successful solution is accepted by the consumer the product will be added to the consumer's shopping cart. The shopping cart is then fed into the settlement service upon consumer checkout. The exchange service keeps a history of customer behavior including which products were viewed, added to their wish list, abandoned in their cart and purchased. This history is fed into the marketing engine to provide additional analytics.

The settlement service 162 is a program executed by the exchange computer that facilitates the various exchange transactions between the merchant, the user, and the issuer as further described herein. The settlement service facilitates the completion of the checkout process. It performs the resulting transactions between the consumer and issuers, the consumer and merchants, and the merchants and issuers. It is responsible to generate the various API calls to debit or credit a consumer's account at various issuers and for sending product/service orders to merchants for fulfillment. In the event of any failures it is also responsible for the roll back of any transactions already completed as part of the checkout process. The service also facilitates customer returns from either the merchant's or issuer's viewpoint. It reports financial information into the exchange's financial system for backend processing. It also keeps an entire audit trail of all resulting transactions, their status, state, and confirmation or denial.

The customer service module 164 will enable the users of the exchange to report any issues that result from its use. This includes consumers having questions about products and services, billing, order status, etc. In addition, it should be the point of contact for issuers and merchants to find assistance with issues. Consumer issues will be forward directly to issuers and/or merchants when appropriate. By doing this it will enable the issuer and/or merchant to provide an elevated level of service when such a level is desired. This is beneficial when an issuer is using the exchange as a captive portal for high value customers and wish to ensure those customers receive a premium customer service experience.

Figure 1C:
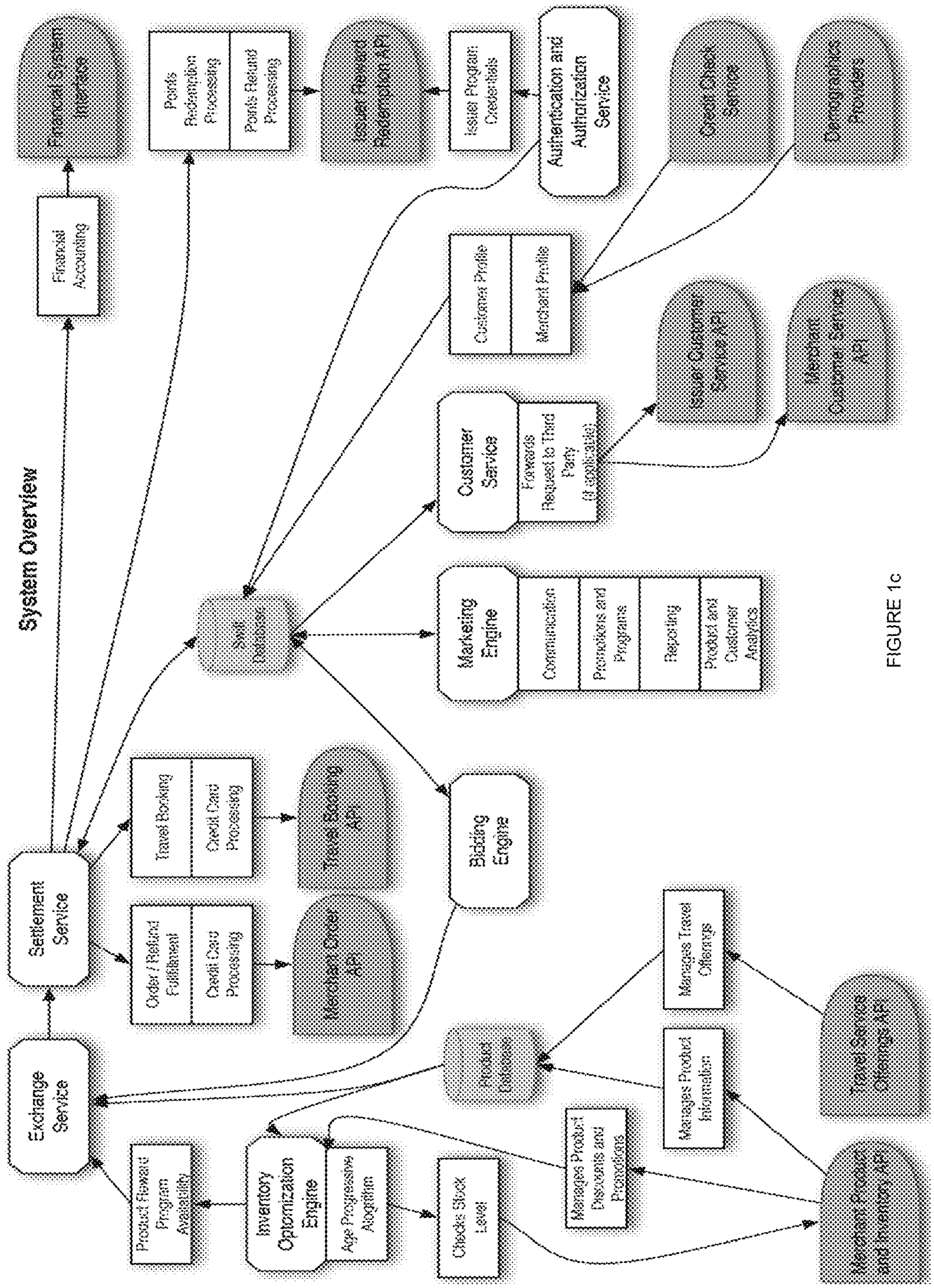
FIG. 1*c* is an alternative detailed diagram of the system of the present invention.

The authentication and authorization service 166 ensures that users of the exchange are valid and for which functions they are entitled. In the case of consumers it will communicate to issuer systems to validate credentials given for the issuer system. In addition it will handle single sign on when a consumer arrives from an issuer portal. Also it will allow for consumers to merge accounts and/or identify when consumers arriving to the exchange from different issuer portals are in fact the same individual. Finally it will allow merchant and issuers to administer the exchange accounts that have elevated privileges when acting on behalf of the merchant or issuer. FIG. 1*c* shows an alternative view of the exchange system shown in FIG. 1*b* and described further herein.

The exchange computer 102 provides each participant with an appropriate interface (e.g. via various web pages) that enables that participant to perform the desired functions as will now be described. FIG. 1 is a screen shot of a home page 134 of the reward exchange system in one embodiment, also known as the SWIFT REWARDS EXCHANGE. Any participant, after accessing the general URL (such as http://www.swiftrewardsexchange.com) of the exchange computer 102, will be provided with the home page 134 of FIG. 1 that is displayed on their particular computer. From there, the participant will select the icon desired (consumer/user button 136, merchant button 138, issuer button 140, manufacturer button 142, or partner button 144). The functionality provided to each type of participant by the exchange server will now be described in detail.

In one aspect, a user 104 registers via the user computer 126 over the computer network 114 with the exchange computer 102 via a web site. The user enters into the user computer 126 user information that includes reward account information for at least one reward program in which the user is previously enrolled. The reward program is operated by an issuer 108 via an issuer computer 130 and provides reward points to a reward account 132 of the user stored in association with the issuer computer 130 as a result of a transaction previously executed between the user and the issuer.

Figure 1D:
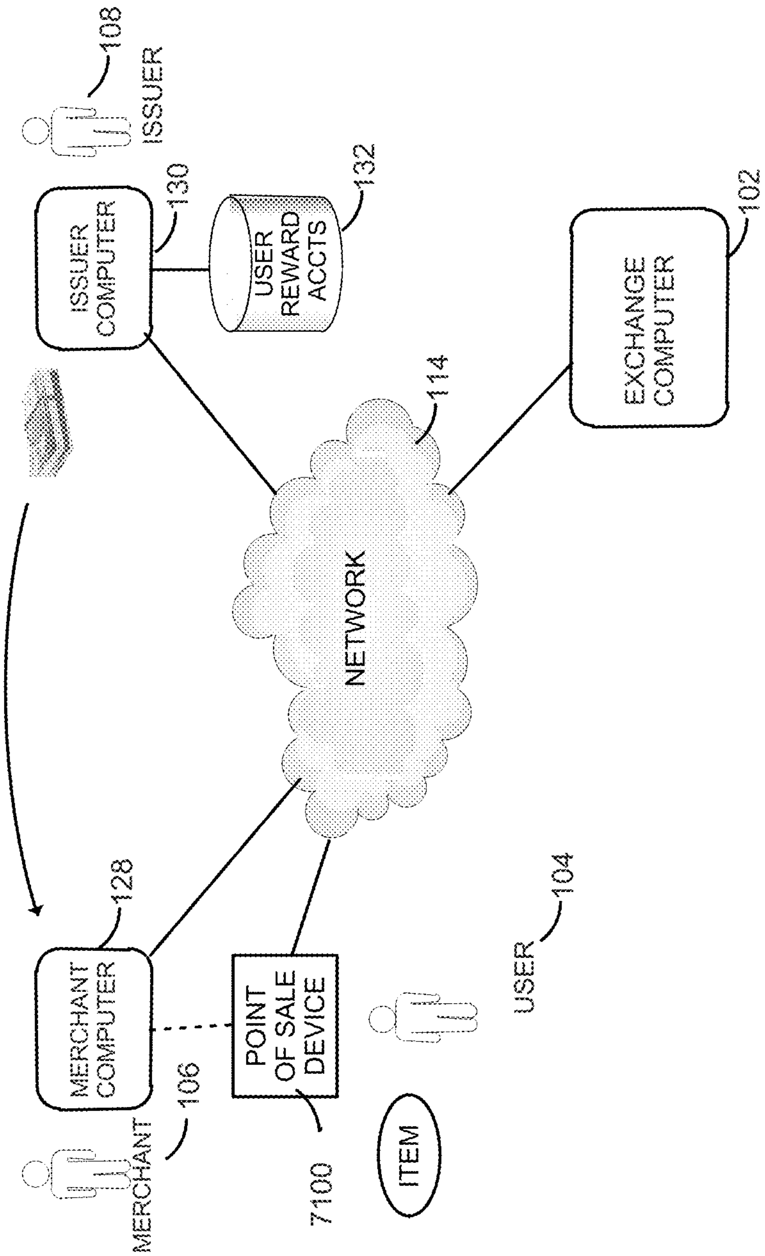
FIG. 1*d* is a system diagram of an alternative embodiment of the present invention utilizing a point of sale device.
Figure 1:
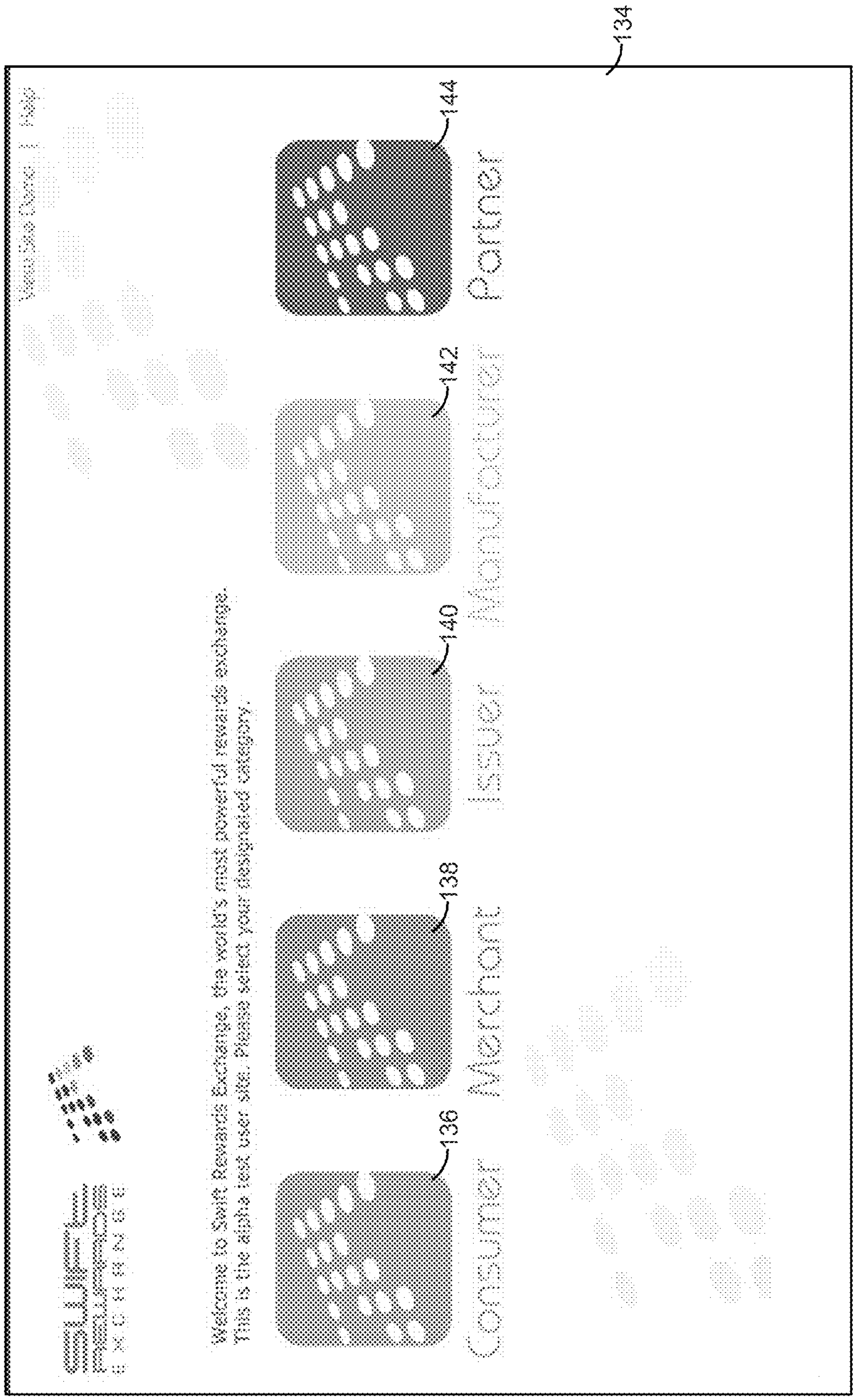
FIG. 1 is a screen shot of a home page of the reward exchange system in one alternative embodiment.
Figure 2:
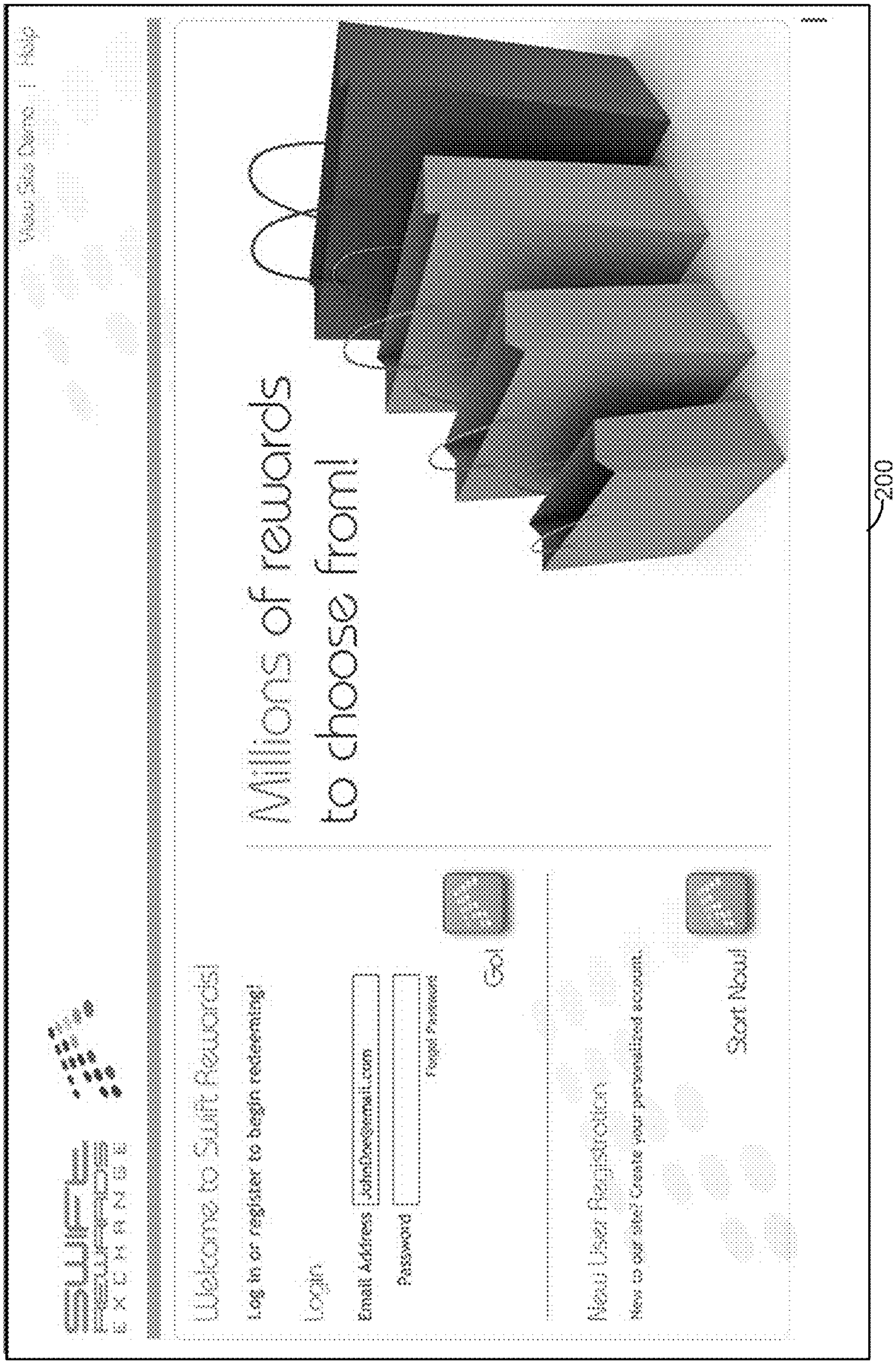
FIG. 2 is a screen shot of a direct user login page in another alternative embodiment.

FIG. 2 is a screen shot of a user login web page 200 that is served from the exchange computer 102 to the user computer 126 accessed when selecting the consumer/user button 136 in FIG. 1. In an alternative, the user will be able to access the exchange computer 102 directly by entering the URL of this particular user login page 200.

In a preferred embodiment, the user may enter or be ported to the exchange computer 102 web site directly by selecting a button or other control from a reward issuer web site or from a merchant web site that is offering a desired product available via the exchange. So, for example, a user may be viewing a web catalog of a merchant such as BEST BUY, and view a DVD player of interest. If that merchant is also making that DVD player available via the exchange, then the merchant will also provide a link button with an image of the exchange and/or text such as "CLICK HERE TO BUY THIS PRODUCT VIA THE REWARDS EXCHANGE". In the case of a rewards issuer web page, the text may read "GET MORE FOR YOUR POINTS", "REDEEM FASTER", TURBO-CHARGE YOUR REWARDS", etc. By clicking through this link, the user will be linked directly to the exchange computer 102 web site, automatically logged in, and a page that displays the desired product (along with reward point redemption options) is provided. If the user is not yet a member of the exchange he would be automatically registered with the exchange based upon the data contained within the existing entry site's database (reward issuer or merchant, as the case may be) or by some other means well known in the art and be directed to the exchange site's user home page or category page depending on the level of connectivity with the originating site; the exchange web page may be modified to reflect the attributes of the originating web page/site or be white labeled/custom banded to reflect the issuer or merchant. When entry is from a participating issuer, that issuer will be designated as the "primary market maker" of that transaction and may direct certain rules of redemption to apply. This direct link embodiment is further described below.

Figure 3:
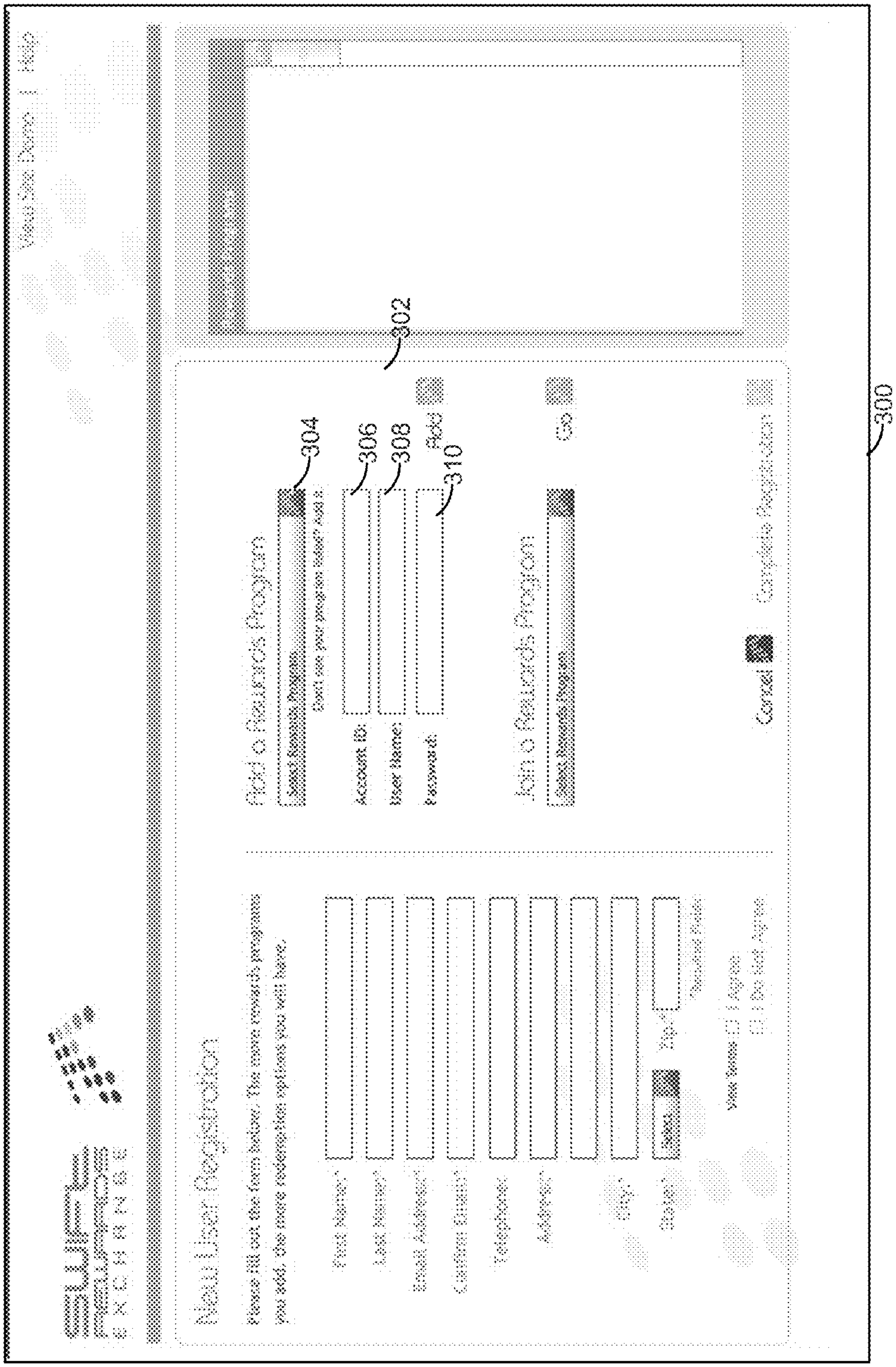
FIG. 3 is a screen shot of a new user registration page in which users may also add reward programs to their profile.
Figure 4:
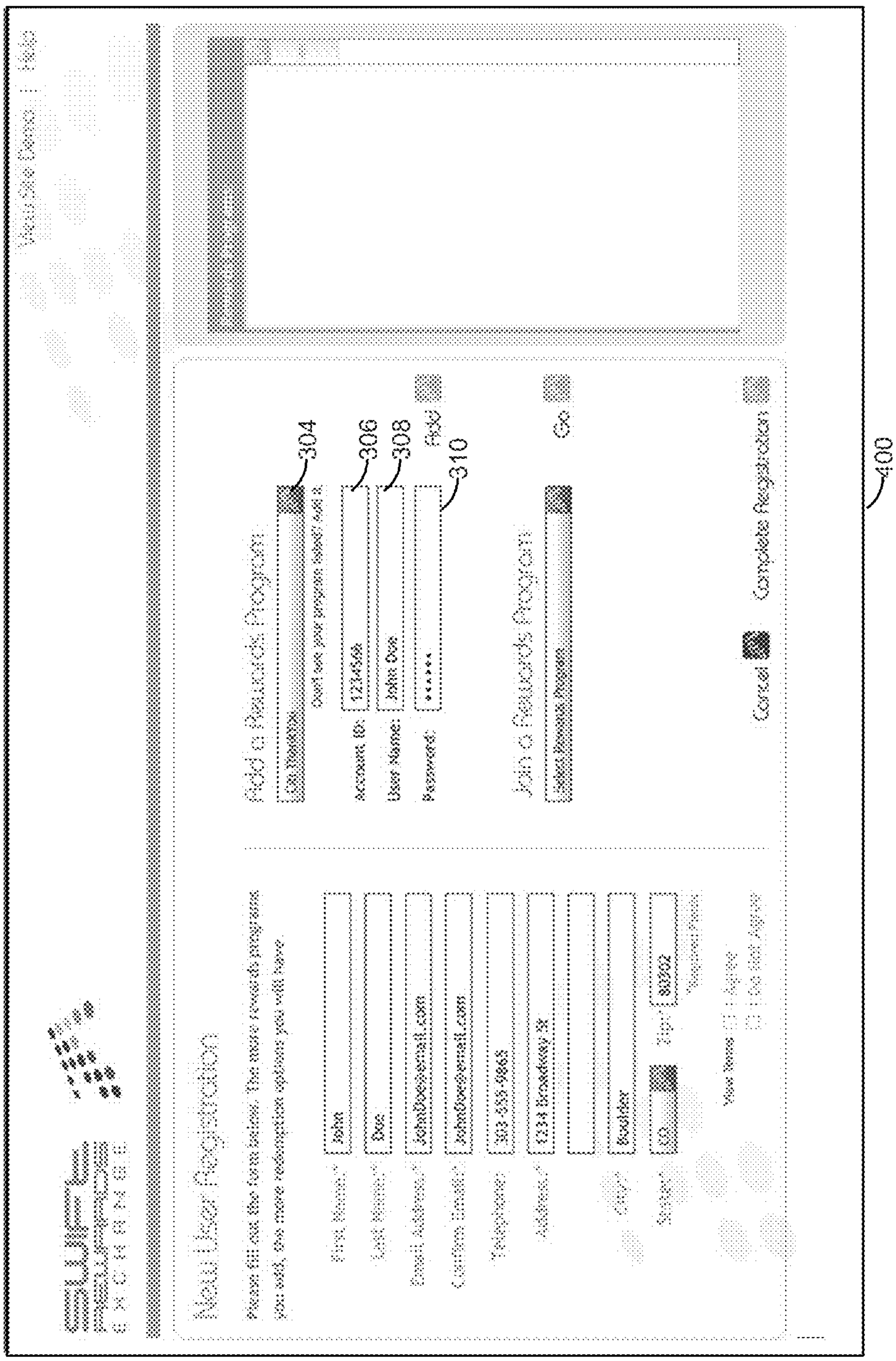
FIG. 4 is a screen shot of the page of FIG. 3 in which a reward program is being added to the profile.
Figure 5:
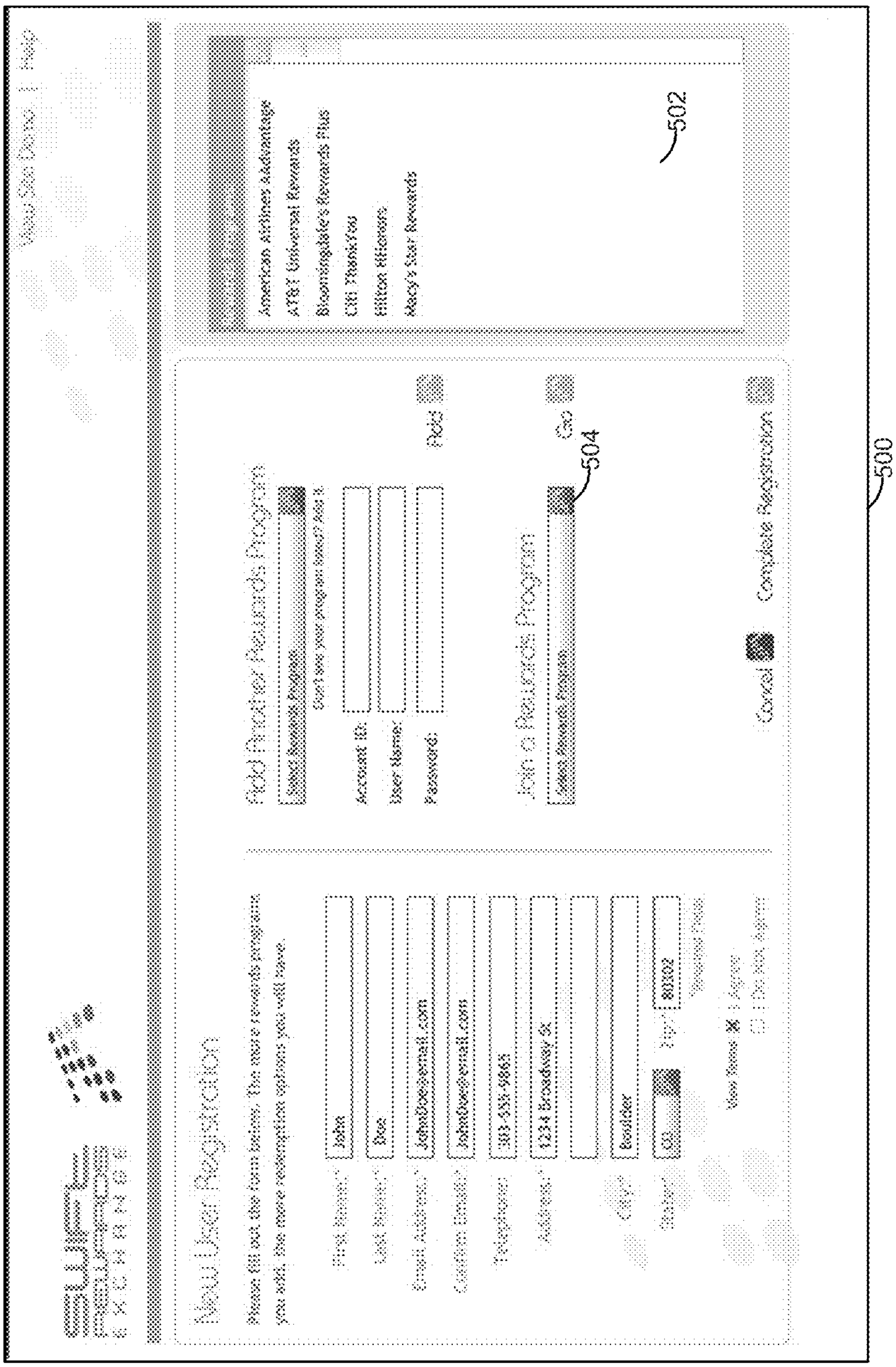
FIG. 5 is a screen shot of the page of FIG. 3 in which several reward programs have been added to the profile.
Figure 6:
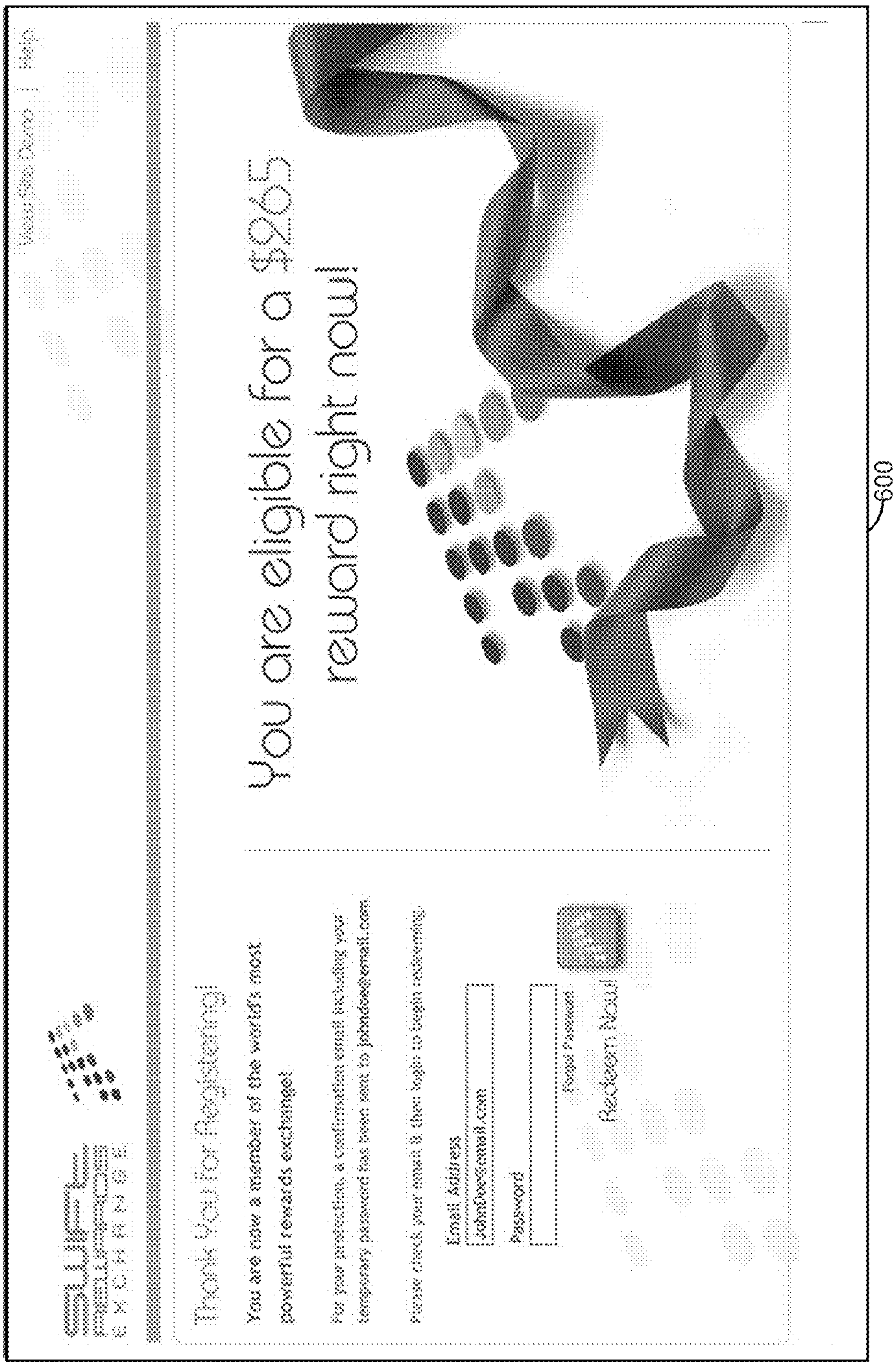
FIG. 6 is a screen shot of an instant reward offer.

Referring back to the user login page 200 of FIG. 2 that is displayed on the user computer 126, the user may login to the system as known in the art (name and password). If the user is a new user, he may register via the new user registration page 300 of FIG. 3. In FIG. 3, new users add their name and other contact information. Users may also add reward programs to their profile by selecting the Add a Rewards Program section 302, and then entering the required information including the name of the rewards program (from the drop down list 304), their account identification number in text box 306, their user name in text box 308, and their password in text box 310. FIG. 4 is a screen shot of a web page 400 in which a reward program is being added to the profile by selecting the program name (CITI THANKYOU), entering the account ID, user name and password. FIG. 5 is a screen shot of a web page 500 in which several reward programs have been added to the user's profile as shown in the column 502 at the right side. In addition to entering reward programs in which the user is already a member, the user may be given the option to join a rewards program by selecting it from the Join a Rewards Program drop down list 504. FIG. 6 is a screen shot of a web page 600 for an instant reward offer that is shown to the user after he has completed or updated his profile information as described above. The user may also login at this point where indicated.

All of the reward program and other user information that is entered by the user is stored in a user profile database 116 as shown in FIG. 1*b* in association with the exchange computer 102 for future use by the exchange computer 102 as described herein.

Once the user has entered all of his reward program information, the exchange computer 102 will communicate with each of the issuer computers 130 with which the user is enrolled with a reward account. The exchange computer receives reward account information 132 from each of the issuer computers 130 for the user 104. For example, the exchange computer 102 will request reward information from reward program 1 operated by issuer 1, from reward program 2 operated by issuer 2, from reward program 3 operated by issuer 3, etc., all of which have been entered by the user since the user is enrolled with each of those issuers. The exchange computer 102 then calculates a promotional wallet for the user, which comprises a total redeemable value for all of the user's reward accounts stored in the plurality of issuer computers. Thus, if the user has 3,000 reward points in reward program 1 that have a redeemable value of $30, and 5,000 reward points in reward program 2 that have a redeemable value of $50, and 10,500 reward points in reward program 3 that have a redeemable value of $105, then the total redeemable value in the user's promotional wallet is $185. The exchange computer then displays to the user via the user computer the user's promotional wallet, for example with a display that states "THE TOTAL REDEEMABLE VALUE OF YOUR PROMOTIONAL WALLET FOR ALL OF YOUR REWARD PROGRAMS IN THE AGGREGATE IS $185."

The user's promotional wallet may be revised from time to time in order to show changes in the value. For example, if a user earns more reward points with an issuer, or if a user redeems reward points either through the exchange or directly with an issuer, then the number of reward points available for redemption will change and of course the value of the promotional wallet will change accordingly. Similarly, if a user adds a new reward program to his user profile, the value of the reward points in that newly added account will be added to the promotional wallet. The promotional wallet may be recalculated periodically or when any of these events may occur, as desired.

In the example given above, it has been assumed that the reward points have a redeemable value of one cent per point. However, the redeemable value may be different based on a value set by the issuer. In an alternative embodiment, the redeemable value of the reward points from an issuer may be different for redemptions with different merchants, based on a trading agreement between an issuer and a merchant, as discussed below. For example, issuer 1 may assign a value of one cent per point for transactions with merchant 1, but it may assign a value of 0.9 cents per point for transactions with merchant 2, etc. Conversion or exchange rates used to calculate the various values may be stored by the exchange computer, the merchant computer, and/or the issuer computer.

The user may of course always modify his user profile to provide any other reward programs information as desired. For example, the user may subsequently register with a new reward program, which may be added to the user profile so he can access that reward program via the exchange system. In addition, the system may be configured to periodically check its user list against issuers in its issuer profile database 118 to see if any of the users may be already enrolled in one of its issuer's reward programs but not entered by the user in his profile. For example, if a user neglects to enter his CHASE VISA reward program into the system, and CHASE VISA is a registered issuer, then the system can check with CHASE VISA to see if that user has a reward program there. If so, the exchange system may invite the user to enroll that program with the system, or it may be adapted to do so automatically via the CHASE VISA reward server if desired.

Figure 7:
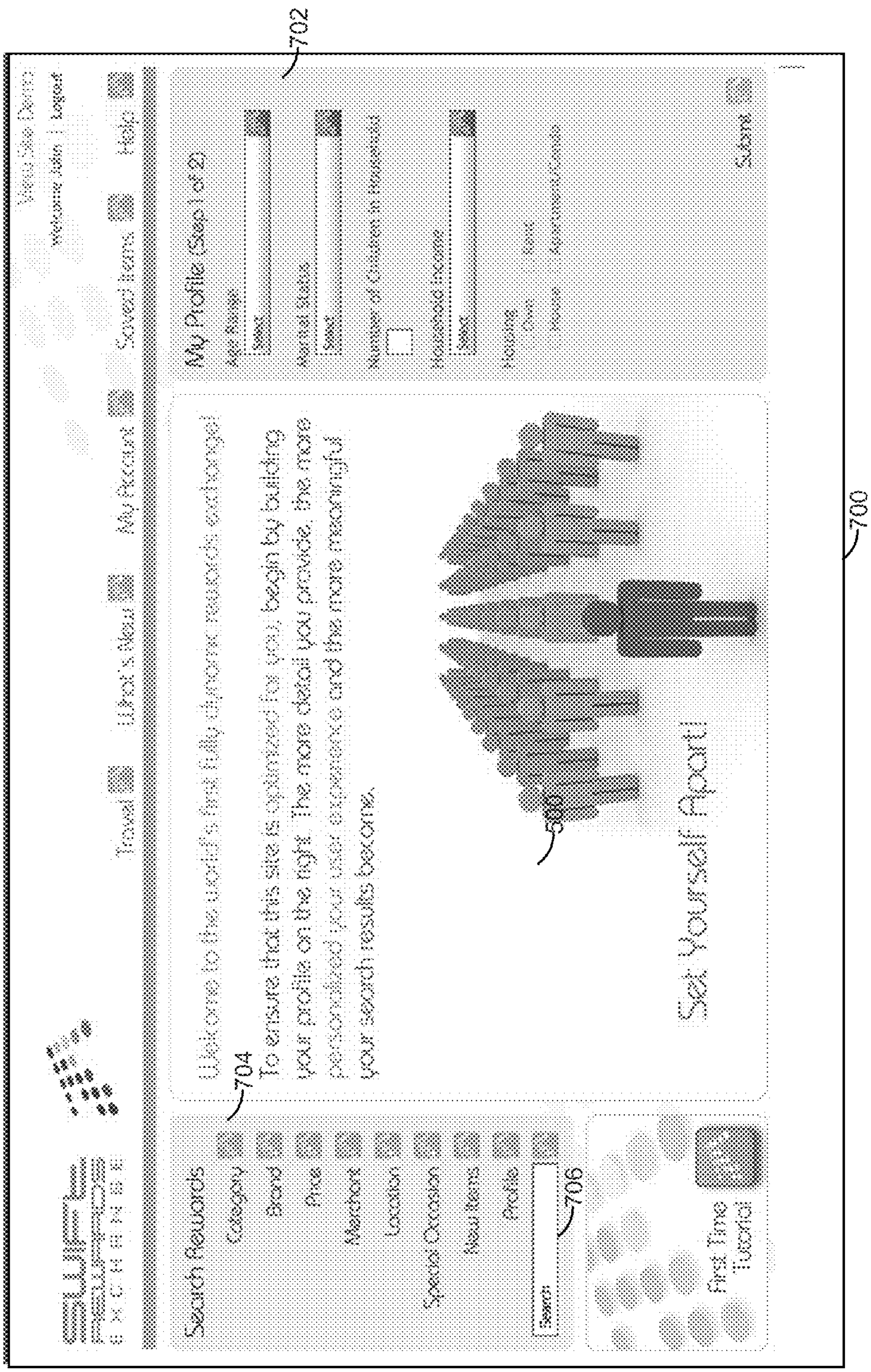
FIG. 7 is a screen shot of the user's home page.
Figure 8:
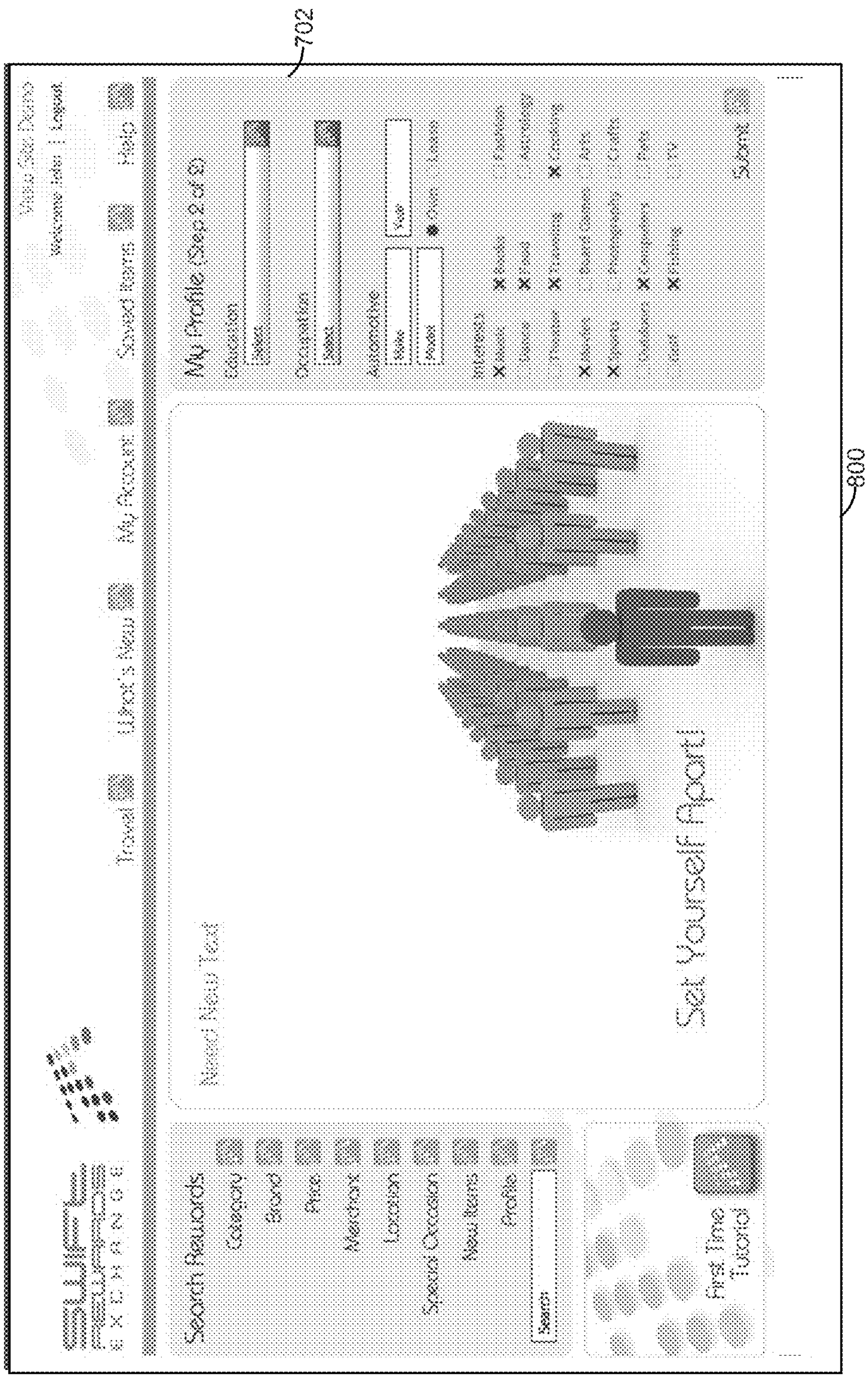
FIG. 8 is a screen shot of the user's home page with a user profile entry section.

FIG. 7 is a screen shot of the user's home page 700 that is accessed after logging in. There, the user can enter additional user profile information in the My Profile section 702 on the right side, as shown in web page 800 of FIG. 8.

In a preferred embodiment, independent web sites of merchants and manufacturers that engage in the reward activity will use the exchange system logo as a button link with a tag line such as "REDEEM FASTER". When the user selects this link, he is linked to the exchange web site and automatically logged in (if he is already a member) or invited to register or optionally automatically registered (if he is not a member). In this case, the user will not see the web page 134 of FIG. 1, but may be linked directly to the web page 900 of FIG. 9 for example to begin his search or directly to a product information page 2100 such as in FIG. 21 if he has already selected a product from the merchant's independent web site that linked him to the exchange computer 102. This allows users to utilize a more natural shopping behavior.

Referring back to FIG. 7, the user's home page 700 enables the user to perform various searches for desired goods or services. The Search Rewards menu 704 at the left side provides the ability to begin a search based on category, brand, price, merchant, location, special occasion, new items, or profile. A free-form search text entry box 706 is also provided.

Figure 9:
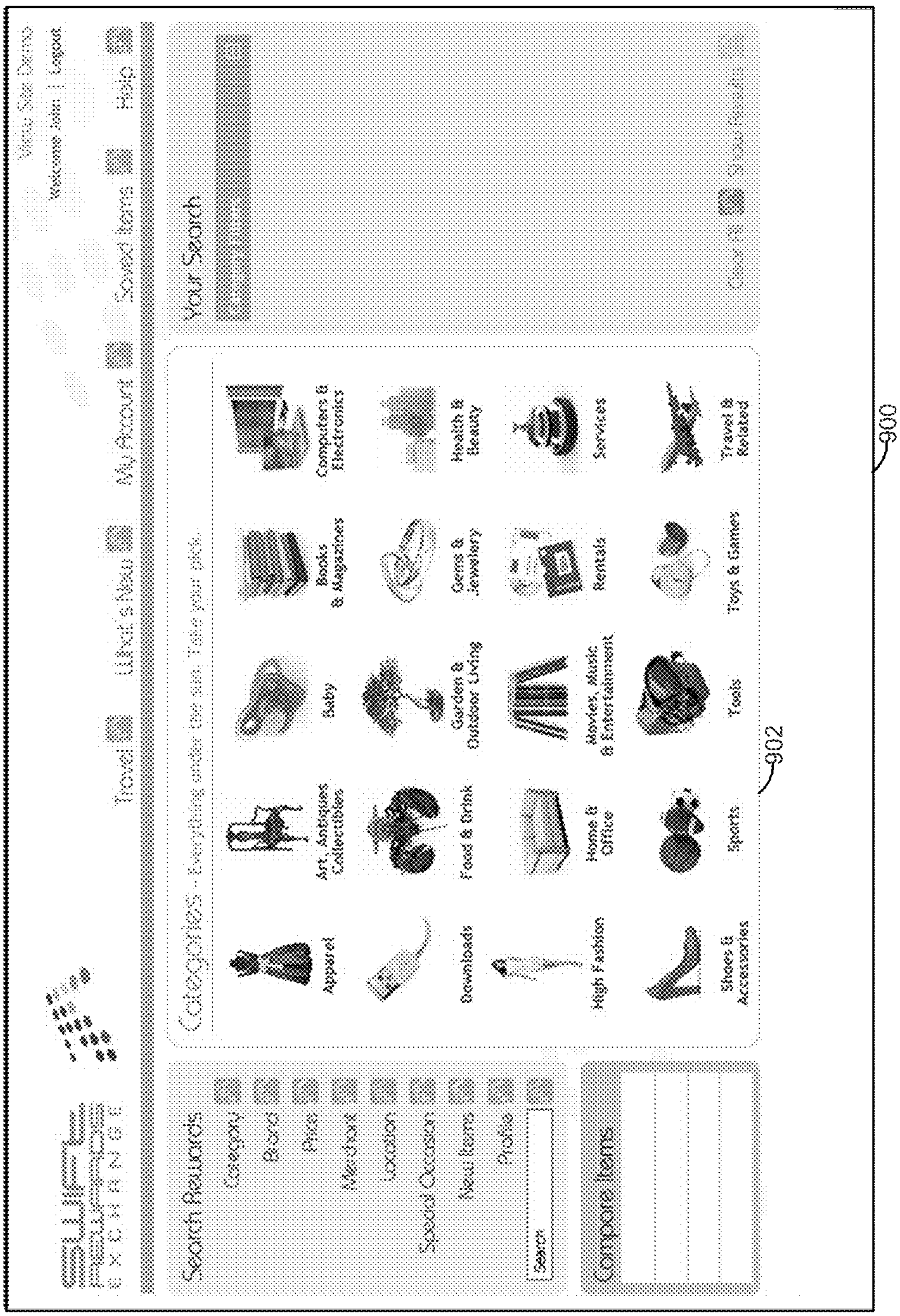
FIG. 9 is a screen shot of a user redemption item search page with category selections.
Figure 10:
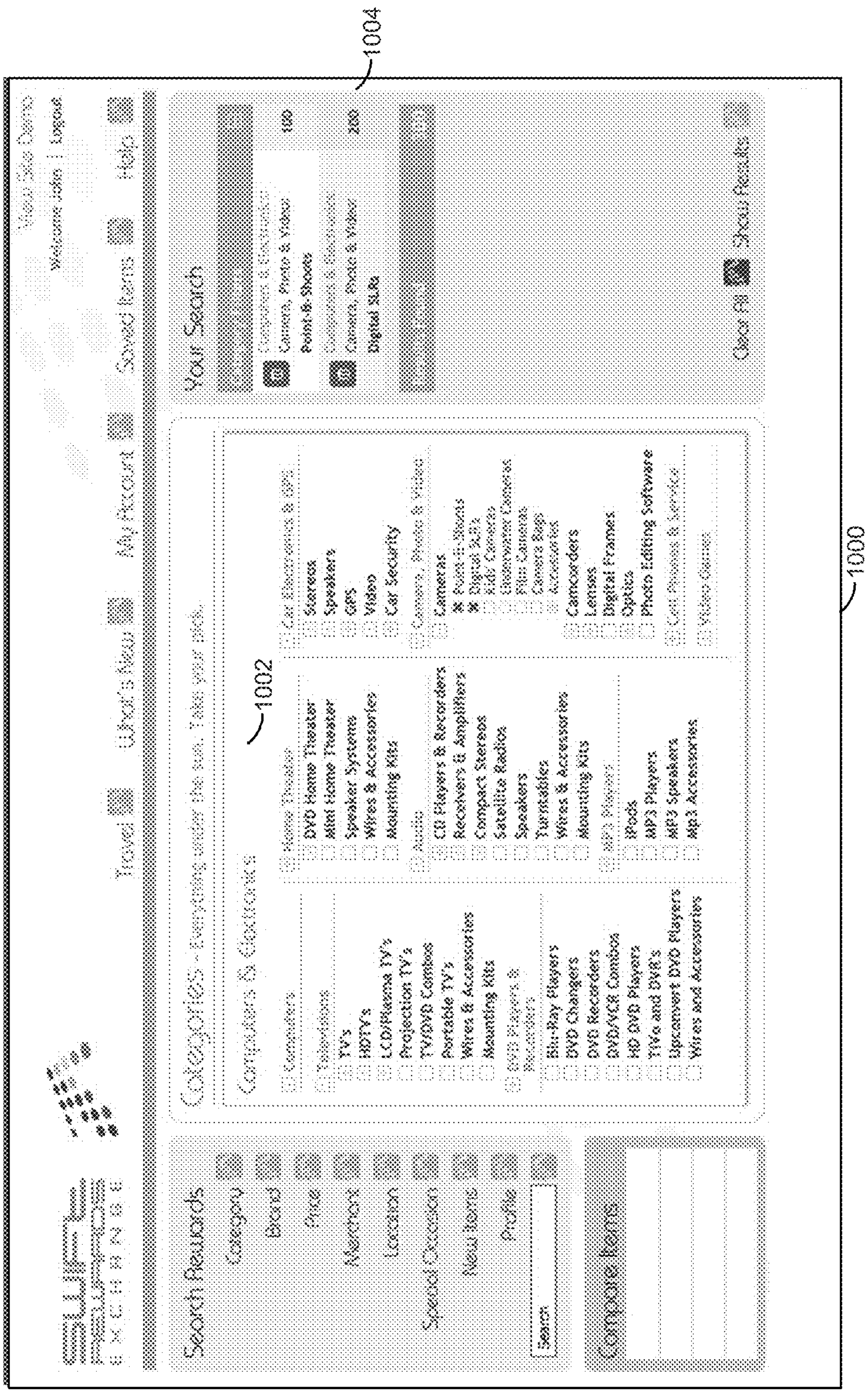
FIG. 10 is a screen shot of a user redemption item search page based on a category with a detailed sub-category listing.

FIG. 9 is a screen shot of a user redemption item search page 900 with category selections 902. There, various major categories are presented in text and icon view. If the user for example selects Computers and Electronics, then the web page 1000 of FIG. 10 is presented on the user computer with numerous drill-down sub-categories 1002 of more detail. In FIG. 10, the user has selected cameras:point-and-shoot and cameras:digital-SLRs. These selections then are presented in the search results box 1004 on the right side, along with the number of results for each sub-category after the exchange computer has searched product database 117 as shown in FIG. 1*b*.

Figure 11:
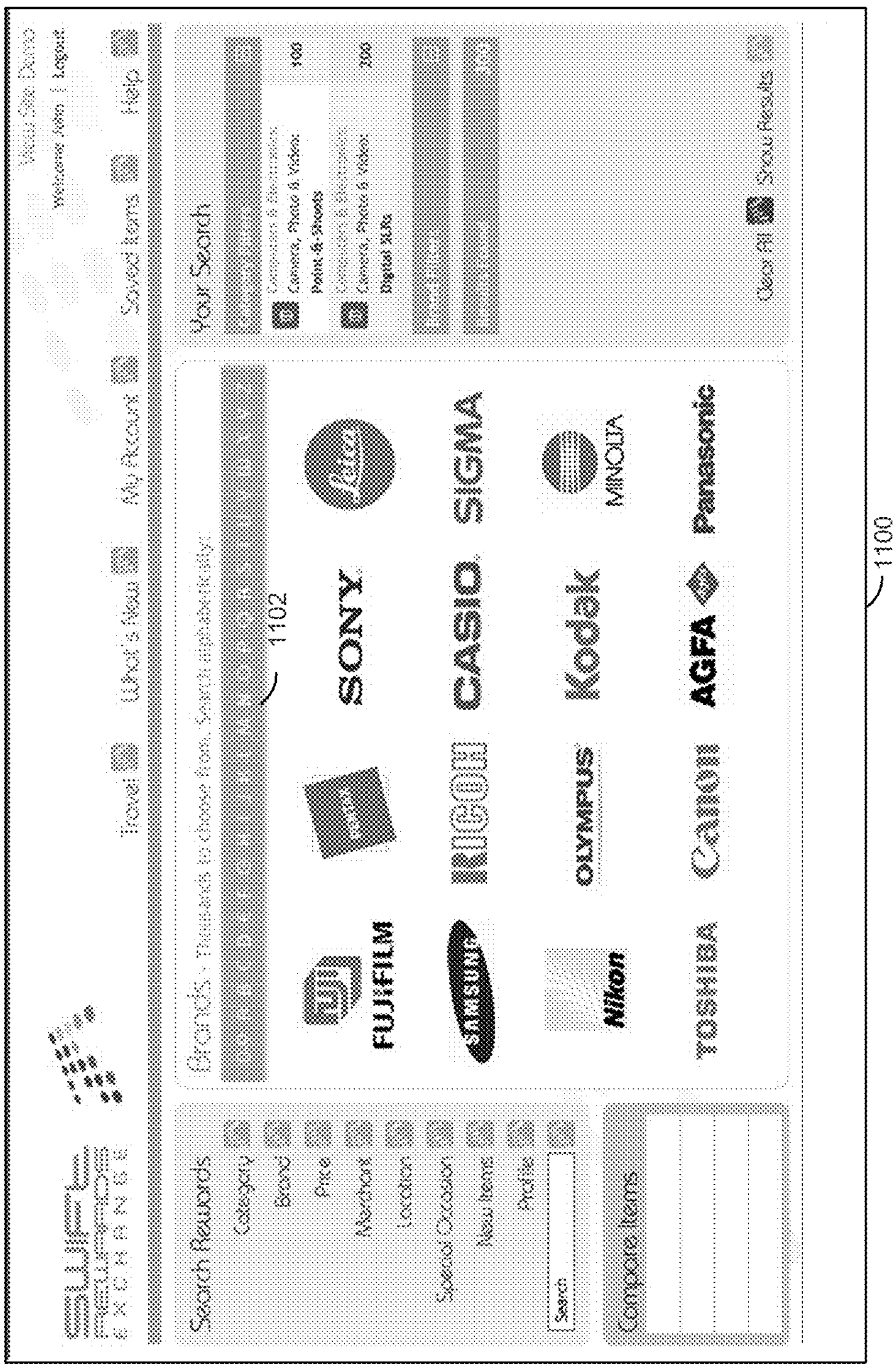
FIG. 11 is a screen shot of a page the enables searching for items by featured brand name.
Figure 12:
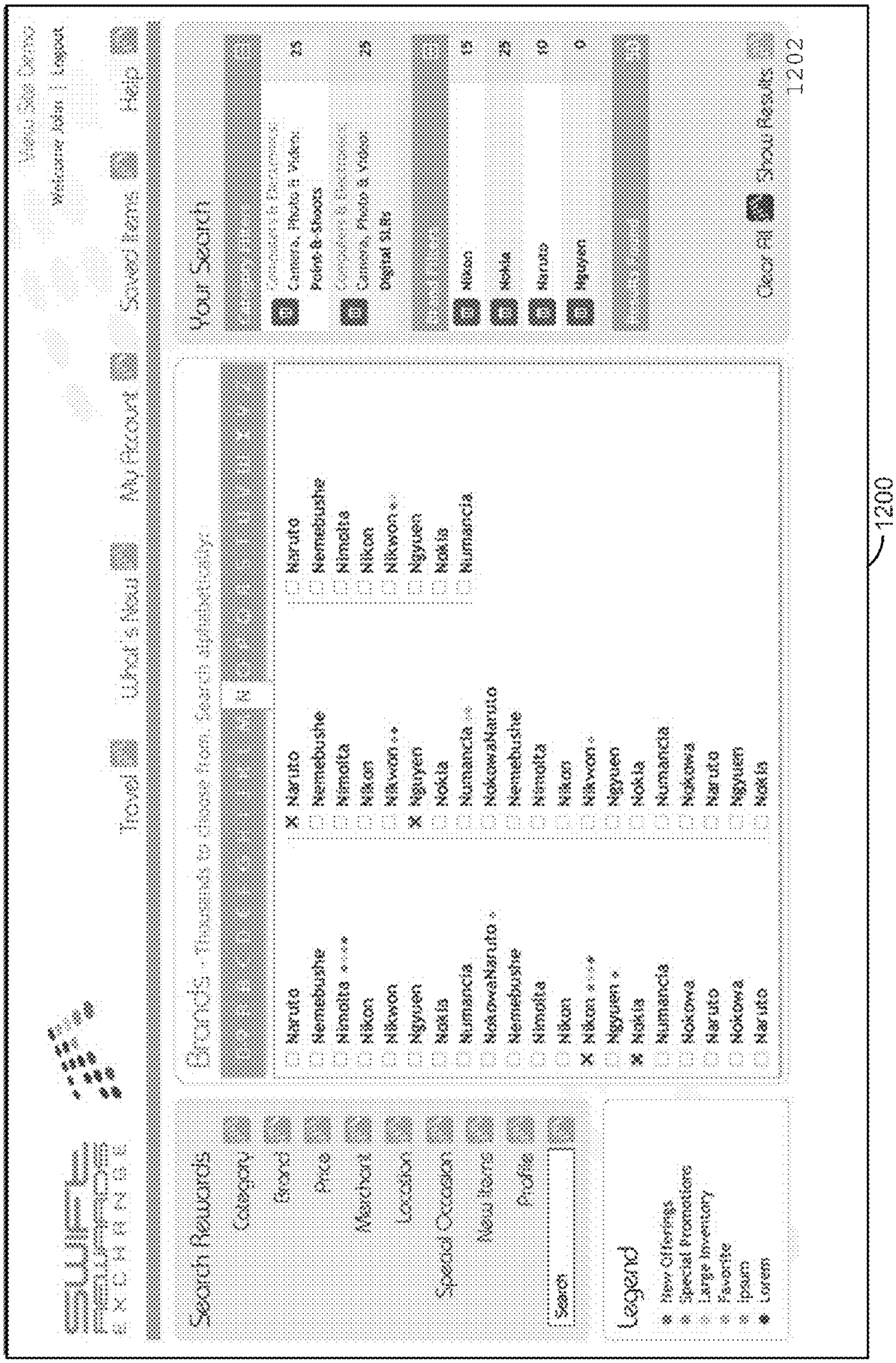
FIG. 12 is a screen shot of a page that enables searching for items by a detailed brand name selection.

FIG. 11 is a screen shot of a web page 1100 the enables searching for items by featured brand name such as SONY or KODAK. Since the user has selected two "cameras" categories, the system provides featured brand names of only those companies that can provide cameras. In addition, the user may select from numerous other brands by selecting the alphabetical bar 1102 as shown. FIG. 12 is a screen shot of a web page 1200 that enables searching for items by a detailed brand name selection, wherein "N" has been selected and the brands available in that grouping are presented. In the web page 1200 of FIG. 12, several "N" brands have been selected. The search results on the right side are now narrowed as shown. That is, the results have provided 50 hits that can be viewed by the sub-category previously selected as well as by brand name as shown.

Also shown in FIG. 12 is a Show Results button 1202. The user may use this button to cause the search engine to display the detailed results of the search based on the previously-entered search criteria. In this example, the user has configured the category filter (see FIG. 10) and the brand filter to arrive at 50 results as shown in FIG. 12. By selecting the Show Results button at this stage, the user will then be provided with a web page that displays the results of the search; for example as described below with reference to FIG. 14. By preventing the specific search results from being shown until the user actually selects the Show Results button 1202, several benefits are achieved. In the prior art, typical search engines will show products to users in a click-through model whereby the search engine directs the user to the merchant's web site such that the merchant ends up paying for the click-through and the consumer is forced to a site he or she may not want to be at. In this invention, the click-through model is avoided such that the merchant will not be required to pay a click-through fee to the search engine, content provider or aggregator and the user is not forced into the merchant site. The merchant is freed from the click-through model and ultimately acquires a more focused inquiry from the user with a higher conversion to executed transactions.

The search results therefore may be dynamically refined when the user implements additional dynamic search filters without showing the search results until the user selects the Show Results button 1202. That is, by selecting any or all of the search filters shown in the search rewards menu 704 (i.e. category, brand, price, merchant, location, special occasion, new items, etc.) the user can drill down to a manageable group of desired products and avoid the prior art click-through model as described with greater accuracy and thereby eliminating extraneous information.

Thus, in accordance with this embodiment, a web page is transmitted to the user computer that provides for the display of a plurality of available search criteria (as shown for example in search rewards menu 704 as well as category selection 902, sub-categories 1002, etc.), each of the available search criteria being independently selectable by a user for searching a database 117 of items available for purchase; receiving from the user computer a search criteria selection obtained from the plurality of available search criteria; searching the database 117 of items available for purchase to determine items matching the search criteria selection; transmitting to the user a web page (such as web page 1200) that provides for the display of a quantity of items matching the search criteria selection; and repeating steps the above steps as desired by the user whereby the quantity of items displayed match all of the search criteria selections received from the user computer.

The user is able to selectively delete, add, and modify any or all of the search criteria at any time during this process, in any desired combination and in any order, thereby providing a rich and dynamic user experience.

At some point, a request is made by the user to display descriptions of the items that match all of the search criteria selections received from the user computer (such as by selecting the Show Results button 1202); and one or more web pages are transmitted to the user computer that provide for the display of the descriptions of the items that match all of the search criteria selections received from the user computer (such as web page 1400).

Figure 13:
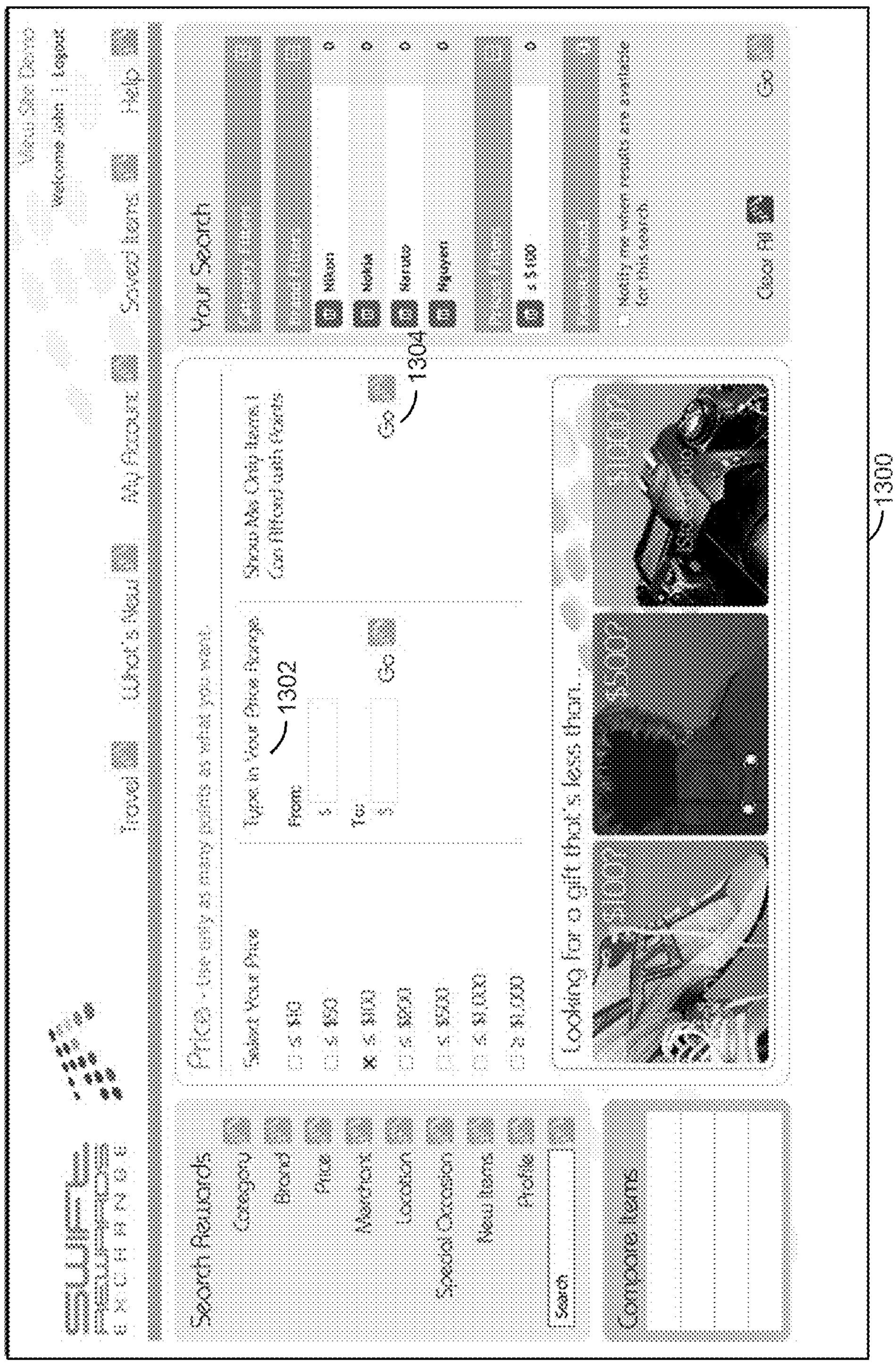
FIG. 13 is a screen shot of a page that enables searching by item price.

FIG. 13 is a screen shot of a web page 1300 that enables searching by item price. Here, the user has selected less than one hundred dollars, but no hits are returned for any of the previously selected brands and sub-categories. The user could if desired enter a price range into section 1302, or he could also force the search engine to show only those results that can be obtained with points with selection 1304. If this is selected, then the search engine 162 operating on the exchange computer 102 must first calculate the monetary value of the user's reward points in all accounts referenced by user profile 116 (the promotional wallet) and then use that value as a search criteria into the product database 117.

Figure 14:
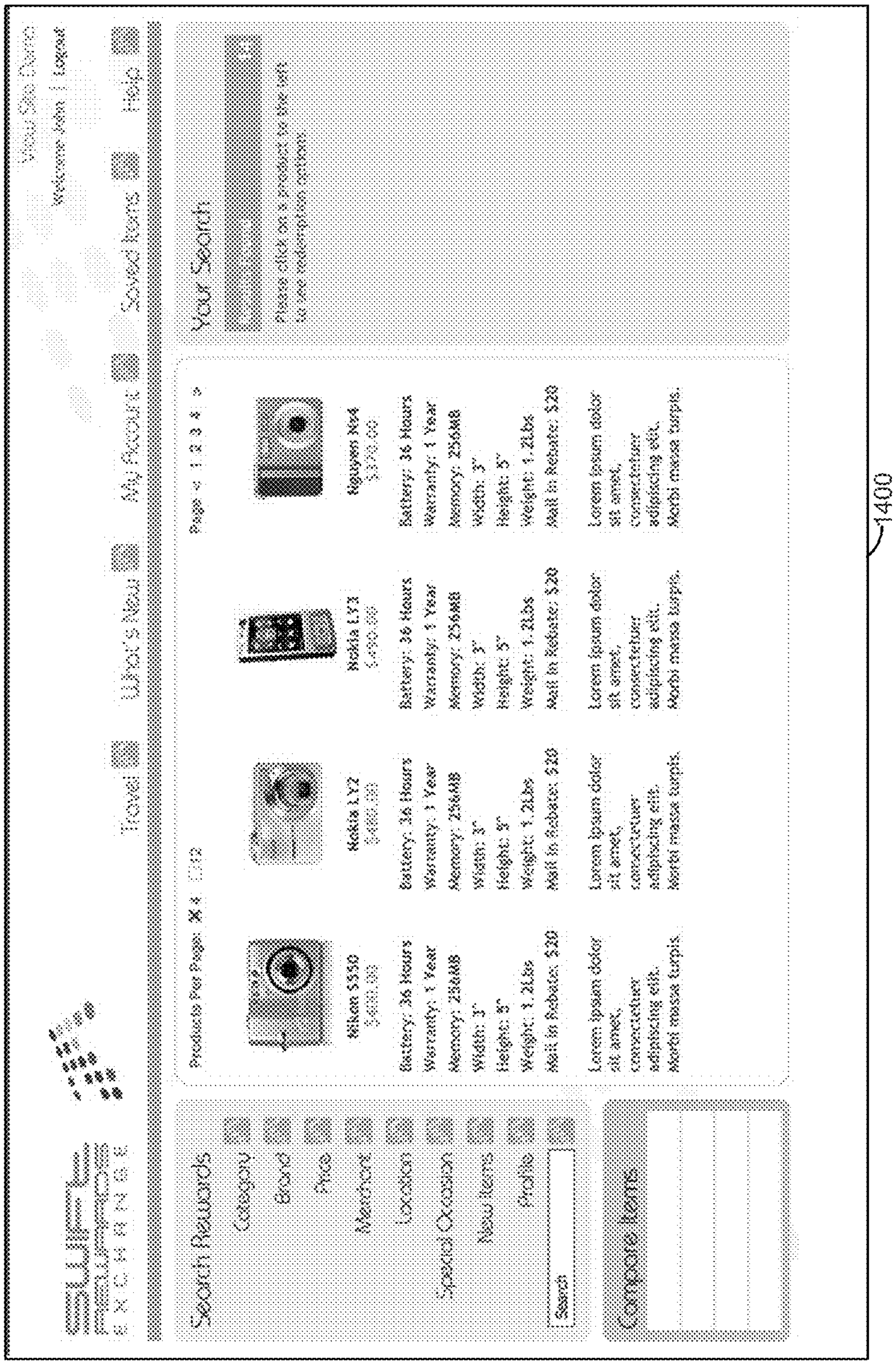
FIG. 14 is a screen shot of a web page that has several available items for redemption.
Figure 15:
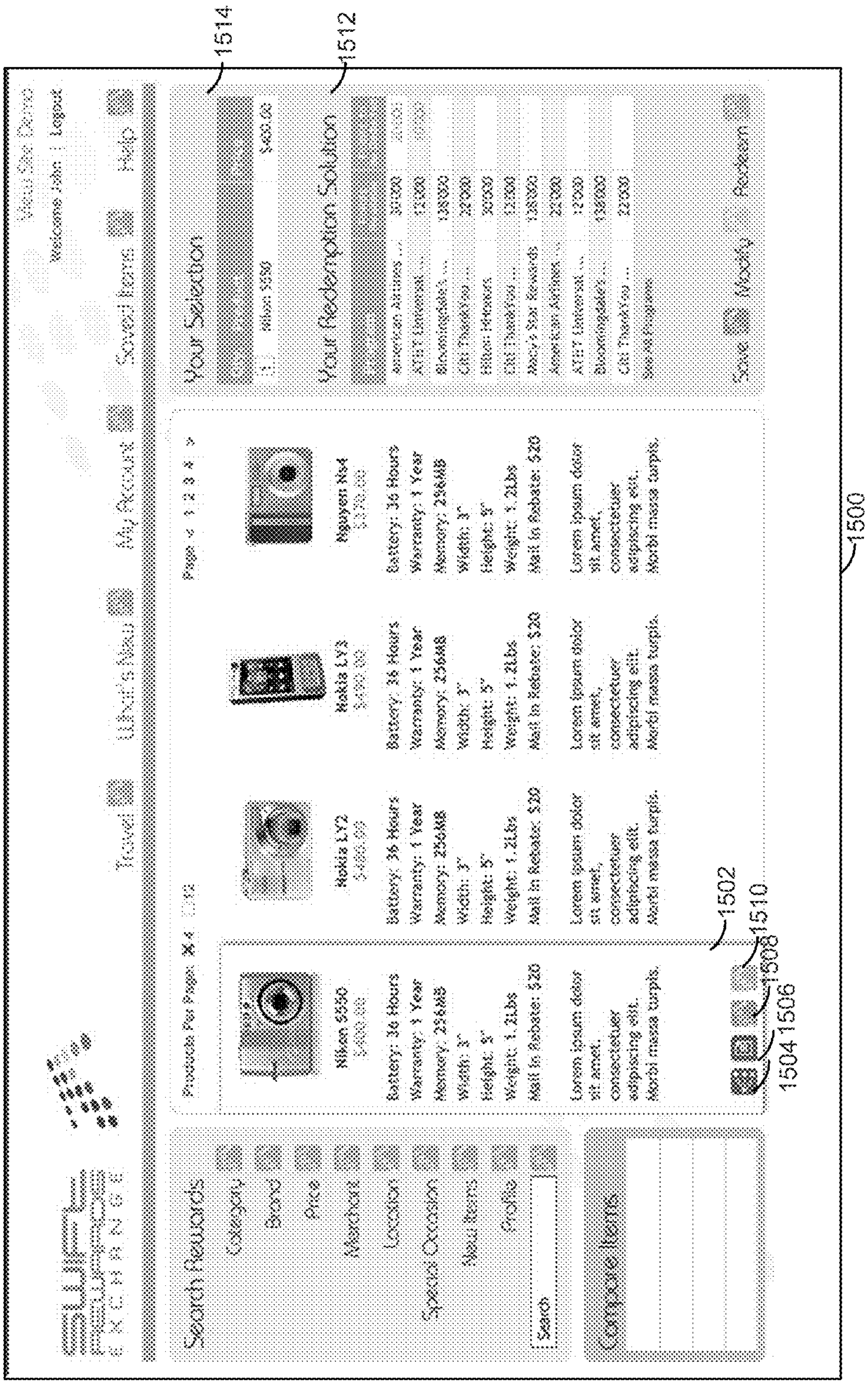
FIG. 15 is a screen shot of a web page with an item selected by a mouse rollover.

FIG. 14 is a screen shot of a web page 1400 that is displayed after the user has selected the Show Results button 1202 as described above. As can be seen, in this example there are several available items for redemption based on previously entered search criteria. The user may select to see only four products per page or 12 products per page. As can be seen, there are 14 total products in the product database 117 that met the user's search criteria. FIG. 15 is a screen shot of a web page 1500 with an item 1502 selected by a mouse rollover or the like. Once the user selects an item 102 by rollover, several options appear at the bottom of the item description. The first button 1504 is to select that item for a comparison, the second button 1506 is to fetch more detailed information about that item, the third button 1508 is to select that item for purchase, and the fourth button 1510 is to save that item for future viewing.

In addition to returning to the user quantities and descriptions of products that match the search criteria designated by the user, the exchange computer may also employ algorithms referred to as fuzzy logic to return, if desired, quantities and descriptions of items that most closely resemble the search criteria entered. This may be especially useful in order to aid a user in making a product selection if the search criteria returns a very small subset of items from the database. For example, if the search criteria is too stringent for the currently available items, then by returning a match to a subset of the search criteria may be helpful. Or, one of the criteria may be broadened by the algorithm such that it is broader than what was originally indicated by the user. This is akin to the exchange computer making suggestions to the user based on search criteria that has been inputed.

As the user is browsing through the various web pages that provide product information, the exchange computer tracks this activity as points of interest. That is, even though a user may not select a particular product to purchase as he browses, a product he is viewing is considered to be a point of interest since the user has shown some interest in that product (or brand, category, or price). The exchange computer tracks these points of interest for the user and analyzes the points of interest over time (which may be only a given browsing session, or over several browsing sessions, etc.). The exchange computer may also dynamically display to the user computer a quantity of products available for redemption that correspond to each of the points of interest selected by the user.

For example, a user may be browsing a category of cameras and select a point and shoot camera to review as well as a digital SLR camera to review. The exchange computer stores and analyzes these points of interest and ascertains that the user may be interested in a third type of camera, and then presents the user with an option to review this new product page if desired.

The exchange computer may provide a proposed redemption solution to the user computer, which designates at least one reward program previously registered in the exchange computer by the user and a quantity of reward points to be redeemed for the purchase of the item by the user. This is displayed in Redemption Solution window 1512 on the right side, which appears once the item 1502 is selected by the user. The user may then either accept the proposed redemption solution, or modify the proposed redemption solution as desired.

The exchange computer 102 will use the cost of the selected item 1502 ($400) and analyze the user's available reward points in reward accounts with which the merchant has an exchange agreement in place (to be described later). The exchange computer will then make a suggestion, which may be modified by the user, as to the points that may be redeemed to pay for the selected item 1502. For example, in this case as shown in section 1512, the exchange server has determined that this user may be able to use 20,000 of his American Airlines points and 10,000 of his AT&T points to pay for the selected item 1502.

The exchange computer determines the proposed redemption solution by any or all of: (1) referencing a user profile stored in an associated user profile database that indicates user preferences as to which of a plurality of reward programs is desired to be used for reward redemption, (2) analyzing prior reward redemptions by the user stored in an associated reward redemption database to ascertain a preferred reward program, (3) ascertaining by reference to a merchant profile database a preferred redemption partner of the merchant from which the user is making the product purchase, (4) referencing an exchange rules profile stored in an exchange rules profile database that indicates exchange preferences as to which of a plurality of reward programs is desired to be used for reward redemption, and/or (5) referencing an issuer rules profile stored in an issuer rules profile database that indicates issuer preferences as to which of a plurality of reward programs is desired to be used for reward redemption.

In the scenario where the exchange computer references a user profile (stored in profile database 116), the user profile contains user preferences that specify which of the reward programs the user wants to use for redemption. For example, a user may specify in his profile to first use the reward points from his CITIBANK reward account, and then use reward points from his AMERICAN EXPRESS reward account when the CITIBANK points are exhausted. In this case CITIBANK is considered to be the primary issuer and AMERICAN EXPRESS is considered to be a secondary issuer. In addition to specifying a preference to redeem the reward points of a primary issuer before redeeming reward points of issuers other than the primary issuer, other scenarios may exist. For example, a preference may be specified by the user in his profile to redeem the reward points of a primary issuer after (rather than before) redeeming reward points of issuers other than the primary issuer.

Similarly, the user may specify a preference to redeem the reward points of a primary issuer up to a specified amount or up to a certain percentage, after which the points of issuers other than the primary issuer will be redeemed. For example, he may specify to redeem points from CITIBANK up to the first $50 of the cost of the item, and then redeem points from other issuers to make up the difference. Further, the user may specify a preference to redeem the reward points of a issuers other than a primary issuer up to a specified amount or up to a certain percentage, after which the points of the primary issuer will be redeemed.

In the alternative to referencing a user profile to determine a proposed redemption solution, the exchange computer may analyze prior reward redemptions by the user stored in an associated reward redemption database 124 in order to ascertain a preferred reward program of the user. So, if the user has not specified in his profile that CITIBANK is his primary or preferred issuer, the exchange computer may be able to ascertain that the user has redeemed CITIBANK reward points in his prior redemptions and then suggest the use of CITIBANK reward points for subsequent redemptions.

In a further alternative, the exchange computer may refer to a merchant profile database 120 in order to ascertain a preferred redemption partner of the merchant from which the user is making the product purchase. So, for example, if the user is requesting a purchase of a TV from BESTBUY, the BESTBUY merchant profile may indicate that CHASE is a preferred redemption partner of BESTBUY. The exchange computer determines this and then checks if the user has registered a reward program with CHASE in his profile. If CHASE has been registered with that user, then the exchange computer will propose a redemption solution that would utilize the user's reward points from his CHASE reward account since CHASE is the preferred redemption partner of BESTBUY.

In a further alternative, the exchange computer may refer to an exchange rules profile stored in an exchange rules profile database 122 that indicates exchange preferences as to which of a plurality of reward programs is desired to be used for reward redemption. An issuer may have preferred status with the exchange system such that its reward program would be first proposed to the user when making a purchase transaction. Likewise, in another alternative, an issuer rules profile stored in an issuer rules profile database 116 may be referenced, that indicates issuer preferences as to which of a plurality of reward programs is desired to be used for reward redemption.

Figure 16:
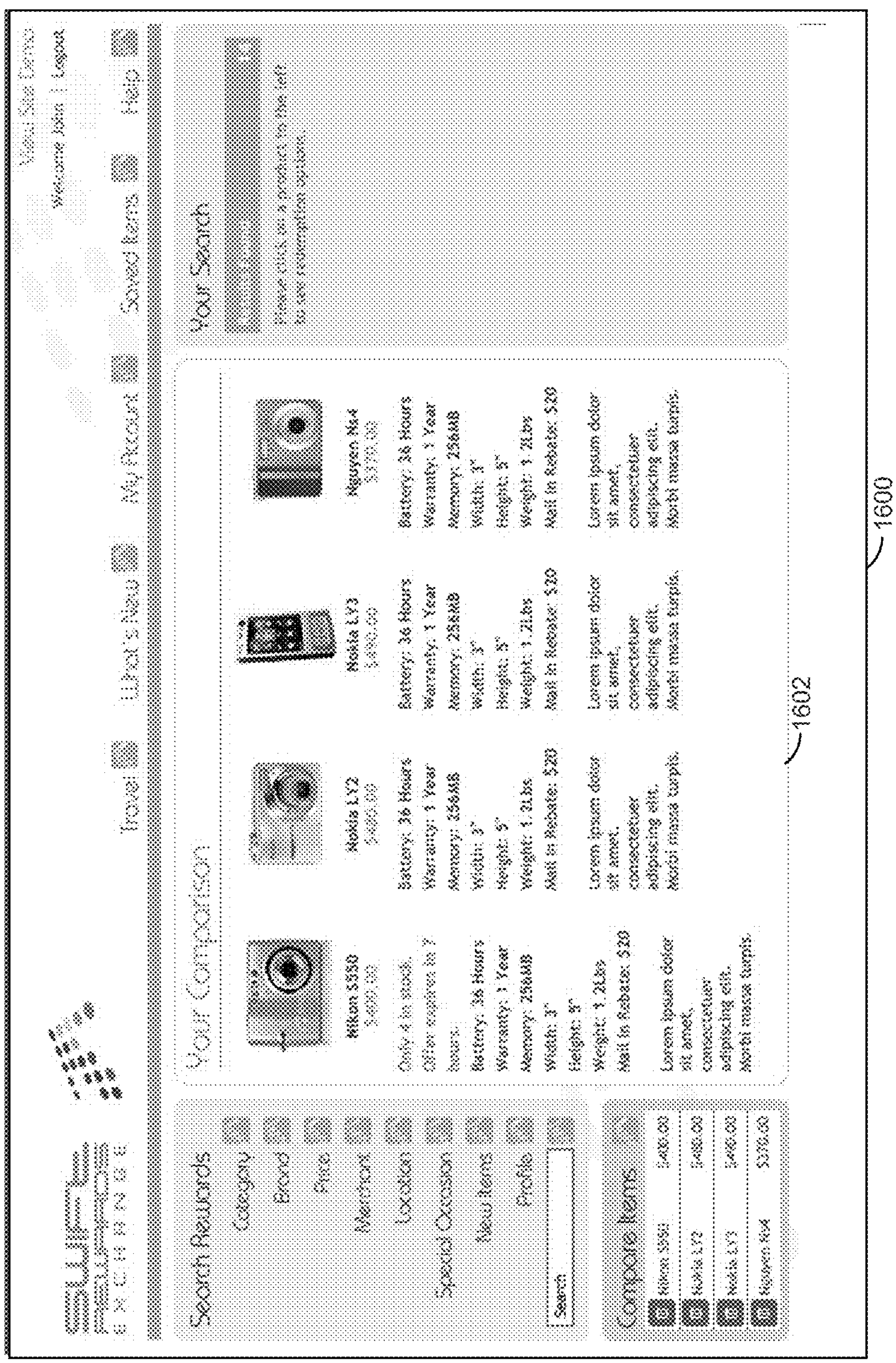
FIG. 16 is a screen shot of a web page with several items selected for comparison viewing.
Figure 17:
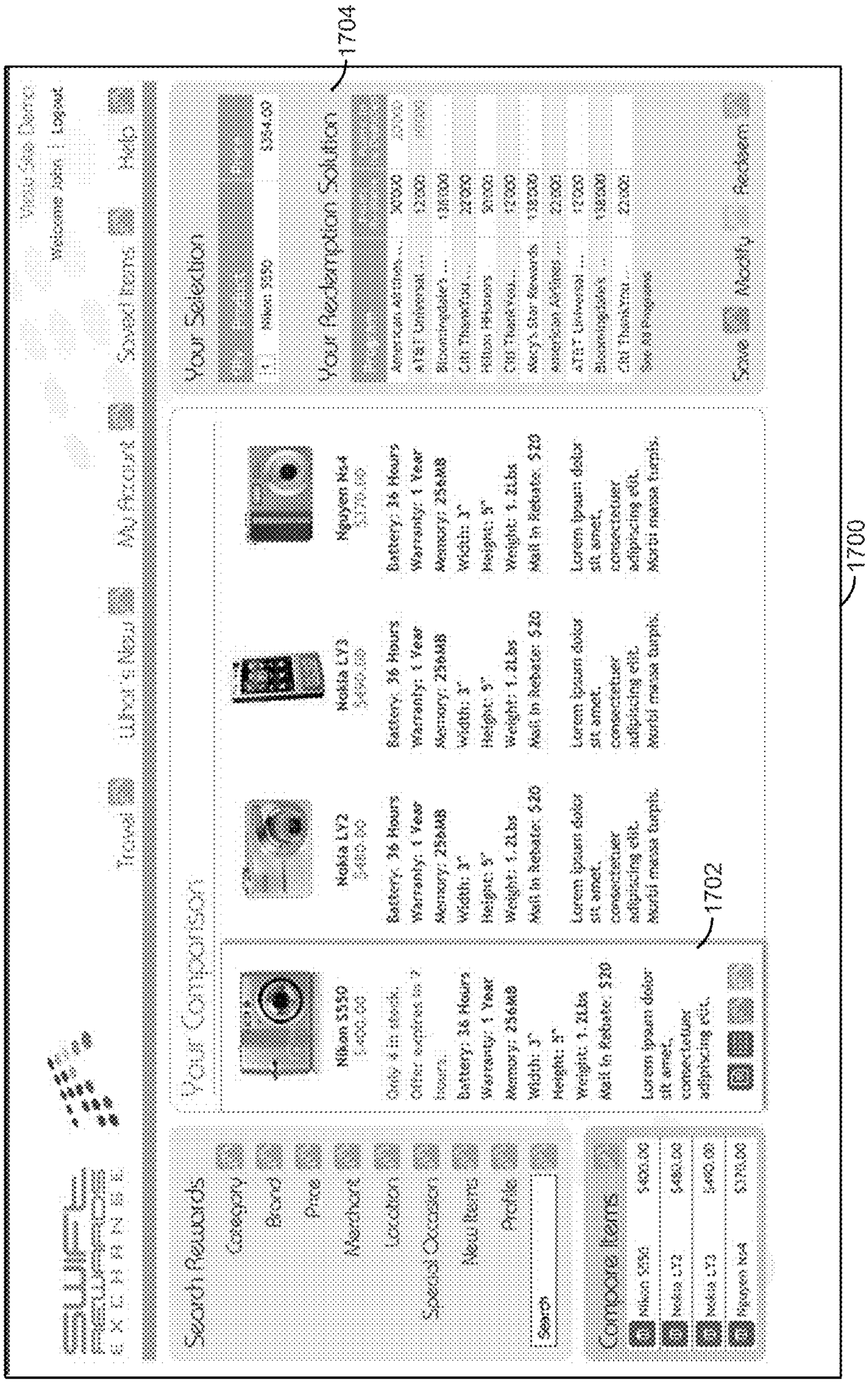
FIG. 17 is a screen shot of a web page with a selected product from the product comparison along with a suggested points redemption solution for obtaining that selected product.
Figure 18:
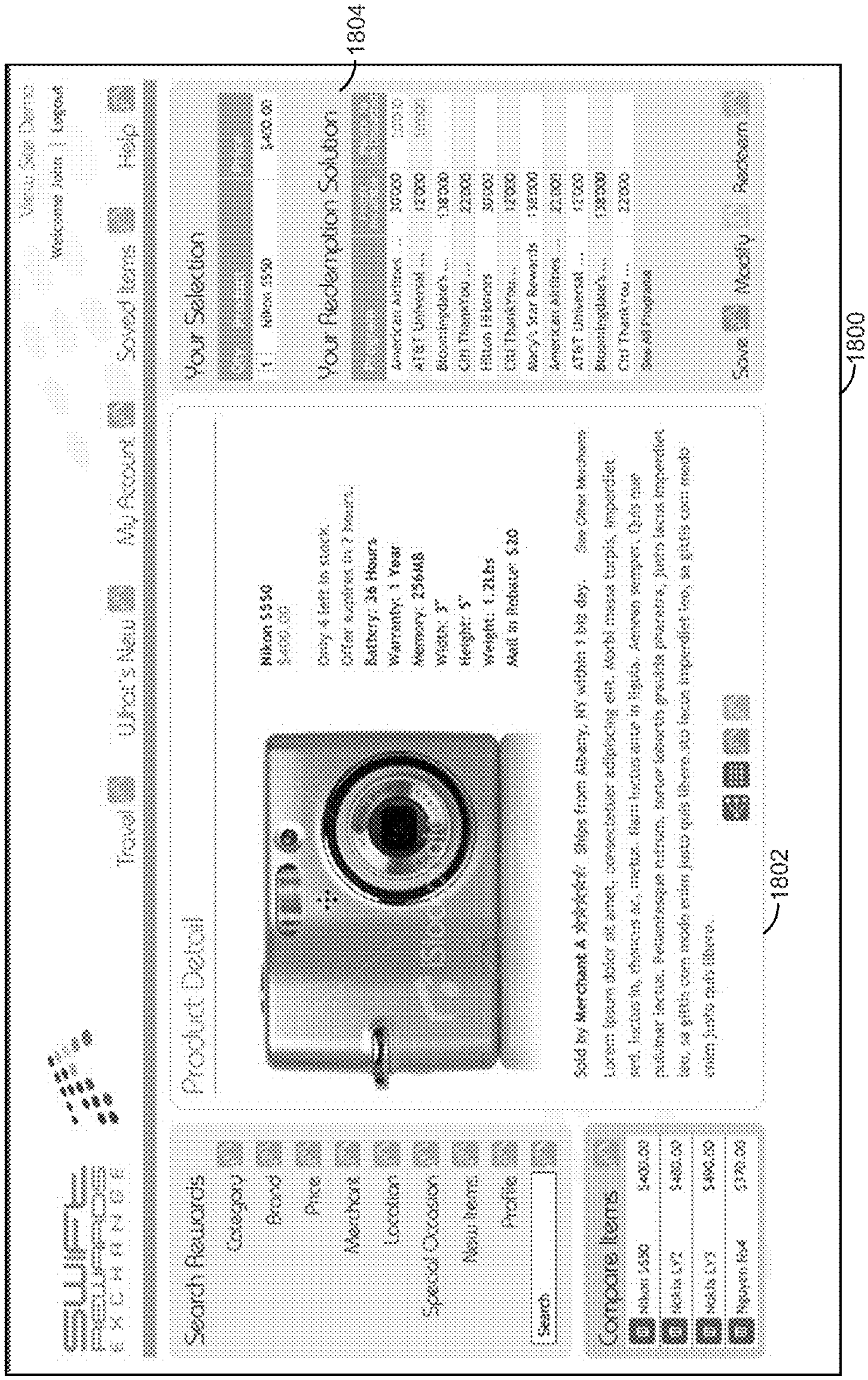
FIG. 18 is a screen shot of a web page with detailed information about a selected product from the product comparison along with a suggested points redemption solution for obtaining that selected product.
Figure 19:
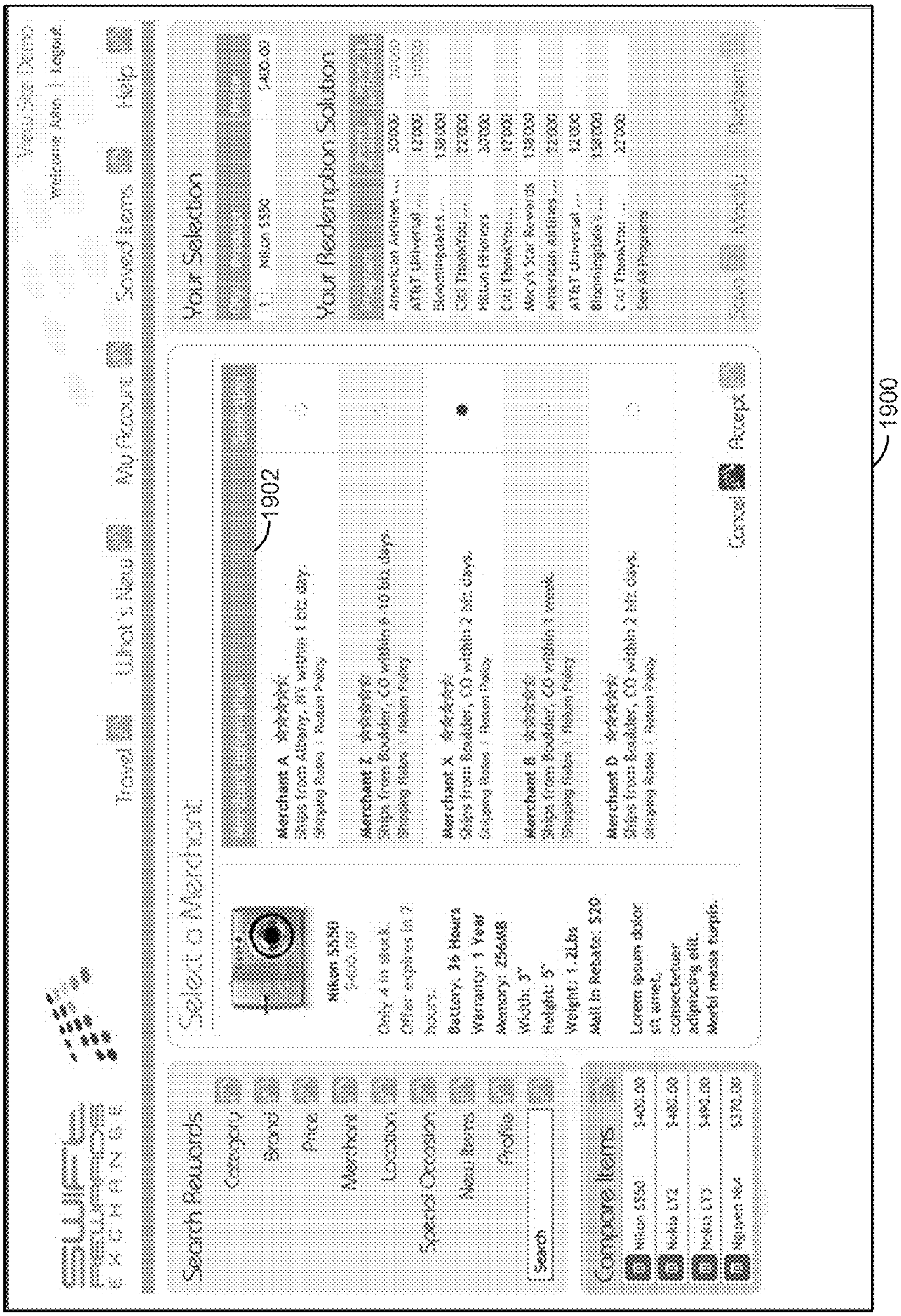
FIG. 19 is a screen shot of a web page with various merchants that can supply the user with the selected product.
Figure 20:
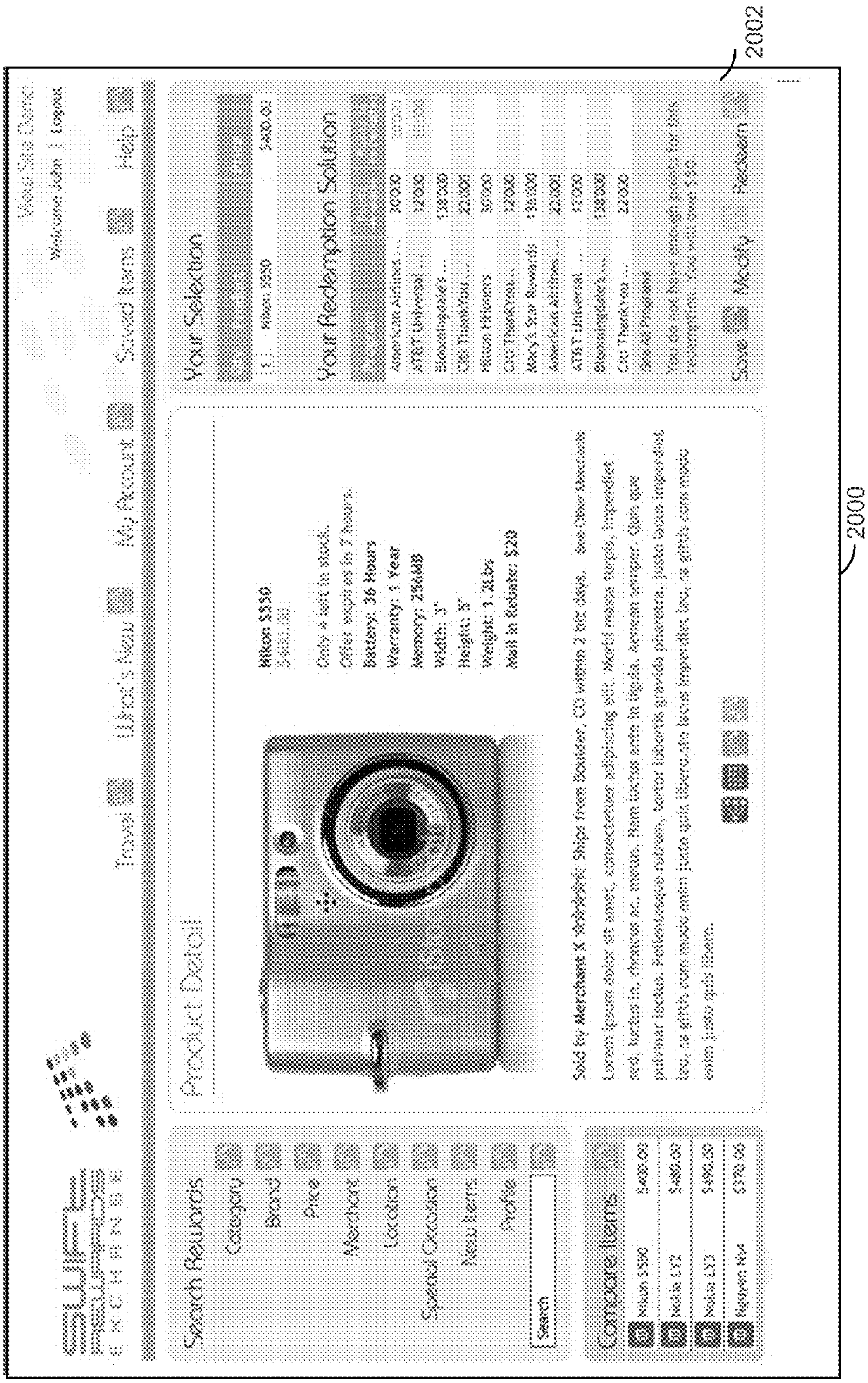
FIG. 20 is a screen shot of a web page in which the user is informed his redemption options do not provide enough points for obtaining the selected items.

FIG. 16 is a screen shot of a web page 1600 with several items selected for comparison viewing in box 1602. FIG. 17 is a screen shot of a web page 1700 with a selected product 1702 from the product comparison along with a suggested points redemption solution 1704 for obtaining that selected product 1702. FIG. 18 is a screen shot of a web page 1800 with detailed information 1802 about a selected product from the product comparison along with a suggested points redemption solution 1804 for obtaining that selected product. FIG. 19 is a screen shot of a web page 1900 with a list 1902 of various merchants that can supply the user with the selected product. FIG. 20 is a screen shot of a web page 2000 in which the user is informed in box 2002 that his redemption options do not provide enough points for obtaining the selected items.

Figure 21:
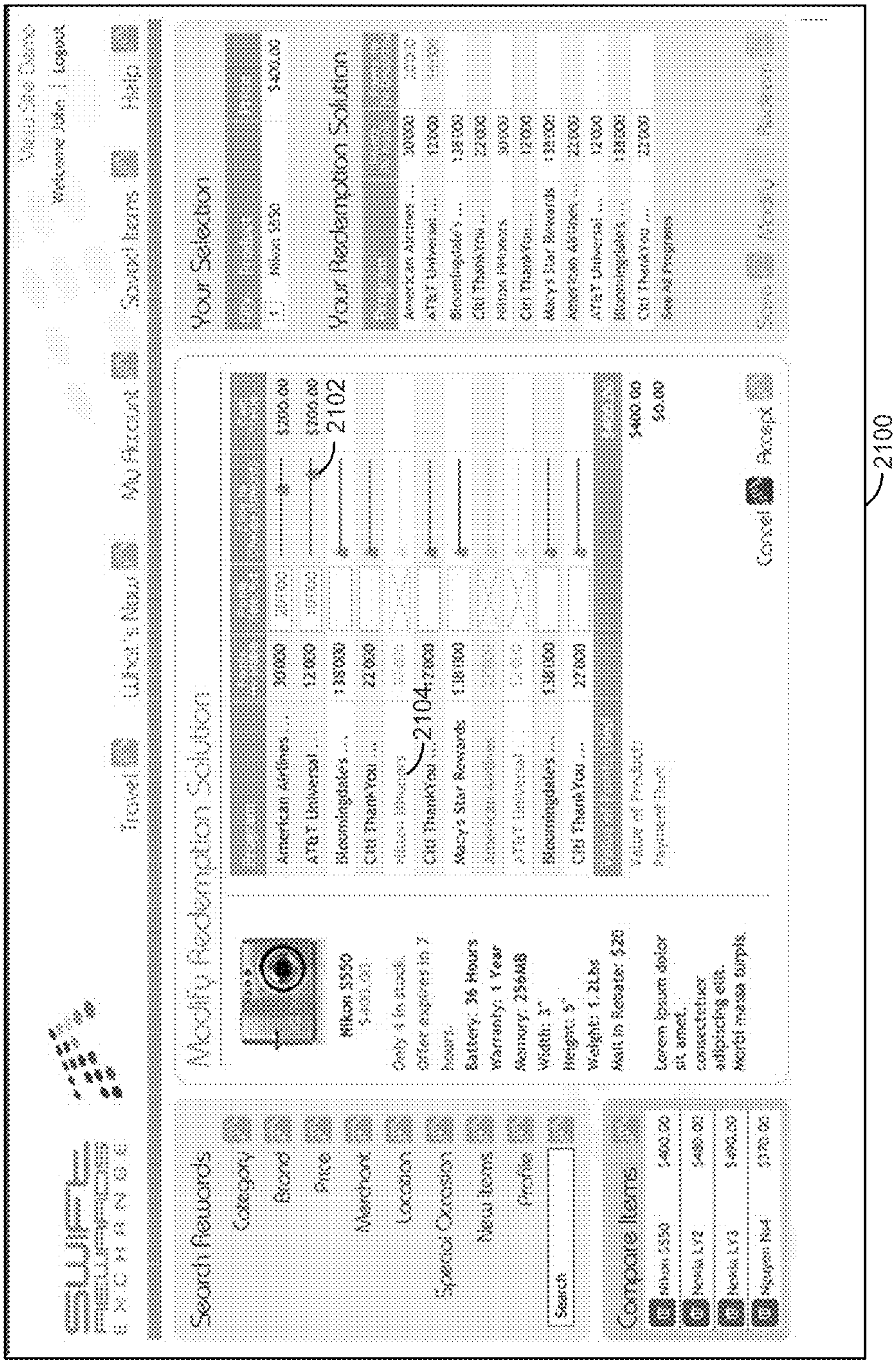
FIG. 21 is a screen shot of a web page that provides the user with slider options for modifying his redemption scenario.
Figure 22:
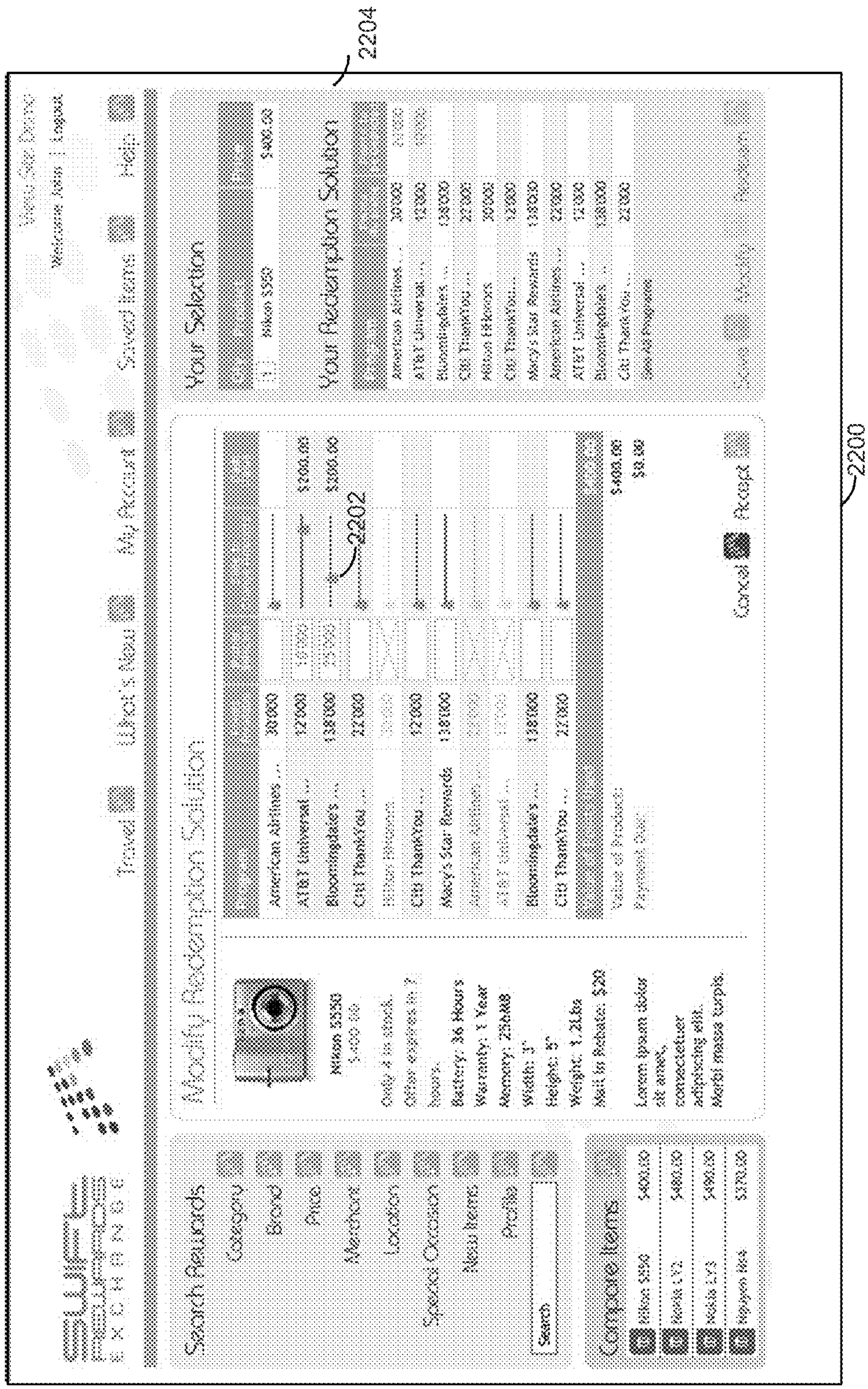
FIG. 22 is a screen shot of a web page that illustrates a modified redemption scenario.

FIG. 21 is a screen shot of a web page 2100 that provides the user with slider controls 2102 for modifying his redemption solution. As previously explained, the exchange computer 102 has analyzed the user's available reward points and rules and determined that an optimal reward scenario is to use 20,000 of his American Airlines points and 10,000 of his AT&T points to pay for the selected item. However, the user may now modify this exchange scenario as desired. For example, the user may want to use none of his American Airlines points, and thus will use the mouse to slide the slider 2102 all the way to the left side to zero (see the resulting web page 2200 of FIG. 22). He may then opt to use some or all of his 138,000 Bloomingdale's reward points by grabbing the slider 2202 and sliding to the right until the desired dollar amount equivalent is displayed (in this case $200 as in FIG. 22). This equates to 25,000 Bloomingdales points as shown. He can then modify his redemption scenario in the same manner with any other available reward programs as shown in FIGS. 21 and 22. The section 2204 labeled Your Redemption Solution at the right side of the web page 2200 page will show the elected redemption options.

In a further embodiment described more fully below, certain constraints may be placed that specify maximum amount of rewards that may be redeemed for a product and/or a minimum amount of monetary consideration. For example, the $400 camera in this example may only be paid for with $300 worth of rewards and a minimum $100 monetary portion (cash, credit, debit, etc). As more fully explained below, this may be set by the merchant, the issuer(s), and/or the exchange service. In this case, the maximum reward portion and/or the minimum monetary consideration amounts may be displayed to the user on web page 2100, for example with a slider control or input boxes. These constraints may be imposed with more than one issuer such that if the user decides to aggregate rewards from multiple issuers, there may be maximum allowable reward portions imposed by each issuer.

Some of the reward programs in the user's profile are shown in grayed out format 2104 in FIG. 21. Although these programs are in the user's profile, they are unavailable for exchange with the selected merchant since there has been no exchange/trading agreement executed via the exchange with the selected merchant and those issuers. This is explained in further detail below.

Figure 23:
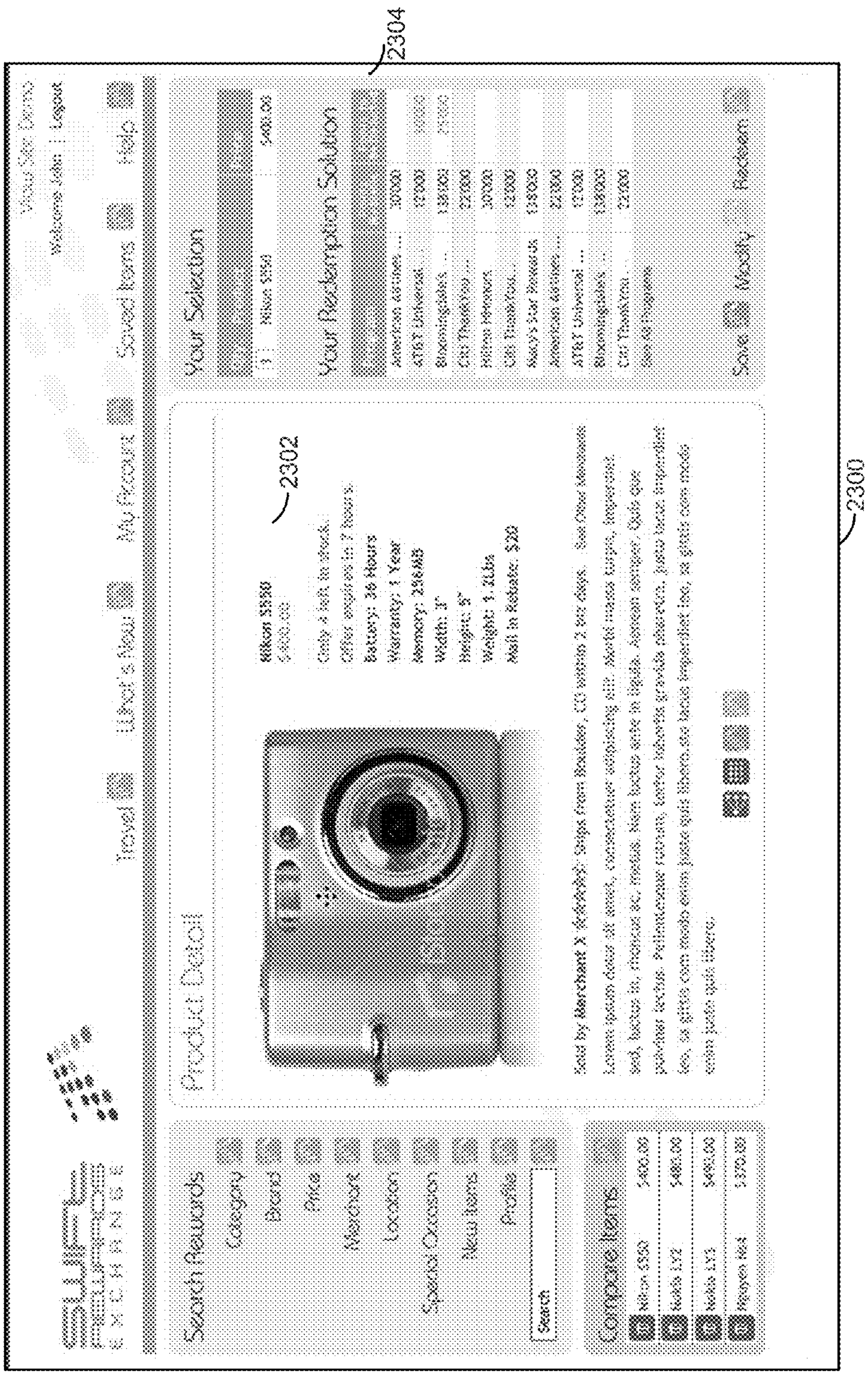
FIG. 23 is a screen shot of a web page that illustrates a selected product along with a modified redemption scenario.
Figure 24:
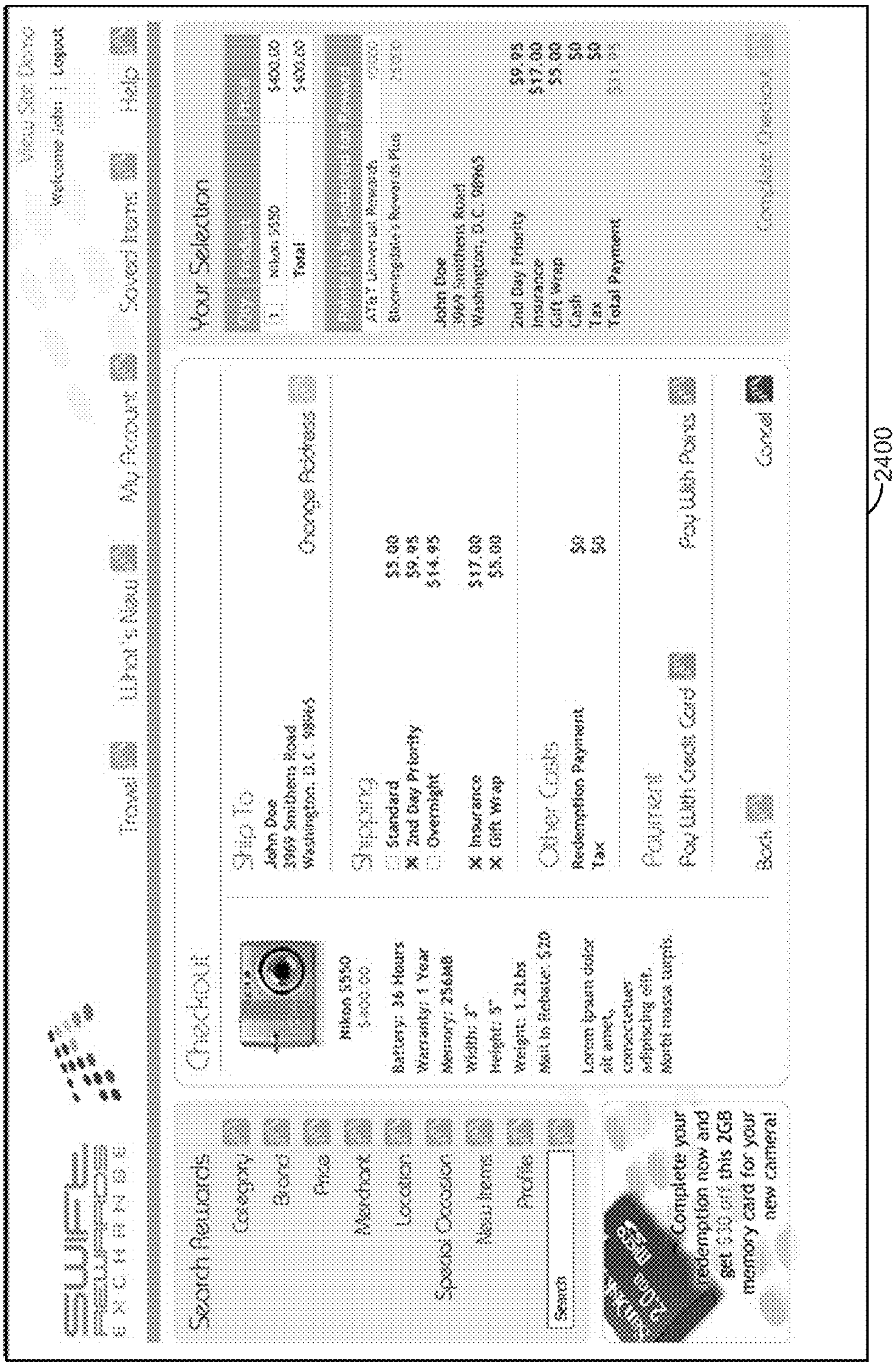
FIG. 24 is a screen shot of a checkout web page.
Figure 25:
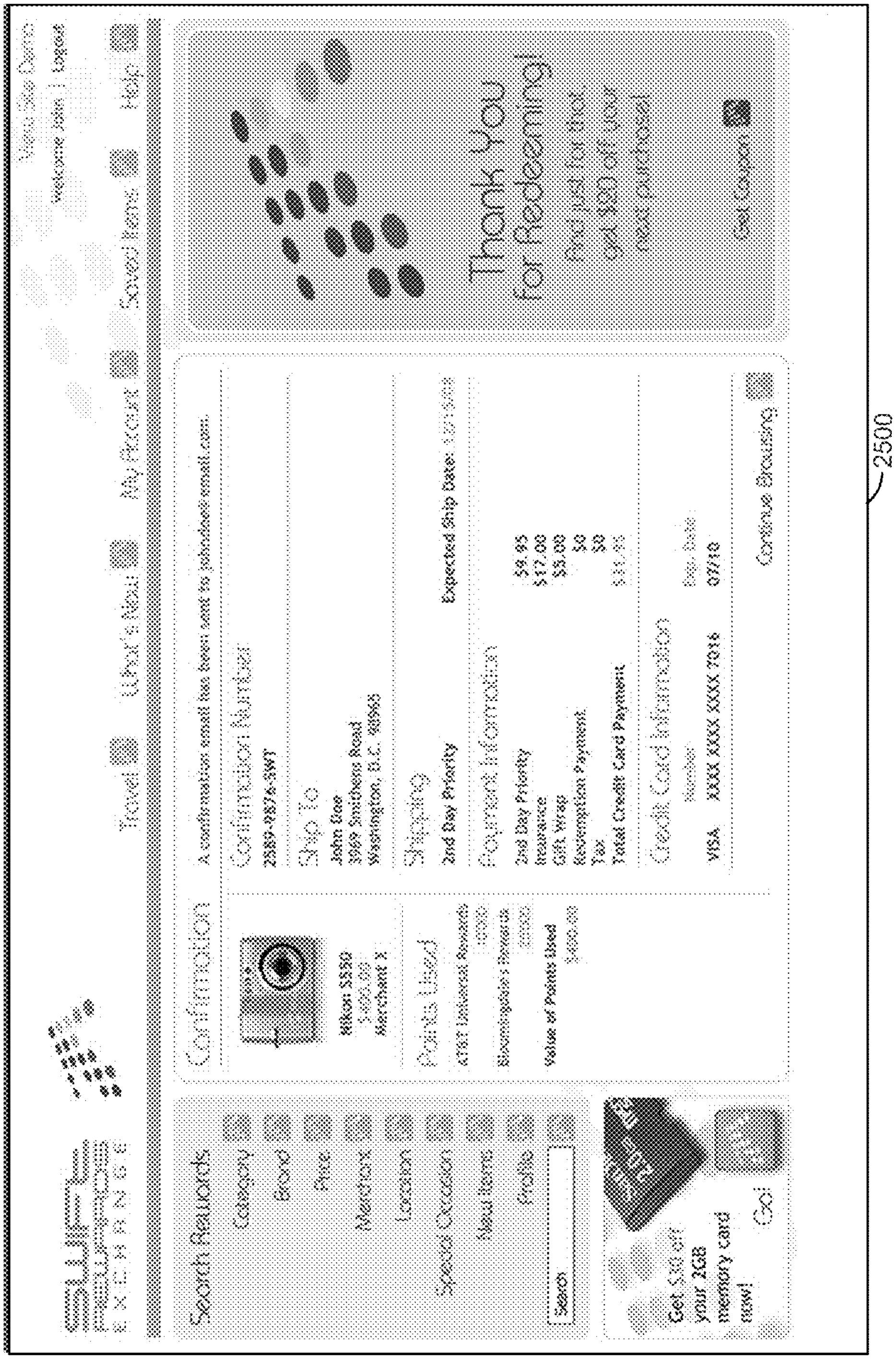
FIG. 25 is a screen shot of a web page showing confirmation of the redemption transaction using points and a credit card.
Figure 26:
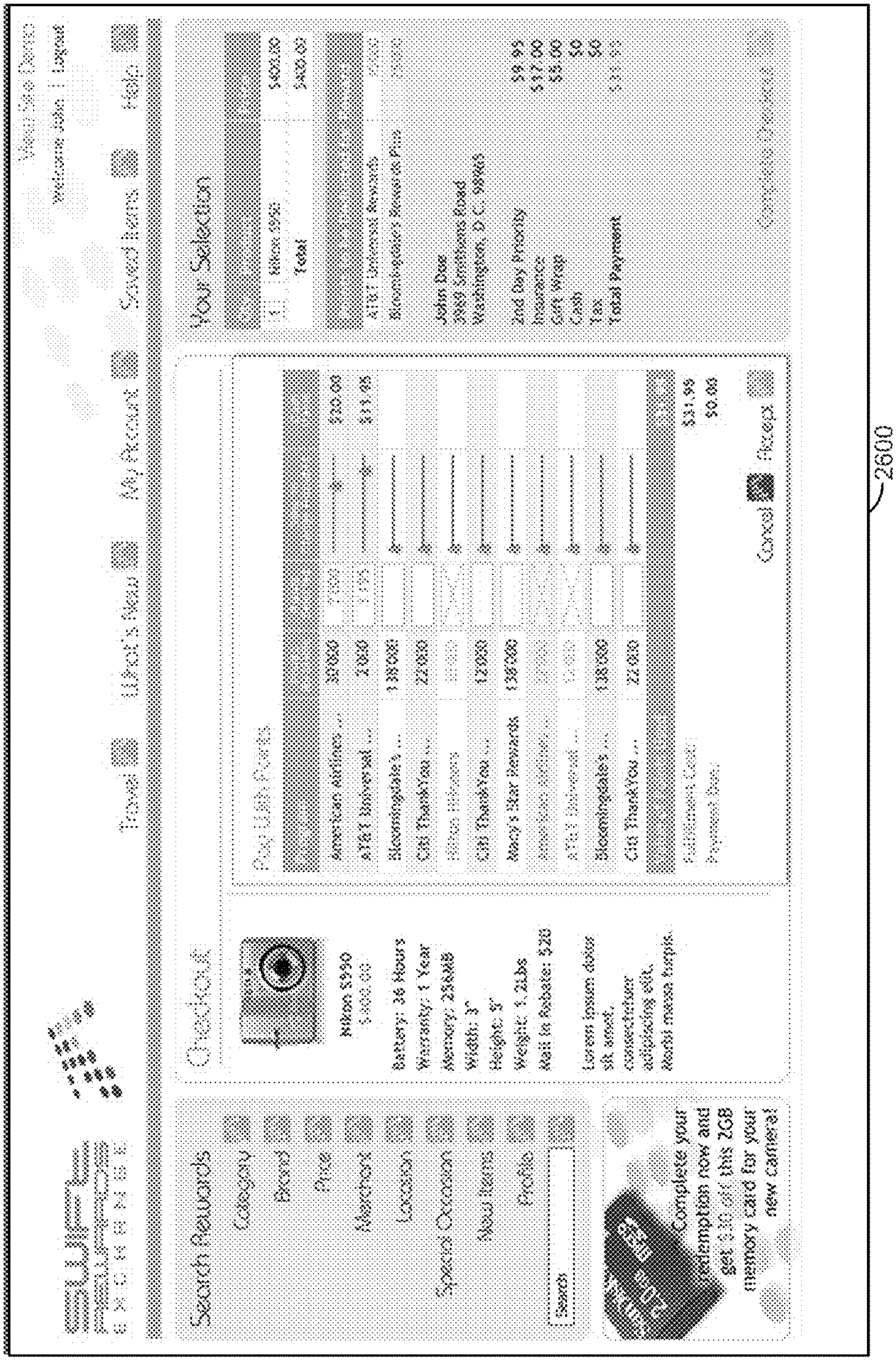
FIG. 26 is a screen shot of a checkout web page for payment with points only.

FIG. 23 is a screen shot of a web page 2300 that illustrates the selected product 2302 along with the modified redemption scenario 2304. FIG. 24 is a screen shot of a checkout web page 2400 in which the selected product price and extra costs such as tax and shipping are presented. This gives the option of paying the extra costs with a credit card or with more reward points. FIG. 25 is a screen shot of a web page 2500 showing confirmation of the redemption transaction using points and a credit card for the extra costs. FIG. 26 is a screen shot of a checkout web page 2600 for payment with points only so that the user may pay for the extra costs with points in the same manner that he pays for the selected item with points.

In sum, the reward redemption transaction may be executed by the user selecting the item for purchase from a merchant (for example by utilizing the dynamic search filter presented by the web page that enables the user to select a desired product category, manufacturer, and/or price range). The item is purchased at least partially by the redemption of reward points from at least one issuer. The user selects via the web page at least one reward program previously registered in the exchange computer by the user and a quantity of reward points to be redeemed for the purchase of the item by the user. The exchange computer then causes a purchase transaction to be executed for the item selected by the user using at least the quantity of reward points from the reward program selected by the user. Cash or other consideration may be combined with selected reward points if desired in order to complete the transaction.

Several ways exist for enabling the transaction to be executed. In one embodiment, the exchange computer mediates the transaction and causes the purchase transaction to be executed for the item selected by the user using at least the quantity of reward points from the reward program selected by the user by the exchange computer requesting the issuer computer associated with the selected reward program to (I) reduce the reward account associated with the user by the quantity of reward points selected by the user for execution of the reward redemption transaction, and (II) convey consideration to the exchange computer corresponding to the quantity of reward points selected by the user for execution of the reward redemption transaction. The exchange computer then conveys consideration to the merchant computer selected by the user in exchange for the associated merchant providing to the user the selected item. So for example, the redemption transaction specifies that a DVD will be purchased by the user from BEST BUY (the merchant) using 1500 reward points from the user's reward account with CHASE (the issuer), for which CHASE will pay one penny per point redeemed. In this case, the exchange computer instructs the CHASE issuer computer to reduce the user's reward account by 1500 reward points. In exchange, CHASE will convey consideration with a value of $15.00 (one penny per point) to the exchange computer, either in real time or by crediting an account that the exchange computer maintains with the CHASE issuer computer via the Settlement Service 162. The exchange computer will request the BEST BUY merchant computer 128 to execute a purchase transaction for the selected DVD, such that the DVD is shipped to the user as known in the art of ecommerce. The exchange computer will convey consideration to the BEST BUY merchant computer 128 (e.g. $15.00), either in real time or by crediting an account that the exchange computer maintains with the CHASE issuer computer via the Settlement Service 162, in exchange for the DVD being shipped to the user. As a result, the exchange computer has brokered a transaction in which the user receives a DVD from the merchant BEST BUY by using reward points from his CHASE reward account, which would otherwise not be acceptable tender for this purchase transaction in the prior art.

In this simple example, the exchange computer conveys the same amount of consideration to the merchant that was received from the issuer ($15.00). It is envisioned that the exchange computer may charge a transaction fee for this service, which may be paid by any or all of the parties involved (the user, the issuer, and/or the merchant). For example, the user may be charged $1.00 by the exchange computer for executing the transaction. Or, the issuer may pay a service fee to the exchange computer in addition to the $15.00 conveyed for redeeming the reward points. Or, the merchant may only receive $14.00 from the exchange computer, wherein the exchange has retained $1.00 of the $15.00 conveyed by the issuer. Any scenario may be implemented as may be agreed to by the parties involved.

In an alternative embodiment, the exchange computer causes the purchase transaction to be executed by requesting the merchant to execute the purchase transaction directly with the issuer by first transmitting to the merchant computer (I) an identification of the item selected by the user and (II) an identification of the reward issuer selected by the user and the quantity of reward points selected by the user for redemption for the item. The merchant computer then directly requests the issuer computer associated with the selected reward program to (I) reduce the reward account associated with the user by the quantity of reward points selected by the user for execution of the reward redemption transaction, and (II) convey consideration to the merchant computer corresponding to the quantity of reward points selected by the user for execution of the reward redemption transaction. The issuer computer at some point (e.g. in real time or at a later time in batch mode) conveys consideration to the merchant in exchange for the merchant providing to the user the selected item. As applied to the purchase example above, the $15.00 consideration paid by the issuer would go directly to the merchant rather than through the exchange computer.

In these examples, only one reward account is being used by the user to redeem points in exchange for a product. Of course, if multiple reward accounts are chosen or redemption for the product, then each issuer is contacted in the same manner as described above. For example, if the user decides to redeem 1000 points from CHASE and 500 points from CITIBANK to pay for the DVD from BEST BUY, then CHASE will convey $10.00 in consideration to the exchange computer and CITIBANK will convey $5.00 in consideration to the exchange computer (each issuer reducing the user's reward account accordingly). The exchange computer may then convey the total consideration of $15.00 to BESTBUY in exchange for the DVD as described above. Likewise, the merchant computer may mediate the transaction directly with the issuer (bypassing the exchange computer) as described above.

Figure 27:
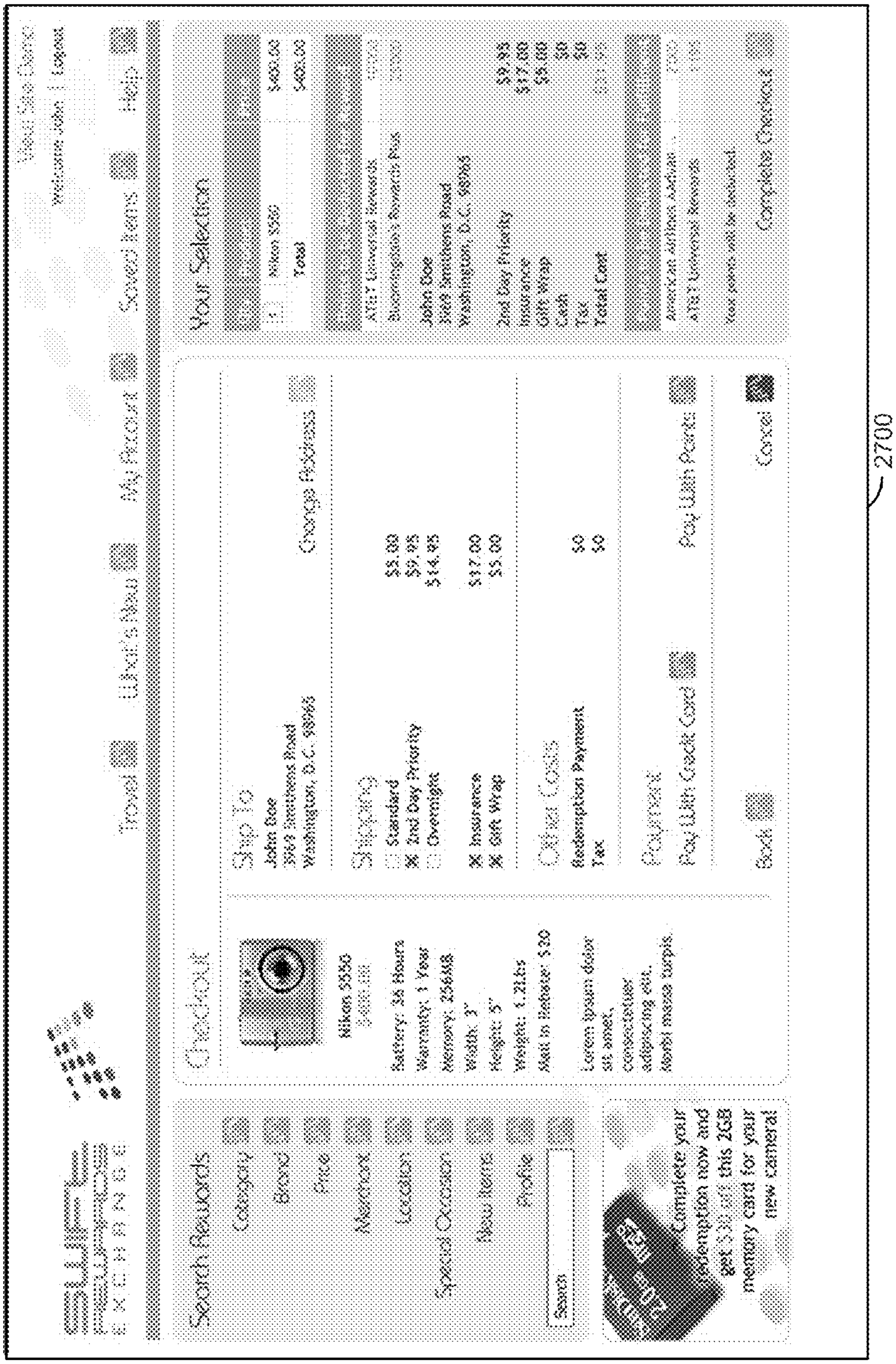
FIG. 27 is a screen shot of a web page showing confirmation of the redemption transaction with points only.
Figure 28:
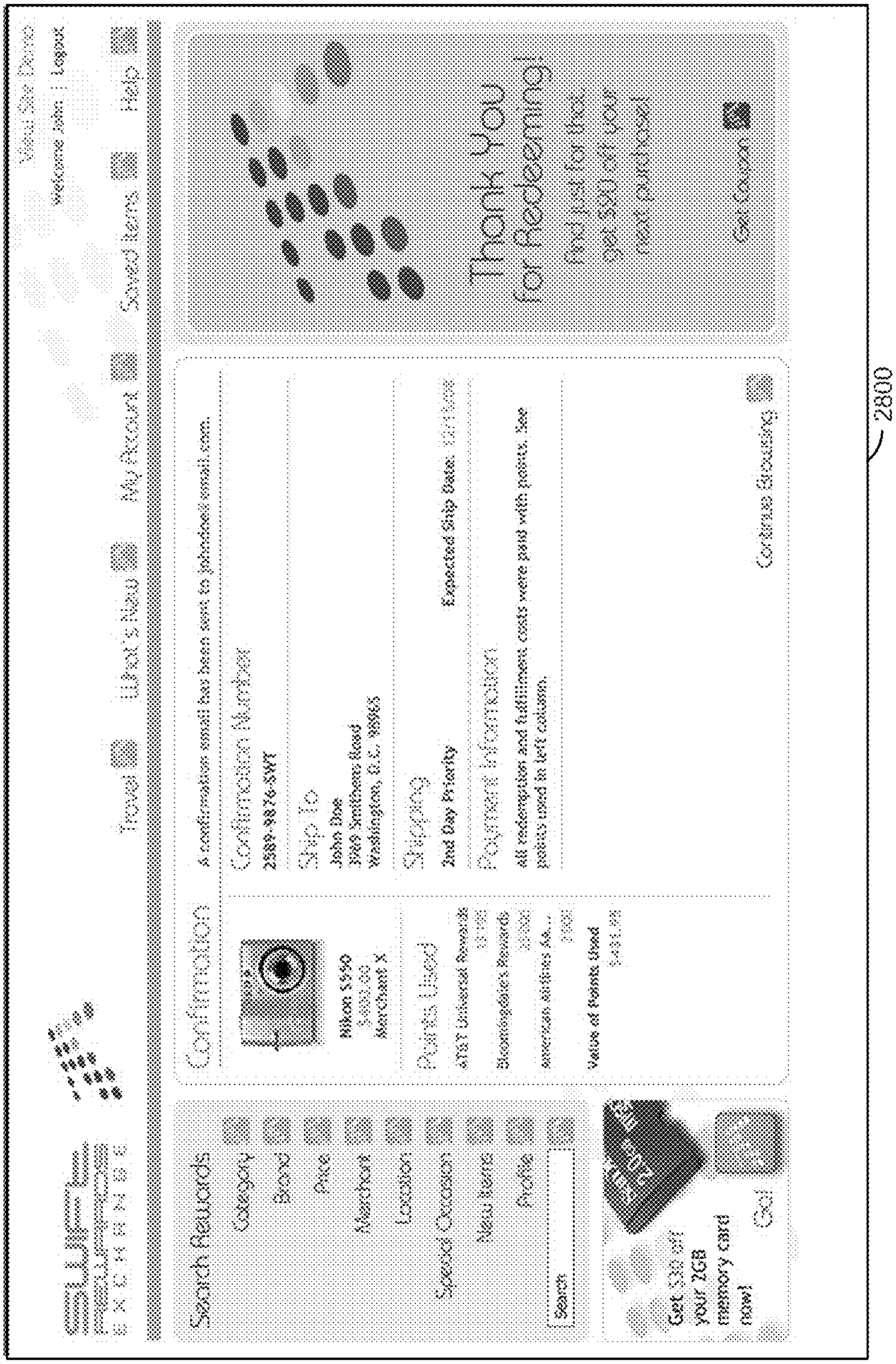
FIG. 28 is a screen shot of a web page showing completion of the redemption transaction with points only.

FIG. 27 is a screen shot of a web page 2700 showing confirmation of the redemption transaction with points only, and FIG. 28 is a screen shot of a web page 2800 showing completion of the redemption transaction with points only.

Figure 28A:
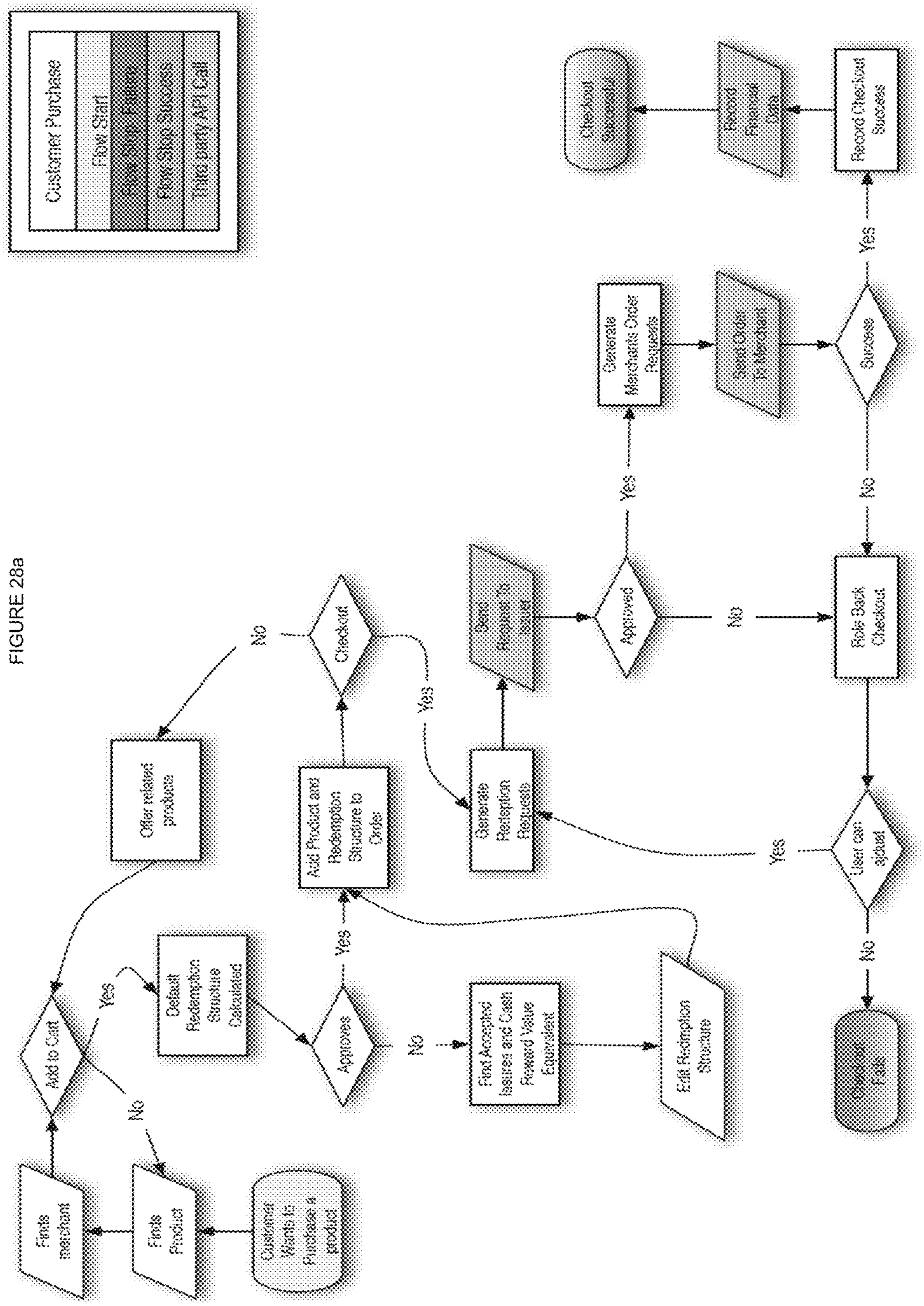
FIG. 28*a* is a flowchart illustrating a user purchase transaction.
Figure 28B:
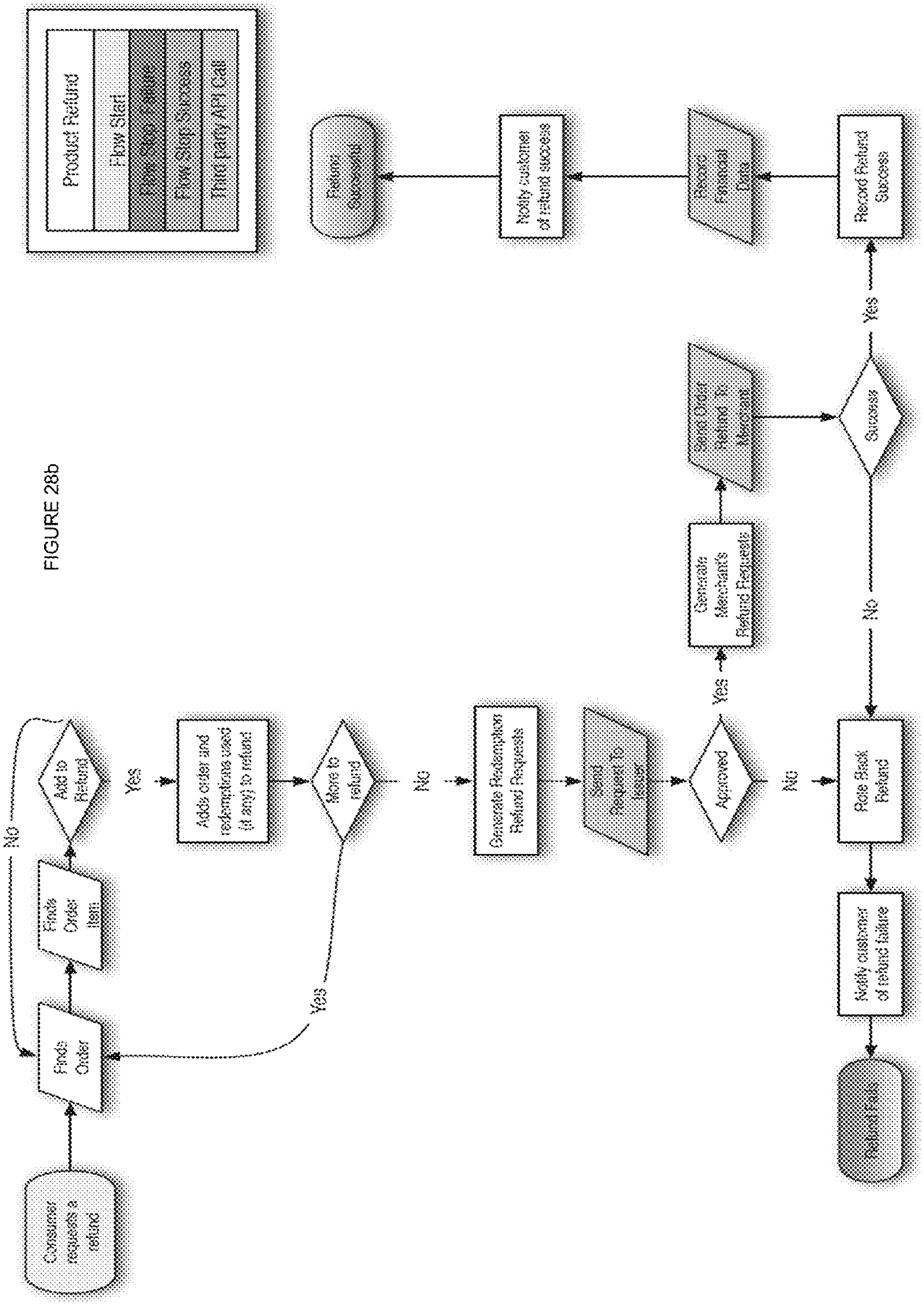
FIG. 28*b* is a flowchart illustrating a product refund process.

FIG. 28*a* is a flowchart illustrating a user purchase transaction under this embodiment. As described above, as a starting point, a user wants to purchase a product utilizing the exchange. After performing the searches of the product database and determining the desired product as well as the merchant from whom the product will be purchased, the product is added to the shopping cart. The user may continue to peruse the site for more products to be purchased, and at some point he or she will decide to execute the purchase transaction. The default or proposed redemption solution is determined by the exchange computer, and presented to the user computer for the user to consider. If the user approves of the proposed redemption solution, then the product and the approved redemption solution is added to the user's order. If the user does not approve of the proposed redemption solution, however, then the proposed solution may be modified before being added to the order. The user may then checkout or continue to add products to his or her shopping cart. During the checkout process, the reward point redemption request (or requests if multiple issuers are involved) is generated and sent to the issuer computer. The issuer computer may then approve or decline the request. If declined, then this is indicated to the user and the redemption scenario may be modified or the checkout aborted (fails). Assuming the issuer approves the redemption request, then the merchant purchase order request is generated by the exchange computer and sent to the merchant computer. If the merchant can't execute the transaction (e.g. the product is no longer available), then this is indicated to the user and the transaction may be modified or the checkout aborted (fails). Assuming that the merchant is able to execute the transaction, then the financial terms are logged (e.g. consideration conveyed by issuer and received by the merchant, transaction fees, etc.) and the product is shipped to the user. FIG. 28*b* is a flowchart of a typical product refund process.

Figure 28C:
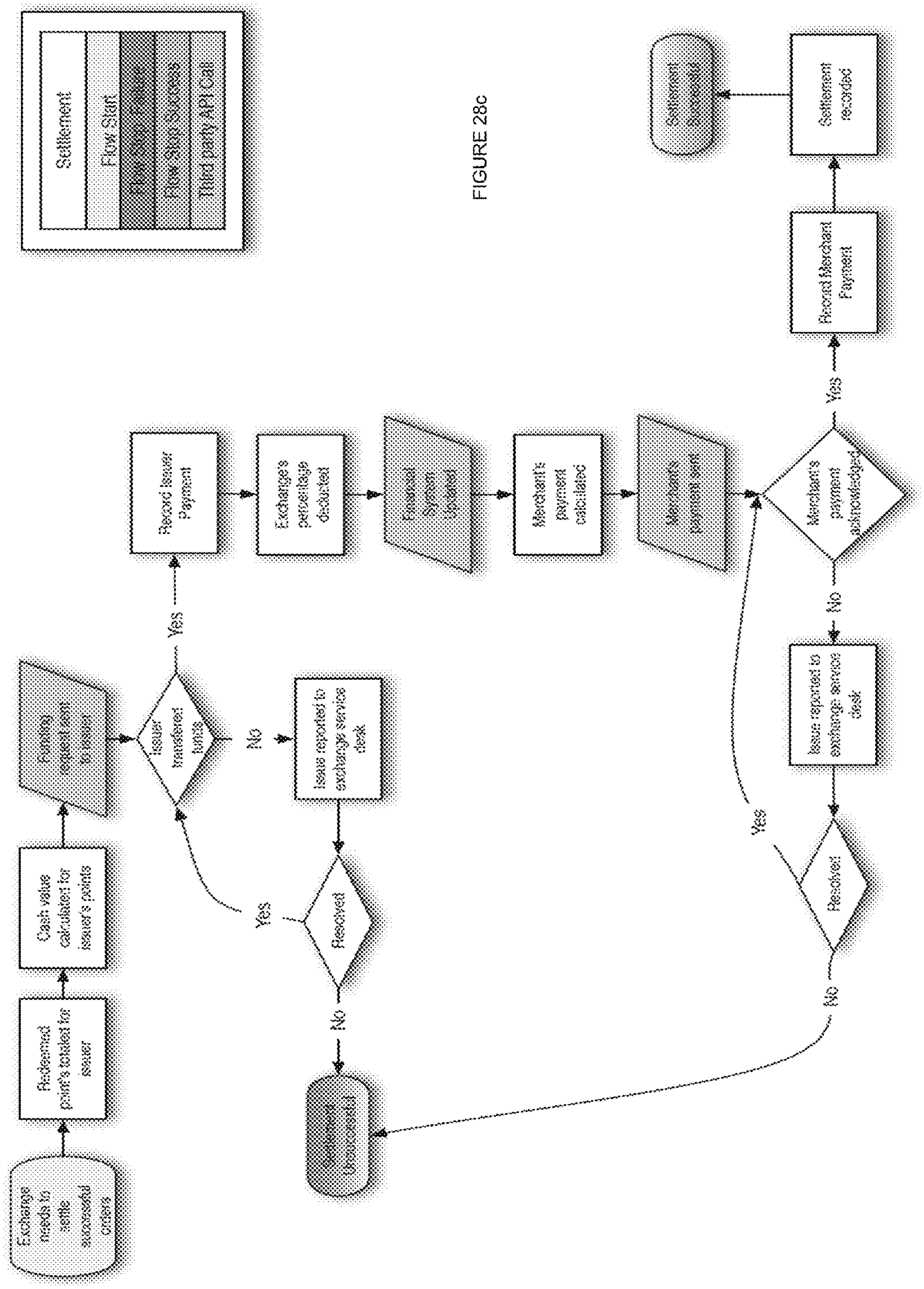
FIG. 28*c* is a flowchart illustrating a settlement process.

FIG. 28*c* is a flowchart illustrating a settlement process of an embodiment of the invention that is executed by the settlement service 162. As a starting point, the exchange needs to settle the completed orders. The total number of redeemed points for an issuer is determined, and the cash value for that issuer's redeemed points is calculated. A request for funds is then sent to the issuer computer for the amount calculated. Once the issuer has transferred the requested funds to the exchange computer, then this issuer payment is recorded in a transaction log. A transaction fee, which may be for example a percentage of the funds transferred in, is deducted from the amount received from the issuer and the records are updated. The associated payments that must be made to the merchant(s) are calculated based on the previously executed purchase transactions. Payment is then sent to the merchant. After acknowledgement of receipt by the merchant, the successful settlement transaction is logged as complete.

In addition to merchants, third party fulfillment centers may participate on the exchange. These third party fulfillment centers would offer products in exchange for reward points in the same manner as described herein with respect to merchants.

In one embodiment, the user may bid on a reward redemption transaction. After selecting an item for purchase from a merchant via the exchange computer web pages, the user selects at least one reward program previously registered in the exchange computer by the user and a quantity of reward points to be bid to be redeemed for the purchase of the item by the user. The user computer submits to the exchange computer a bid of the quantity of reward points that the user is offering for redemption for purchase of the item. The exchange computer, utilizing the bidding engine 154, submits the bid received from the user computer to the merchant computer, and the merchant computer either accepts or rejects the bid for purchase of the product. So, for example, if the user is bidding on a $1,000 plasma TV, he may submit a bid to the merchant for $900 to purchase the TV. The merchant may accept the bid, reject the bid, or make a counter offer (e.g. $950). The transaction may be executed once both parties agree on a purchase price.

Similarly, the exchange computer may submit the bid received from the user computer to the issuer computer, and the issuer computer either accepts or rejects the bid for purchase of the product. In the plasma TV example above, if the exchange computer indicates that the plasma TV will require redemption of 100,000 points from CHASE, then the user may submit a bid of 90,000 points for redemption. The exchange computer submits this bid to the CHASE issuer computer, which may then accept the bid, reject it, or make a counter offer. In the event that the issuer does agree to make the purchase by redeeming less points, then it would still convey the required consideration to the exchange computer, but would retire less points, thus placing a higher value on each point retired than it would otherwise.

The exchange computer may also split bids between the issuer and the merchant such that the merchant may agree to take less consideration than otherwise required, and the issuer may retire less points than otherwise required, in order to execute a desired transaction. For example, if the user bids 90,000 CHASE points to obtain the plasma TV from BEST BUY, then CHASE may agree to retire 90,00 points (rather than 100,000) but convey only $950, and BESTBUY may agree to accept the $950 rather than the listed price of $1,000.00.

In another aspect of the invention, a product purchase transaction is executed by a user first selecting an item for purchase from a merchant. Then, the exchange computer determines the lowest price that is being charged by the plurality of merchants for the item selected by the user. The exchange computer also determines the lowest number of reward points that may be redeemed from the plurality of issuers for the item selected by the user. The determined lowest price and the determined lowest number of reward points are displayed to the user via the user computer, and the user selects a mode of purchase of the item with either the determined lowest price or the determined lowest number of reward points. Then, a purchase transaction is executed for the item selected by the user by the mode selected by the user.

Figure 29:
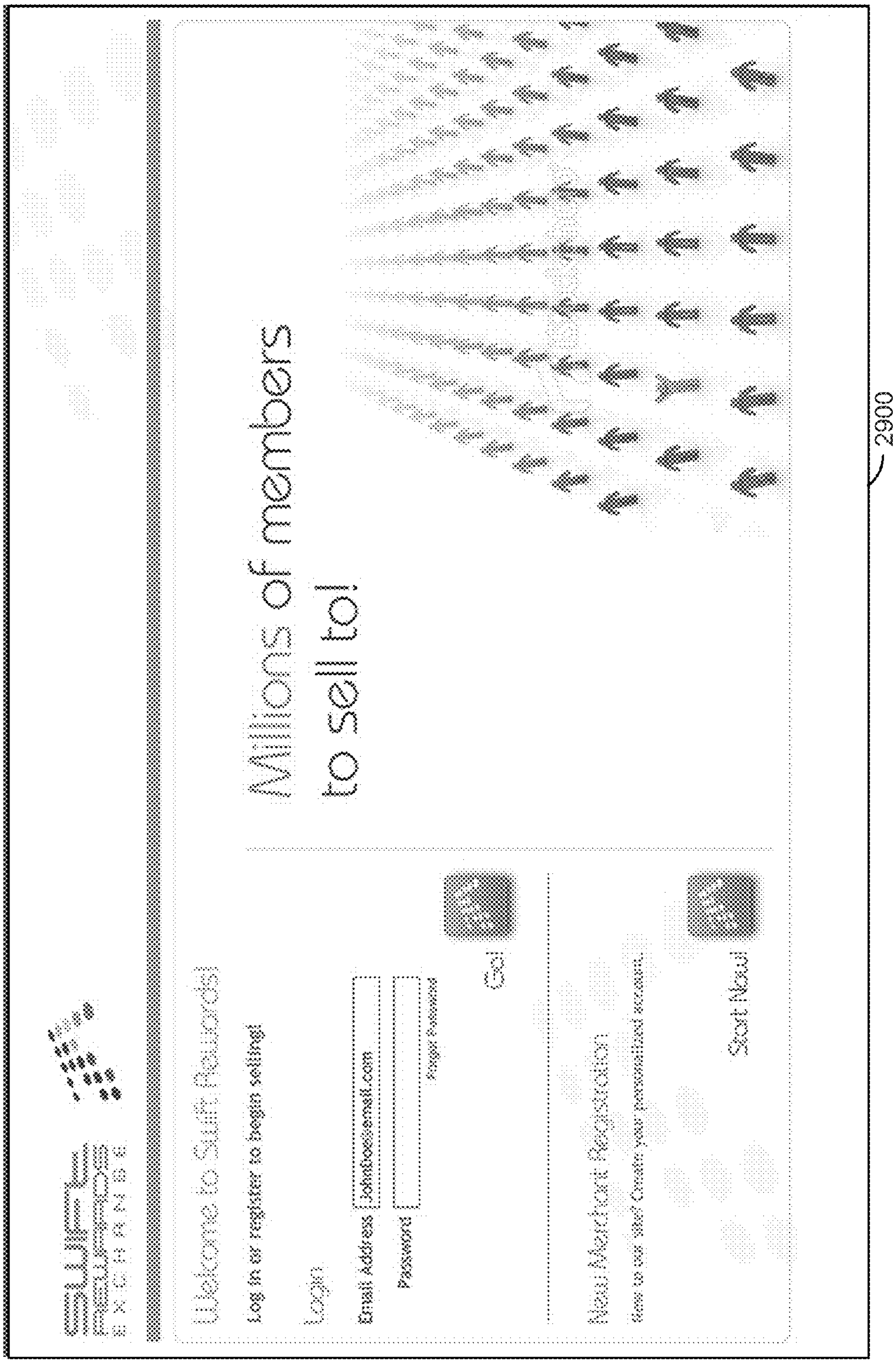
FIG. 29 is a screen shot of a merchant login page.
Figure 30:
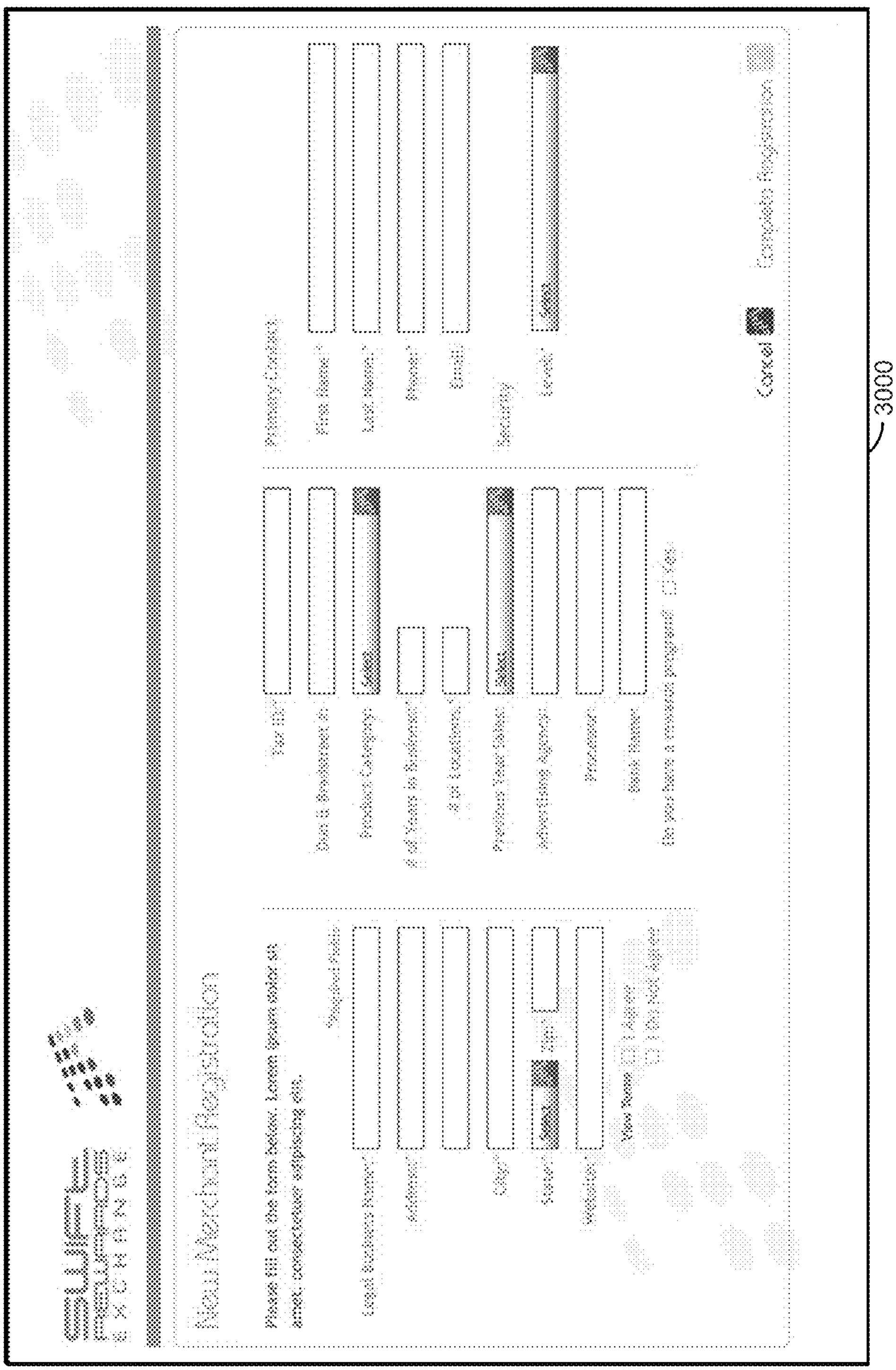
FIG. 30 is a screen shot of a new merchant registration page.
Figure 31:
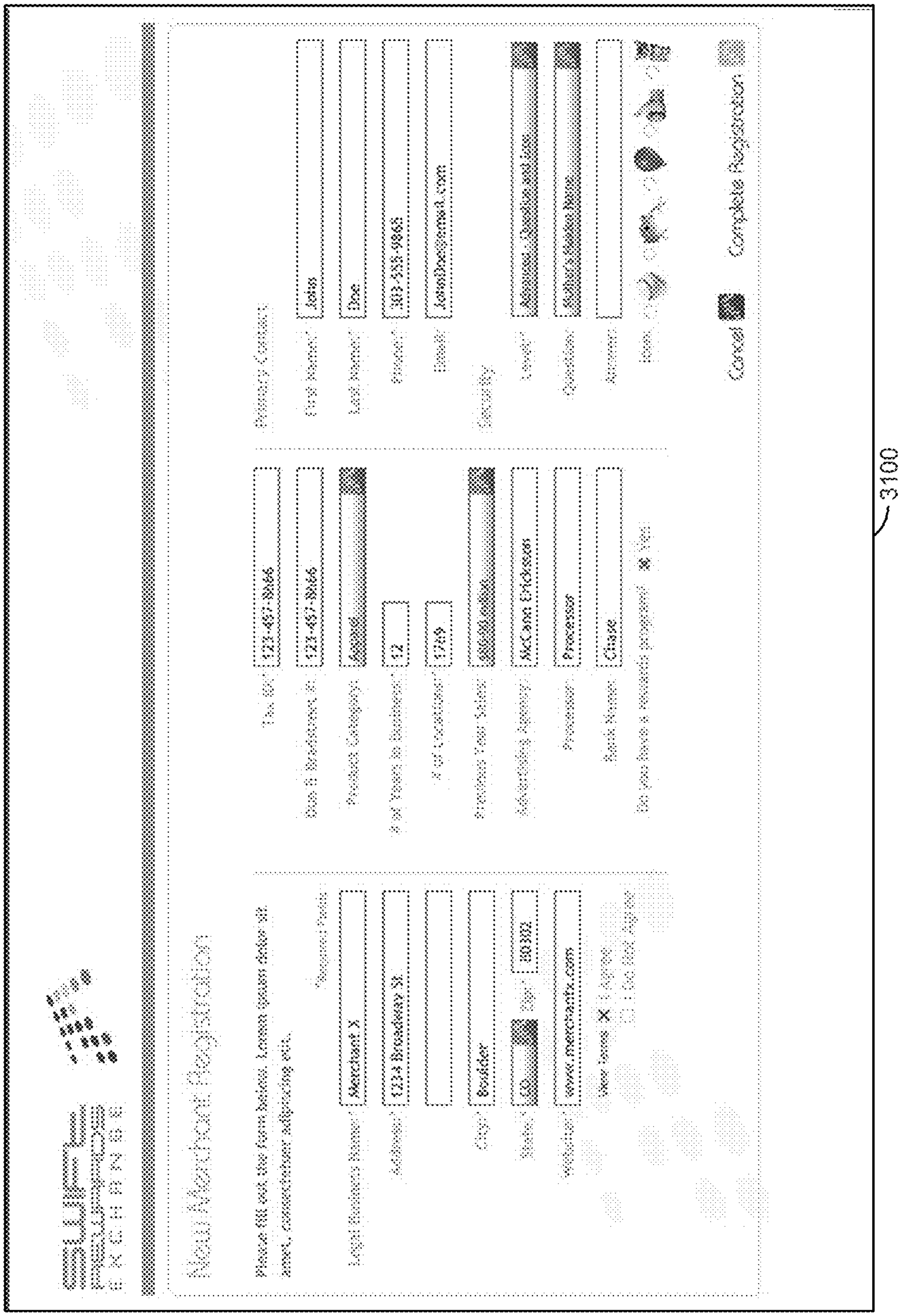
FIG. 31 is a screen shot of a new merchant registration page with filled in data.
Figure 32:
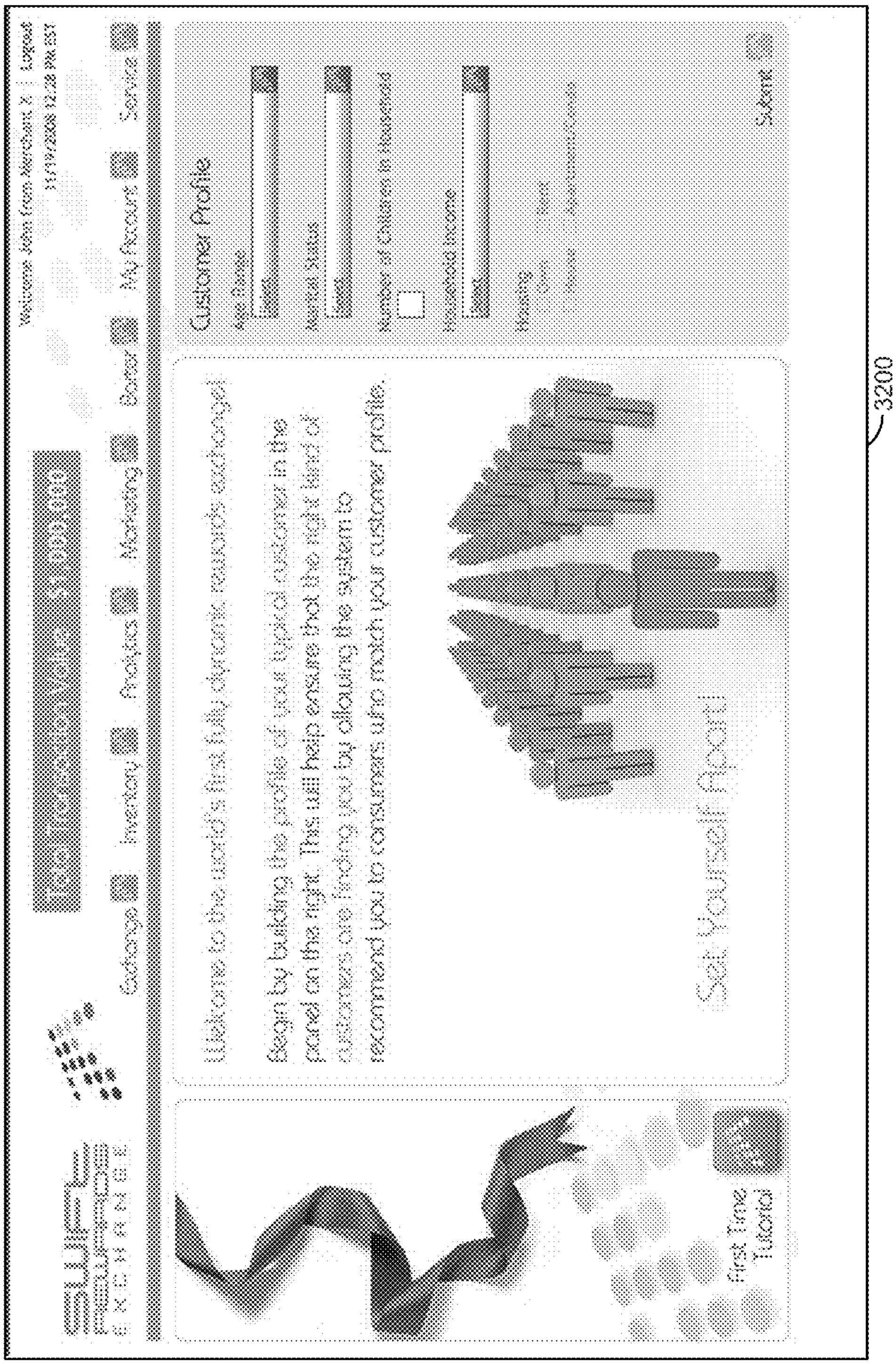
FIG. 32 is a screen shot of a merchant home page.
Figure 33:
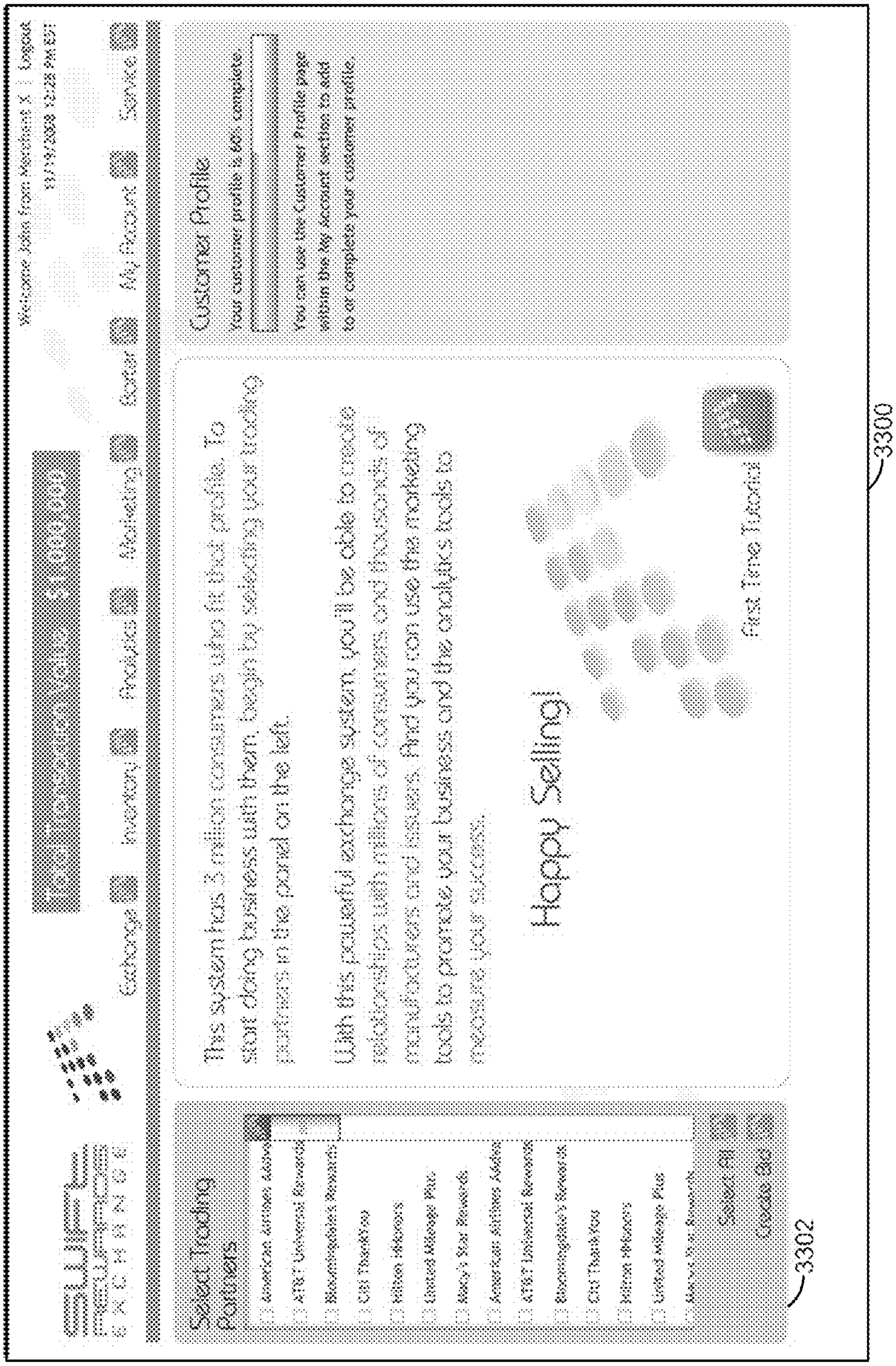
FIG. 33 is a screen shot of a merchant page with a trading partner selection portion.
Figure 34:
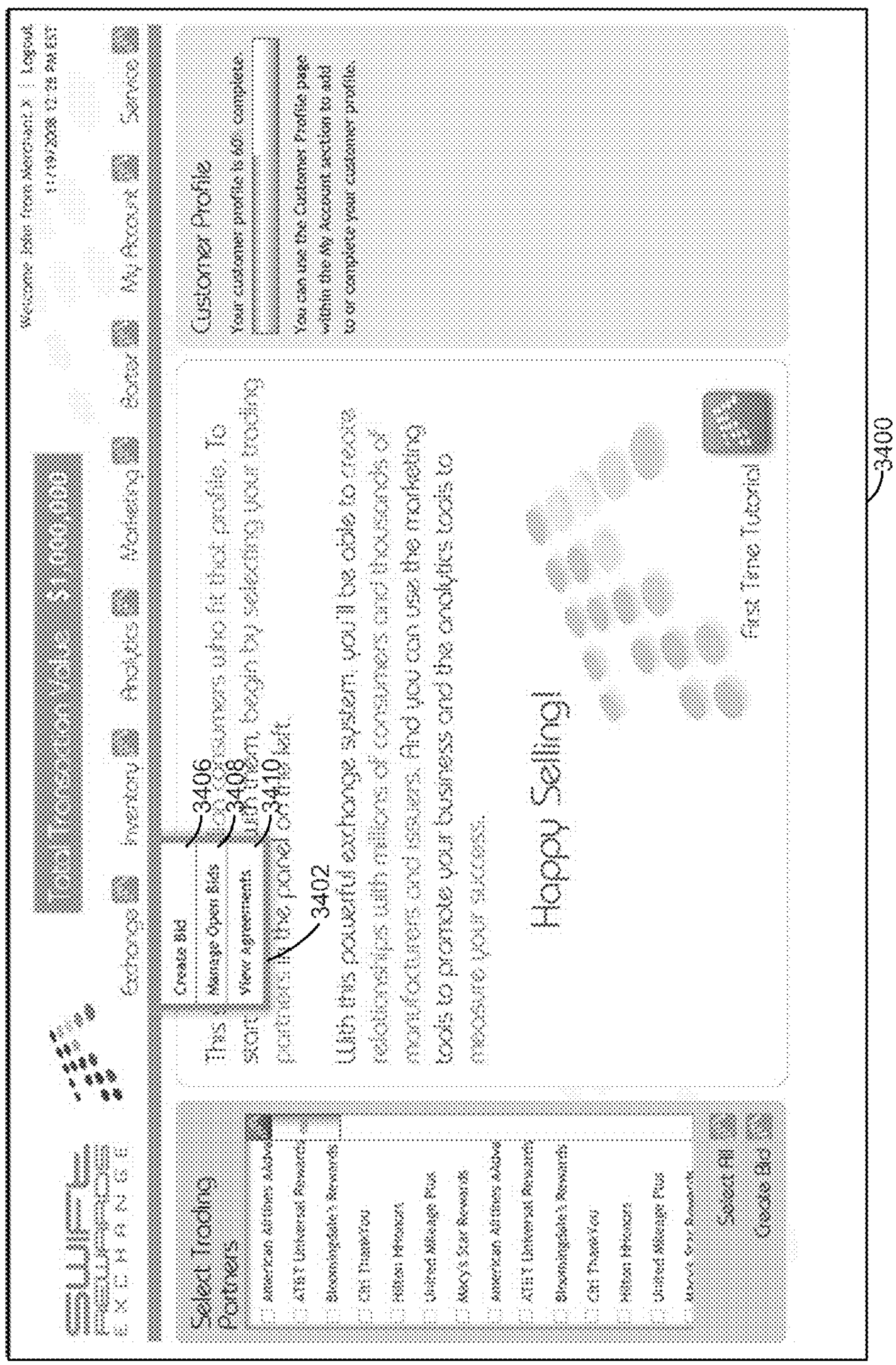
FIG. 34 is a screen shot of a merchant page with an Exchange menu item drop down list.

With respect to merchant interaction, a plurality of merchants also register with the exchange computer via the web site by using an associated merchant computer for providing merchant information that includes (i) product information that identifies at least one product to be offered for sale to the user via the exchange computer, and (ii) a designation of issuers registered with the exchange computer with which the merchant agrees to execute a reward redemption transaction when requested by the user. FIG. 29 is a screen shot of a merchant login page 2900 that is accessible by selecting the merchant button 138 from the home page of FIG. 1 or by direct entry of an appropriate URL. There, the merchant may login to the system as known in the art (name and password). If the merchant is new to the system, he may register via the new merchant registration page 3000 of FIG. 30. In FIG. 30, new merchants add their name and other contact information, the result of which is shown in the web page 3100 of FIG. 31. FIG. 32 is a screen shot of the merchant's home page 3200 that is accessed after logging in to the exchange computer 102. There, the merchant can enter desired customer profile information in the Customer Profile section 3202 on the right side, such as age range, marital status, income, etc. FIG. 33 is a screen shot of a merchant page 3300 with a trading partner selection portion 3302 on the left side. There, the merchant may select any or all of the issuers or other trading partners that are registered in the exchange system, such as Citi ThankYou, Hilton Honors, etc. FIG. 34 is a screen shot of a merchant page 3400 with an Exchange menu item drop down list 3402 that shows a Create Bid option 3406, a Manage Open Bids option 3408, and a View Agreements option 3410.

A merchant and an issuer may execute a trading agreement. The merchant may create a bid by selecting via the merchant computer a desired issuer from a group of issuers that are registered with the exchange, and entering into the merchant computer a desired redemption discount offer, the desired redemption discount offer being the amount that the merchant is willing to provide in a transaction with the selected issuer. The merchant submits the bid to the exchange computer, which then forwards the bid to the issuer computer of the desired issuer selected by the merchant in the bid. The issuer accepts the bid, rejects the bid, or counter proposes a modified bid in which a modified redemption discount is submitted to the exchange computer for forwarding to the merchant computer.

Figure 38:
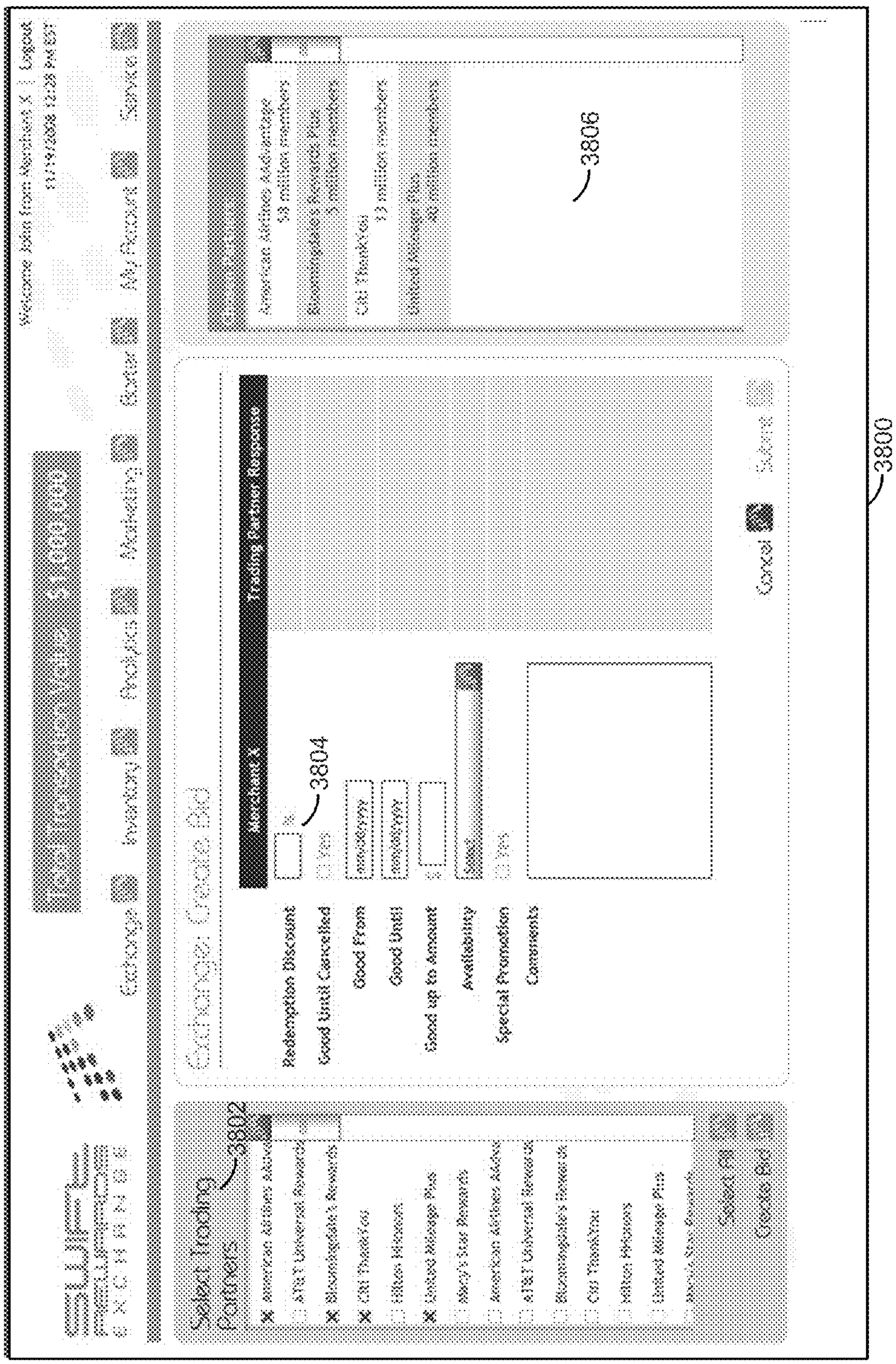
FIG. 38 is a screen shot of a merchant page for creating an exchange bid.
Figure 39:
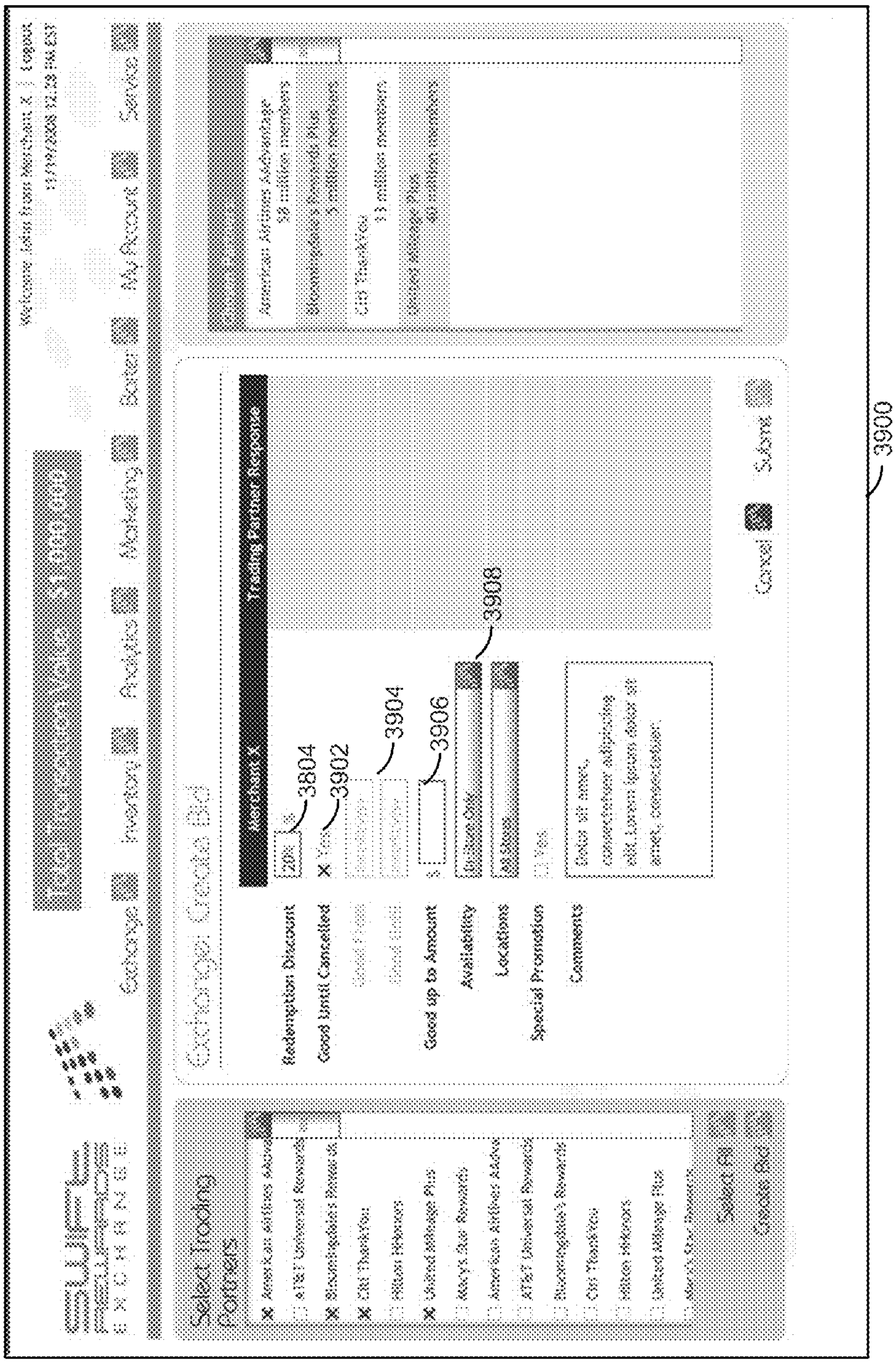
FIG. 39 is a screen shot of the merchant page of FIG. 38 in which bid data has been entered.

Thus, if the merchant selects Create Bid 3406, then the web page 3800 of FIG. 38 is presented. The merchant selects the desired trading partners on the Select Trading Partners section 3802 to whom the bid will be presented by the exchange computer 102. The merchant then enters the desired Redemption Discount 3804, which is the discount that the merchant is willing to provide in a transaction with the issuer selected in section 3802. For example, as shown in the web page 3900 of FIG. 39, the merchant has entered a desired 20% discount into box 3804. If this were accepted by the issuer(s) to whom the bid is submitted, then the merchant would only charge $80 for a $100 MSRP item, for example. The merchant can also select in box 3902 if it wants to keep the bid good (open) until cancelled or set a time frame for expiration in boxes 3904. The merchant can also set a cap up in box 3906 to which the amount of transactions can be executed at the set discount rate. The merchant can also set other options such as availability (e.g. in-store, web, etc.) in drop down list 3908 as well as special promotions. Once the bid data is entered by the merchant, the bid is submitted into the exchange computer 102 and stored in issuer/merchant bid database 119 as shown in FIG. 1*b*.

The bid is then forward to the trading partner selected by the merchant. Once the trading partner reviews the bid, it will submit a response to the exchange computer 102 that is forwarded back to the merchant and displayed in the Chosen Partners column 3806 indicated in FIG. 38. Chosen Partners column 3806 indicates the chosen trading partners as well as the number of members of that partner.

Certain parameters may exist in the system to automatically block bids from a merchant from being sent to the issuer. An issuer may have designated certain issuer preferences (for example stored in issuer profiles database 118) that indicate the issuer's rules for executing a trading partnership with a merchant. For example, an issuer may designate that it will not execute an agreement with any merchant having annual sales less than X amount. When the merchant submits a bid, the system can filter out the merchants that do not meet the issuer's criteria and automatically respond to the merchant without having to submit the bid to the issuer. This auto-reject criteria may be modified by the issuer as desired.

In an alternative embodiment, an issuer receives multiple requests/bids from merchants through the system which first does a credit check, removing those who do not meet the standards of the issuer, scans for blocked categories such as escort services, liquor or tobacco products and previously blocked merchants. Of the merchants who pass, the system then looks at the product category offered by the merchant, his geography and sales volume for desirability and is automatically approved, rejected with a minimum discount required to establish a trading relationship based upon the algorithms that establish the value of the merchant to the issuer.

Figure 40:
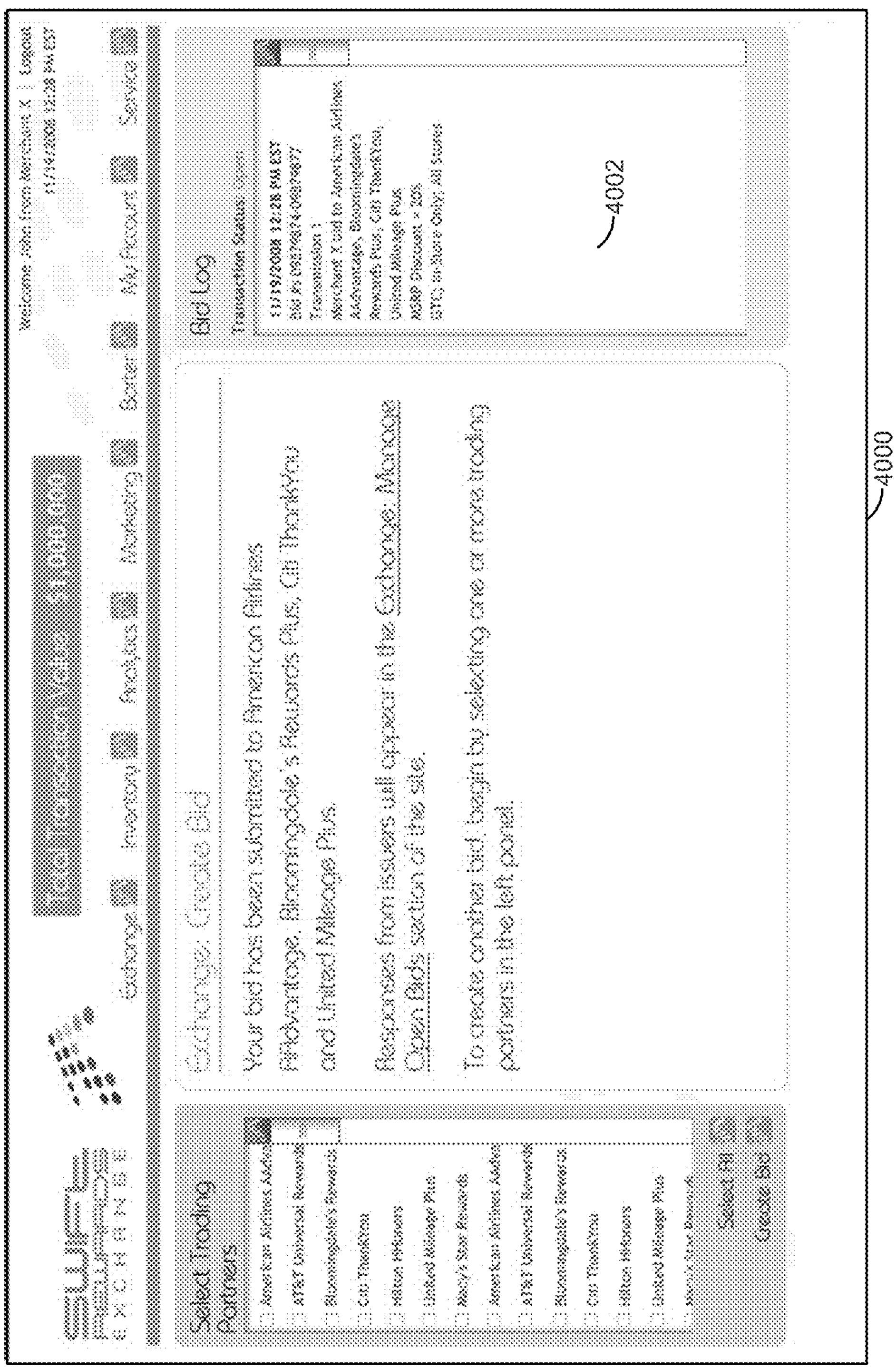
FIG. 40 is a screen shot of a merchant page in which the bid has been submitted.
Figure 41:
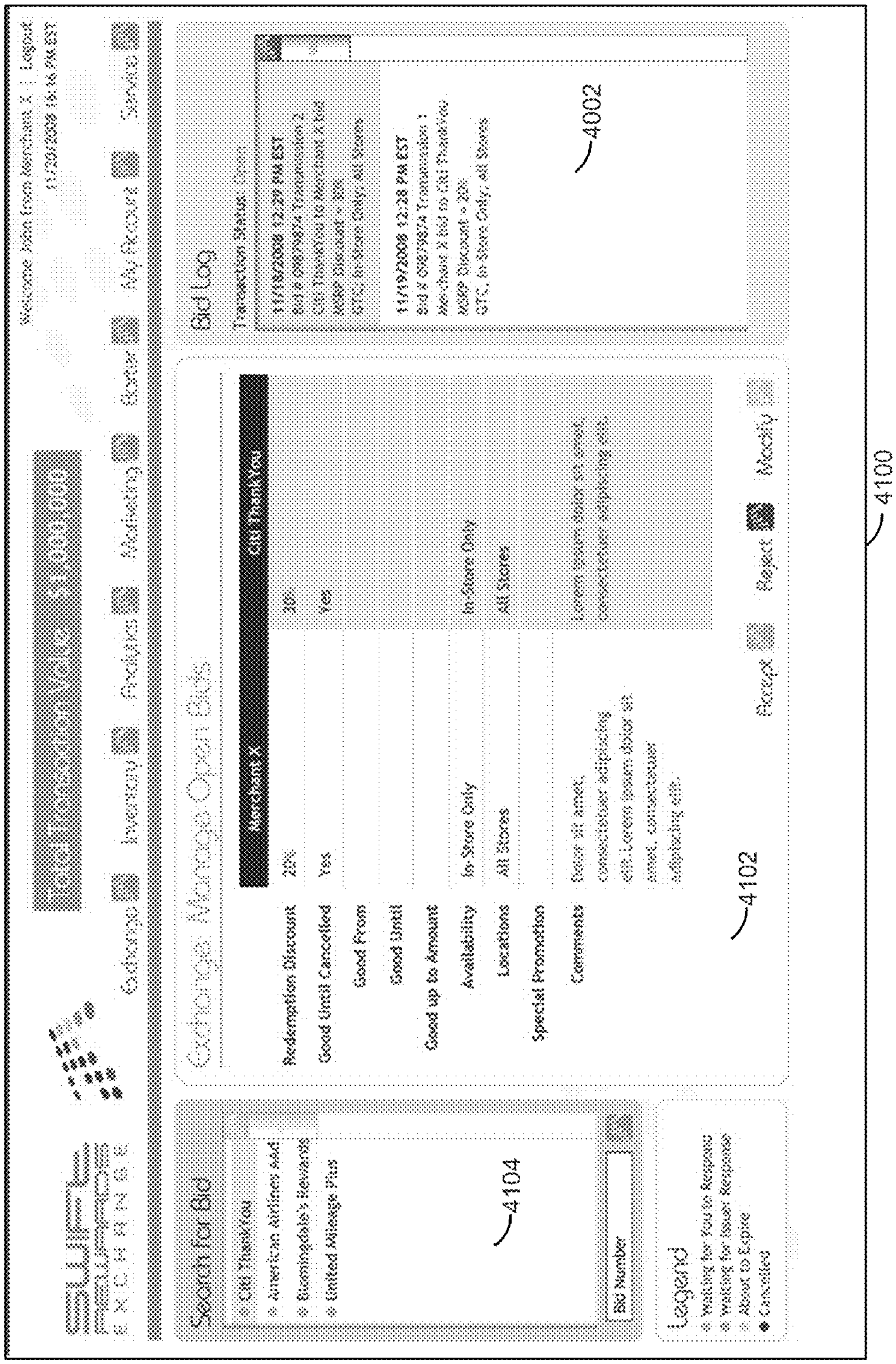
FIG. 41 is a screen shot of a merchant page in which open bids may be searched, selected and managed.

FIG. 40 is a screen shot of a merchant page 4000 in which the bid has been submitted. A Bid Log 4002 displays each bid made by the merchant, including pertinent details of that bid. FIG. 41 is a screen shot of a merchant page 4100 in which open bids may be searched in section 4104, selected and managed in section 4102. The Search for Bid section 4104 displays the open bids of that merchant. The merchant may select an open bid from that list and review its details. Shown in FIG. 41 is the detail in section 4102 of a bid made to Citi ThankYou, in which the issuer (Citi ThankYou) has made a counter-offer back to the merchant in the amount of a 30% discount. That is, Citi ThankYou has rejected the 20% discount offer and instead counter proposes that this merchant provide a 30% discount. The issuer would rather have the higher 30% discount since it means that it would only have to pay the merchant $70 for a $100 MSRP item, while retiring $100 worth of reward points of the user (e.g. 10,000 points). A log of the bids made back and forth will be displayed in the Bid Log 4002 on the right side.

Figure 42:
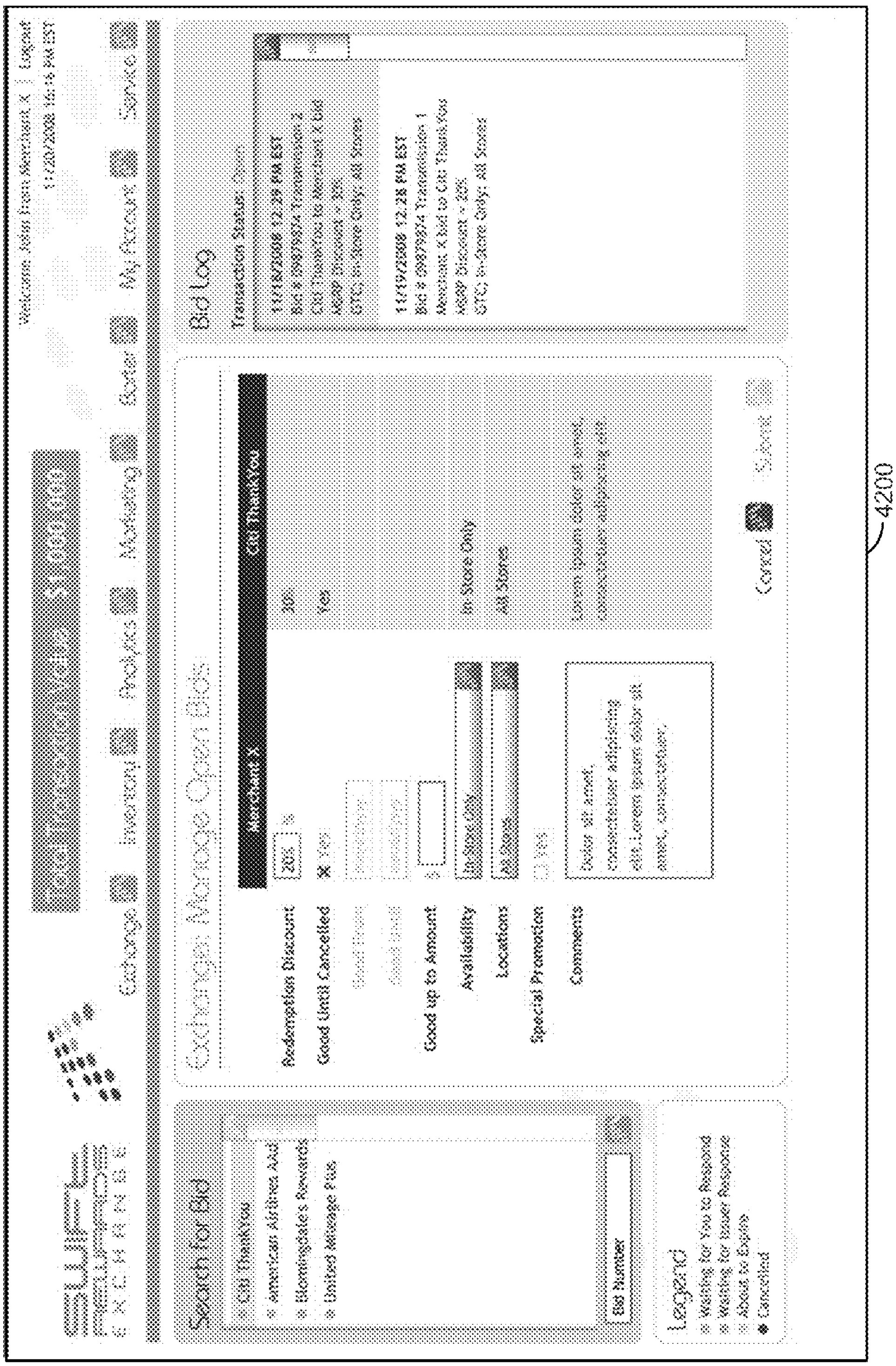
FIG. 42 is a screen shot of a merchant page in which a bid is selected for review.
Figure 43:
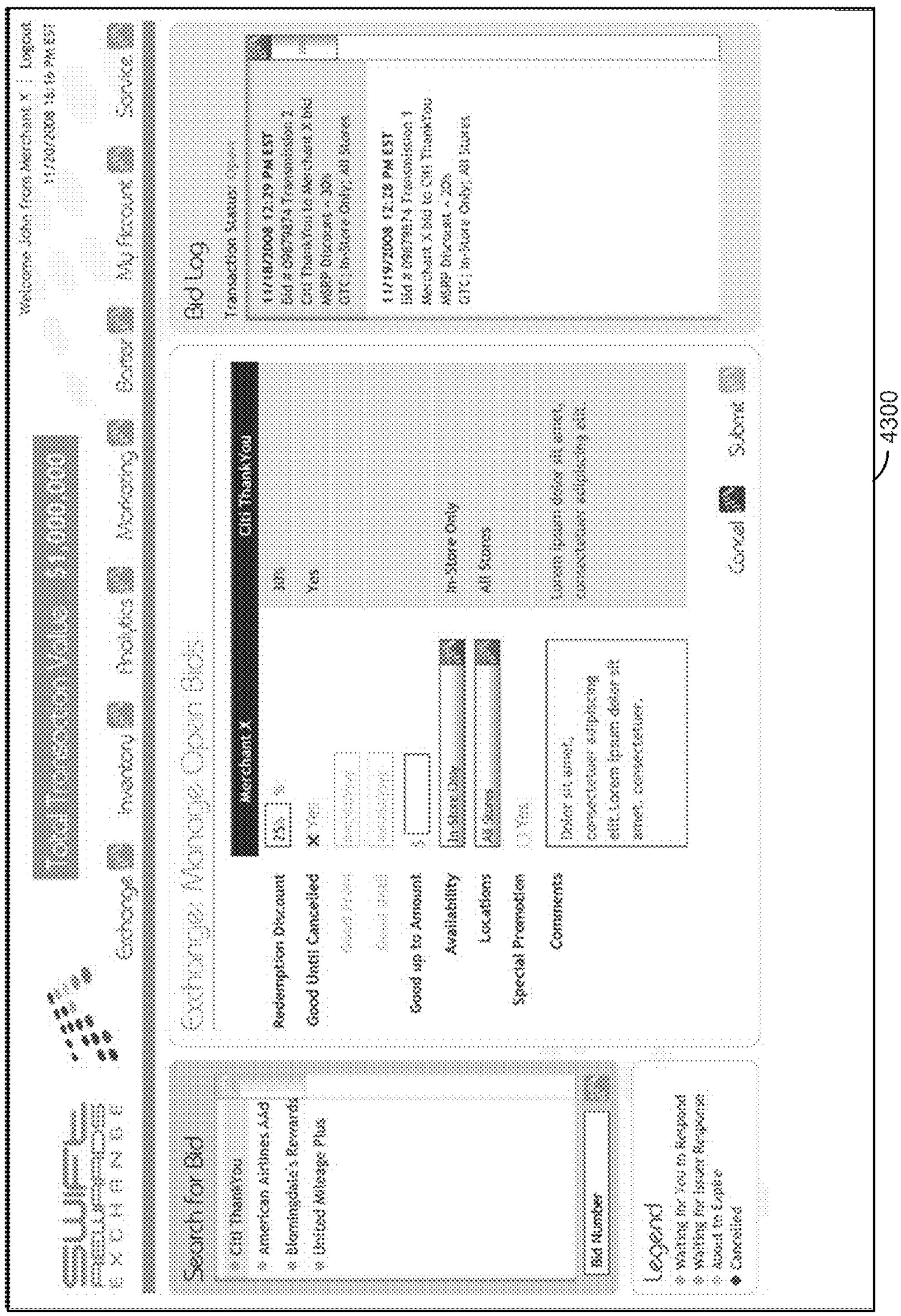
FIG. 43 is a screen shot of a merchant page in which a counter-offer is provided.
Figure 44:
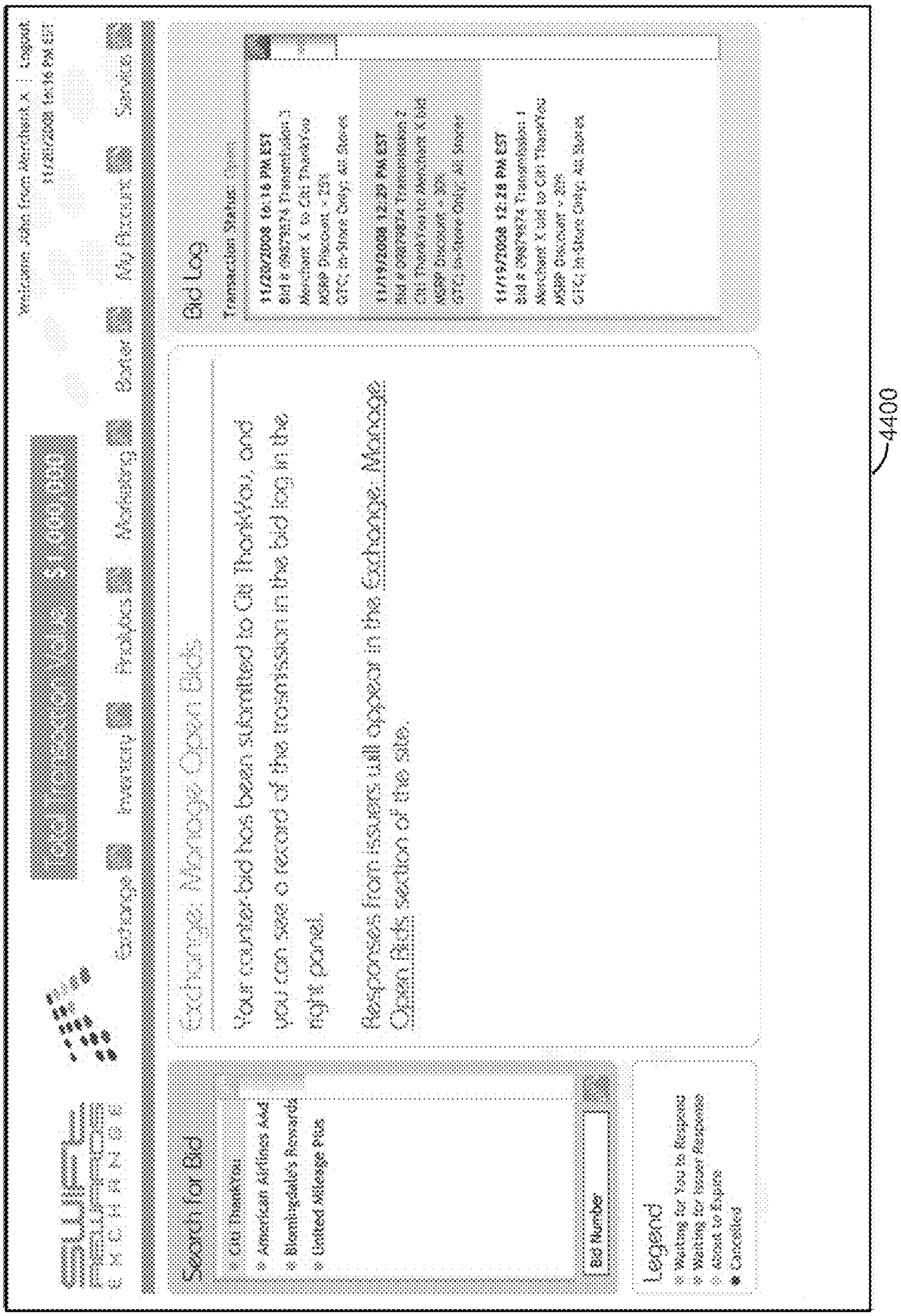
FIG. 44 is a screen shot of a merchant page in which a counter-offer is submitted.
Figure 45:
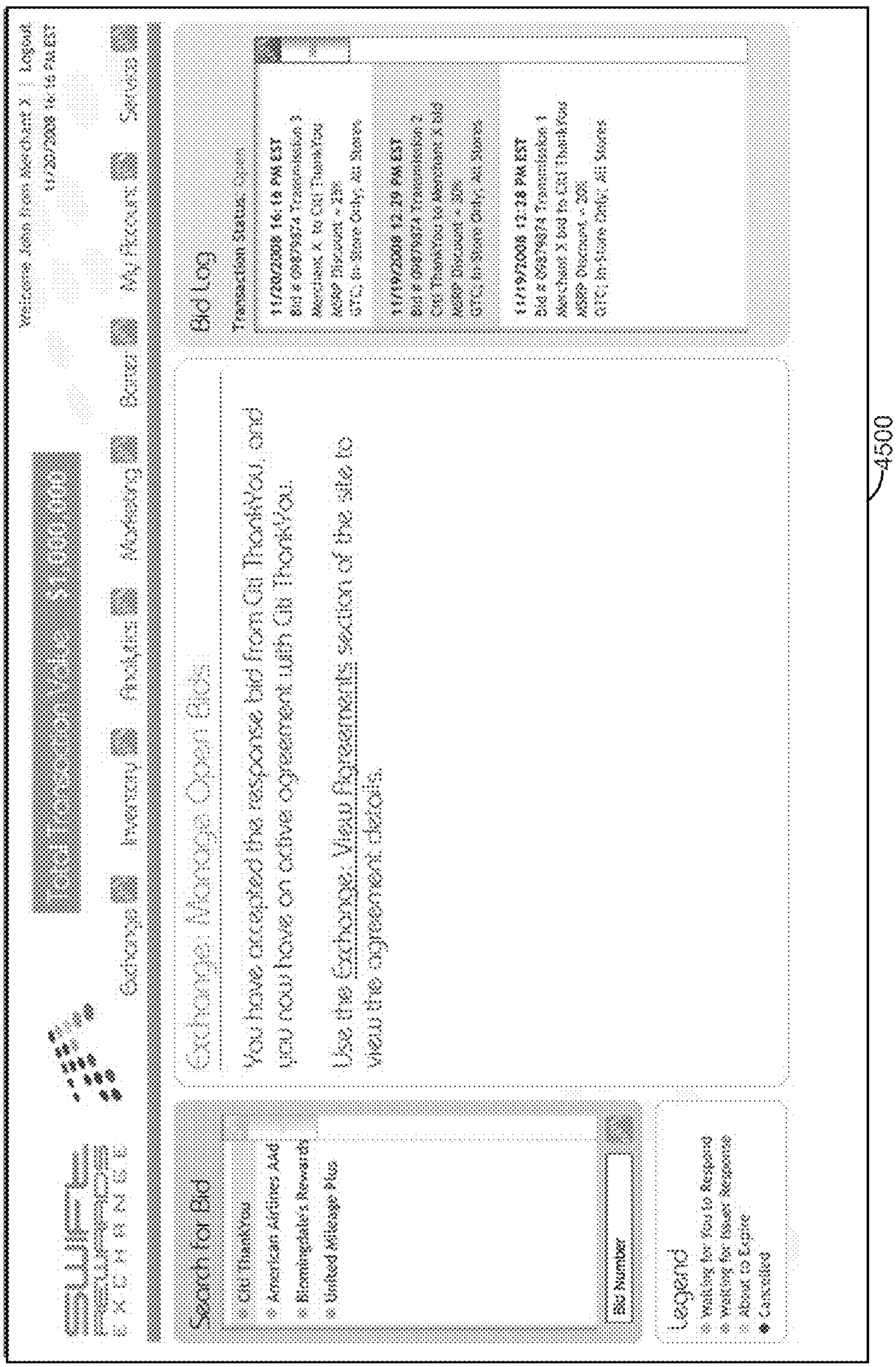
FIG. 45 is a screen shot of a merchant page in which a bid is accepted.
Figure 46:
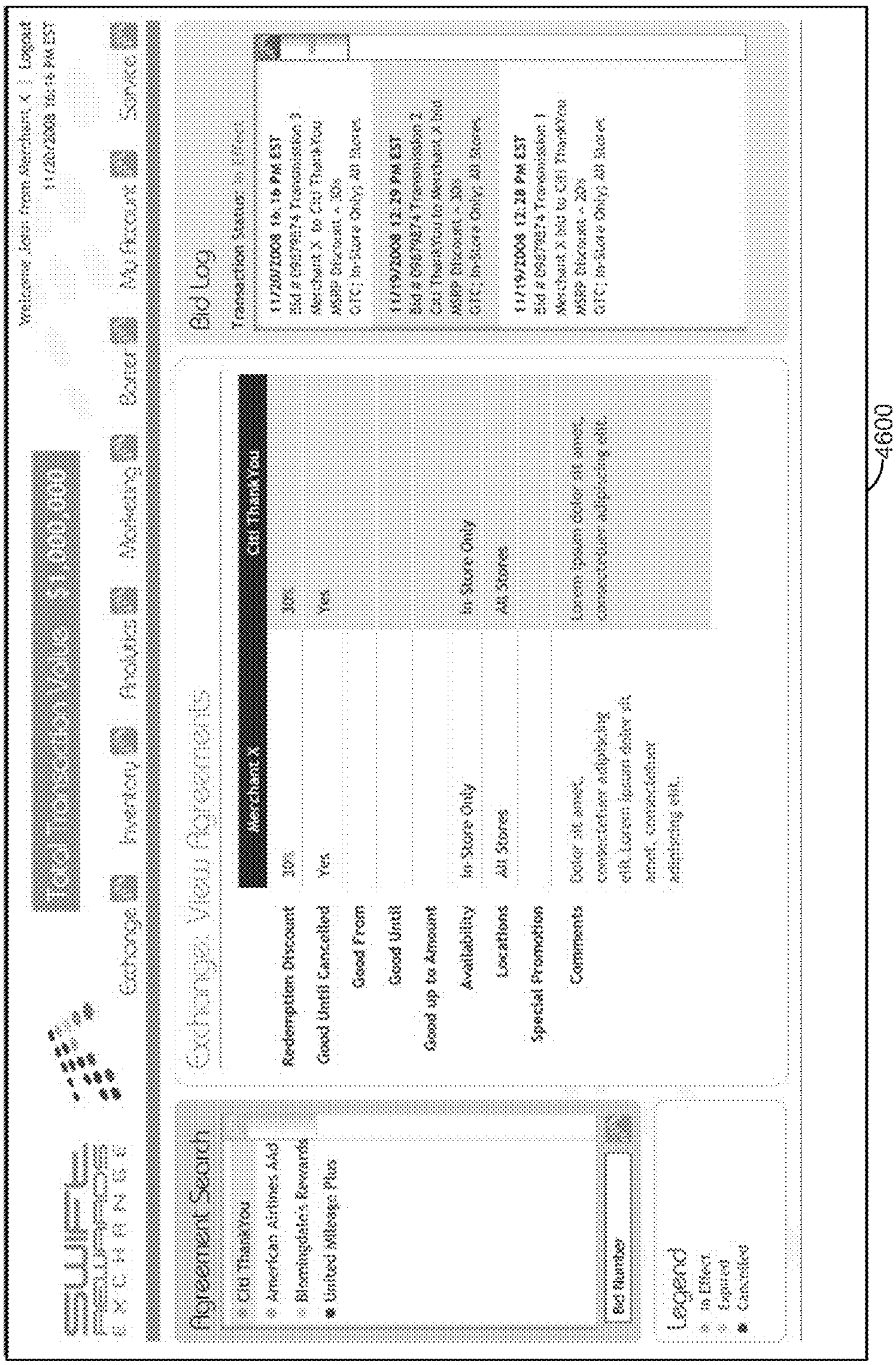
FIG. 46 is a screen shot of a merchant page in which accepted bid agreements may be viewed.

FIG. 42 is a screen shot of a merchant page 4200 in which a bid is selected for review. FIG. 43 is a screen shot of a merchant page 4300 in which a further counter-offer is provided, for example the merchant here has entered a proposed discount of 25%. This will be submitted back to the issuer via the exchange until the parties either reach an agreement or cease negotiations. FIG. 44 is a screen shot of a merchant page 4400 in which a counter-offer is submitted. FIG. 45 is a screen shot of a merchant page 4500 in which a response bid is accepted by the merchant. FIG. 46 is a screen shot of a merchant page 4600 in which accepted bid agreements may be viewed.

Figure 46A:
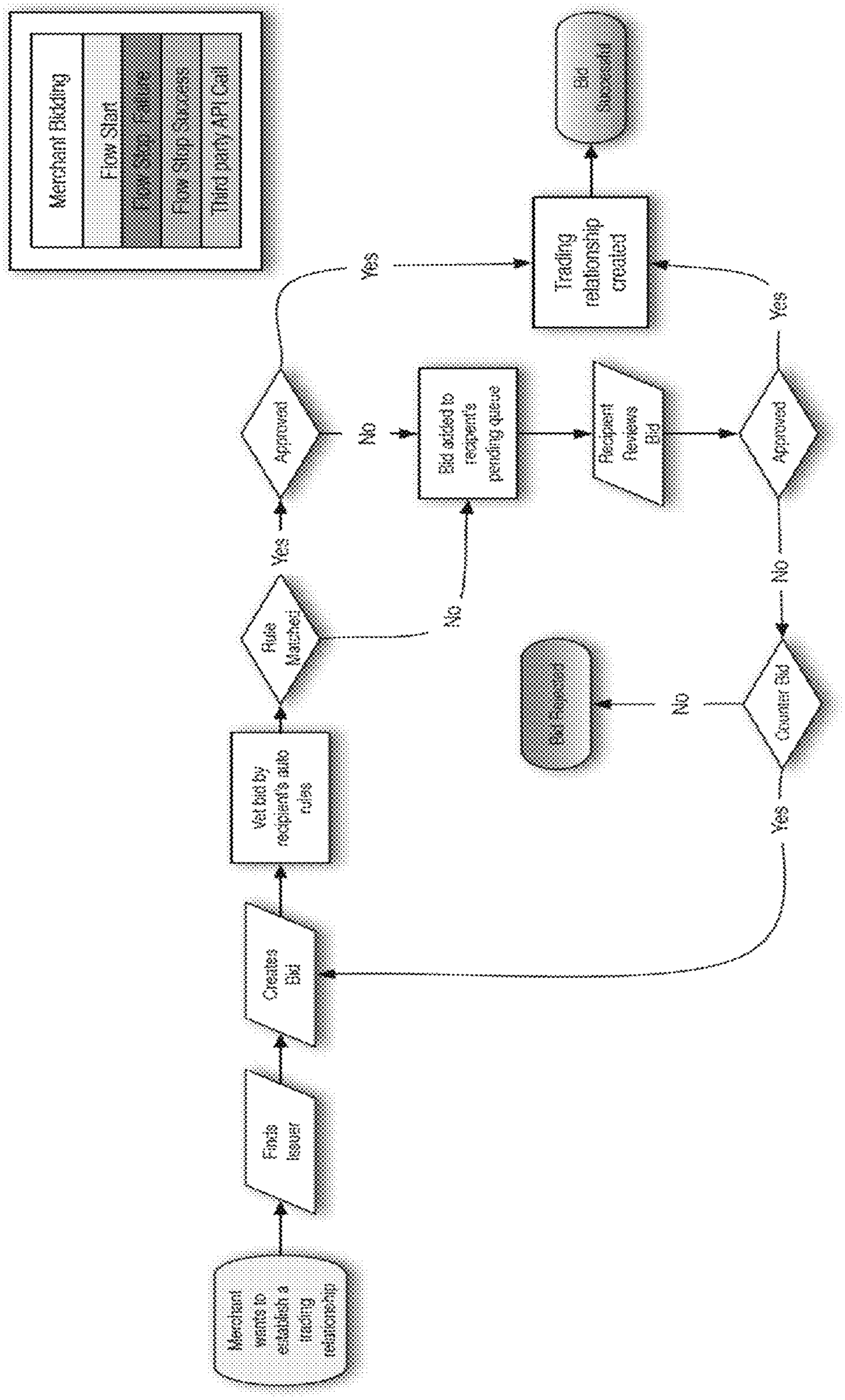
FIG. 46*a* is a flowchart illustrating the merchant bidding process.
Figure 46B:
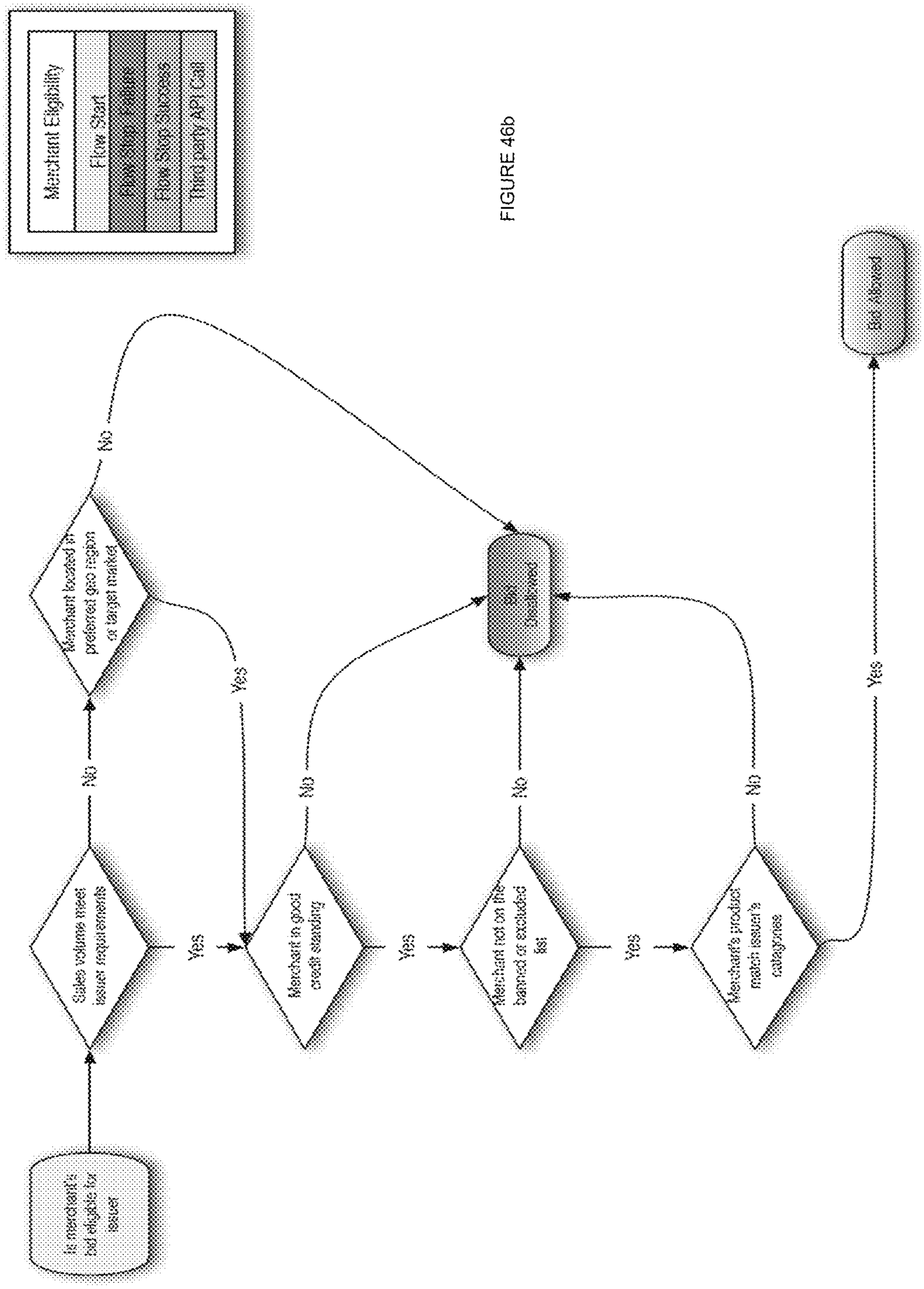
FIG. 46*b* is a flowchart illustrating the merchant eligibility process.

This bidding process described above is managed by the bidding engine 154 of the exchange computer 102 in association with the issuer/merchant bids database 119, which are shown in FIG. 1*b*. FIG. 46*a* also illustrates this process, in which a merchant that wants to establish a trading relationship with an issuer will find an issuer via the web page, then create the desired bid that is checked against the issuer profile in the issuer profile database 118. If the bid meets a predefined rule from that issuer's profile (such as "accept all bids under 10% discount), then the bid is approved an the trading relationship is automatically created. If the rule is not met then the bid is queued and sent to the issuer for review. The bid could be accepted or rejected, in which case a counter-bid may be made by the issuer and returned to the merchant via the exchange computer.

Further checks on the bid may be made with respect to merchant eligibility as illustrated in FIG. 46(*b*). In order to determine if the merchant's bid is eligible for the selected issuer, several criteria are reviewed. For example, the merchant's sales volume is checked to see if it meets the issuer's defined requirements. Also, the merchant must be in good credit standing (have the required credit rating). The merchant is cross-checked against a list of banned or excluded merchants. Finally, the merchant's products must match the issuer's stated categories. Assuming all of these (and perhaps other) criteria have been met, then the bid will be allowed to be made. If any criteria fail, then the bid is disallowed.

Figure 35:
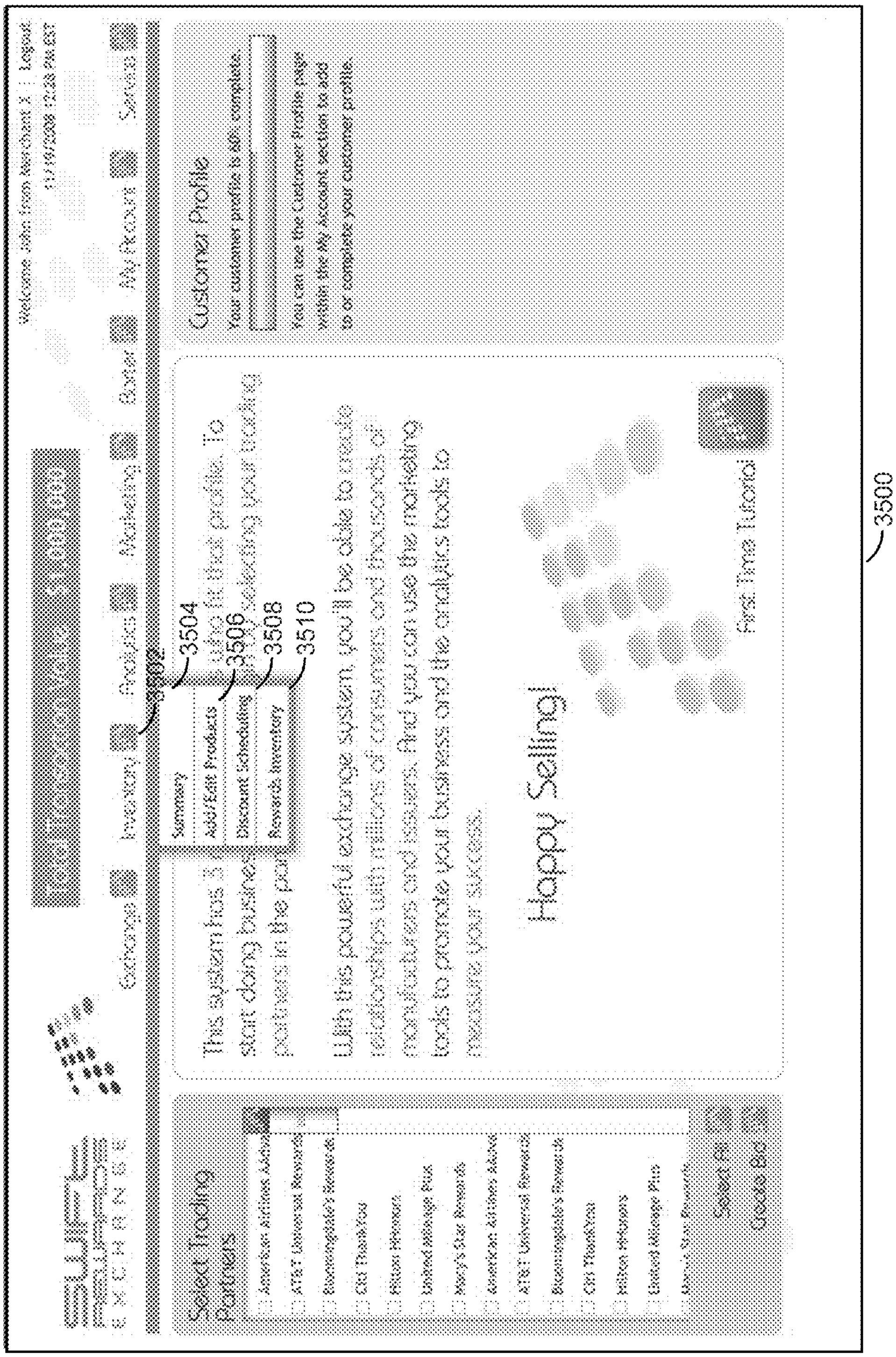
FIG. 35 is a screen shot of a merchant page with an Inventory menu item drop down list.
Figure 47:
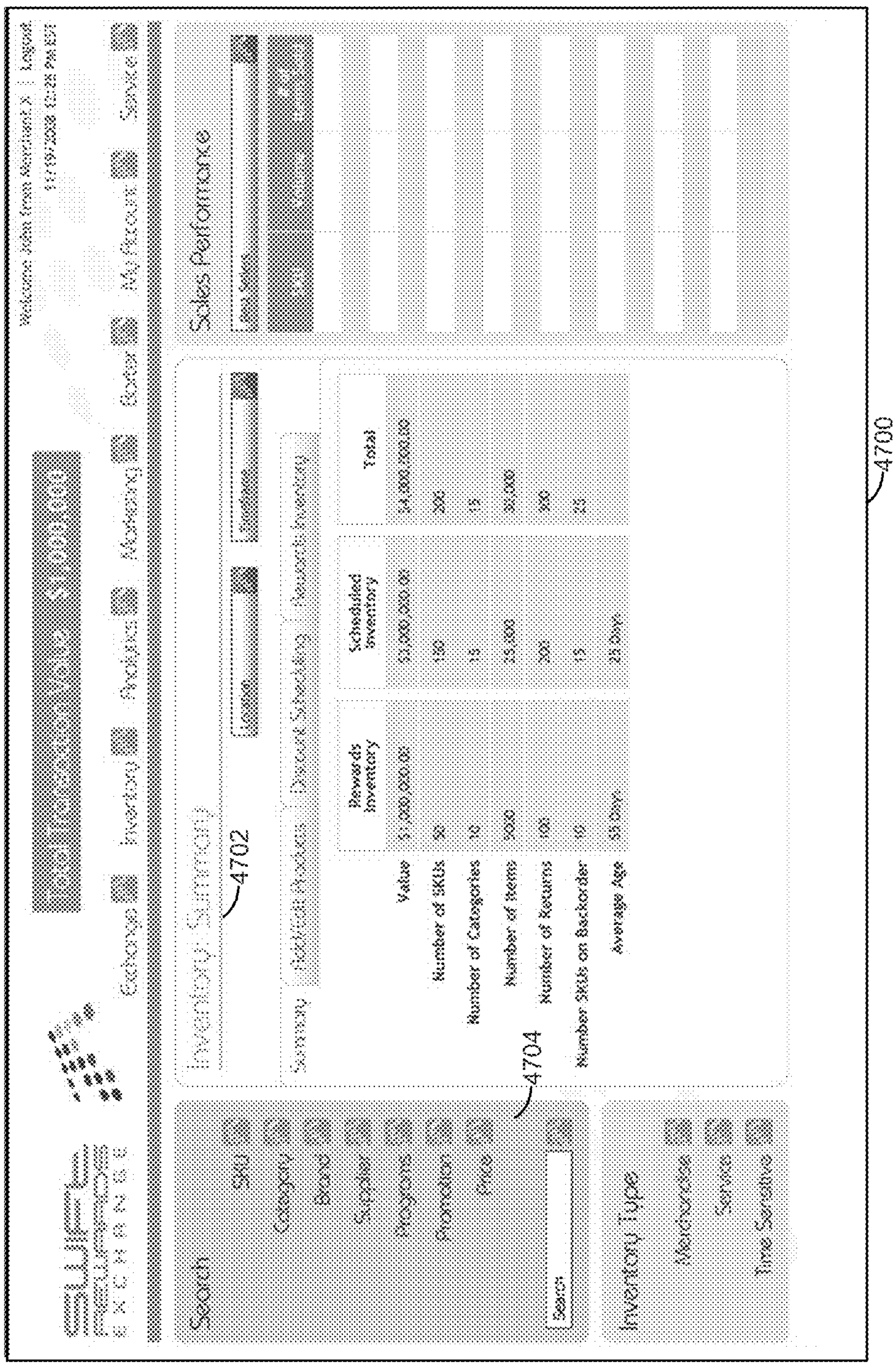
FIG. 47 is a screen shot of a merchant page in which the inventory summary is presented.

FIG. 35 is a screen shot of a merchant home page 3500 with an Inventory menu item drop down list 3502 that sets forth the options of Summary 3504, Add/Edit products 3506, Discount Scheduling 3508, and Rewards Inventory 3510. This is the vehicle by which merchants are able to enter their available products and services into the system for storage in the product database 117 and searching and subsequent purchase by an interested user as described above. For example, FIG. 47 is a screen shot of a merchant page 4700 in which the inventory summary is presented in section 4702. This displays a summary of the value of the reward inventory, the scheduled inventory, and the total inventory. Also shown for informational purposes are the number of SKUs, categories, items, returns, etc.

Also shown is a Search engine panel 4704 on the left side in which the merchant can search the inventory by SKU, category, brand, supplier, programs, promotion and price, as well as a free-form text entry search box. The merchant can also select to search for merchandise, services, or time-sensitive items as shown.

Figure 48:
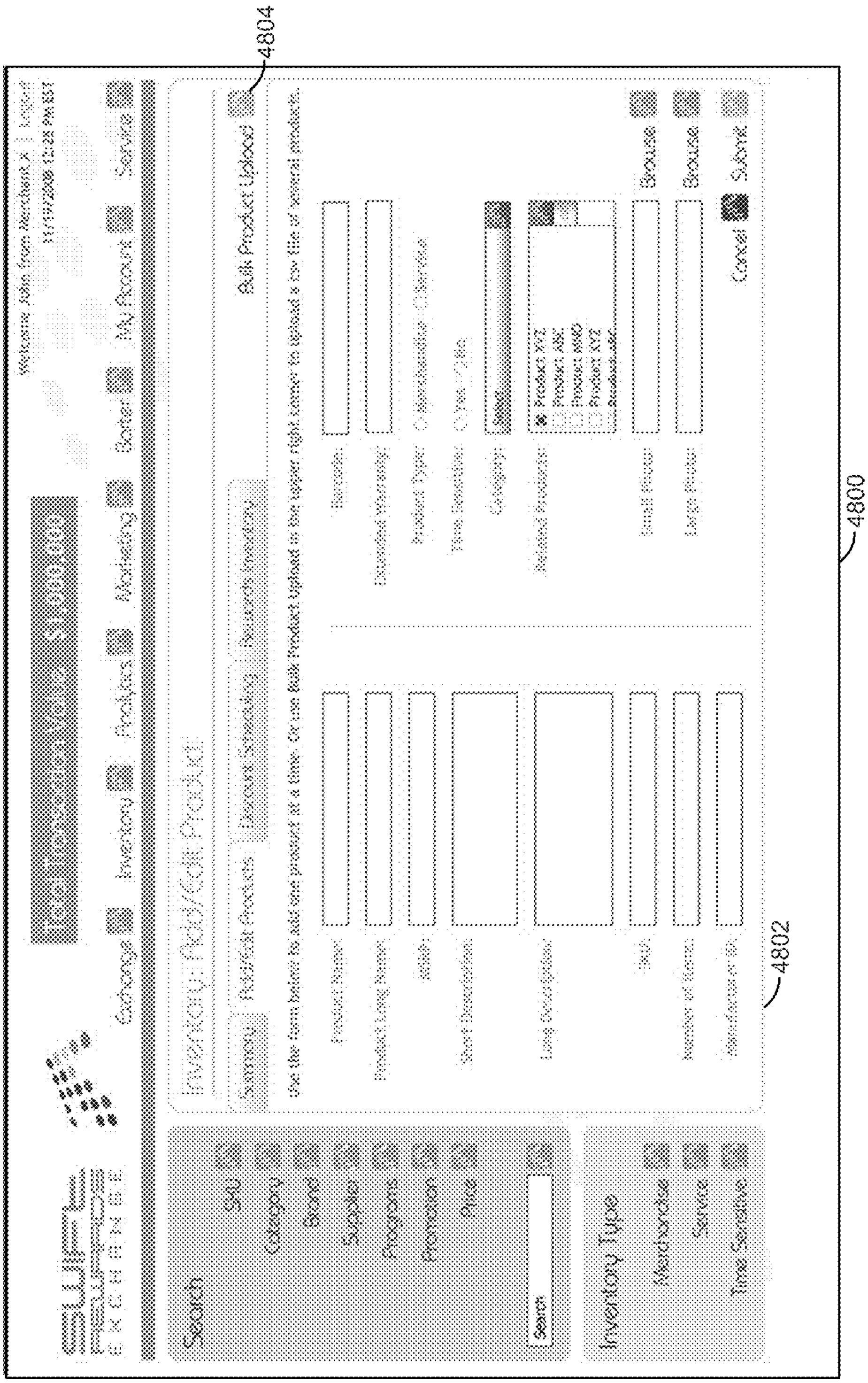
FIG. 48 is a screen shot of a merchant page in which inventory may be added or edited.
Figure 48A:
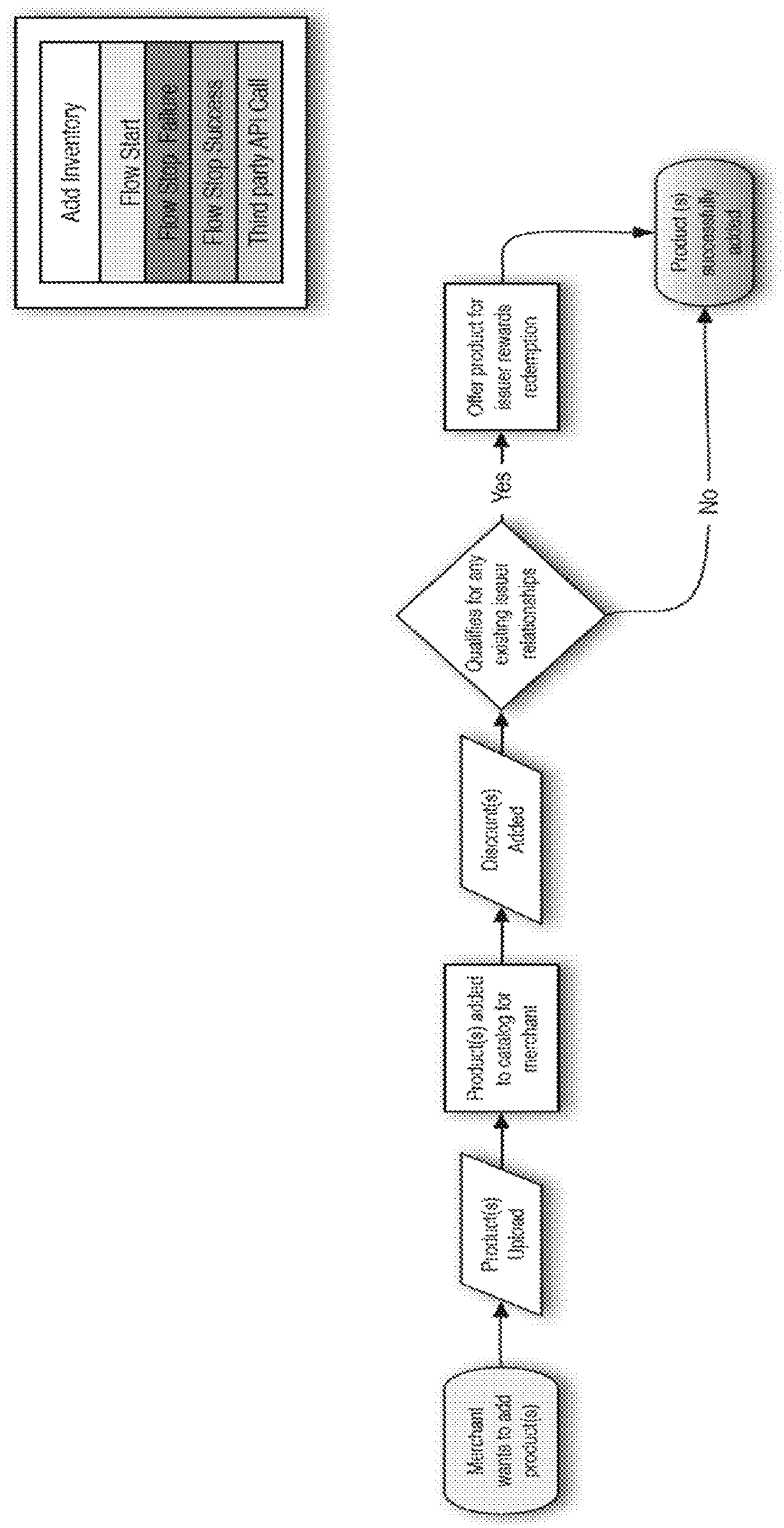
FIG. 48*a* is a flowchart illustrating the process of a merchant adding inventory.
Figure 48B:
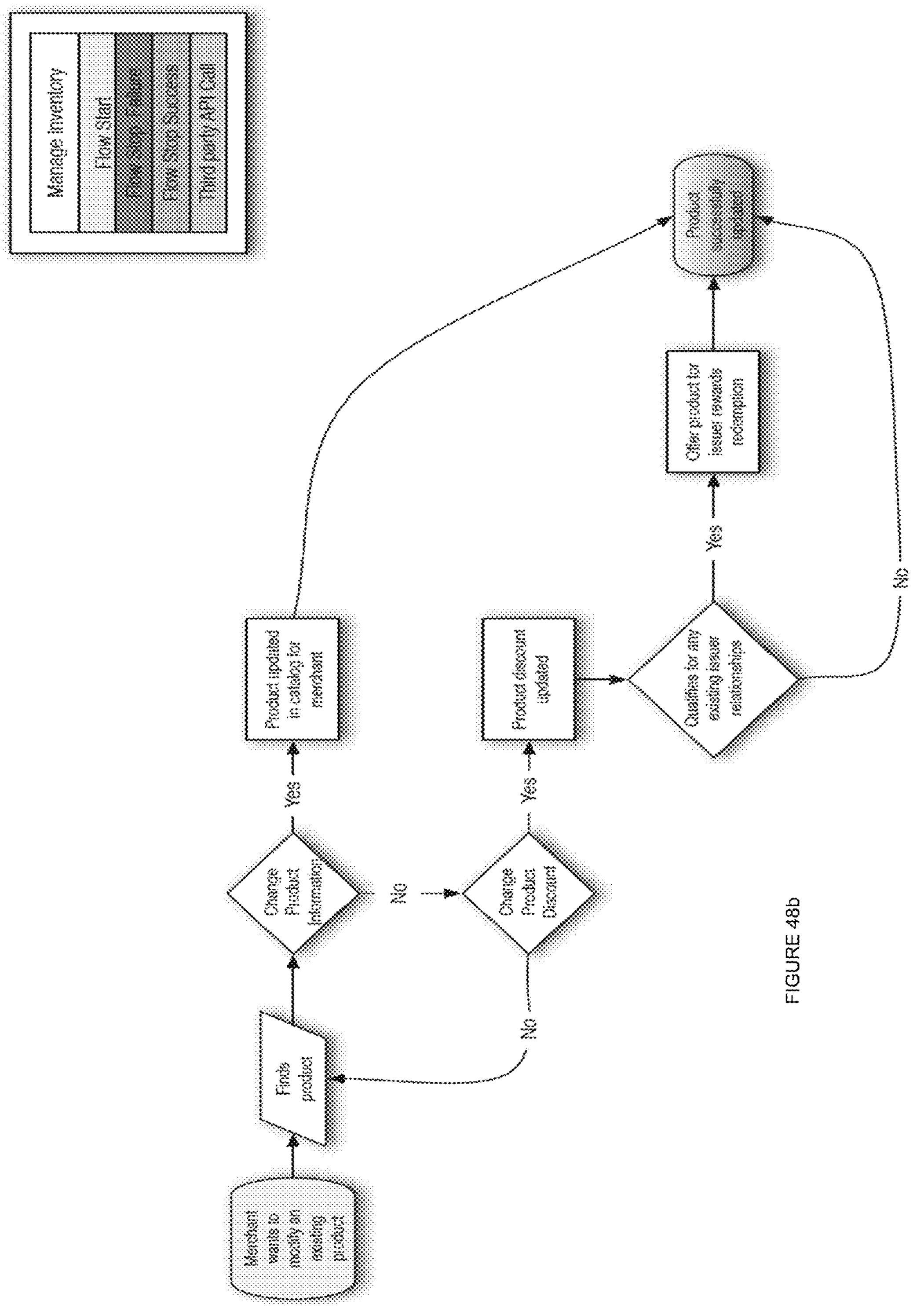
FIG. 48*b* is a flowchart illustrating the process of a merchant managing inventory.
Figure 48C:
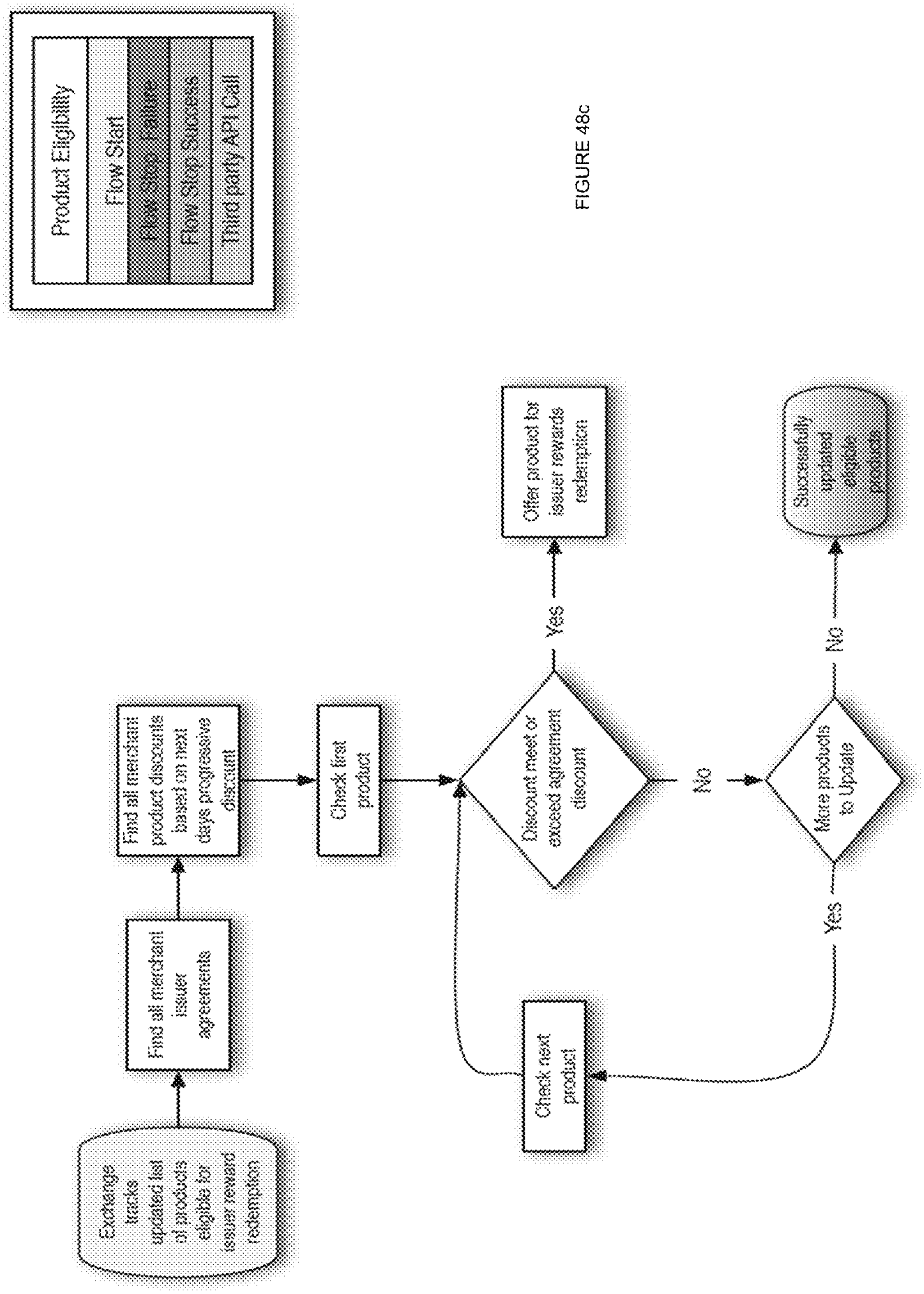
FIG. 48*c* is a flowchart illustrating the process of product eligibility.

FIG. 48 is a screen shot of a merchant page 4800 in which inventory may be added or edited. Reference is also made to the process flowchart of FIG. 48*a*. Entry fields are presented in section 4802 for product name and related information as shown. As such, product descriptions and quantities may be added by the merchant for all the products (and services) he wishes to make available on the exchange. In the alternative, a Bulk Product Upload function 4804 may be selected in which a file is uploaded that contains all of the required information, thus eliminating the need for manual entry. Inventory may be managed as shown by the process flow of FIG. 48*b*, and product eligibility is determined as shown by the process flow of FIG. 48*c*.

Figure 49:
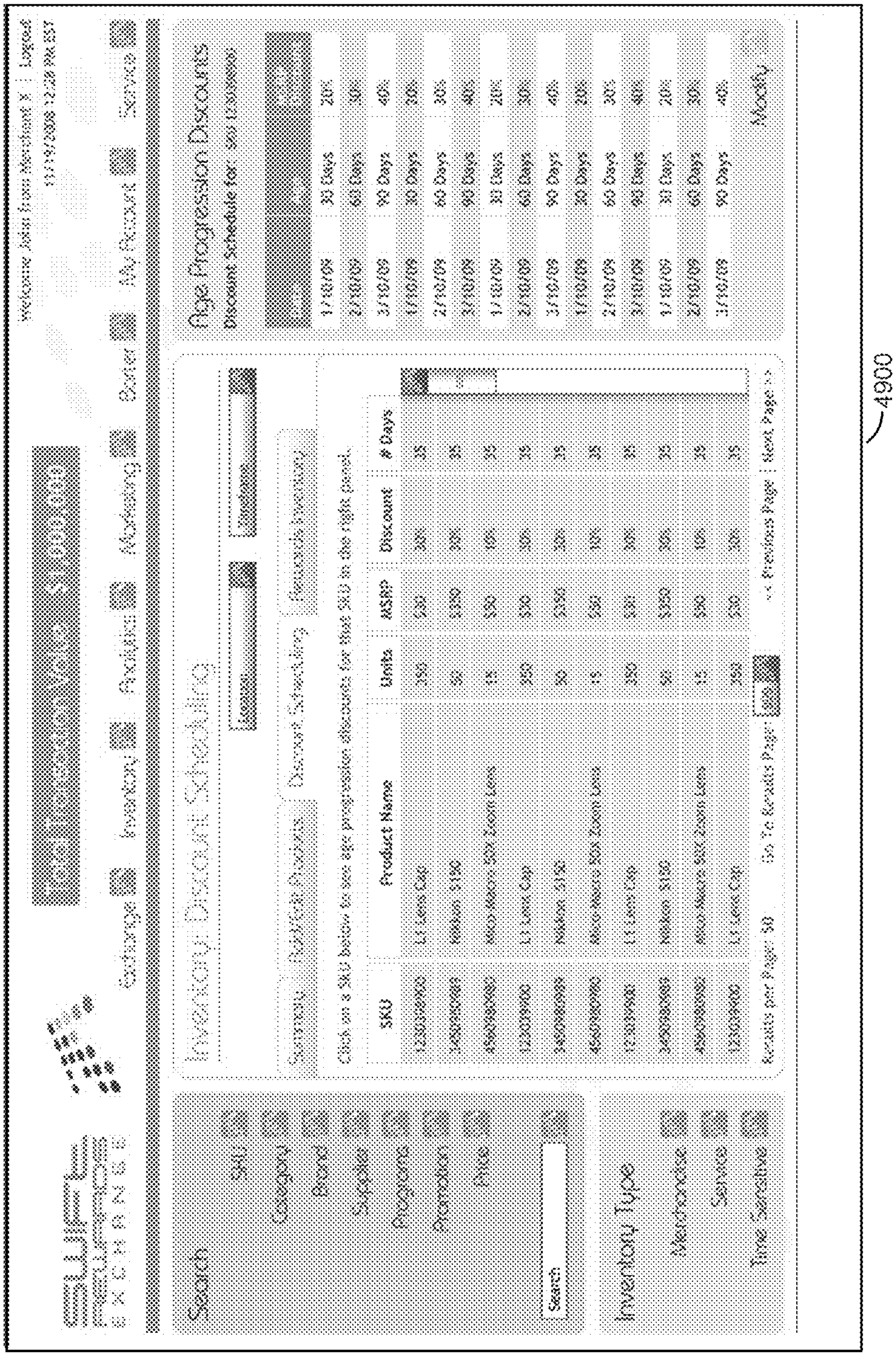
FIG. 49 is a screen shot of a merchant page in which discount scheduling may be implemented.
Figure 50:
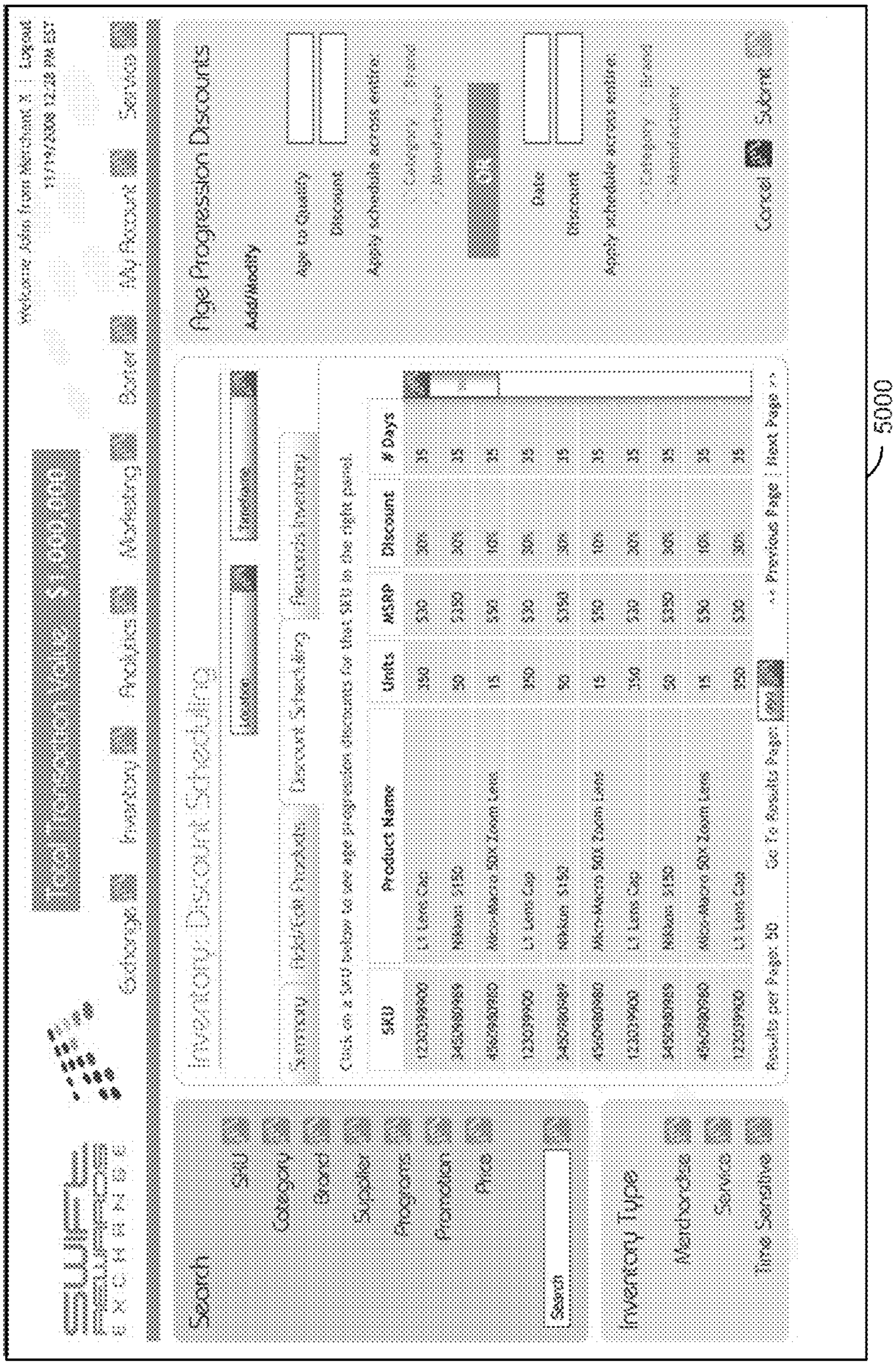
FIG. 50 is a screen shot of a merchant page in which discount scheduling may be modified.
Figure 51:
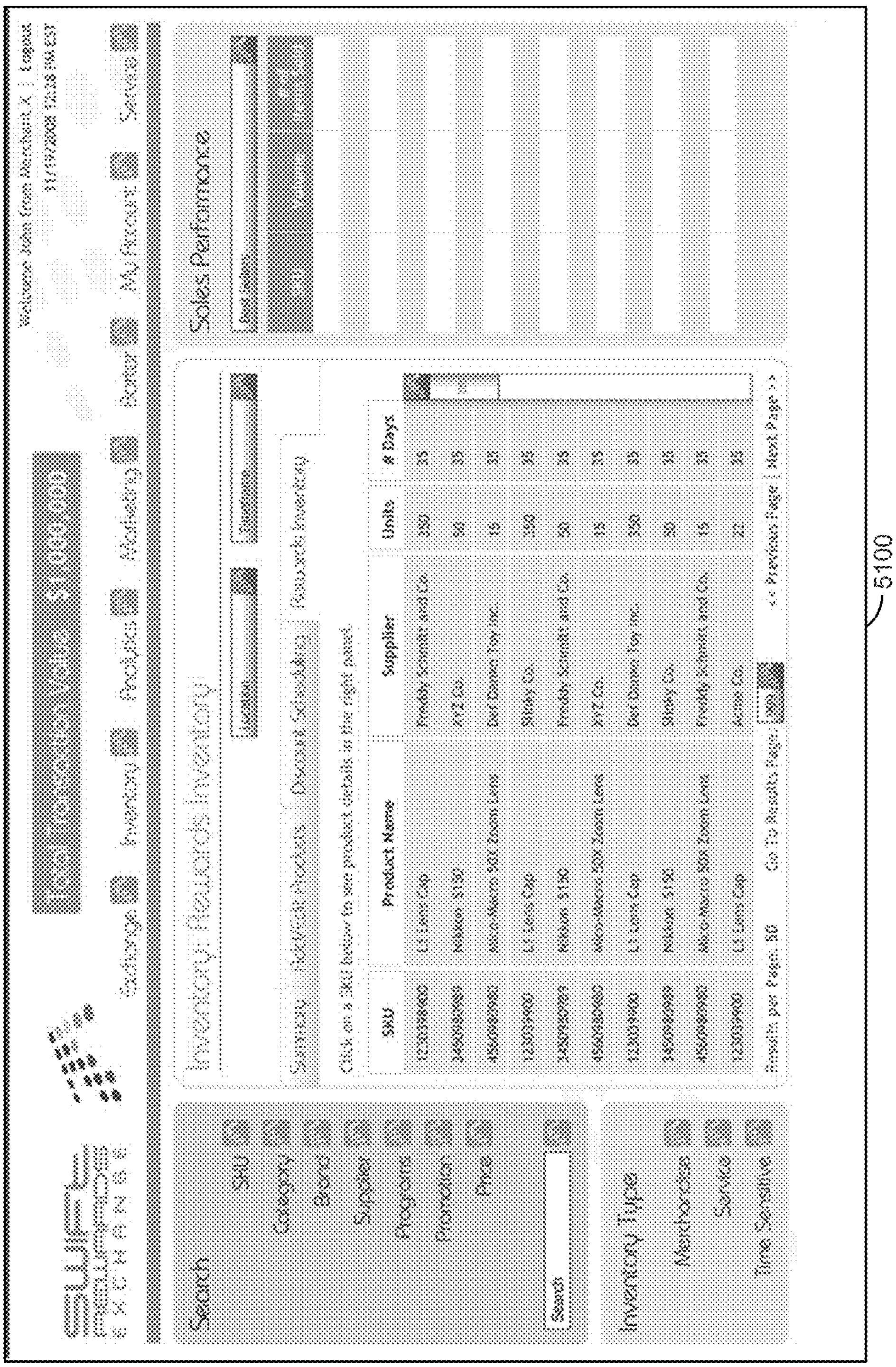
FIG. 51 is a screen shot of a merchant page in which rewards inventory is shown.
Figure 52:
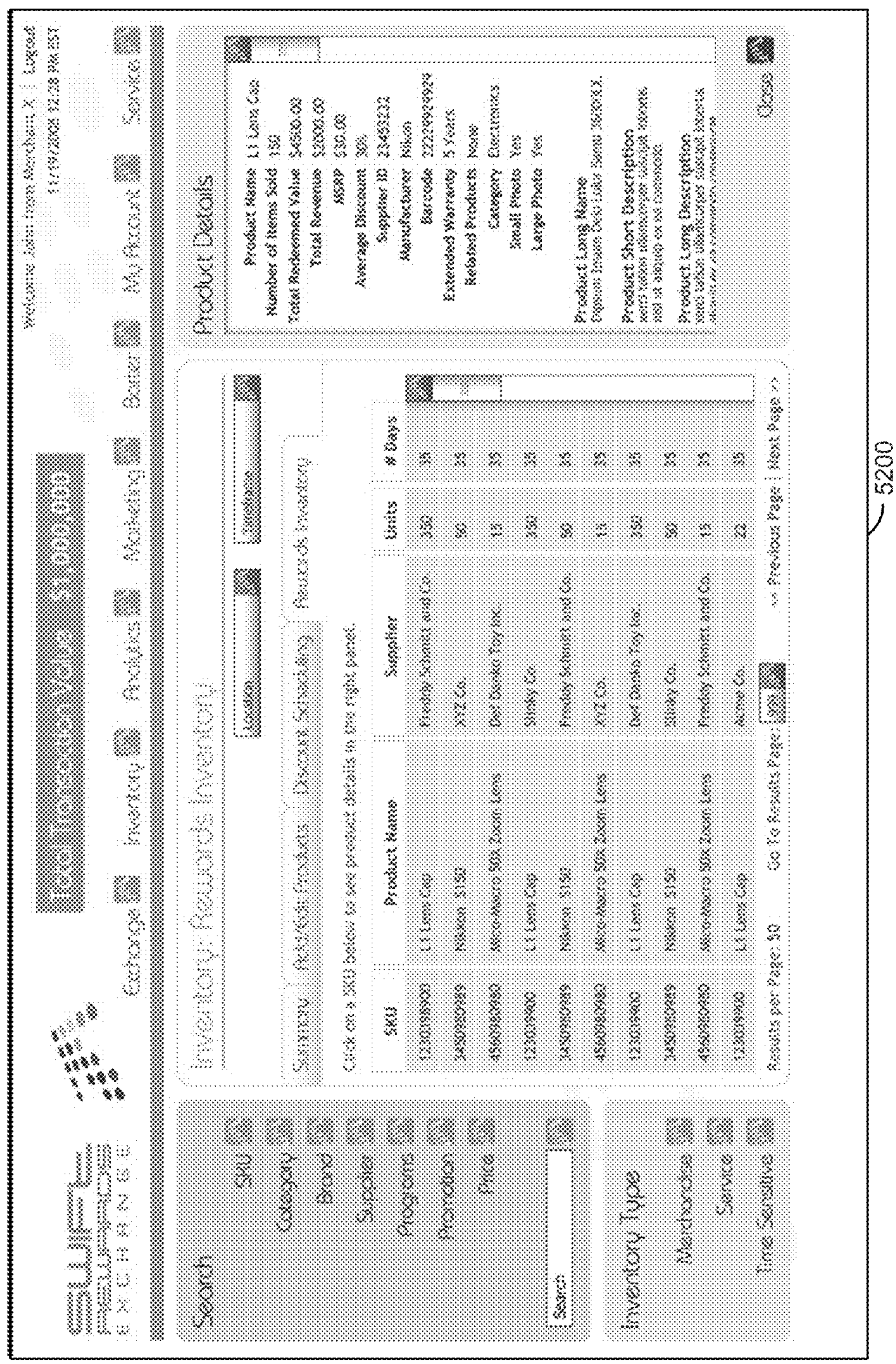
FIG. 52 is a screen shot of a merchant page in which rewards inventory detail is shown.

FIG. 49 is a screen shot of a merchant page 4900 in which discount scheduling may be implemented in accordance with this invention. FIG. 50 is a screen shot of a merchant page 5000 in which discount scheduling may be modified. Here the merchant may enter a schedule of price discounts that will be automatically generated based on the schedule entered. For example, a product may be provided with a 20% discount for 30 days, then 30% for the next 30 days, etc. This progression discount schedule may be modified by the merchant as desired. Similar functionality is provided for rewards inventory as shown in web page 5100 in FIG. 51. FIG. 52 is a screen shot of a merchant page 5200 in which rewards inventory detail is shown.

Figure 36:
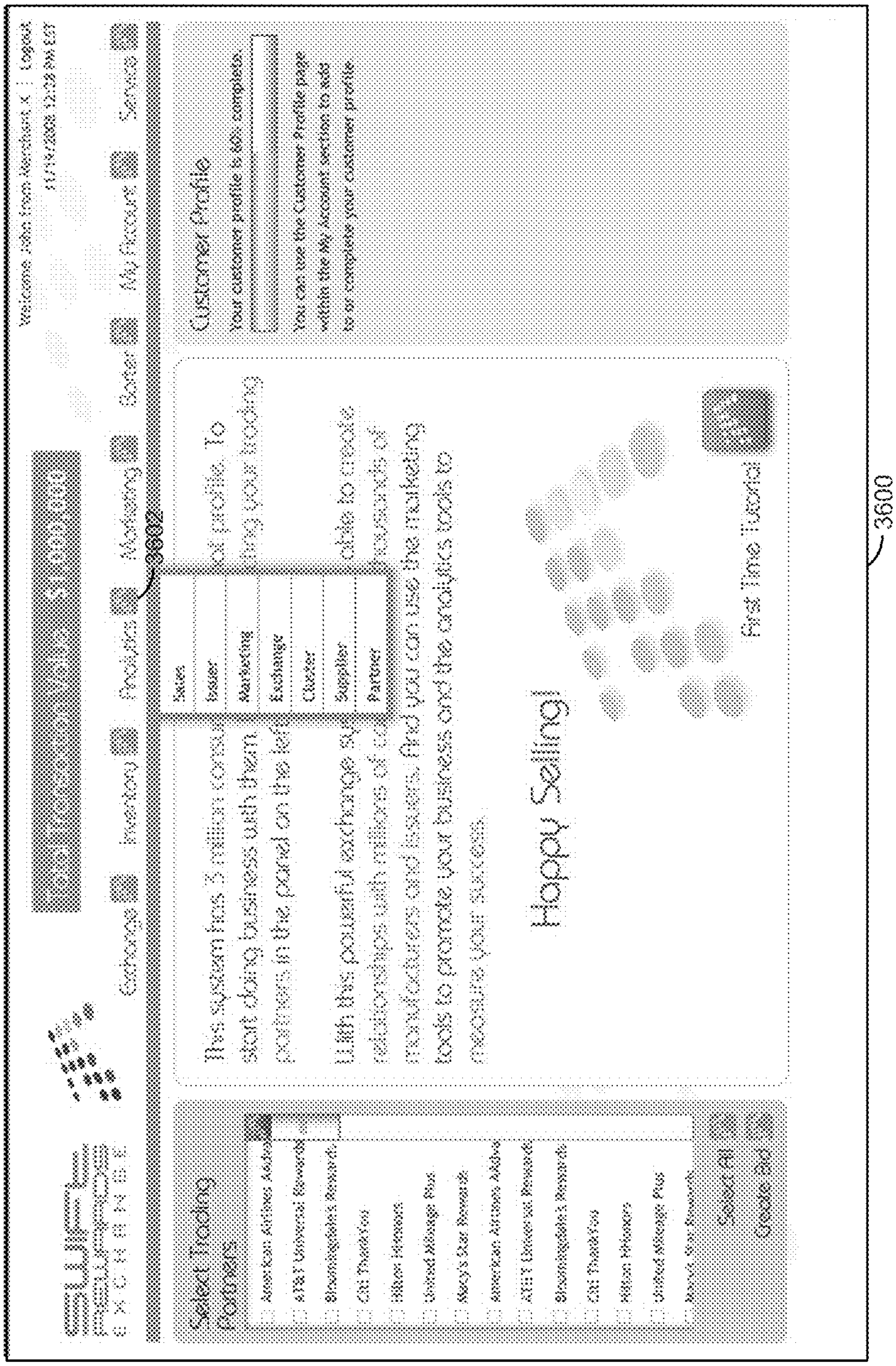
FIG. 36 is a screen shot of a merchant page with an Analytics menu item drop down list.
Figure 37:
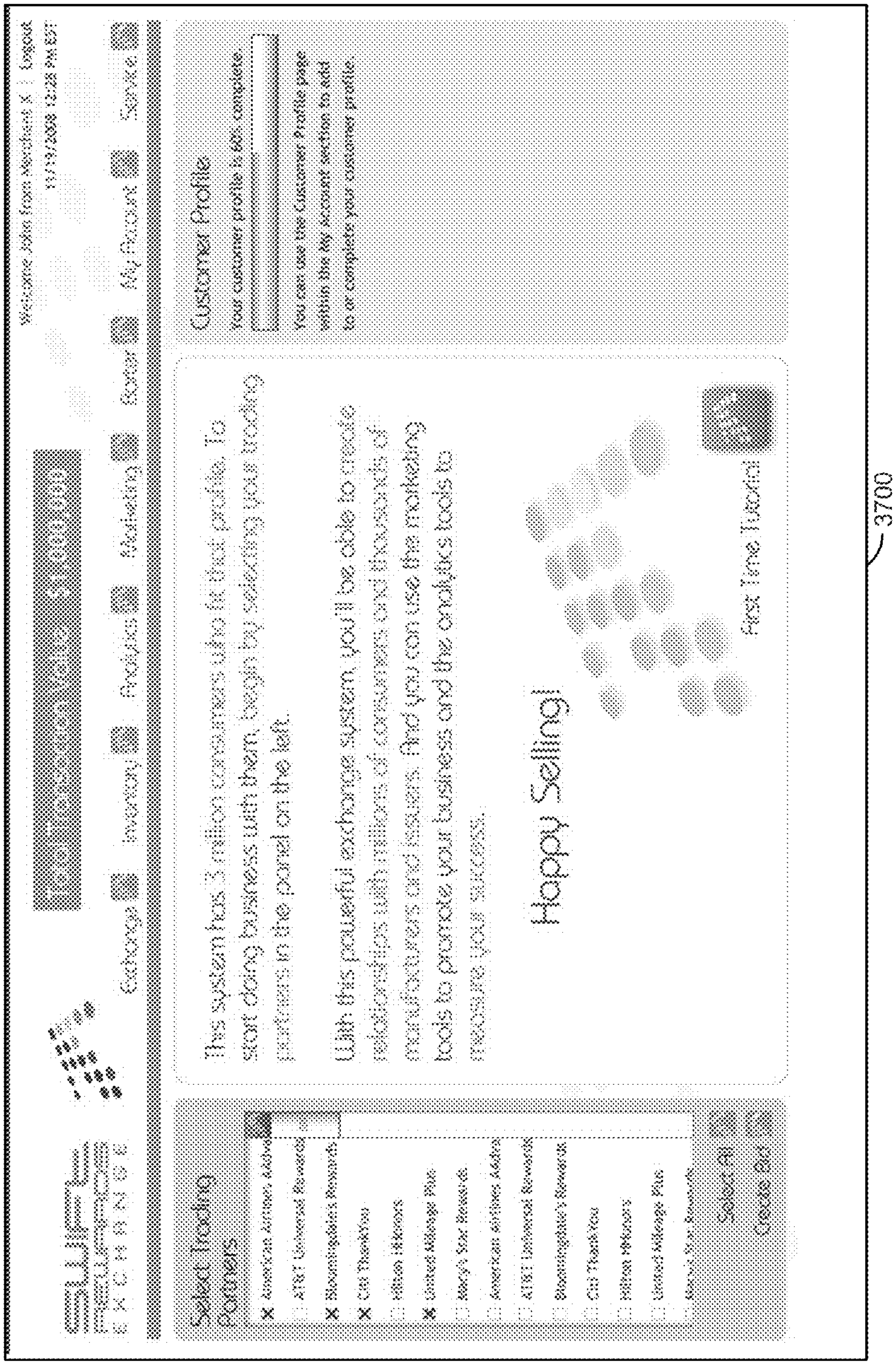
FIG. 37 is a screen shot of a merchant page with trading partners selected.
Figure 53:
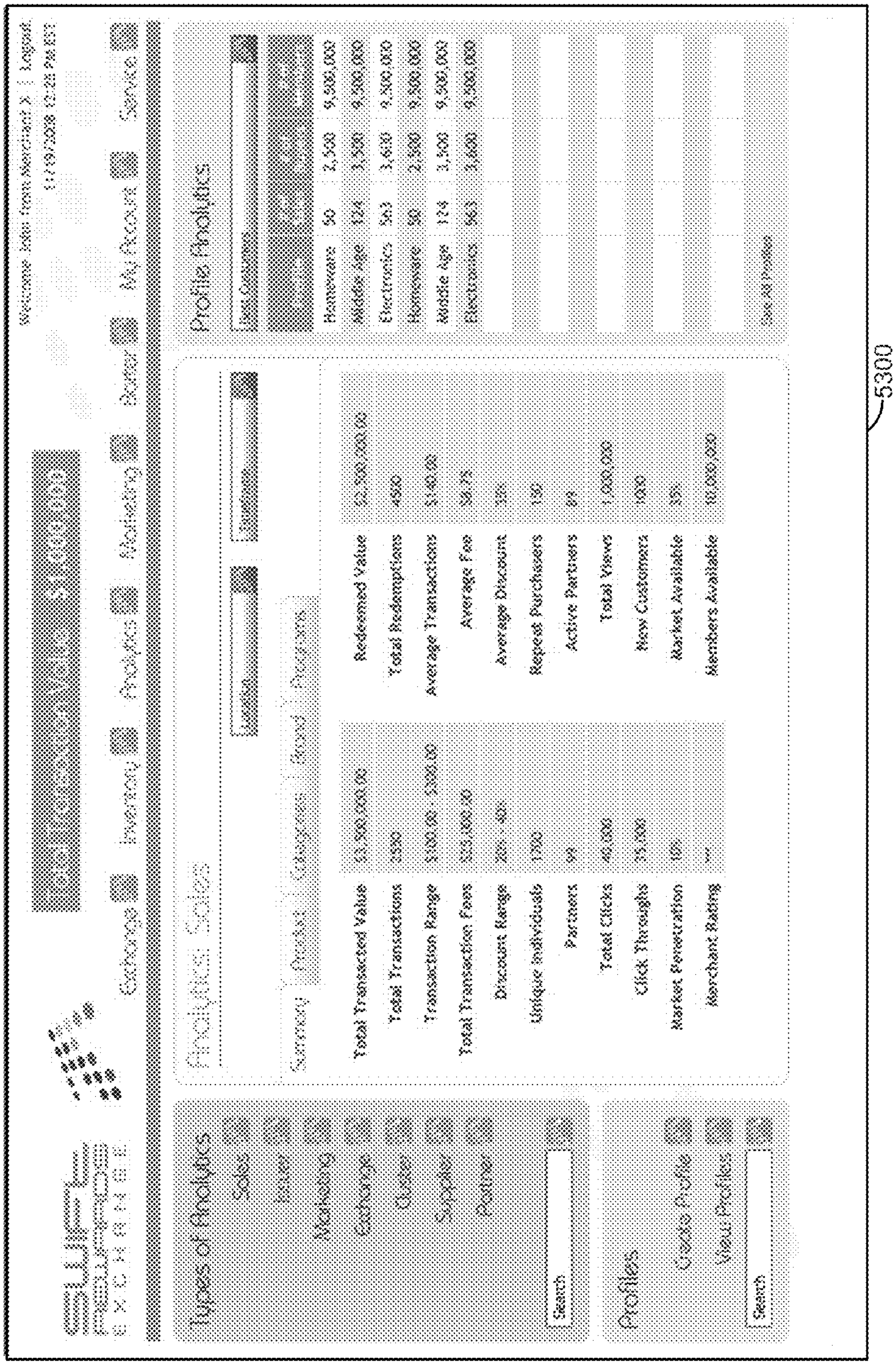
FIG. 53 is a screen shot of a merchant page in which an analytics summary is shown.
Figure 54:
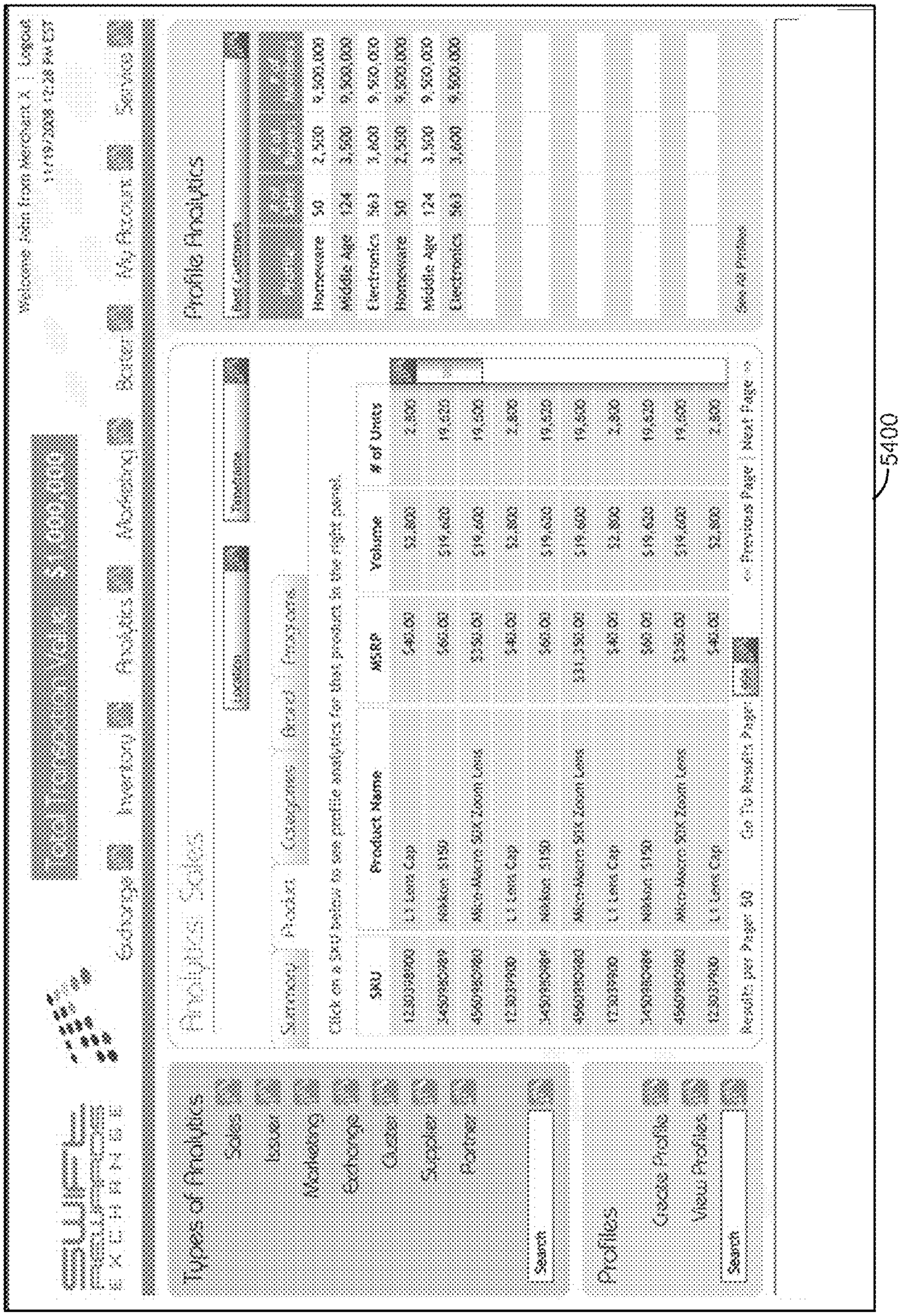
FIG. 54 is a screen shot of a merchant page in which analytics by product is shown.
Figure 55:
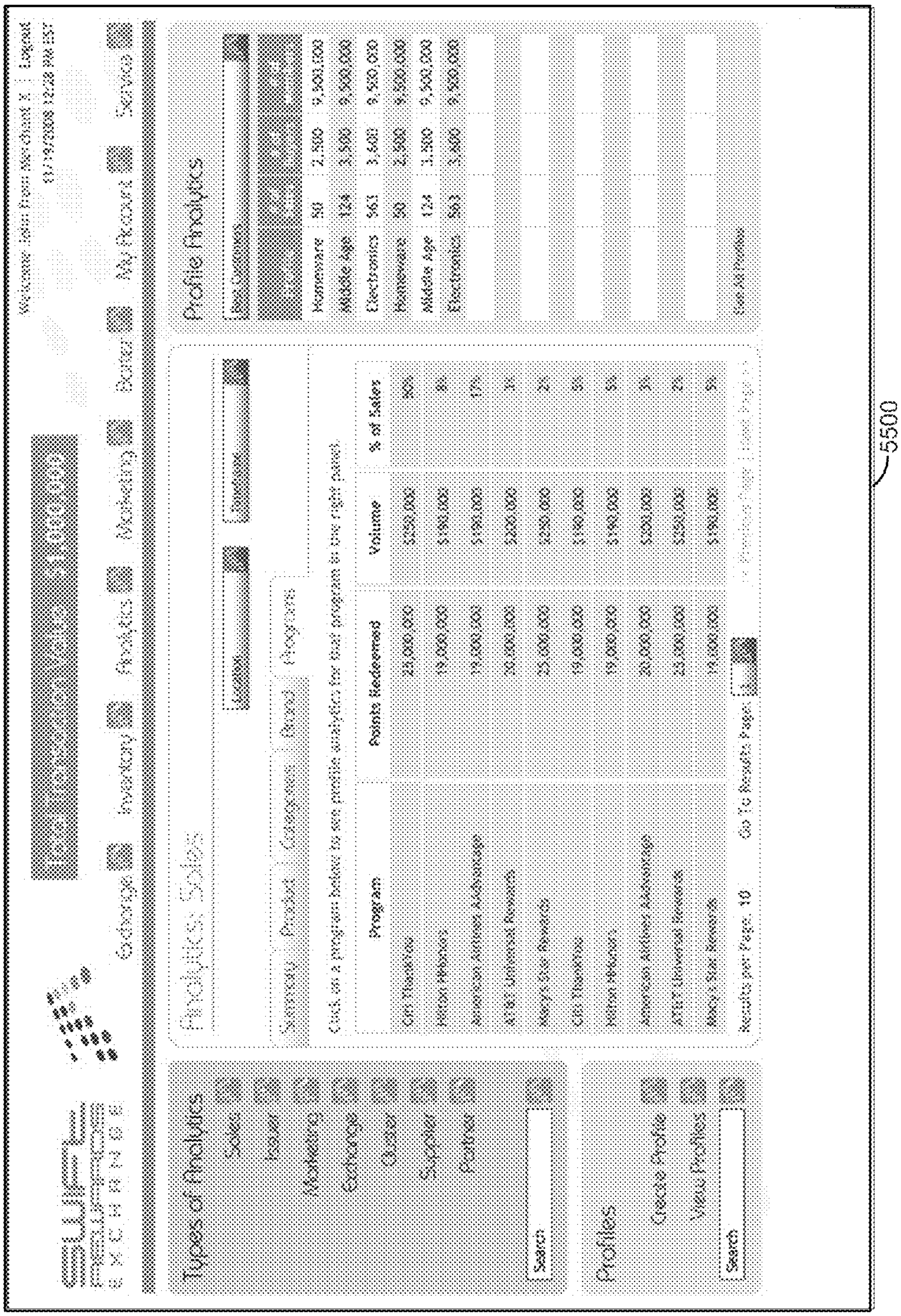
FIG. 55 is a screen shot of a merchant page in which analytics by reward programs is shown.
Figure 56:
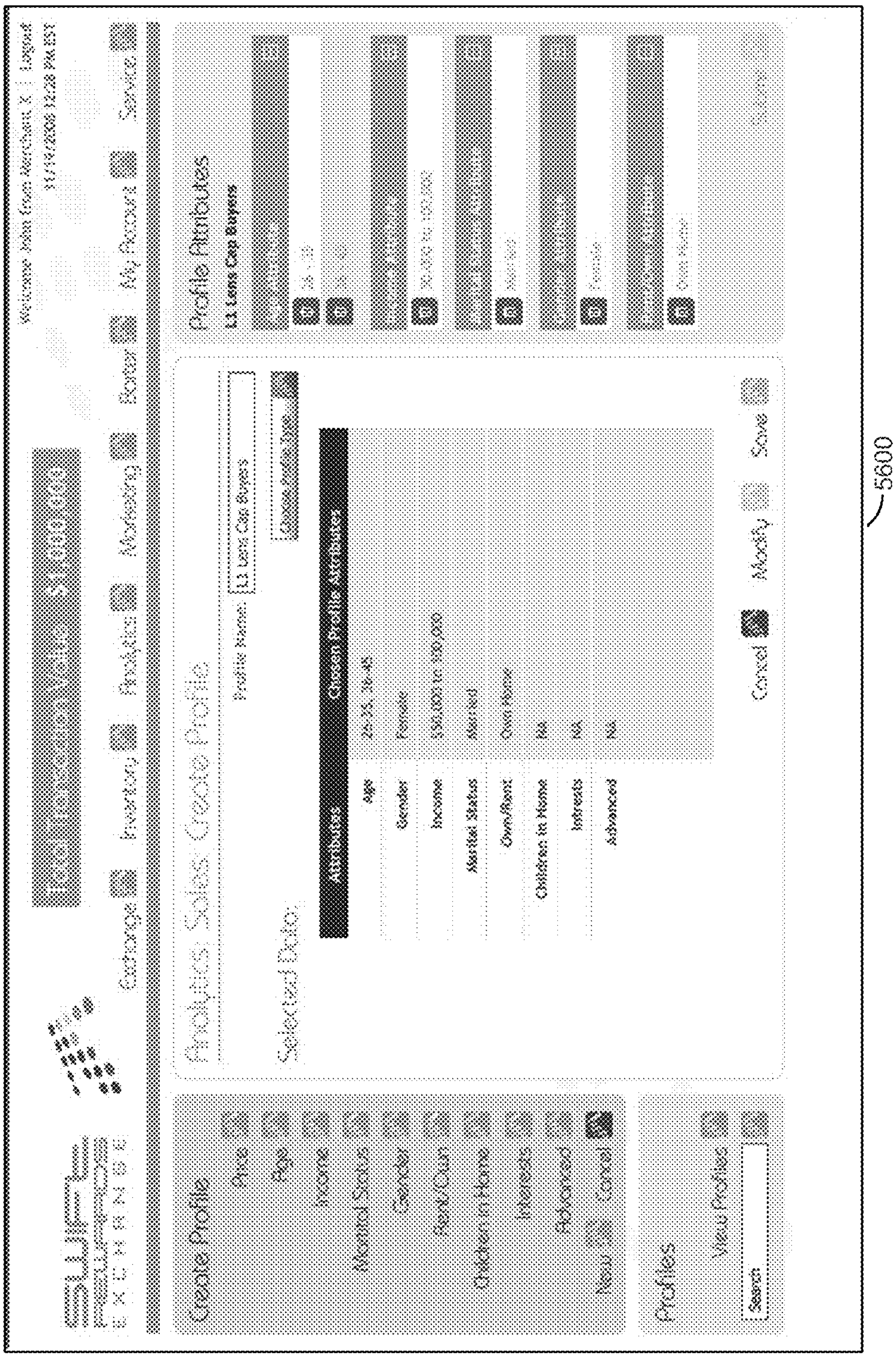
FIG. 56 is a screen shot of a merchant page in which a profile summary is shown after creation.
Figure 57:
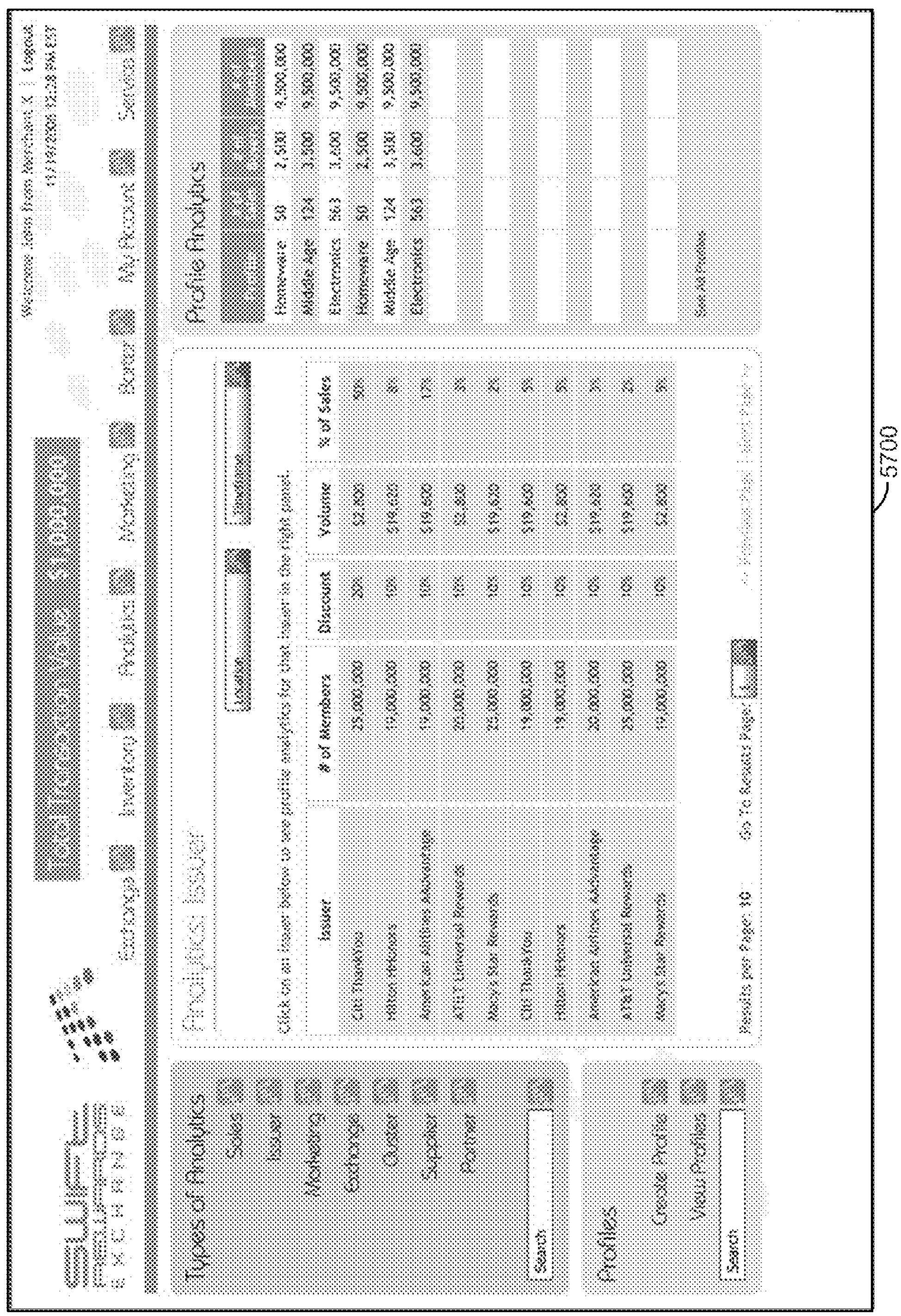
FIG. 57 is a screen shot of a merchant page in which issuer analytics are shown.
Figure 58:
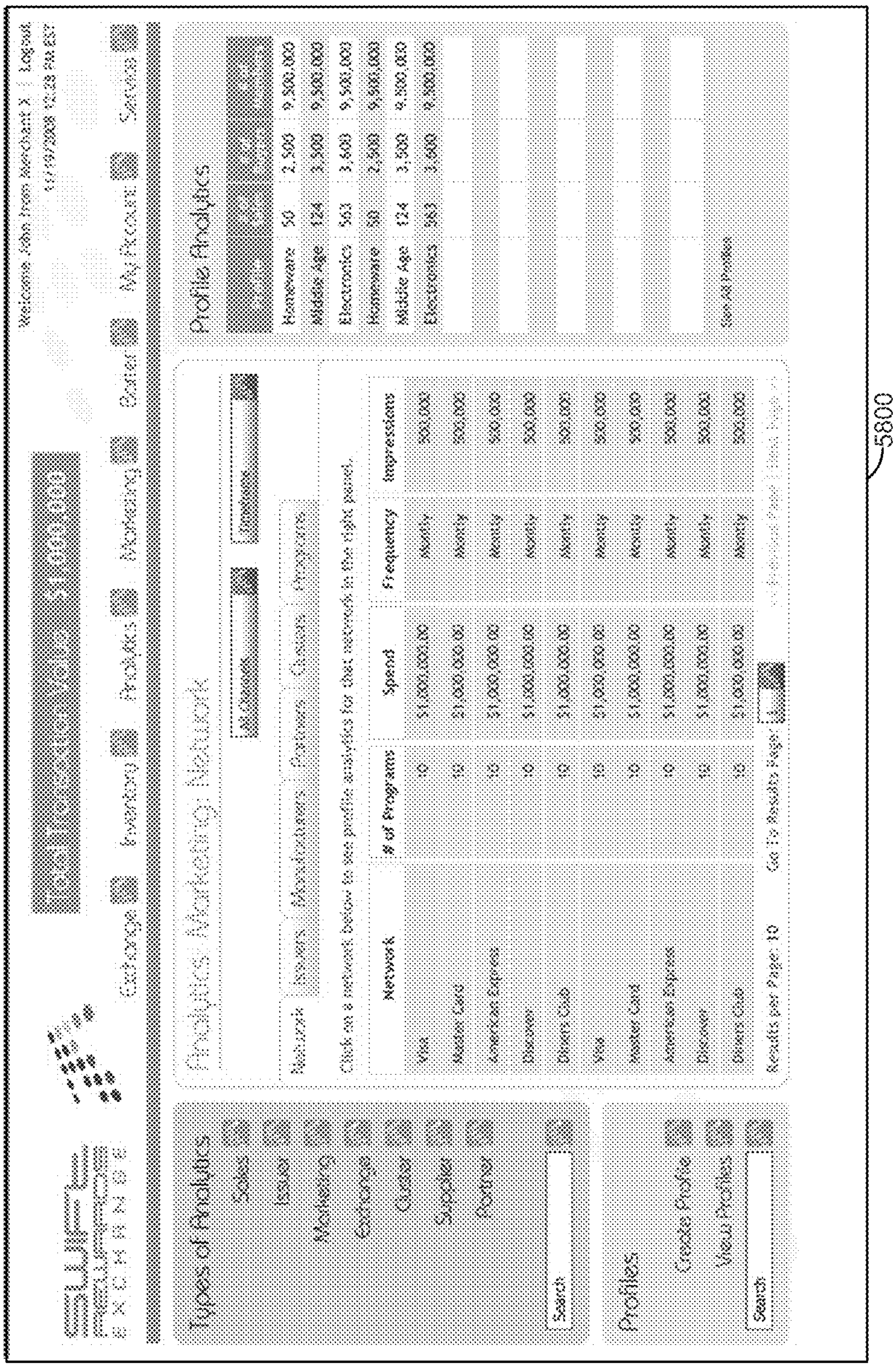
FIG. 58 is a screen shot of a merchant page in which network analytics are shown.

FIG. 36 is a screen shot of a merchant page 3600 with an Analytics menu item drop down list 3602, showing various options such as Sales, Issuer, Marketing, Exchange, Cluster, Supplier and Partner. FIG. 53 is a screen shot of a merchant page 5300 in which an analytics summary is shown. FIG. 54 is a screen shot of a merchant page 5400 in which analytics by product is shown; and FIG. 55 is a screen shot of a merchant page 5500 in which analytics by reward programs is shown. FIG. 56 is a screen shot of a merchant page 5600 in which a profile summary is shown after creation. FIG. 57 is a screen shot of a merchant page 5700 in which issuer analytics are shown, and FIG. 58 is a screen shot of a merchant page 5800 in which network analytics are shown.

In another aspect of the invention, a merchant may submit to the exchange computer any or all of the following: (1) a price discount schedule that specifies price discounts to be automatically generated by the exchange computer as a function of elapsed time that a specified product is available for purchase; (2) a redemption schedule that specifies redemption discounts to be automatically generated by the exchange computer as a function of elapsed time that a specified product is available for purchase; and/or (3) a transacted value discount schedule that specifies transacted value discounts to be automatically generated by the exchange computer as a function of elapsed time that a specified product is available for purchase.

In yet another aspect of the invention, a user profile is built for storage in a user profile database associated with the exchange computer. A reward redemption offer is generated based on information in the user profile and then presented to the user via the user computer. The user profile may include information regarding the user's past reward redemptions and/or the user's past product viewing history. A merchant may access the user profile database in order to generate a product offer to a user that is targeted to that user based on the profile information of the user.

Figure 59:
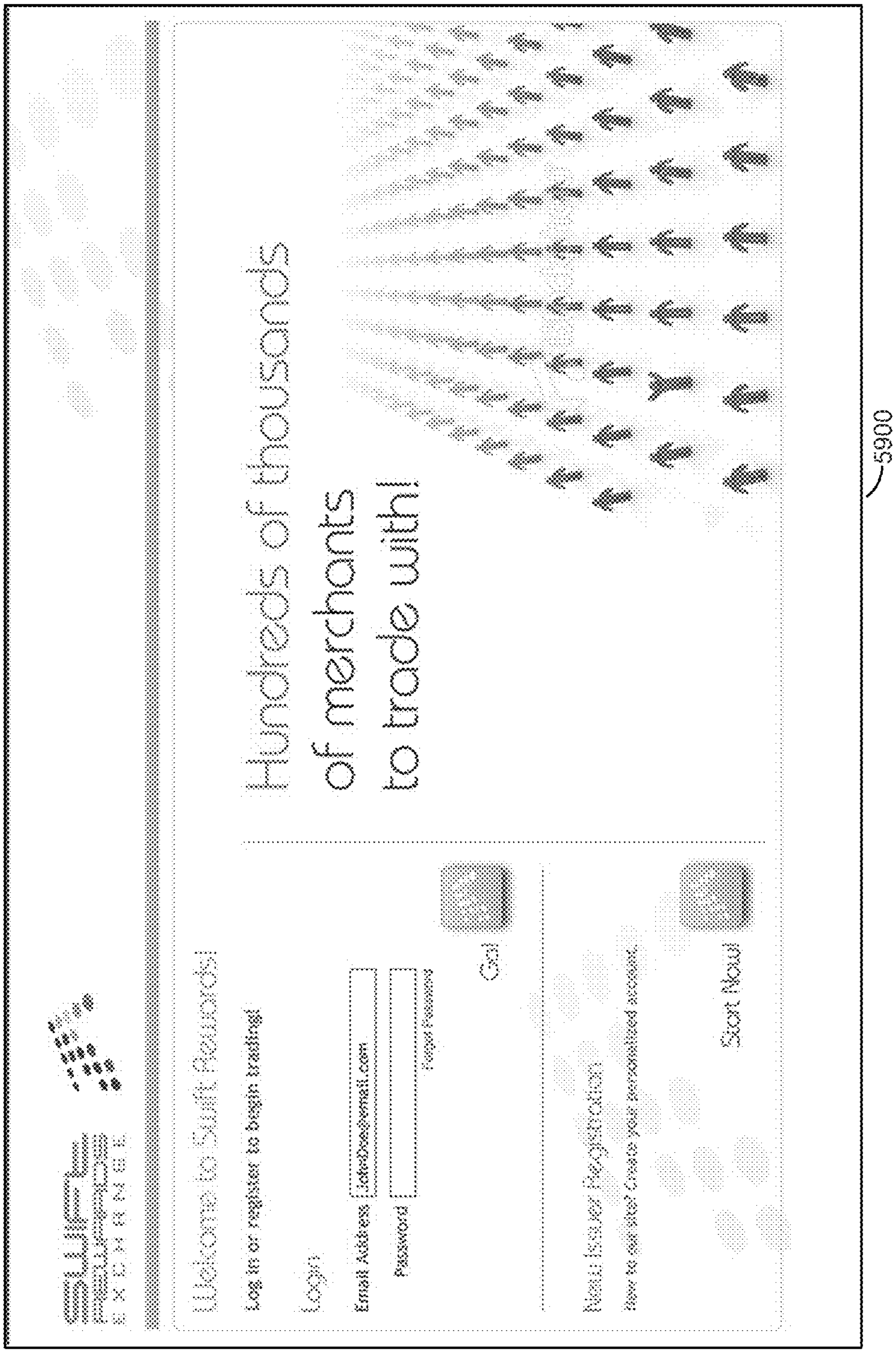
FIG. 59 is a screen shot of an issuer login page.

FIG. 59 is a screen shot of an issuer login page 5900 that is accessed by a reward point issuer 108 on an issuer computer 130 interconnected to the exchange computer 102 via the network 114 by selecting the issuer button 140 on the home screen 134 of FIG. 1. This page may of course also be directly accessed with an appropriate URL entry.

A plurality of issuers also register with the exchange computer via the web site, each of the issuers registering using an associated issuer computer for providing issuer information comprising a designation of merchants registered with the exchange computer with which the issuer agrees to execute a reward redemption transaction when requested by the user.

Figure 60:
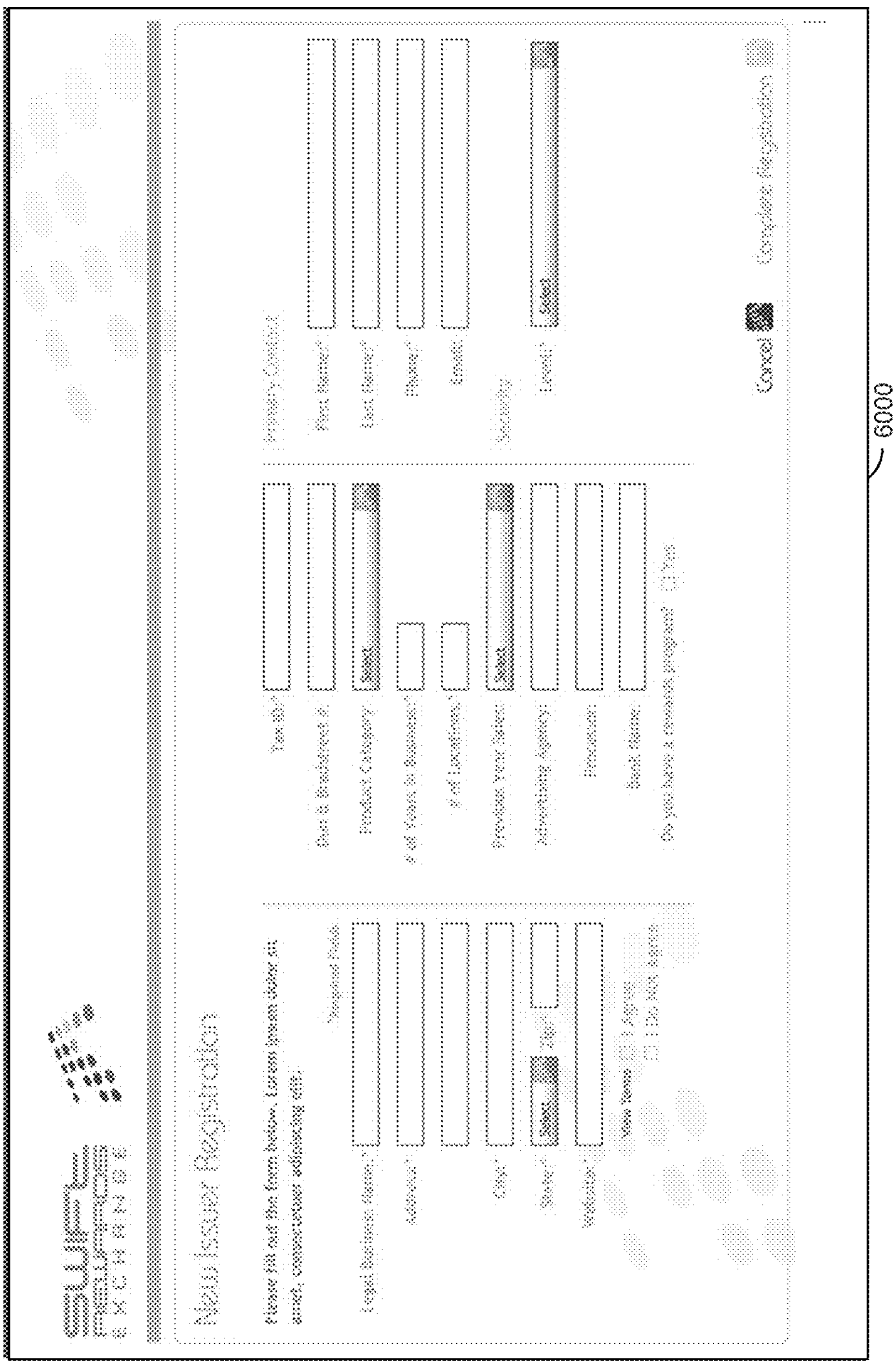
FIG. 60 is a screen shot of a new issuer registration page.
Figure 61:
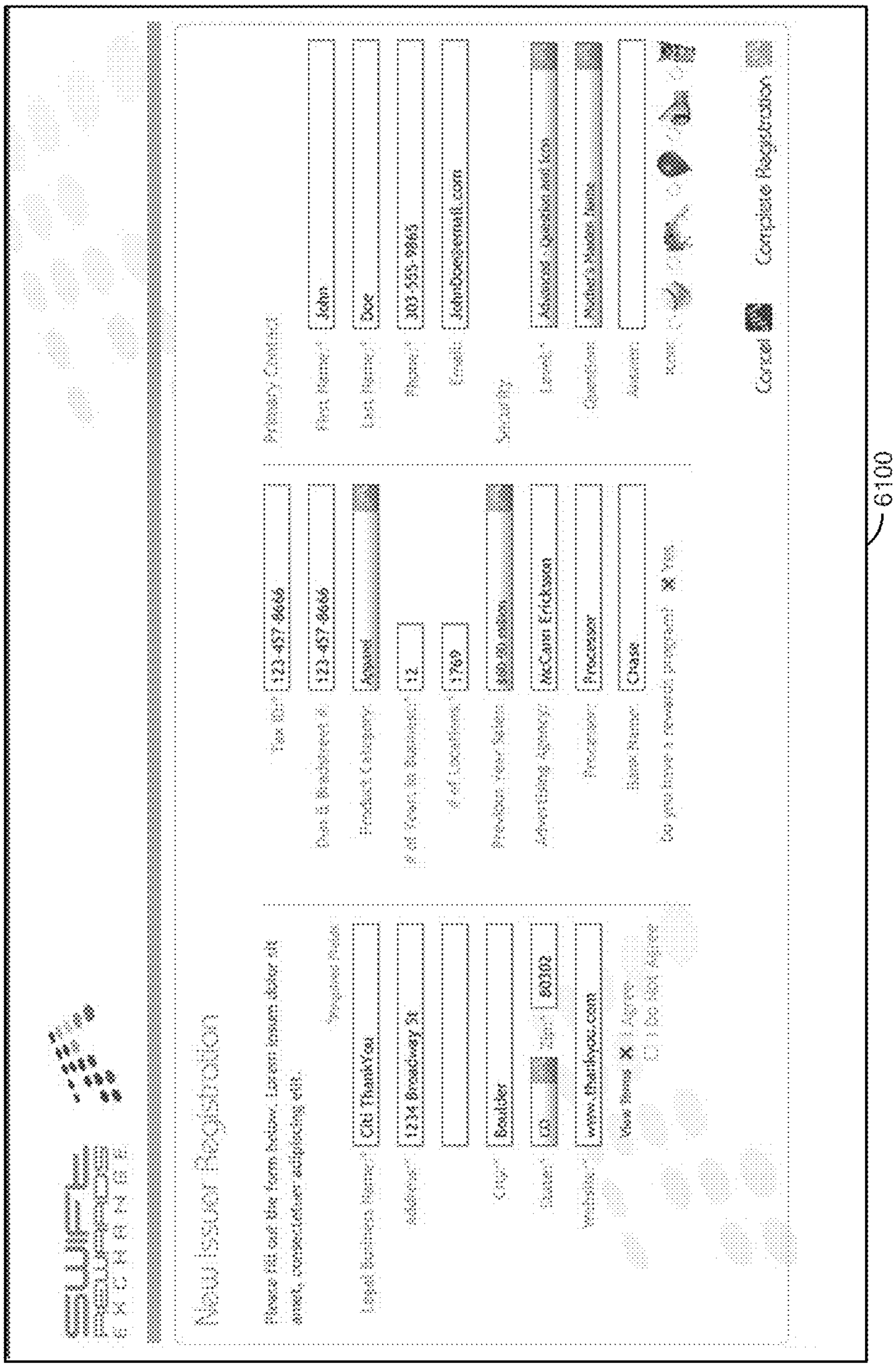
FIG. 61 is a screen shot of a new issuer registration page with filled in data.
Figure 62:
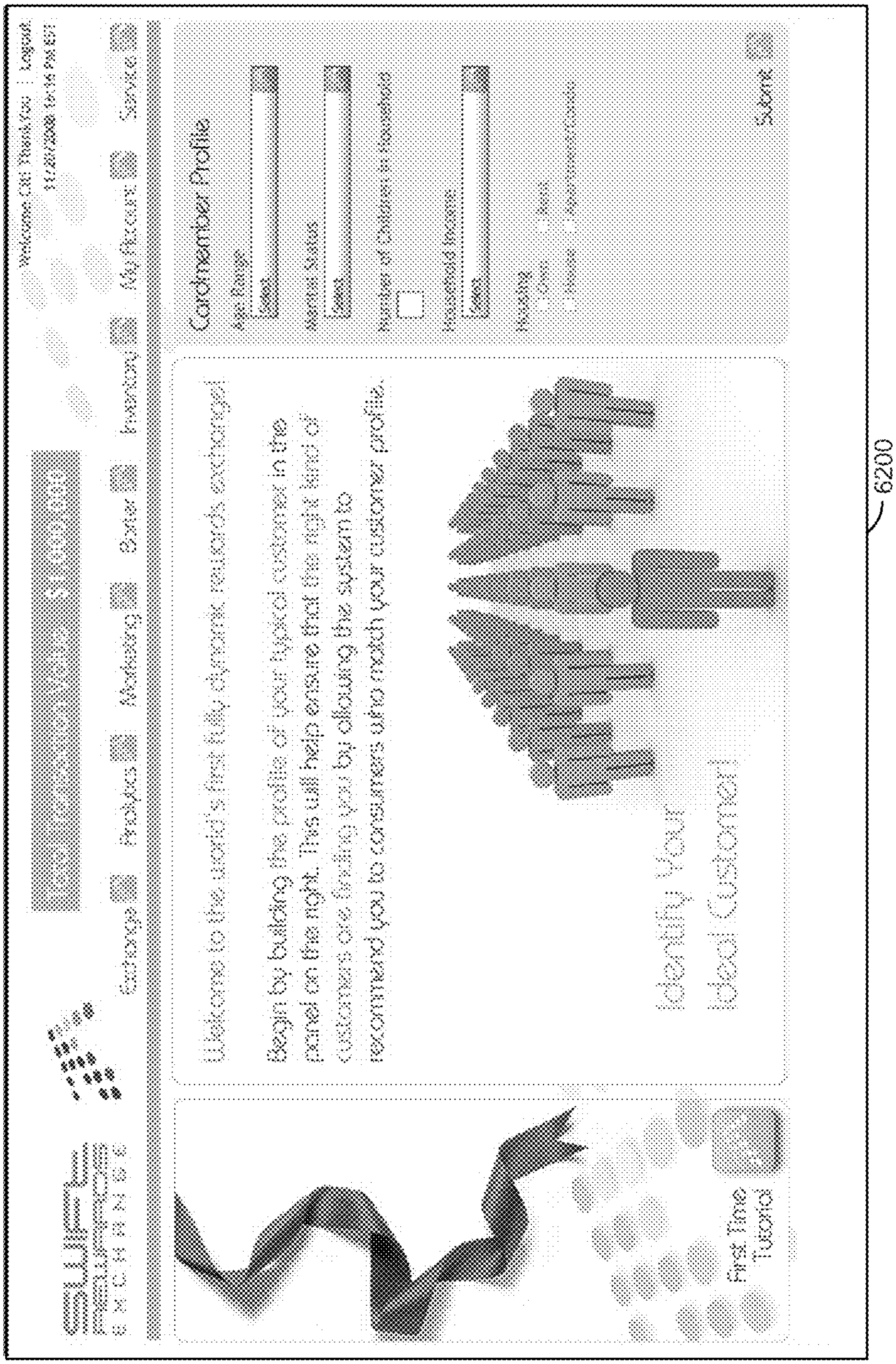
FIG. 62 is a screen shot of an issuer home page.
Figure 63:
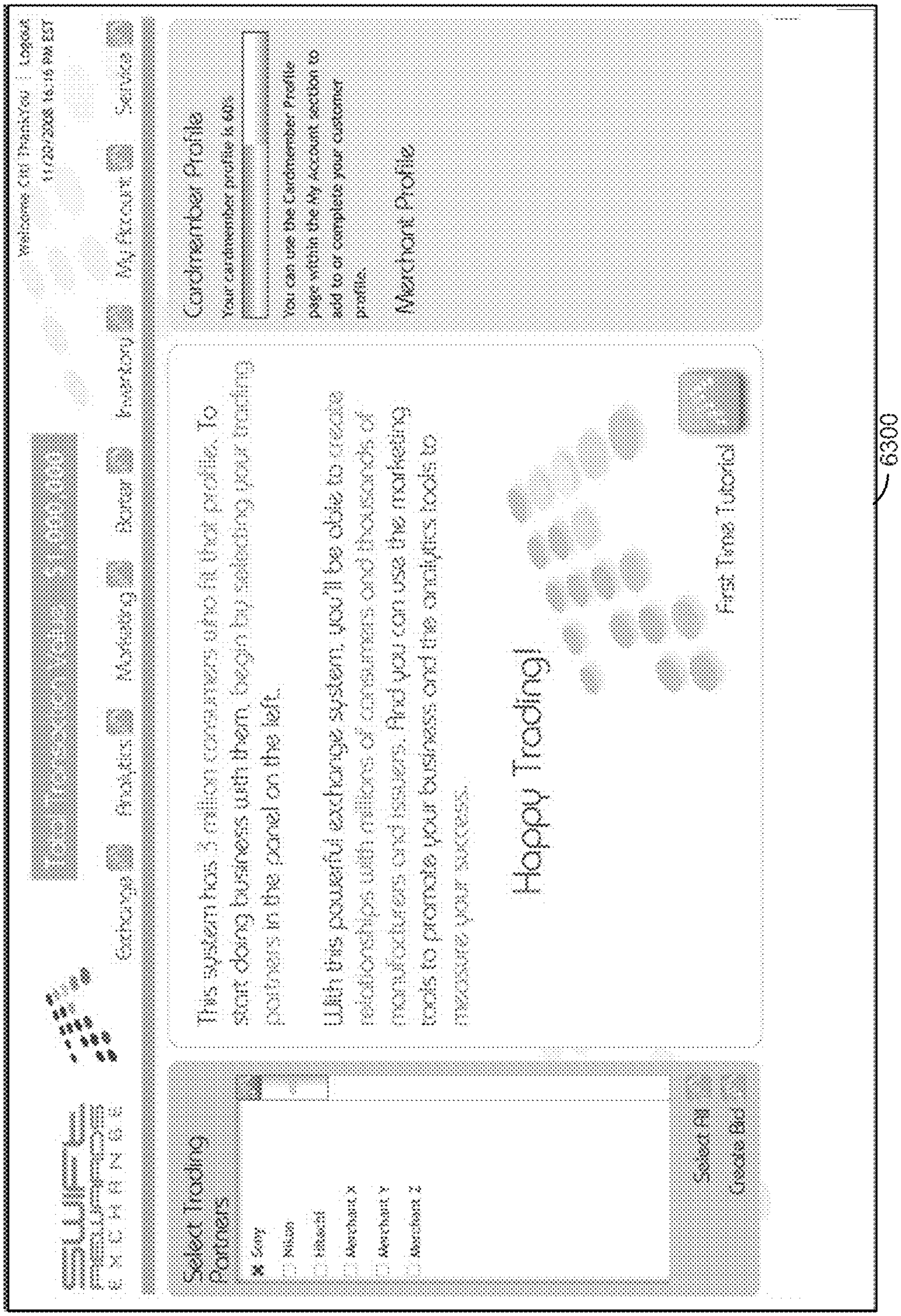
FIG. 63 is a screen shot of an issuer bid creation page.

FIG. 60 is a screen shot of a new issuer registration page 6000, and FIG. 61 is a screen shot of a new issuer registration page 6100 with filled in data. FIG. 62 is a screen shot of an issuer home page 6200 after the issuer has logged in. FIG. 63 is a screen shot of an issuer bid creation page 6300 in which the issuer may create an exchange bid in the same manner as described with respect to the merchants above.

That is, in the alternative, the issuer may create a bid by selecting with the issuer computer a desired merchant from a group of merchants that are registered with the exchange, and entering into the web page a desired redemption discount offer, the desired redemption discount offer being the amount that the issuer is willing to accept in a transaction with the selected merchant. The issuer submits the bid to the exchange computer, which then forwards the bid to the merchant computer of the desired merchant selected by the issuer in the bid. The merchant accepts the bid, rejects the bid, or counter proposes a modified bid in which a modified redemption discount is submitted to the exchange computer for forwarding to the issuer computer.

Figure 64:
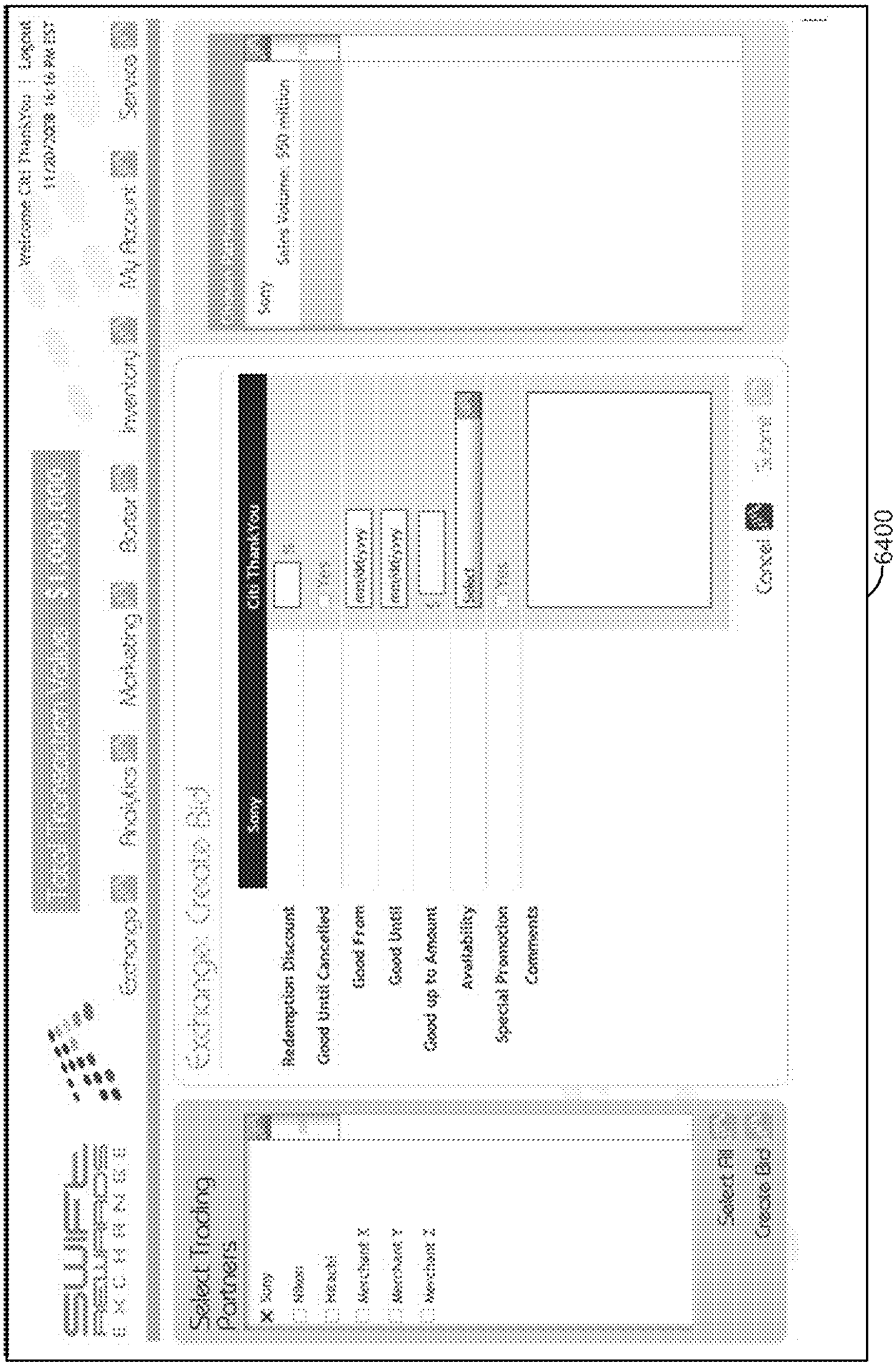
FIG. 64 is a screen shot of an issuer bid creation page with a trading partner selected.
Figure 65:
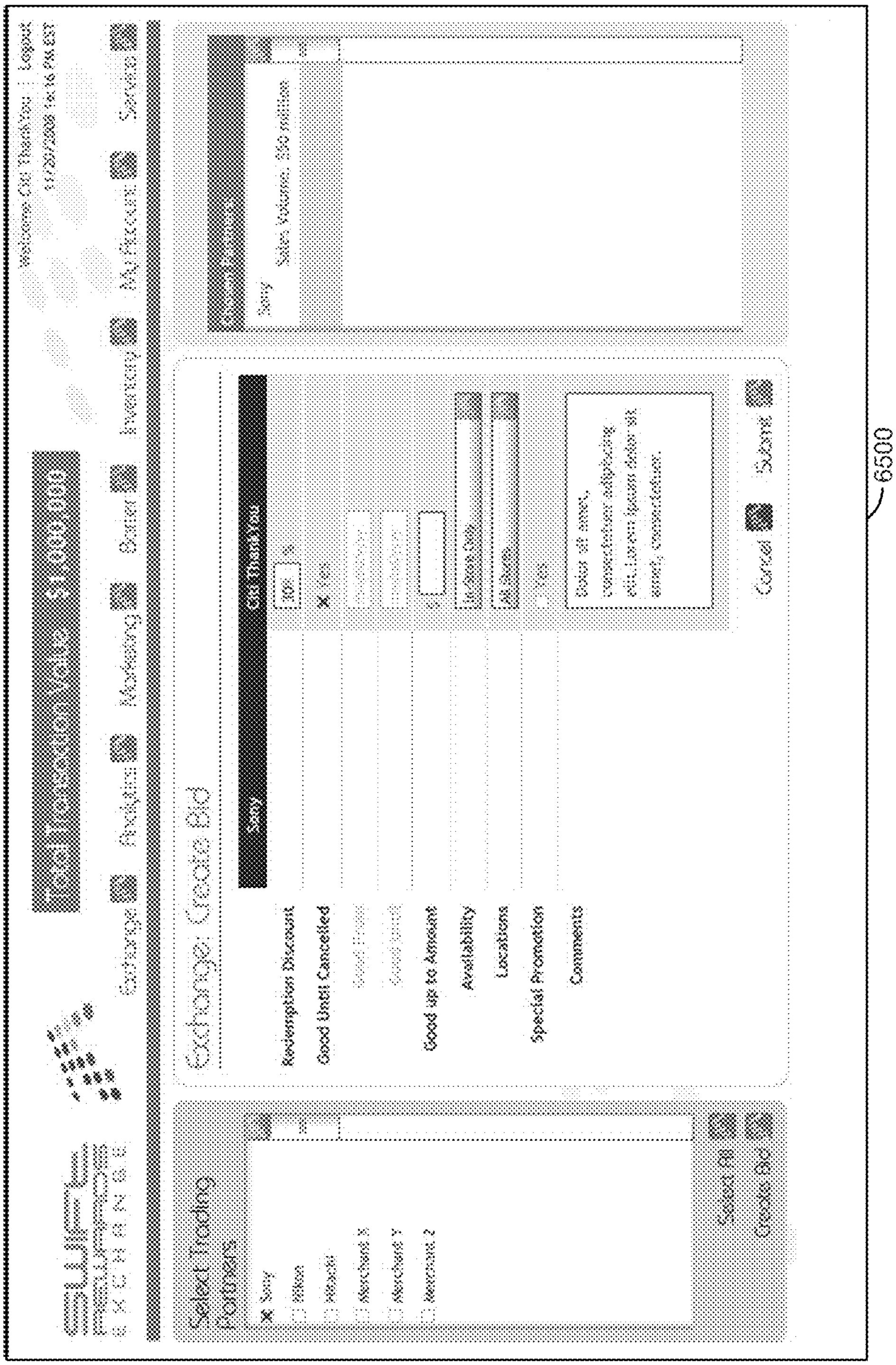
FIG. 65 is a screen shot of the issuer page of FIG. 64 in which bid data has been entered.
Figure 66:
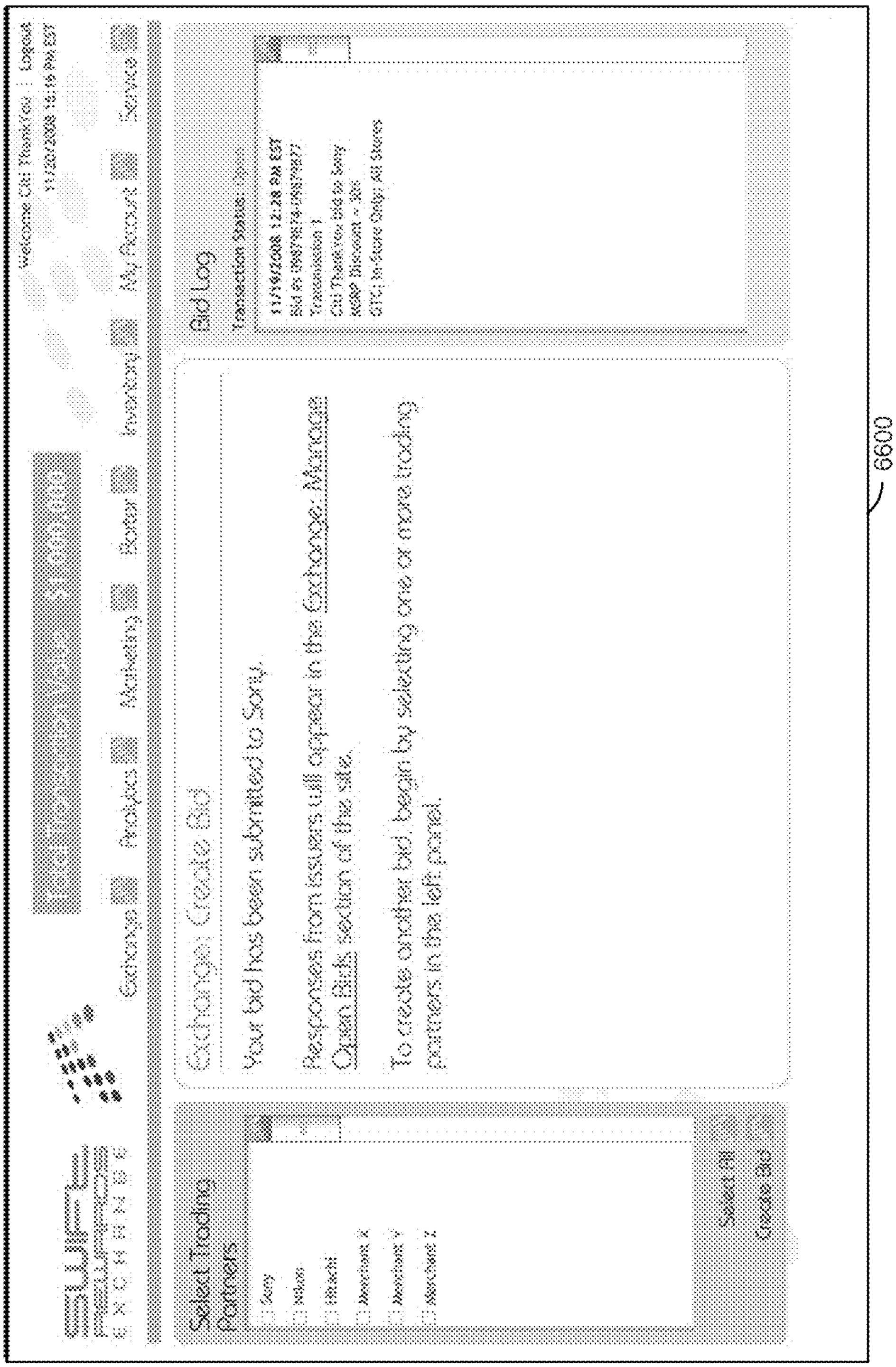
FIG. 66 is a screen shot of an issuer page in which the bid has been submitted.
Figure 67:
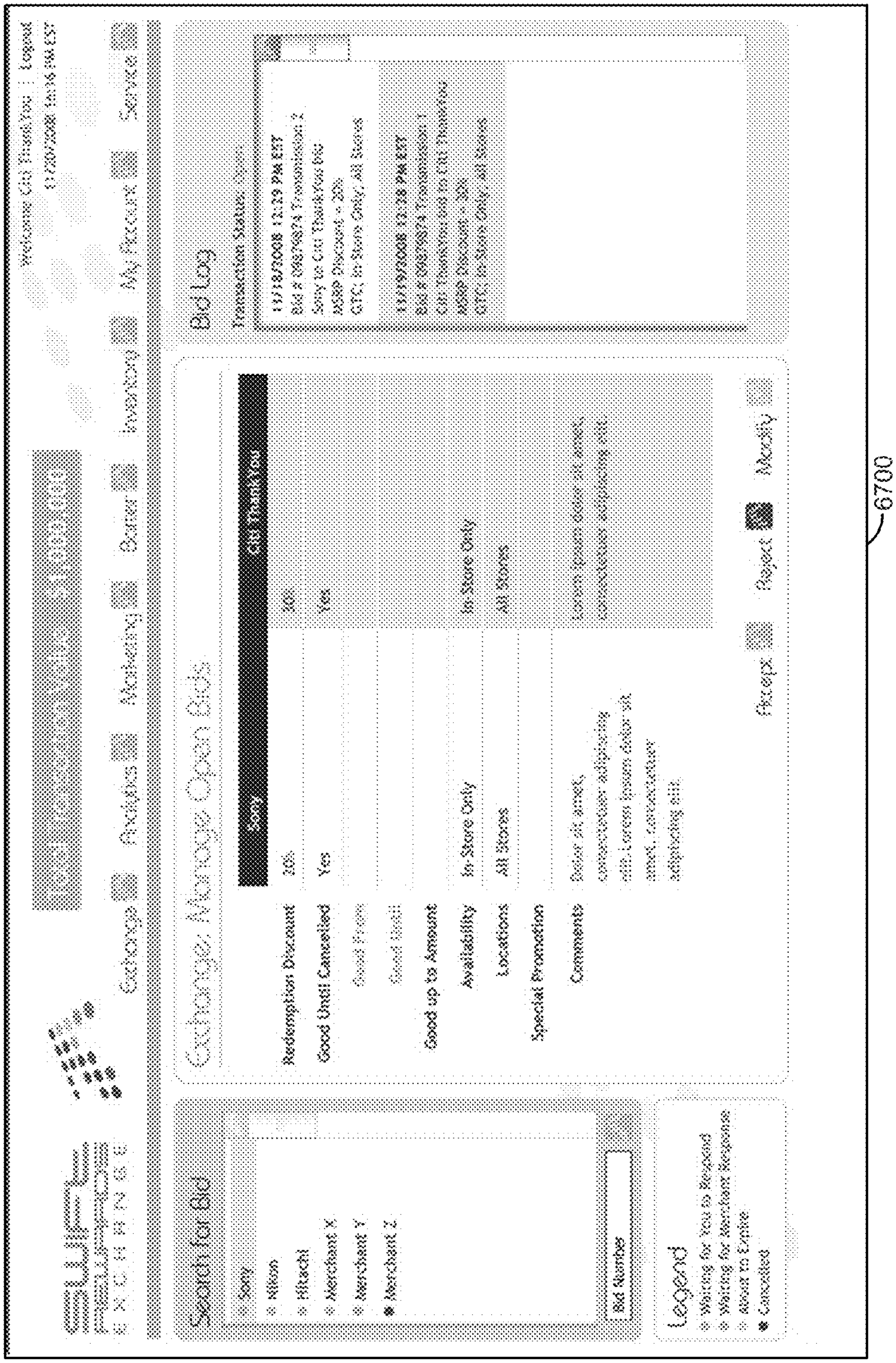
FIG. 67 is a screen shot of an issuer page in which open bids may be searched, selected and managed.
Figure 68:
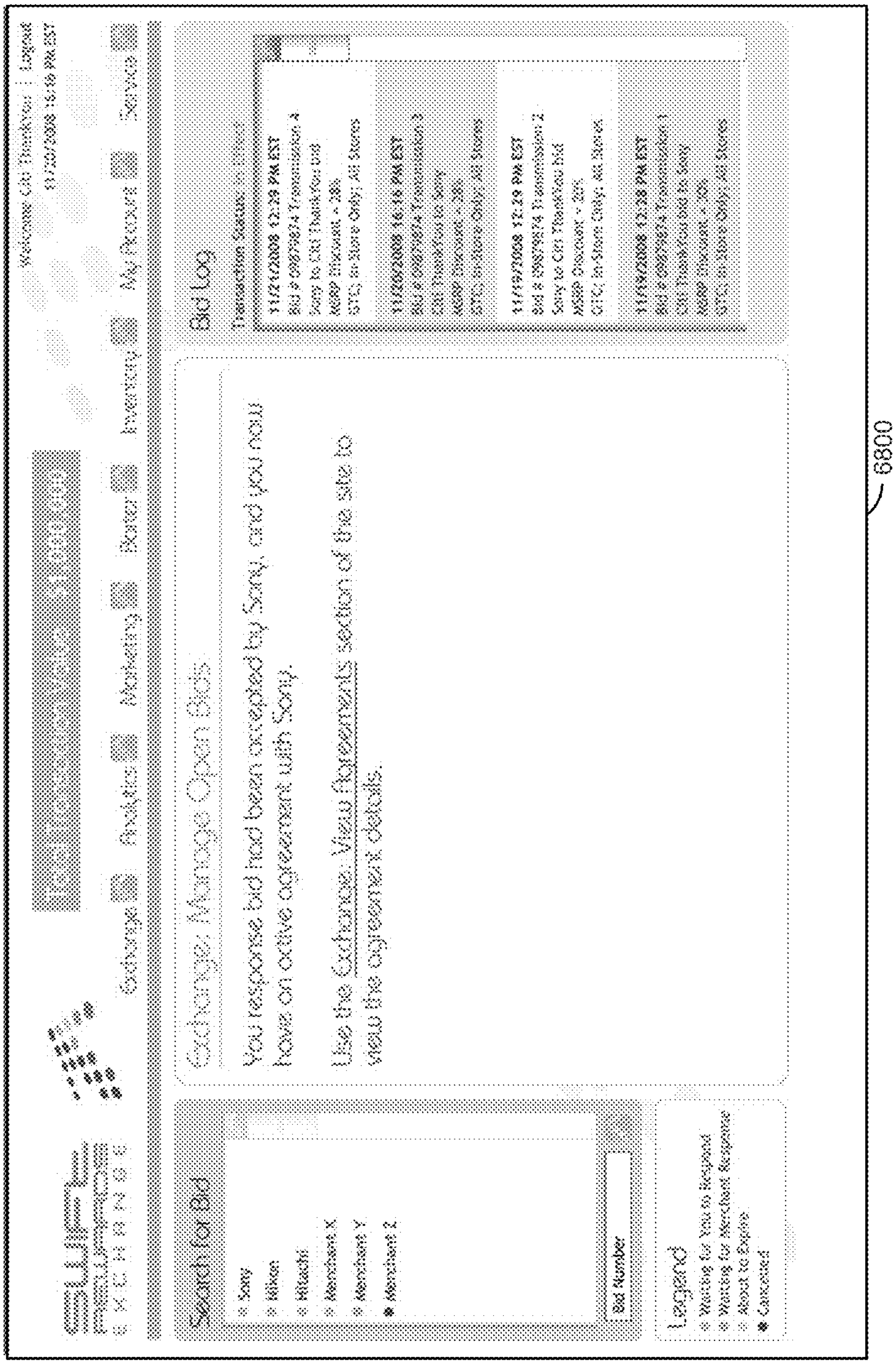
FIG. 68 is a screen shot of an issuer page in which a bid is selected for review.
Figure 69:
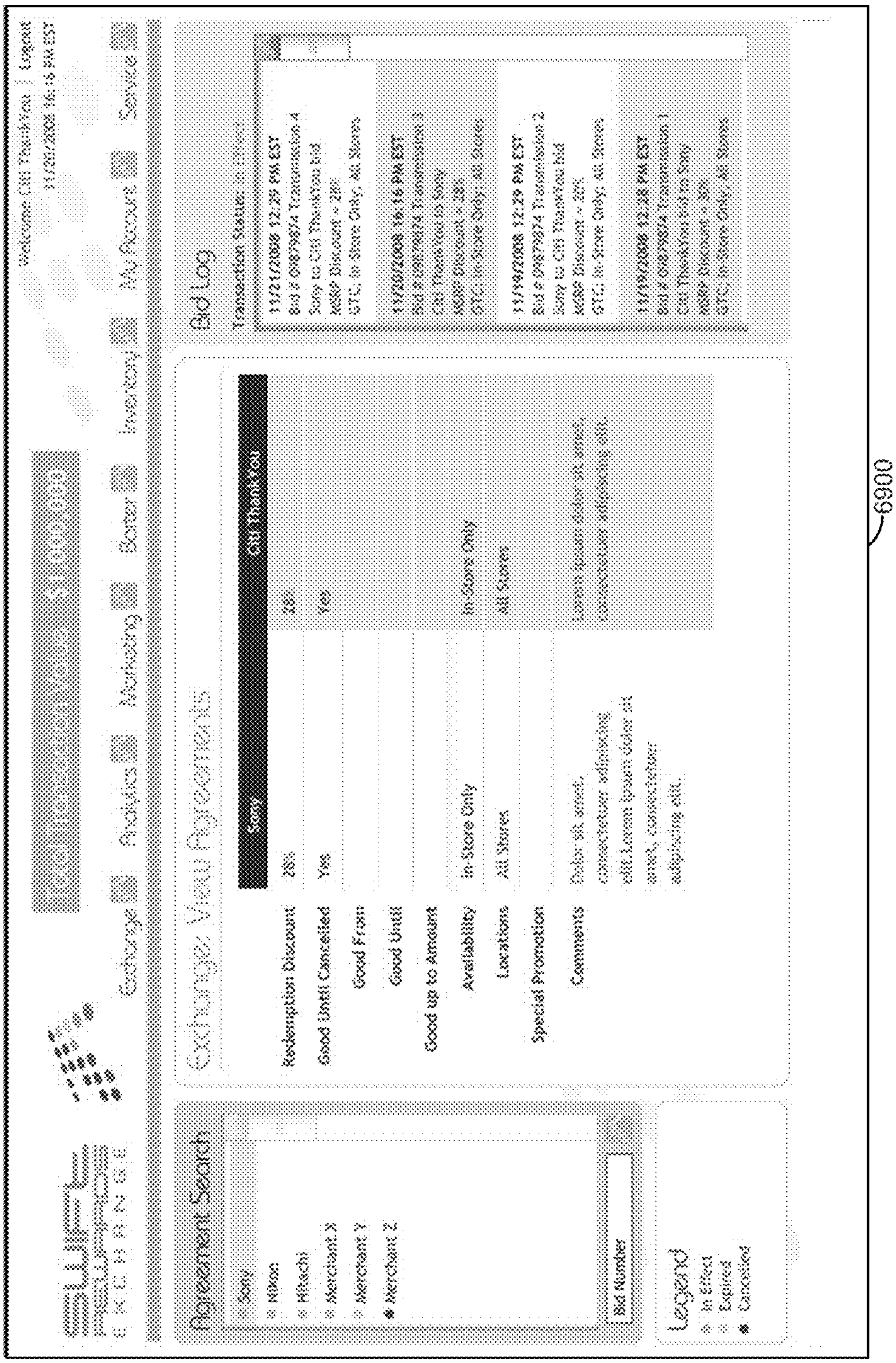
FIG. 69 is a screen shot of an issuer merchant page in which accepted bid agreements may be viewed.
Figure 69A:
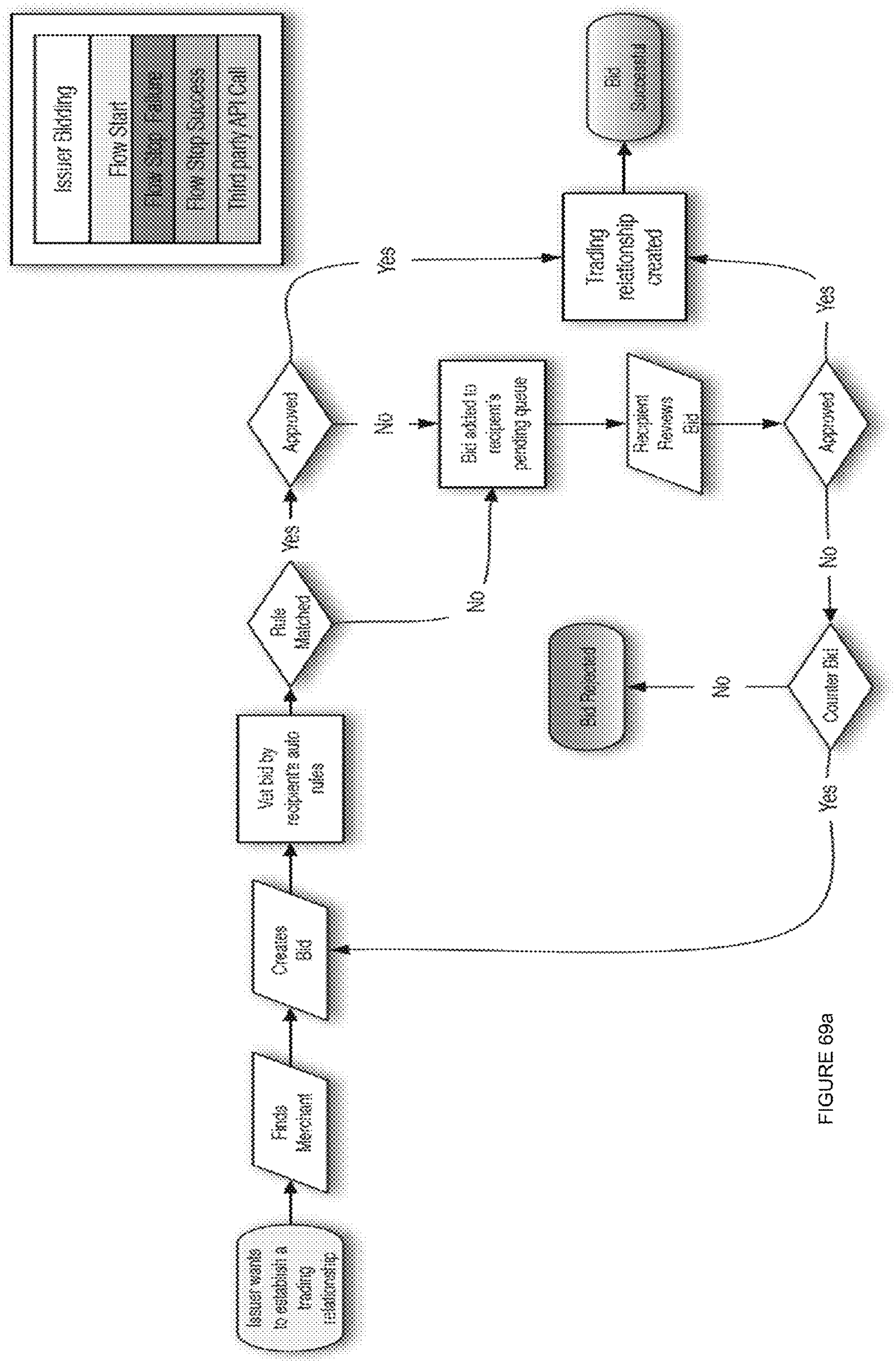
FIG. 69*a* is a flowchart illustrating the issuer bidding process.

FIG. 64 is a screen shot of an issuer bid creation page 6400 with a trading partner selected, FIG. 65 is a screen shot of the issuer page 6500 of FIG. 64 in which bid data has been entered, and FIG. 66 is a screen shot of an issuer page 6600 in which the bid has been submitted. FIG. 67 is a screen shot of an issuer page 6700 in which open bids may be searched, selected and managed; FIG. 68 is a screen shot of an issuer page 6800 in which a bid is selected for review, and FIG. 69 is a screen shot of an issuer merchant page 6900 in which accepted bid agreements may be viewed.

Figure 70:
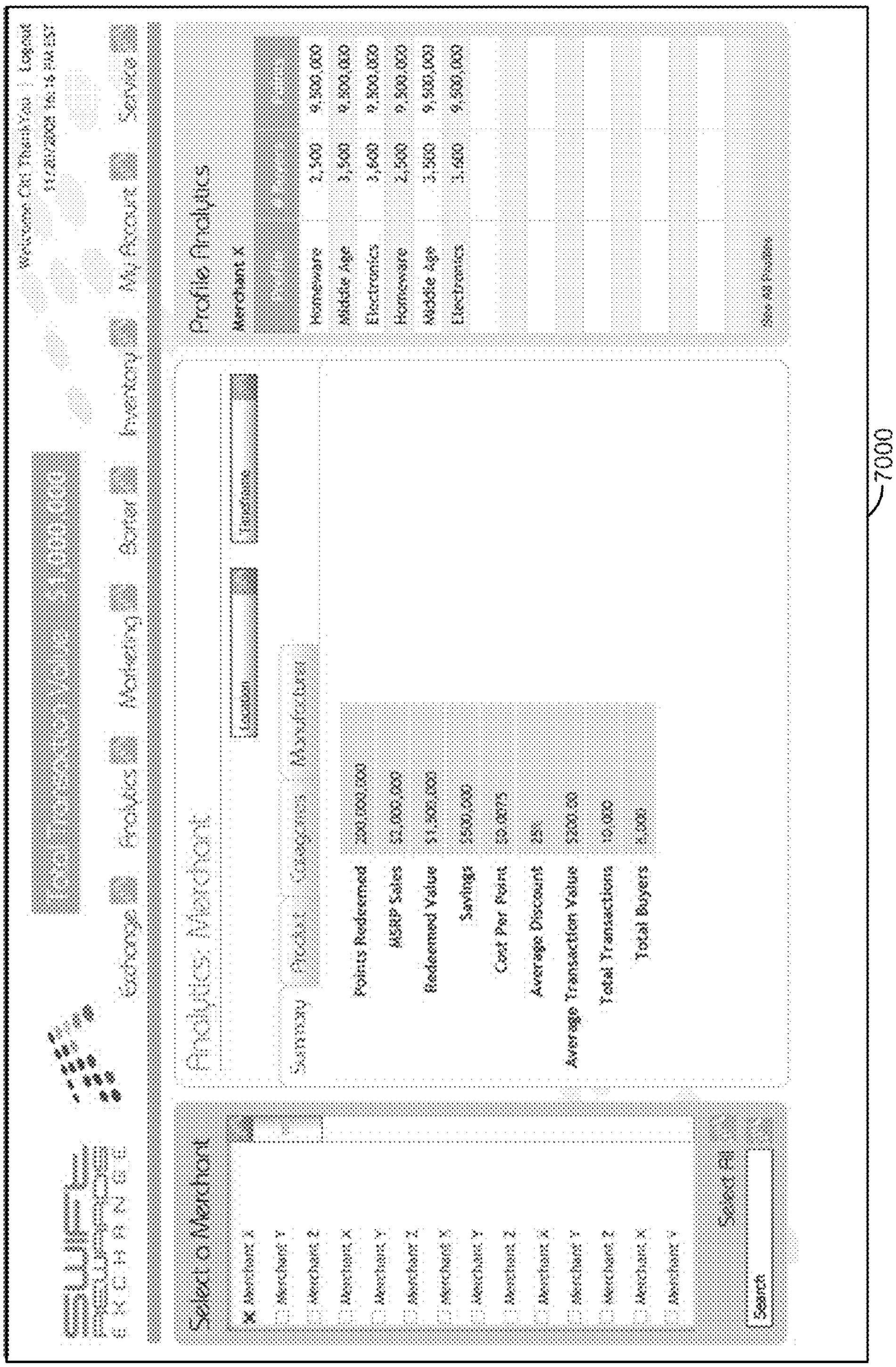
FIG. 70 is a screen shot of an issuer page in which an analytics summary is shown

FIG. 70 is a screen shot of an issuer page 7000 in which an analytics summary is shown similar to the analytics previously described.

The selection of the manufacturer button 142 on FIG. 1 provides functionality to a manufacturer similar to that of a merchant as previously described.

In an alternative to a user entering search criteria into a user computer for products review, a user may use a mobile device such as a camera-enabled cell phone or smart phone such as an IPHONE to capture an image of a UPC bar code of a product of interest. The bar code is imaged and decoded, and the UPC data is transmitted wirelessly to the exchange computer 102. Scanning and decoding of UPC codes is well known in the art. This enables a user to scan a product and comparison shop with the present invention.

In a further alternative embodiment, functionality may be embedded within a point of sale device (POS device) to interact with the exchange computer 102. For example, a user may be shopping in a store and bring a product to the register for checkout. The UPC of the product will be scanned by the cashier using a POS device or associated scanner, and the UPC data will be transmitted to the exchange computer along with customer identification information that may be obtained for example by scanning the magnetic stripe of the user's credit or debit card. The exchange computer may then send back to the POS device a display of the user's available reward points in his promotional wallet as described above. If the merchant where the user is purchasing the product has a trading agreement with the issuer(s) of the user's points (or with a third party other than the points issuer which has the ability to transact the point based transaction), then the user may elect to have a reward exchange transaction take place on order to pay for the product. For example, if the user is purchasing a $20 DVD at BEST BUY, this information is sent to the exchange computer 102 via the POS device. If the user has reward points with CHASE, and CHASE has already executed a trading agreement with BEST BUY, then the user may elect to use his CHASE reward points to pay for the DVD. The user's reward account would be reduced by the number of points required (e.g. 2,000 points), and CHASE per its agreement with BEST BUY would convey appropriate consideration to BEST BUY to pay for the DVD.

If for example a 10% trading agreement was previously agreed to by BEST BUY (as merchant) and CHASE (as issuer), then CHASE would convey $18 to BESTBUY for the purchase of the DVD.

The system that is used to implement this embodiment is shown in FIG. 1*d* and includes an exchange computer 102, a merchant computer 128 associated with a merchant 106 and selectively interconnected to the exchange computer via a computer network 14, an issuer computer 130 associated with a reward points issuer 108 and selectively interconnected to the exchange computer via the computer network; and a point of sale device 7100 operably associated with the merchant computer 128. This similar in topology to the system of FIG. 1*b*, except that there is no need for a user computer since the purchase transaction is made via the point of sale device at the merchant's retail outlet.

The point of sale device 7100 may be a terminal associated with a cash register at a checkout counter of the store. Or, the point of sale device may a kiosk located in the store, or in a central location such as a shopping mall, airport terminal, and the like. A point of sale device may be implemented in various mobile environments such as a taxicab to enable a rider to pay for his or her ride with reward points through the exchange, or it may be located at a concierge desk in a hotel or travel agency environment.

Figure 71:
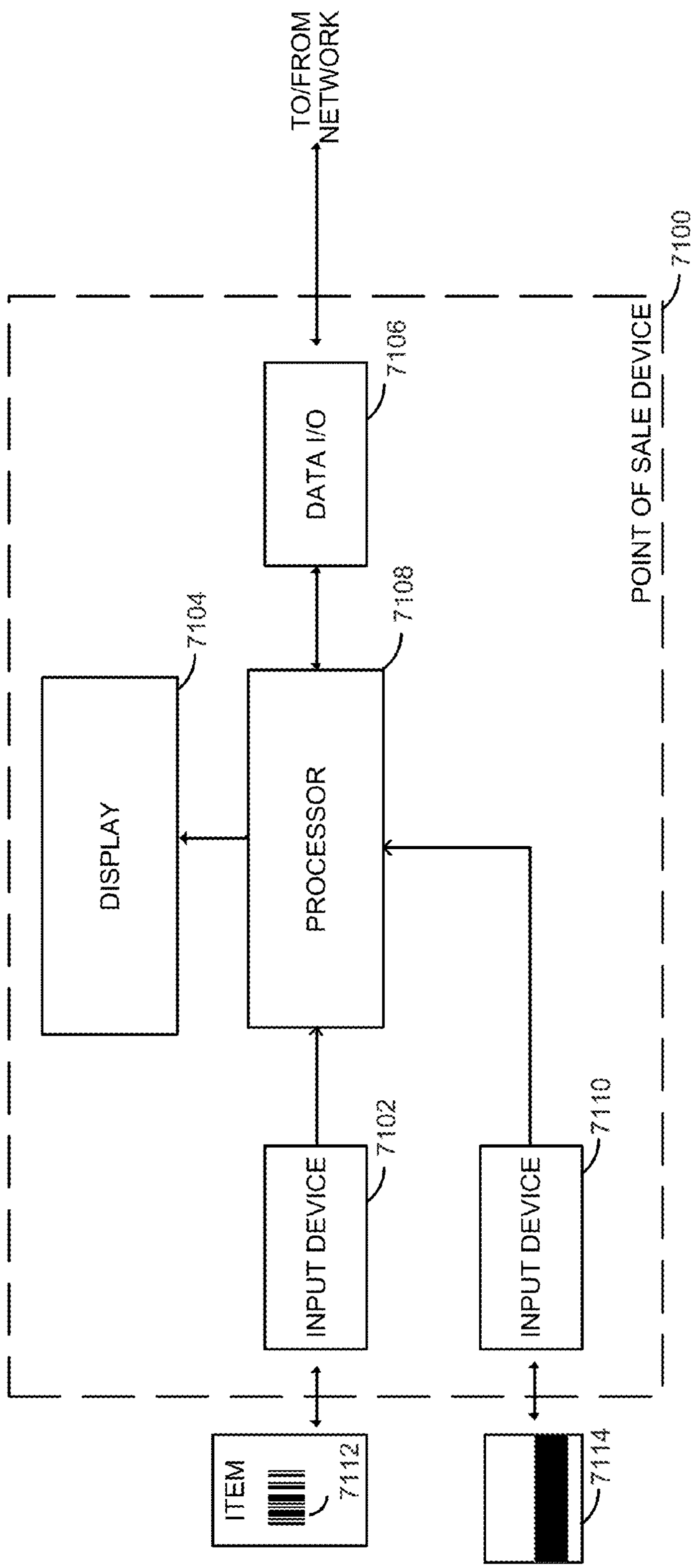
FIG. 71 is a diagram of the point of sale device of FIG. 1*d*.

The point of sale device 7100 is shown in further detail in FIG. 71. The point of sale device 7100 has at least one input device 7102 for inputting information from a user and/or item, a display 7104, a data connection 7106 to the computer network; and a processor 7108.

In an alternative embodiment, a user may be browsing through the aisles at a merchant's retail store and may have real-time communications with a merchant computer located at the store, or with a point of sale device at the store if the merchant computer is located offsite. The user may be carrying a communications device such as a cell phone, or a smartphone or PDA such as an IPHONE or IPAD, and the merchant system (merchant computer or point of sale device) may communicate with the user to advertise certain items that may be of interest, or an application with a remote transmitting device which communicates with a user mobile device. For example, the merchant computer may push an ad to the user's cell phone in the form of a text message that reads "CDs now on sale in aisle 3" or the like. The content of the ad may be of general interest or it may be derived from an analysis of the user's past purchasing or browsing history (e.g. points of interest). Thus, if the merchant computer has already sold CDs to a particular user, the text message above may be sent. If the device being carried by the user has Wi-Fi capabilities and the user is logged in to the store's network, then the system will know the user is in the store and will be able to communicate with the user via the Wi-Fi connection or by text messaging discussed above.

In addition to pushing simple ads, the system may interact with a user device to notify the user of the availability of certain redemption opportunities available at the store that meet certain parameters designated by either the merchant, issuer, or user, concerning products available within the retail environment.

The system may use RF, IR, BLUETOOTH, WI-FI, and or other means of wireless communication between the user device and the merchant computer or point of sale device for such communications discussed above.

With respect to the point of sale device 7100 of FIG. 71, the processor 7108 is programmed to receive via the input device 7102 price information associated with an item to be purchased by a user. Price information associated with the item may be input by reading a machine-readable indicia associated with the item. For example, the input device 7102 may be a bar code canning device, which is then used to scan a bar code such as UPC code 7112 on the (or associated with) the item to be purchased by the user. The price information may be embedded in and obtained directly from the machine-readable UPC indicia 7112, or the machine-readable indicia may include an index that is used by the point of sale device 7100 to lookup the price information from an associated product database. Either of these options are well known in the art.

In an alternative embodiment, the machine-readable indicia may be an RFID tag that is embedded in the item or its packaging. RFID tags emit RF signals that contain information about the item in the same fashion that bar codes contain such information, including but not limited to its price or an index used to lookup its price. In this case, the input device 7102 is an RFID reader device associated with the point of sale device.

In a further alternative, the price or product information may be manually entered into the point of sale device 7100 by a manual data entry input device associated with the point of sale device. This would be a keyboard that may be used for example if the bar code cannot be successfully scanned. All of these data entry input devices 7102 described herein are known in the art and need not be described in any further detail herein.

The input device may also be used to in order to input a user identification (user ID) into the point of sale device 7100. While the same input device 7102 may be used for this function (e.g. a keyboard), it may be preferred to use a second input device 7110 as shown in FIG. 71, which may be a device configured to read an encoded token presented by the user. For example, the input device 7110 may be a card reader known in the art that is able to read the magnetic stripe from a token that is a card 7114 such as a credit card, debit card, or reward loyalty card, etc. Alternatively, the input device 7110 may be a smart card reader that is configured to read a memory chip on a smart card as known in the art. Any type of input device that can read a user ID from a token would be useful with this invention.

In the preferred embodiment the user ID is (or is associated with) the credit card number of the user that is presented by the user during the transaction. The user ID is transmitted by the point of sale device 7100 to the exchange computer 102 via the data connection 7106. The user ID is then used by the exchange computer to ascertain a promotional wallet for that user (as described previously), which is sent back to the point of sale device from the exchange computer via the data connection. As previously described, the promotional wallet indicates a redeemable value of reward points stored in at least one reward point account 132 associated with the user 104 and at least one issuer computer 130.

The promotional wallet is then displayed on display 7104 for the user to review. The promotional wallet may include a proposed redemption solution, as described above, or it may simply show the reward point account(s) linked to by the exchange computer with the number of points available in the account(s). The functionality described above with respect to the display of reward points and selection by the user of the desired points for redemption, may also be implemented by the point of sale device 7100. The user can select the desired redemption solution on the point of sale device (for example if the display 7104 is a touch screen display or through associated buttons as known in the art). The redemption selection, which indicates a selection of reward points to be redeemed from at least one reward point account associated with the user and at least one issuer computer, is then used to execute the purchase transaction for the item selected by the user by using the inputted redemption selection.

In a simple redemption scenario, the user has selected to redeem reward points from a single issuer such as CITIBANK. For example, the user may indicate that the item should be purchased in full with 5,000 of his CITIBANK reward points as indicated in the proposed redemption solution on the display 7104. The point of sale device may then cause the purchase transaction to be executed by transmitting an instruction to the exchange computer 102 to request the CITIBANK issuer computer to redeem the 5,000 reward points selected by the user by (I) reducing the reward account associated with the user by the quantity of reward points selected by the user for execution of the purchase transaction (5,000 points), and (II) conveying consideration to the exchange computer 102 corresponding to the quantity of reward points selected by the user for execution of the purchase transaction. For example, the issuer computer may at some point convey $50.00 to the exchange computer. This may done in real time at the time of the request, or it may done offline in a batch transaction mode in a settlement process as previously described. Regardless of when the consideration is actually conveyed. The point of sale device may receive confirmation from the exchange computer 102 that the issuer computer has redeemed the 5,000 reward points selected by the user and the user may take the item purchased. Settlement between the parties may occur at a later time if desired. For example, the merchant computer 128 may receive consideration for the sale of the item from the exchange computer 102 to complete the transaction.

Alternatively, the transaction may occur directly between the merchant and the issuer without further intervention by the exchange computer. That is, the point of sale device 7100 may cause the purchase transaction to be executed by transmitting an instruction to the CITIBANK issuer computer to request it to redeem the 5,000 reward points selected by the user by (I) reducing the reward account associated with the user by the 5,000 points selected by the user for execution of the purchase transaction, and (II) conveying consideration directly to a merchant computer associated with the point of sale device corresponding to the 5,000 reward points selected by the user for execution of the purchase transaction. The point of sale device may then receive confirmation from the merchant computer that the issuer has redeemed the reward points selected by the user and the user may take the item purchased. Settlement between the parties may occur at a later time if desired. For example, the merchant computer 128 may receive consideration for the sale of the item from the CITIBANK issuer computer 130 to complete the transaction.

In the alternative to using a single reward points issuer as described above, the exchange computer may present the user with an option to redeem points from multiple issuers and combine the total redeemable value to pay for the desired item. Thus, the redemption selection input to the point of sale device may indicate a combination of a first selection of reward points to be redeemed from a first reward point account (e.g. CITIBANK) and a second selection of reward points to be redeemed from a second reward point account (e.g. CHASE), etc. In this embodiment, there will be multiple redemptions and transfers of consideration; one for each issuer selected by the user for redemption. The exchange computer may then authorize the transaction after it has received confirmation of the redemption from all of the selected issuers. In addition, coupons and other forms of tender such as cash, credit, store credits, etc. may be used along with reward points to execute the purchase transactions.

The point of sale device may display advertisements relevant to the user, the product, and/or the transaction itself which are served from the merchant computer based on the transaction, the user, the product being purchased, etc.

Figure 72:
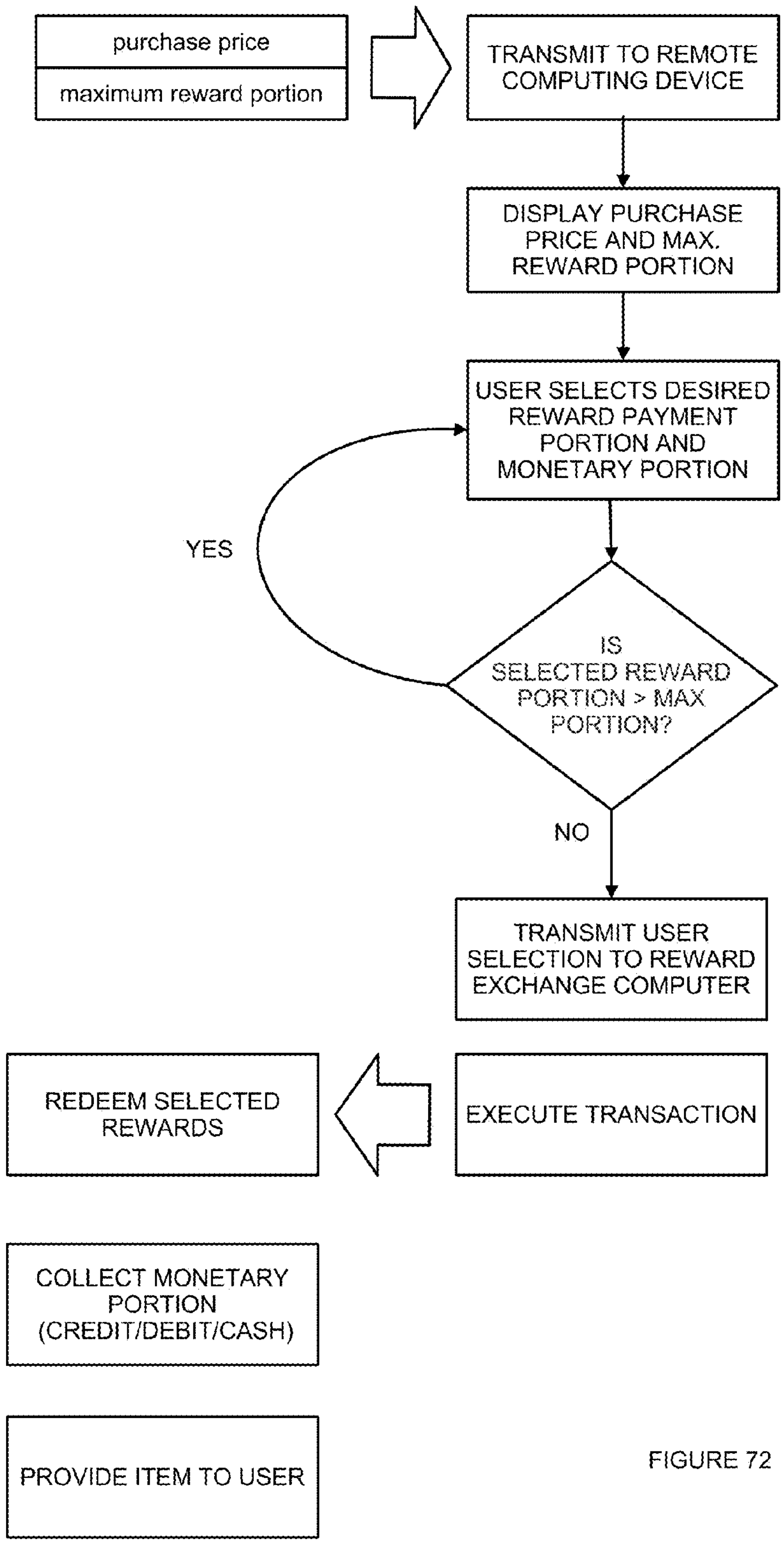
FIG. 72 is a flowchart of an aspect of the invention in which a maximum allowable reward payment portion of a purchase price of an item for sale by a merchant is implemented.

FIG. 72 is a flowchart of an aspect of the invention in which a maximum allowable reward payment portion of a purchase price of an item for sale by a merchant is implemented. A purchase price for the item is established by a party in the transaction, which may be a merchant, a rewards issuer, or the operator of the online rewards exchange system. The purchase price in this embodiment is paid for with a reward payment portion and a monetary consideration portion. The reward payment portion is equivalent to the value of rewards that may be redeemed by a user from at least one reward issuer towards payment of the purchase price for the item. The monetary consideration portion (which may be cash, credit card, debit card, check, etc.) makes up the balance of the purchase price, such that the reward payment portion and the monetary consideration portion is equivalent to the purchase price for the item.

In this embodiment, a maximum allowable reward payment portion amount for the reward payment portion of the purchase price is established. The maximum allowable reward payment portion sets the upper limit of the portion of the purchase that may be paid with rewards. For example, the purchase price may be set to $100, and the maximum allowable reward payment portion may be set to $40. This would allow a user to redeem rewards up to a value of $40, with the balance of $60 payable only with monetary consideration. The maximum allowable reward payment portion may be expressed in different ways, such as but not limited to an absolute value (e.g. $40 as above), or as a percentage of the purchase price (e.g. 40%), or in terms of the rewards (e.g. 4,000 reward points).

The purchase price information (the purchase price and the maximum allowable reward payment portion) is then and sent by the online reward exchange computer to a remote computing device for interaction with a user. The remote computing device may be a user computer (in an online embodiment) or a point of sale terminal (in a retail store embodiment). The user computer may be a desktop computer, laptop computer, handheld portable computer, smartphone and the like. In any of theses cases, the purchase price information is preferably displayed is some form for the user to view and consider, along with a description of the item such as images, text etc. As a result the user is informed how much the item costs, as well as how much of that price may be paid for with rewards (the maximum allowable reward payment portion amount). The user may then control the remote computing device to enter a purchase request for the item, which includes (i) a desired amount of the reward payment portion and (ii) a desired amount of the monetary consideration portion. As long as the desired amount of the reward payment portion does not exceed the maximum allowable reward payment portion (and the total value of the desired amount of the reward payment portion and the desired amount of the monetary consideration portion is equivalent to the purchase price for the item), then the purchase request is sent to the reward exchange computer. The transaction may then be executed by redeeming the rewards of the reward payment portion received in the purchase request (as fully described above), executing a monetary transaction for the monetary consideration portion (e.g charging a user's credit card), and then providing the item to the user.

Figure 74A:
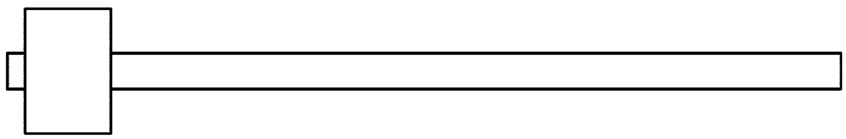
FIGS. 74*a*, 74*b*, and 74*c* illustrate the use of a slider control for making payment for an item in rewards and monetary consideration.
Figure 74B:
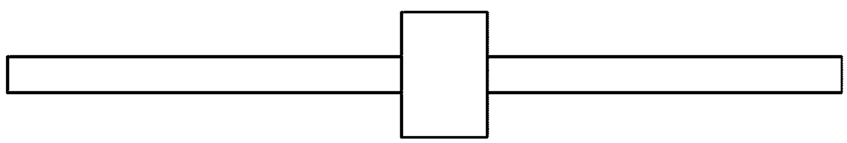
Figure 74C:
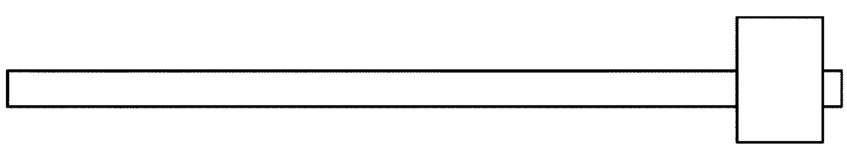

In a preferred embodiment a slider control is implemented at the remote computing device, which allows the user to set the desired amount of the reward payment portion. In this embodiment, a user interface instruction is transmitted by the reward exchange computer to the remote computing device to provide a slider control for display at the remote computing device, such as on a web page. The slider control allows a user to select along an axis the desired amount of the reward payment portion only up to the maximum allowable reward payment portion. In addition, the desired amount of the monetary consideration portion is calculated as a function of the desired amount of the reward payment portion selected with the slider control. For example, in the case where the purchase price for the item is $100 and the maximum allowable reward payment portion is 6,000 points (which also may be expressed at $60 when the par value of each point is one cent), then this purchase price information is transmitted by the reward exchange computer to the remote computing device. FIGS. 74*a*, 74*b*, and 74*c* show a slider as may be displayed on the display of the remote computing device for this example (such as on the web page 2100 in FIG. 21). FIG. 74*a* shows that when the slider is at the extreme left position, the reward payment portion is selected at 0 points. Optionally, this may be the default position presented to the user. Since the purchase price is $100, the corresponding monetary consideration portion is calculated to be $100 as displayed in FIG. 74*a*. The user may then control the remote computing device to move the slider as desired along the bar (such as with a mouse, trackpad, touchscreen, etc.) and the reward payment portion and monetary consideration portion will change accordingly. FIG. 74*b* illustrates the slider at the middle position, where the reward payment portion is 3,000 points and the corresponding monetary consideration portion is $70. FIG. 74*c* illustrates the slider at the extreme right position, where the reward payment portion is the established maximum of 6,000 points and the corresponding monetary consideration portion is $40. These amounts may be displayed to the user in different ways and in different resolutions other than what is shown by the example here. In any event, by sliding the control along the bar, the desired reward payment portion will vary, as will the corresponding monetary consideration portion. The reward payment portion will be limited by the maximum allowable reward payment portion that was received by the remote computing device as part of the purchase price information from the reward exchange computer.

Figure 75:
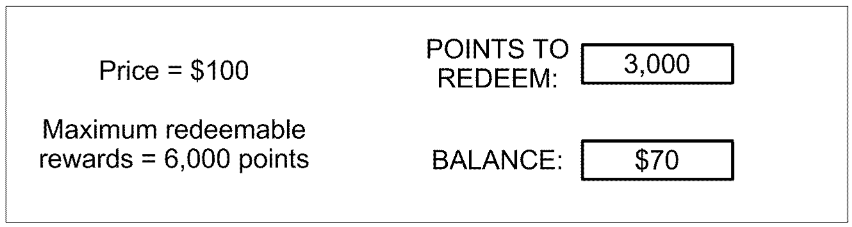
FIGS. 75 and 76 illustrate user input boxes for entering rewards to redeem and/or monetary consideration to be given for an item.
Figure 76:
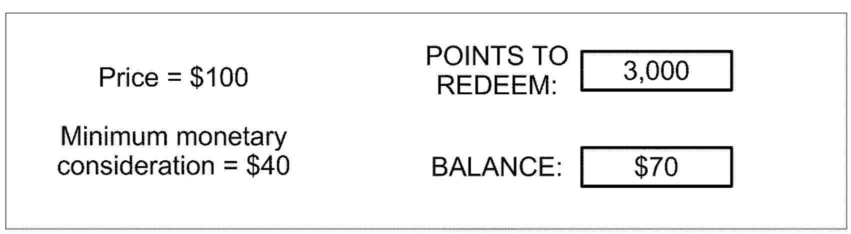

In another embodiment, rather than use a slider interface control element, the user may be presented with a simple display of the purchase price and the maximum allowable reward payment portion, as well as an input box that would allow the user to input either the desired amount of the reward payment portion (in which case the corresponding amount of the required monetary consideration is calculated and optionally displayed) or the desired amount of the monetary consideration (in which case the corresponding amount of the required reward payment portion is calculated and optionally displayed), both cases of which are limited by the maximum allowable reward payment portion amount. An example of this is shown in FIG. 75.

Various combinations of these user interface control elements, as well as others well known in the art, may be used within the scope of this invention.

In a further embodiment, the exchange computer may use the desired amount of the reward payment portion and the desired amount of the monetary consideration portion as submitted by the user in order to search its product database and determine a plurality of additional items that may be purchased in accordance with those desired amounts. That is, if the user indicates that the desired monetary consideration portion is $70 and the desired reward portion is 3,000 points, then the exchange computer will search the database to find additional products that can be purchased with $70 and 3,000 points. A description of these additional items may then be transmitted to the remote computing device for the user to review and select as may be desired.

These additional items may also purchased from a predefined cluster of merchants, wherein each merchant in the cluster of merchants agrees to provide items at the purchase price that may be paid for with a reward payment portion and a monetary consideration portion, utilizing the maximum allowable reward payment portion amount for the reward payment portion of the purchase price. For example, a group of merchants may band together and form a cluster of merchants, in which they all agree to negotiate with issuers under the same terms and conditions with respect to the maximum allowable reward payment portion as well as other matters. The clusters maybe formed based on virtually any type of organizations, such as by product types sold by the merchants, geographic locations of the merchants, size of the merchants (e.g. in terms of gross sales amounts), etc. For example, a group of merchants in a single shopping center may form a cluster and agree that they will all honor a predefined rule set regarding the relative amounts of monetary consideration and maximum allowable reward payment portion. As such, if a user request to purchase an item with a desired monetary consideration portion of $70 and a desired reward portion of 3,000 points, then all of the shopping center cluster merchants would agree to provide similar items to the user at the same terms and conditions, and the exchange computer would send this information to the user for further consideration.

Figure 73:
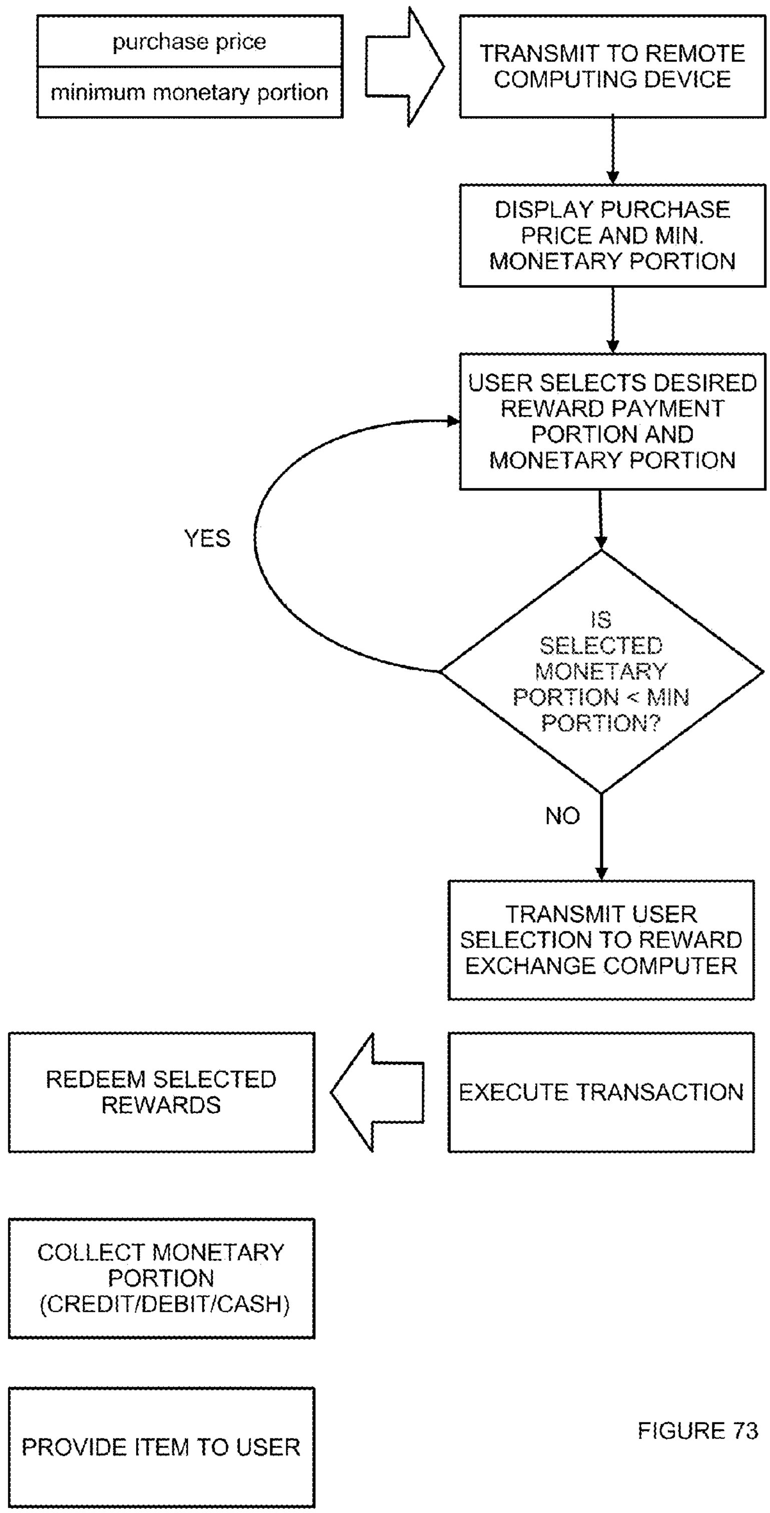
FIG. 73 is a flowchart of another aspect of the invention in which a minimum allowable monetary consideration portion amount of the purchase price is implemented.

In an alternative embodiment, the purchase price information may include a minimum allowable monetary consideration portion amount of the purchase price rather than a maximum allowable reward payment portion amount. This would operate similarly to the embodiment described above. Thus, FIG. 73 is a flowchart of this embodiment in which a minimum monetary consideration portion of a purchase price of an item for sale by a merchant is implemented. A purchase price for the item is established by a party in the transaction, which may be a merchant, a rewards issuer, or the operator of the online rewards exchange system. The purchase price in this embodiment is paid for with a reward payment portion and a monetary consideration portion. The reward payment portion is equivalent to the value of rewards that may be redeemed by a user from at least one reward issuer towards payment of the purchase price for the item. The monetary consideration portion (which may be cash, credit card, debit card, check, etc.) makes up the balance of the purchase price, such that the reward payment portion and the monetary consideration portion is equivalent to the purchase price for the item.

In this embodiment, a minimum monetary consideration portion amount for the reward payment portion of the purchase price is established. The maximum minimum monetary consideration portion sets the lower limit of the portion of the purchase that must be paid with monetary consideration. For example, the purchase price may be set to $100, and the minimum monetary consideration portion may be set to $40. This would require a user to pay with monetary consideration at least $40, with the balance payable by redeeming rewards. The minimum monetary consideration portion may be expressed in different ways, such as but not limited to an absolute value (e.g. $40 as above), or as a percentage of the purchase price (e.g. 40%).

The purchase price information (the purchase price and the minimum monetary consideration portion) is then and sent by the online reward exchange computer to a remote computing device for interaction with a user. The remote computing device may be a user computer (in an online embodiment) or a point of sale terminal (in a retail store embodiment). The user computer may be a desktop computer, laptop computer, handheld portable computer, smartphone and the like. In any of theses cases, the purchase price information is preferably displayed is some form for the user to view and consider, along with a description of the item such as images, text etc. As a result the user is informed how much the item costs, as well as how much of that price must be paid for with monetary consideration (the minimum monetary consideration portion). The user may then control the remote computing device to enter a purchase request for the item, which includes (i) a desired amount of the reward payment portion and (ii) a desired amount of the monetary consideration portion. As long as the desired amount of the monetary consideration portion does not go lower than the minimum monetary consideration portion (and the total value of the desired amount of the reward payment portion and the desired amount of the monetary consideration portion is equivalent to the purchase price for the item), then the purchase request is sent to the reward exchange computer. The transaction may then be executed by redeeming the rewards of the reward payment portion received in the purchase request, executing a monetary transaction for the monetary consideration portion (e.g charging a user's credit card), and then providing the item to the user.

In a preferred embodiment a slider control is implemented at the remote computing device, which allows the user to set the desired amount of the monetary consideration portion. In this embodiment, a user interface instruction is transmitted by the reward exchange computer to the remote computing device to provide a slider control for display at the remote computing device. The slider control allows a user to select along an axis the desired amount of the monetary consideration portion only up to the minimum monetary consideration portion. In addition, the desired amount of the reward payment portion is calculated as a function of the desired amount of the monetary consideration portion selected with the slider control. For example, in the case where the purchase price for the item is $100 and the minimum monetary consideration portion is $40, then this purchase price information is transmitted by the reward exchange computer to the remote computing device. FIGS. 74*a*, 74*b*, and 74*c* show a slider as may be displayed on the display of the remote computing device for this example. FIG. 74*a* shows that when the slider is at the extreme left position, the monetary consideration portion is selected at $100. Optionally, this may be the default position presented to the user. Since the purchase price is $100, the corresponding reward payment portion is calculated to be 0 as displayed in FIG. 74*a*. The user may then control the remote computing device to move the slider as desired along the bar (such as with a mouse, trackpad, touchscreen, etc.) and the reward payment portion and monetary consideration portion will change accordingly. FIG. 74*b* illustrates the slider at the middle position, where the monetary consideration portion is $70 and the corresponding reward payment portion is 3,000 points. FIG. 74*c* illustrates the slider at the extreme right position, where the monetary consideration is the established minimum $40 and the corresponding reward payment portion is 6,000 points. These amounts may be displayed to the user in different ways and in different resolutions other than what is shown by the example here. In any event, by sliding the control along the bar, the desired monetary consideration portion will vary, as will the corresponding reward payment portion. The monetary consideration portion will be limited by the minimum allowable monetary consideration portion that was received by the remote computing device as part of the purchase price information from the reward exchange computer.

In another embodiment, rather than use a slider interface control element, the user may be presented with a simple display of the purchase price and the minimum allowable monetary consideration portion, as well as an input box that would allow the user to input either the desired amount of the reward payment portion (in which case the corresponding amount of the required monetary consideration is calculated and optionally displayed) or the desired amount of the monetary consideration (in which case the corresponding amount of the required reward payment portion is calculated and optionally displayed), both cases of which are limited by the minimum allowable monetary consideration portion amount. An example of this is shown in FIG. 75.

The merchant clustering discussed above is also applicable to this embodiment.

In another embodiment, the maximum allowable rewards payment portion (and likewise the minimum allowable monetary consideration portion) may be modified, in cases wherein the item for purchase has some type of shelf-life or expiration date, in accordance with the expiration date of the item. For example, if the item for purchase is a ticket (plane ticket, cruise ticket etc.) for an event at a specific date, then the merchant may want to allow a user to use more rewards (and less required monetary consideration) to purchase the item as the expiration date approaches. This may also be applicable to perishable items such as food items. In this embodiment, the merchant may set up a sliding scale that allows for this contingency. For example, a merchant selling a ticket to a cruise that departs on June 1, with a price of $1,000.00, may set a maximum allowable reward amount of 60,000 reward points having a par value of one cent per point (with the balance payable in monetary consideration). The merchant may also specify that the same ticket may be purchased with up to 70,000 reward points if unsold by April 1, then up to 80,000 reward points if unsold by May 1, then up to 100,000 points (100%) if unsold by May 25.

In one embodiment of this aspect of the invention, the merchant will determine the relative percentages of monetary consideration and reward payments that may be used to purchase the product from the merchant. That is, the merchant will be the party that establishes the purchase price information for an item for sale, which includes the purchase price for the item for sale, wherein the purchase price may be paid with a reward payment portion and a monetary consideration portion, with the reward payment portion equivalent to a value of rewards that may be redeemed by a user from at least one reward issuer towards payment of the purchase price for the item. As described above, the purchase price information also includes a maximum allowable reward payment portion amount for the reward payment portion of the purchase price. The merchant transmits the designated purchase price information for the item for sale. That is, the merchant may supply this information to the exchange computer, which will include the purchase price information along with the descriptions of the items for sale as described above. Optionally, the purchase price information may be transmitted to a user computer in other ways, such as on a web site operated by the merchant with optional links back to the reward exchange web site. In any event, the user is provided with this purchase price information as designated by the merchant and the sale may occur as described above (i.e. the item is sold in accordance with the maximum allowable reward payment portion and the monetary consideration portion). In one embodiment, the merchant establishes the purchase price information for an item for sale by controlling a slider control provided at a merchant computer, the slider control allowing the merchant to select along an axis the maximum allowable reward payment portion. This may be similar to the slider control shown in FIGS. 74*a*, 74*b* and 74*c*. In an alternative embodiment to this, the purchase price information includes a minimum allowable monetary consideration portion amount of the purchase price rather than a maximum allowable reward payment portion amount as described above.

The merchant may indicate the maximum allowable reward payment portions and/or minimum allowable monetary consideration portions for a given product or group of products based on a trading relationship with a particular merchant, if desired. Thus, these parameters may be set by a merchant as part of a bid made to an issuer as described above. For example, these parameters may be entered into the web page 4200 of FIG. 42 as described above.

Similarly these parameters may be included in the inventory management process described above.

In another embodiment of this aspect of the invention, the rewards issuer will determine the relative percentages of monetary consideration and reward payments that may be used to purchase the product from the merchant. That is, the rewards issuer will be the party that establishes the maximum allowable reward payment portion for an item for sale by a merchant. The reward issuer transmits the maximum allowable reward payment portion amount for the reward payment portion of the purchase price. That is, the rewards issuer may supply this information to the reward exchange server, which will already have the purchase price information from the merchant along with the descriptions of the items for sale as described above. Optionally, the maximum purchase price information may be transmitted to the merchant computer. In any event, the user is provided with the purchase price information and the sale may occur as described above (i.e. the item is sold in accordance with the maximum allowable reward payment portion and the monetary consideration portion). In one embodiment, the rewards issuer establishes the purchase price information for an item for sale by controlling a slider control provided at a rewards server computer, the slider control allowing the rewards issuer to select along an axis the maximum allowable reward payment portion. This may be similar to the slider control shown in FIGS. 74*a*, 74*b* and 74*c*. The reward issuer subsequently provides compensation to a merchant towards the purchase of the item by a user, the compensation being equivalent to rewards redeemed by the user up to the maximum allowable reward payment portion established by the reward issuer. In an alternative embodiment to this, the reward issuer establishes a minimum allowable monetary consideration portion amount of the purchase price rather than a maximum allowable reward payment portion amount.

In a further embodiment, the product search criteria described above may be modified to also incorporate a search filter that would only provide products that allow for at least certain maximum allowable reward payment portion. For example, the user could specify that he or she only wants to see results for a DVD player search in which at least 75% of the purchase price may be paid for with rewards.

In addition, as described above, a user may use a mobile device such as a camera-enabled cell phone or smart phone such as an IPHONE to capture an image of a UPC bar code of a product of interest. The bar code is imaged and decoded, and the UPC data is transmitted wirelessly to the exchange computer. In a further embodiment, the user may then place a bid or offer to but the product of interest, such as by bidding on the purchase price, and/or bidding on the number of rewards that the user is willing to redeem either as partial or full payment for the product.

In a further embodiment of this aspect of the invention, the maximum allowable reward payment portion (or the corresponding minimum allowable monetary consideration portion) may be a function of a discount that is provided in a purchase transaction. For example, in the case where the merchant has provided a discount to the issuer as part of the trading agreement described above, a further constraint may be imposed such that a discount greater than X % would also require that no more than Y % of the purchase price be paid for with rewards. Similarly, in the case where a discount is provided to the consumer for a given product purchase, then a further constraint may be imposed such that a discount greater than X % would also require that no more than Y % of the purchase price be paid for with rewards. In addition, these requirements may be combined such that if the combined discount provided to the consumer and issuer is greater than X % would also require that no more than Y % of the purchase price be paid for with rewards.

In a further aspect of the invention, the merchant may elect to provide a combined discount (e.g. 60% off total) which includes a customer discount (e.g. 20% off to the customer) and an issuer discount (e.g. 40% off to the issuer). In this scenario a $100 item would sell for an $80 price presented to the customer. The customer would redeem what he perceives to be a one hundred dollar item paid for with $80 worth of points from a selected issuer(s), which may be 8,000 points (with a perceived value of one cent per point). The merchant would provide a further 40% discount to the issuer, so the issuer would only pay the merchant $40 in monetary consideration but would retire 8,000 of the customer's reward points in the transaction. By selling the inventory at less of a discount to the consumer ($20 rather than $60), brand devaluation is eliminated or reduced, and the consumer is glad to be able to purchase using his promotional wallet and preserving his cash. The exchange may take a transaction fee from individual constituents.

The merchant may provide this combined discount scenario as part of its bid process with a given issuer as discussed above, whereby the combined discount could apply to all transactions with that issuer. In the alternative, the merchant may provide this scenario in conjunction with a particular inventory, such as a DVD player, which may or may not be limited to a given issuer. The system is flexible in order to allow the merchant to specify the desired configuration in virtually any desired combination.

Figure 77A:
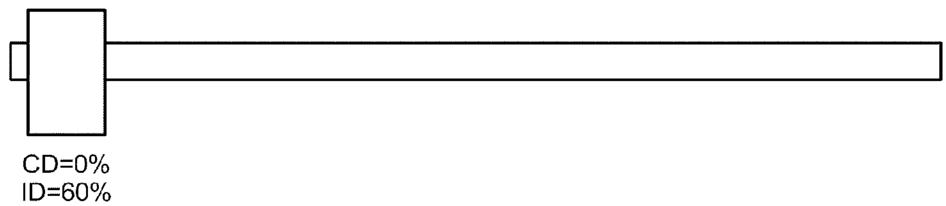
FIGS. 77*a*, 77*b* and 77*c* illustrate the use of such a slider control that may be provided to the merchant for establishing a customer discount and an issuer discount for a transaction.
Figure 77B:
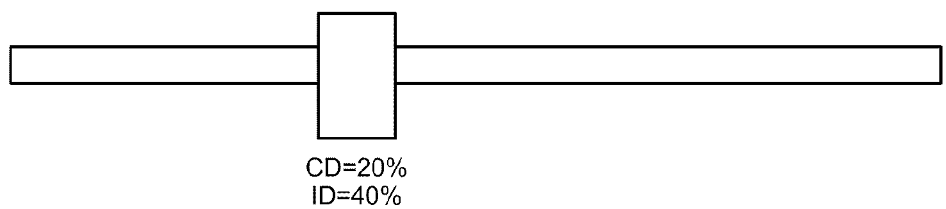
Figure 77C:
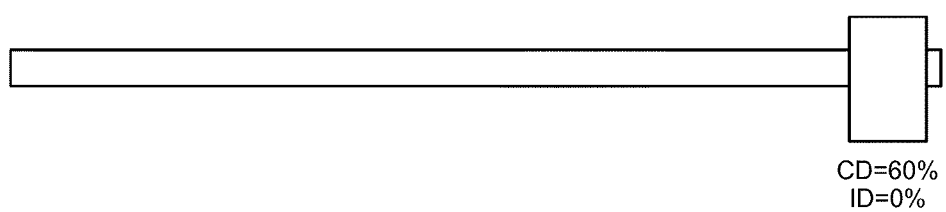

In the embodiment in which the merchant offers the combined discount to a given issuer for all transactions with that issuer, the merchant may be given user interface controls such as a slider control in order to specify the relative percentages of issuer discount and customer discount as desired. FIGS. 77*a*, 77*b* and 77*c* illustrate the use of such a slider control that may be provided to the merchant, for example in or associated with the web page 3800 as shown in FIG. 38. As described above, the merchant may enter its bid data onto this web page 3800. This bid data in this embodiment may now include the slider as shown in FIGS. 77*a*, 77*b* and 77*c*. FIG. 77*a* shows the slider in the extreme left position, wherein for a total discount offered of 60%, the customer discount would be 0% and the issuer discount would be the full 60%. The merchant may now control the slider along its axis to obtain the desired relative percentages. For example, FIG. 77*b* shows the slider at ⅓ along the axis, such that the customer discount would be 20% and the issuer discount would be 40%. Similarly, FIG. 77*c* shows the slider at the extreme right position, in which the customer gets the full discount (60%) and the issuer gets no discount (0%). Other values are of course selectable along the continuum of the axis as desired, wherein the total combined discount will always equal 60% (in this example). If the merchant enters a different combined discount in the web page, then the values selectable along the axis of the slider control will of course change accordingly.

In the alternative embodiment in which the combined discount is specified for a given product entered by the merchant into the system, the relative percentage may be established by using the slider control in the web page for example of FIG. 48 as described above.

Other interface means of indicating these relative percentages of the combined discount may also be used as known in the art.

Automatic Registration and Data Analysis

Figure 78:
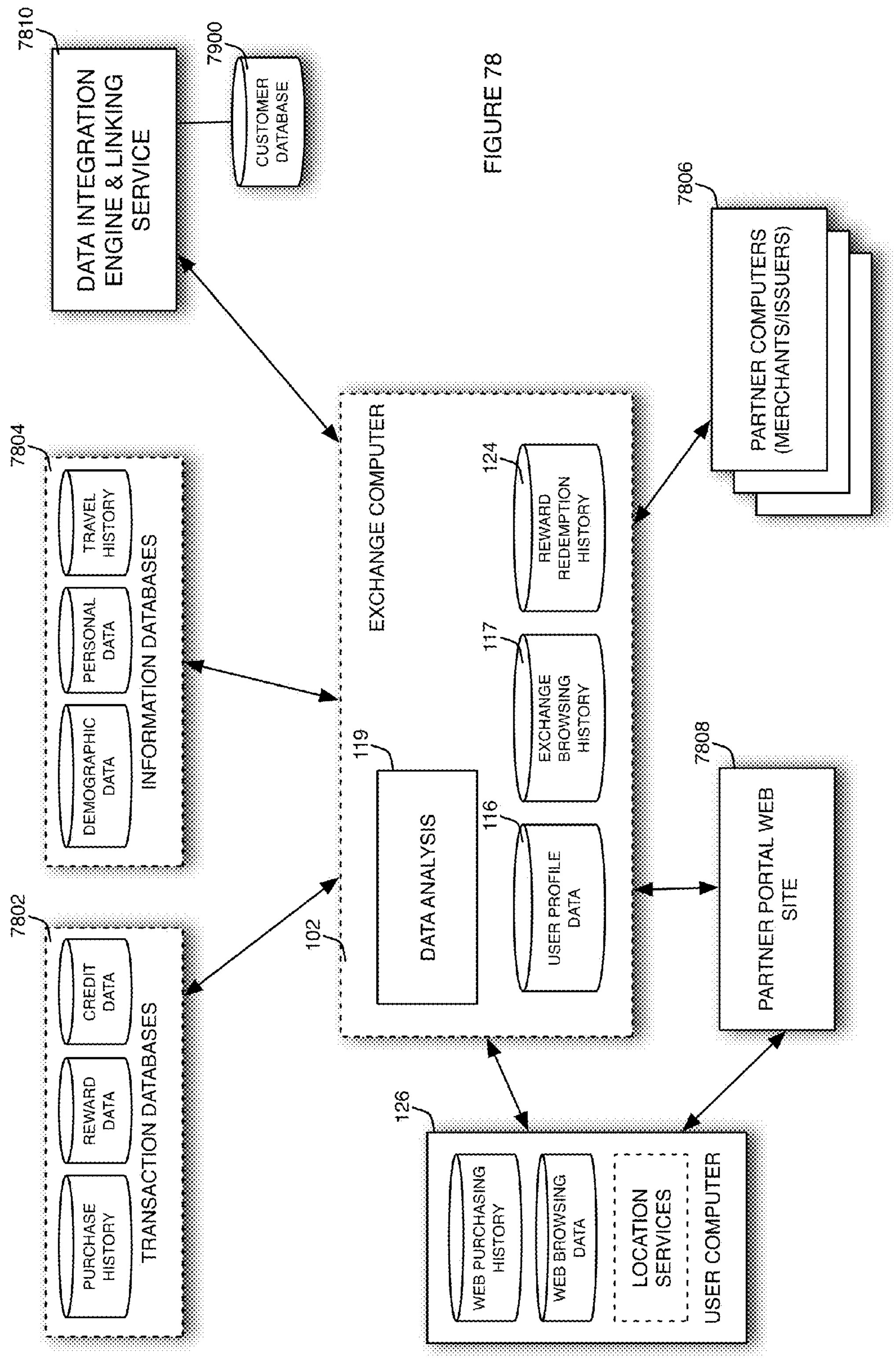
FIG. 78 is a block diagram of an alternative embodiment of the invention that implements automatic user login and registration and promotional data analysis.

The present invention adds further functionality to the reward exchange system 100 as shown in FIGS. 1*a* and 1*b* above, and will be referred to in this embodiment as exchange system as shown in FIG. 78. All of the functionality described above with respect to the reward exchange system 100 is incorporated within the exchange system of this additional embodiment. As shown in FIG. 78, the system includes as its main components an exchange computer 102 that interconnects over a computer network such as the Internet (not shown) with a user (also referred to as a customer or consumer). As previously explained, a user is a participant who makes purchases, receives reward points, and ultimately exchanges or redeems reward points for goods or services. In most cases the user will interact with the exchange computer 102 via a user computer (or user computing device) 126 such as a desktop computer, laptop computer, smartphone, tablet, netbook, web-enabled television set and the like. Also as previously explained, the exchange computer 102 is the central server computer that interoperates with each of the entities described herein. All of the entities in FIG. 78 interoperate with the exchange computer 102 over a wide area network, such as the Internet, in order to accomplish the functionality of the exchange as described herein. An alternative network such as a credit card network may also be used. Communications are accomplished through computers such as server and/or client computers as well known in the art.

Figure 79:
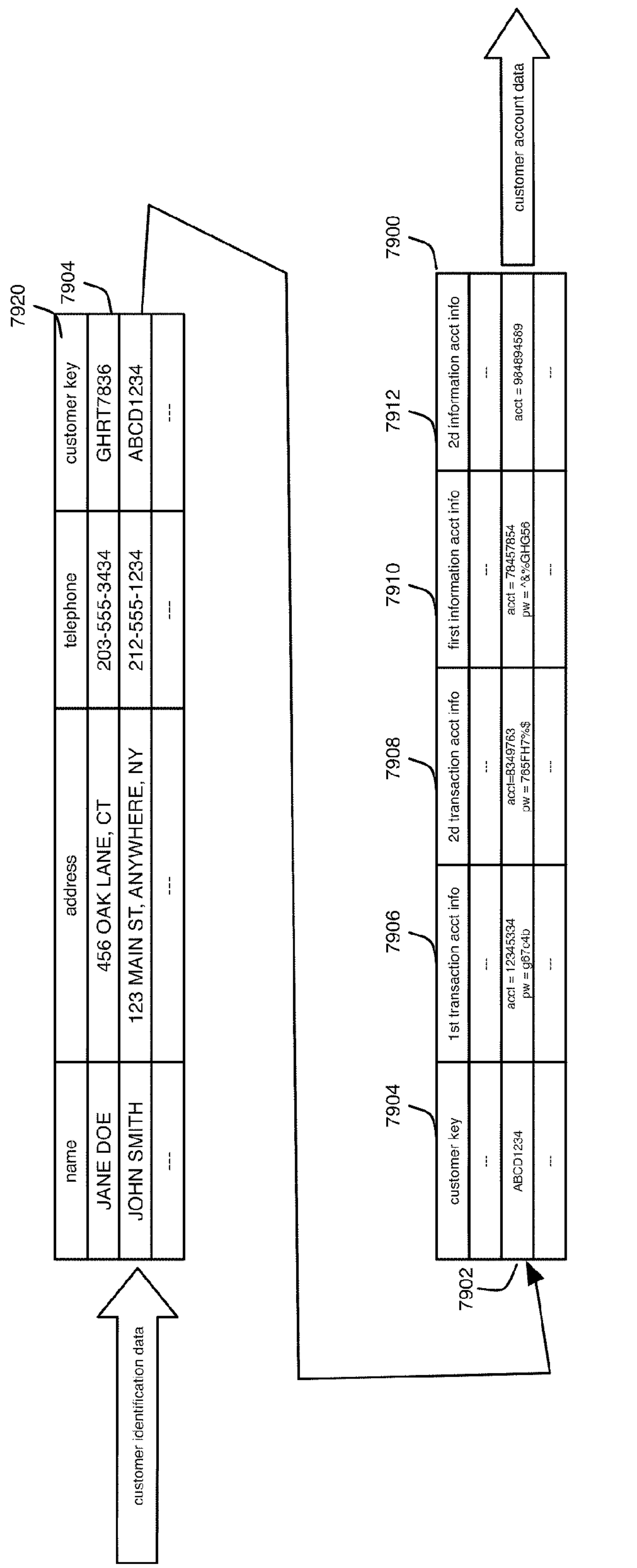
FIG. 79 is an illustration of tables of a customer database of customer record sets used in the embodiment of FIG. 78.

Also shown in FIG. 78 is a customer data integration engine and linking service 7810, a plurality of remote databases that include transactional databases 7802 and information databases 7804, and a plurality of partner computers 7806 (which may be merchant computers, manufacturer computers, and/or issuer computers). The customer data integration engine and linking service 7810 (also referred to as the linking service) provides, as described herein, the ability to gather customer data and information from many disparate sources (such as transaction databases 7802 and information databases 7804) and integrate, analyze and collate that customer data and information into a customer record set that is linked to a single unique customer. As the customer record sets are created, they are stored in a customer database 7900 at the customer linking service 7810. For example, as shown in FIG. 79, the customer database 7900 stores a plurality of customer record sets 7902, each of which may include a customer key 7904, a first transaction account field 7906, a second transaction account field 7908, a first information account field 7910, and a second information account field 7912. Of course, many more transaction account fields and information account fields may be stored, as well as other types of information that is linked to this particular customer identified by customer key 7904. This information will be further described below.

Transaction databases 7802 are shown interconnected to the exchange computer 102 and the customer linking service 7810 in FIG. 78 (via a network such as the Internet, not shown). Each of these transaction databases 7802 is associated with a transacting entity and stores information on transactions that have been executed between the user and that transacting entity. The transactions may be financial, such as in the case of the user purchasing an item from a merchant. In this case the transaction database may be a credit card transaction database that stores the credit card transaction between the user and the merchant. In addition, the transaction database may be a merchant database that stores the transaction between the user and the merchant. More specifically, the transaction database may be a reward database that stores rewards such as reward points earned by a user for transactions between the user and the reward issuing entity (which may be a merchant, a credit card issuer, etc. as well known in the art). In this case, the transaction database 7802 would operate in the same manner as the user reward account database 132 shown in FIG. 1*b* as described more fully above.

Information databases 7804 are also shown interconnected to the exchange computer 102 and the customer linking service 7810 in FIG. 78 (via a network such as the Internet, not shown). An information database 7804 will contain general information on a customer or user that is not necessarily related to a specific transaction as in the case of transaction databases 7802. For example, an information database 7804 may be a marketing or demographic database that stores accumulated marketing or demographic data on a customer (general purchase habits, income level, marital status, gender, shopping preferences, education level, etc.), other personal data, travel history, and the like. This information is particularly useful in an embodiment of the invention that will be described subsequently with respect to customer promotional analysis.

The partner computers 7806 include computers operated by the various partners in the exchange system, such as merchants, issuers, and manufacturers. In some cases, the transaction databases 7802 and information databases 7804 may be associated with partner computers 7806. For example, a transaction database 7802 may be a reward account database associated with MEMBERSHIP REWARD POINTS from AMERICAN EXPRESS. AMERICAN EXPRESS may or may not be a partner in the exchange system; in either case the functionality of the transaction database of MEMBERSHIP REWARD POINTS is substantially the same. The functionality of these partner computers 7806 will be described further herein.

Referring again to the customer database 7900, transaction account fields 7906, 7908 as shown in FIG. 79 each store login credentials for a customer reward account that is stored in a transactional database 7802 at a reward server computer such as issuer computer 130 as shown in FIG. 1*b*. Thus, first transaction account field 7906 is shown as storing an account number 12345334 and a password g67c4b which is used to gain access to that transaction account. Other information may be stored in this field such as the name of the rewarding entity associated with that reward account, information on how to link to that transaction database 7802 over the computer network, etc. Likewise, second transaction account field 7908 is shown as storing an account number 8349763 and a password 765FH7%$ which is used to gain access to that transaction account.

Additional transaction fields with similar data contained therein may be stored in the customer record set 7902.

Likewise, information account fields 7910, 7912 each store login credentials for a customer information account that is stored in an information database 7804 as shown in FIG. 78. Thus, first information account field 7910 is shown as storing an account number 78457854 and a password ^&% GHG56 which is used to gain access to that information account. Other information may be stored in this field such as the name of the information database entity associated with that information account, information on how to link to that information database over the computer network, etc. Likewise, second information account field 7912 is shown as storing an account number 984894589 but no password since passwords may not be required in this particular information database 7804. Additional information fields with similar data contained therein may be stored in the customer record set 7902.

The customer record set 7902 is assembled by the customer linking service 7810 by interacting with the various remote databases 7802, 7804 across the Internet and analyzing the information to ensure that it is matched with the appropriate customer, who is identified by the unique customer key 7904. A non-limiting example of this service in the prior art is the ABILITEC Customer Data Integration Solution by ACXIOM. The ABILITEC service maintains databases of customer information and matches that information in order to assemble a customer record set 7902 for each unique customer, which contains the transaction account fields and information account fields described above. The ABILITEC system is merely an example of a prior art system that may be used in conjunction with the present invention; however, other similar methodologies that provide the same or similar mapping functionalities within the context of this invention may also be used.

The customer record sets 7902 stored in the customer database 7900 at the customer linking service 7810 is accessed by the exchange computer 102 as described further below.

Customer Data Matching with the External Linking Service

Initially, the user/customer must undergo a registration and identification verification process in order to gain access to the exchange system. For this initial process, customer identification data is provided to the exchange that will serve to uniquely identify him or her to the system. One objective is to require the customer to only have to enter a relatively minimal amount of data (or perhaps manually enter no data) in order to make the process simpler and less tedious, without sacrificing the integrity of the registration process. The data that is provided to the exchange computer is verified by comparing it against preexisting customer data records that are either (1) previously gathered, analyzed and collated at the data linking service, and/or (2) distributed amongst various remote databases and web sites across the Internet.

In the preferred embodiment, the user may attempt to interact with the exchange system for the first time (and undergo a registration process) when linking to the exchange web site from another web site such as a portal web site 7808 that has partnered with the exchange system (i.e. a merchant, issuer, etc.). For example, the user may be browsing a merchant's web site 7808 where a link is provided to the exchange computer 102 on the merchant's web site 7808, which when clicked by the user would link him to the exchange web site. If the user has been logged into the merchant's web site, the link from the merchant's web site to the exchange system web site may contain some or all of the data required to identify the customer. That is, a customer who is registered with the merchant web site will already have provided to it his name, address, email address, telephone number etc., and the merchant web site can readily and transparently send that data to the exchange web site so that the exchange computer can begin the verification and registration process described below. Authorization for providing the customer information may be required by the merchant web site so that it is not impermissibly sharing personal information with the exchange computer.

In an alternative embodiment, the user may be browsing the exchange web site directly, and may desire to register with the exchange system in order to interact with the exchange and gain the benefits of the exchange as described through this application. Instead of being required to manually add reward program information as described in the embodiments above, the operation of this embodiment allows the user to simply enter a small amount of customer identification data such as name, address, email address, and telephone number. This data is sent to the exchange computer 102 as part of the registration process. For example, this customer identification data may be entered into a new user registration web page for example, such as the web page 300 shown in FIG. 3.

Figure 80A:
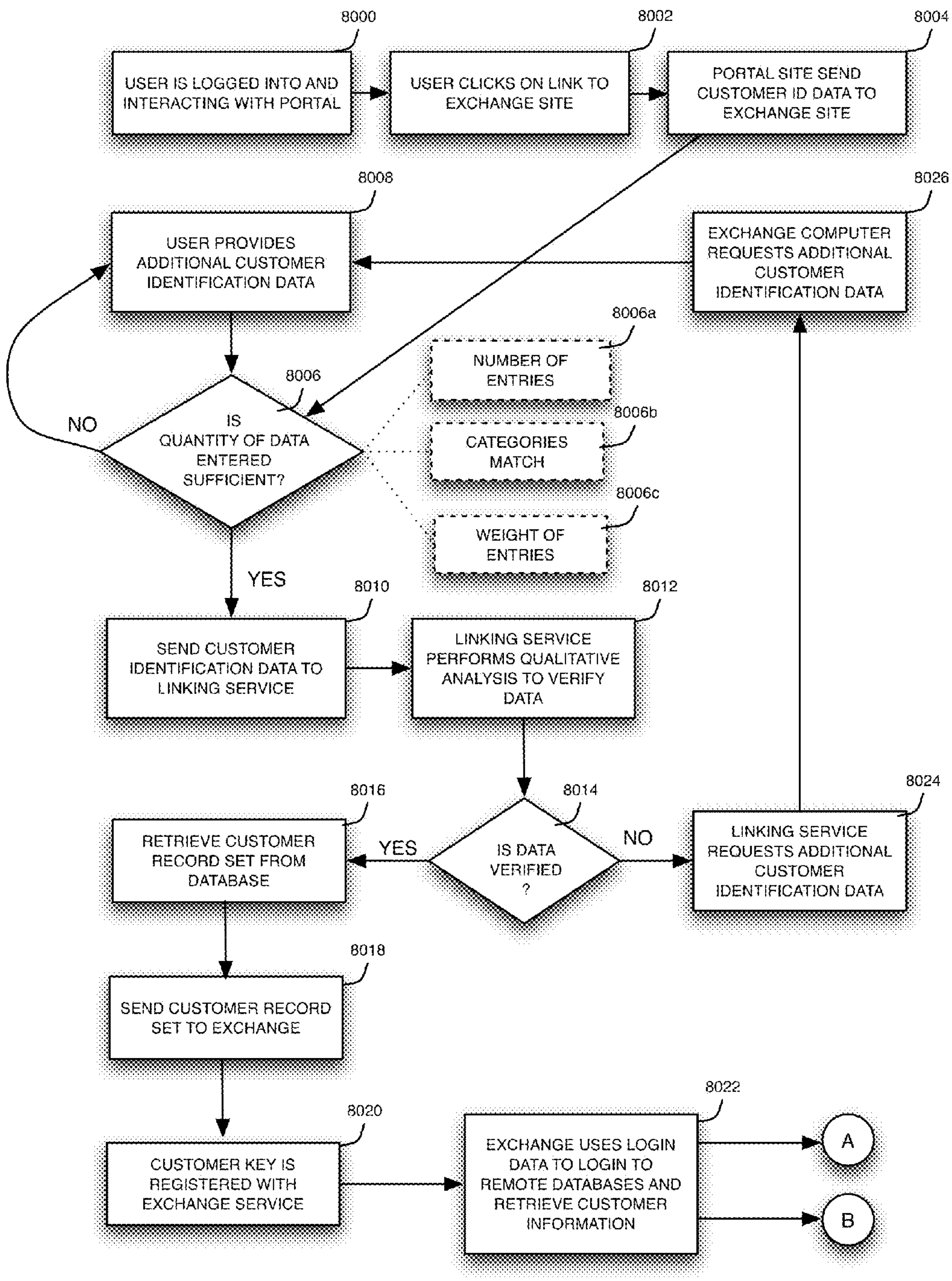
FIGS. 80*a*, 80*b*, 80*c* and 80*d* are flowcharts of various embodiments of the customer verification and registration process of an embodiment of the present invention.

Referring to the flowchart of FIG. 80*a*, the primary embodiment will be described in which the customer identification data is provided by the portal web site 7808. At step 8000, the user is logged into the partner portal web site and determines that he would like to click through on a link on the portal web site 7808 that will take him to the exchange web site. For example, there may be an invitation displayed on the portal web site page that invites him to join the exchange. After the user clicks on the link to the exchange web site at step 8002, the portal web site enables the user computing device and the exchange web site to connect with each other for subsequent direct communications (for example by sending a redirect command to the user computing device). In addition, the portal web site will send customer identification data such as name, address, email address, etc. to the exchange web site at step 8004. This customer identification data may be obtained from a database at the portal web site, which was previously obtained from the user when that user had previously registered with that portal web site. For example, if the portal web site is a HILTON HONORS reward site, then the user will have already provided to that web site his name, address, email address, etc. The portal web site may be required to obtain permission from the user to provide that customer identification data to the exchange web site as part of the automatic registration process.

Quantitative Analysis

After the exchange computer 102 has been provided with the customer identification data from the portal site, then the exchange computer 102 may implement a quantitative data analysis algorithm at step 8006 in order to operate on the customer identification data to help verify the identity of the customer. That is, there is a minimal amount of customer identification that would be required in order to uniquely identify that customer. Simply providing a name would in most cases not uniquely identify the customer, since many people have the same name. Therefore, the system designer can specify a required minimum of customer identification data (specified by amount of data and/or type of data), on which this quantitative analysis is performed. For example, one possible quantitative data analysis algorithm shown at step 8006*a* may be to require a minimum number of data entries, such as by obtaining at least four specific pieces of information (e.g. name, address, email address and telephone number), or to require a customer at step 8006*b* to provide a subset of any four out of six possible pieces of information, or two specific required pieces of information and three optional pieces of information, etc. In another embodiment at step 8006*c*, the quantitative data analysis algorithm is a weighted entry algorithm, in which each category of information that is input is weighted by assigning a numerical value that indicates the relative importance of that category in the verification process. For example, Table A below indicates one non-limiting example of a weighting algorithm under this embodiment:

TABLE A

Customer Identification Weighting Criteria

| DATA TYPE | WEIGHT |
|---|---|
| Name | 4 |
| Street Address | 5 |
| City | 3 |
| email address | 6 |
| State | 2 |
| Telephone number | 6 |

In this example, a weight threshold of 12 may be required to satisfy the algorithm and uniquely identify the customer to the system. This could be satisfied, for example, by any of the following combinations:

email address, telephone number (total=12)
name, street address, city (total=12)
name, street address, telephone number (total=15)
telephone number, street address, city (total=14)

Of course, other combinations of data may also satisfy the total threshold requirement. In a variation of this embodiment, each assigned weight value may be varied as a function of the uniqueness of the value within the dataset. For example, a common name such as John Smith may be given less weight than a more unique name since the more unique name will reduce the set of persons available to be matched. Likewise, a more populated city such as New York City will be given less weight than a small town such as Manorville. As a result, a person whose name is John Smith and lives in New York City will need more matching criteria since there are likely many such persons, while a person with a unique name living in Manorville may be matched with no or little additional required input criteria. In this case, the weights in Table A may be changed on the fly as the data is entered by the user.

If the number of pieces of data entered has not satisfied the quantitative data analysis algorithm (implemented by the number of entries algorithm, the weight of entries algorithm, or any other similar quantitative analysis), then the exchange computer will request additional customer identification data. The request for additional data will be made by sending an appropriate message at step 8008 to the user computer, even though the initial set of data was provided by the portal site. That is, once the user has clicked on the link from the portal site to the exchange site, the user computer is redirected to the exchange site and further communications between the user computer and the exchange computer are undertaken without requiring intervention by the portal web site.

Qualitative Analysis

Once the quantitative data analysis algorithm is satisfied, then the customer identification data that has been input will be analyzed on a qualitative basis by sending the customer identification data to the customer linking service at step 8010. The linking service will implement a qualitative data analysis algorithm at step 8012 to analyze the customer identification data to verify the identity of the customer, and if the verification passes at step 8014, then the corresponding customer record set is retrieved from the customer database at step 8016 and sent to the exchange at step 8018 along with a customer verification message, and the customer is now registered with the exchange system at step 8020. A user name and password for subsequent logging into the exchange system (which may have been entered by the user during the initial customer identification data input stage or anytime thereafter) may be stored in association with the customer data at the exchange computer and optionally at the linking service in order to make subsequent logins easier as well known in the art.

If, however, the verification process implemented with the qualitative data analysis by the linking service fails (e.g. one of the pieces of information entered by the customer does not match with the other information, as described below), then a verification failure message will be sent to the exchange computer at step 8024, and the exchange computer will inform the customer, by sending a message to the user computing device, that the verification has failed. At that point, the exchange computer may request additional customer identification data at step 8026, which may be to request re-entry of the same data (such as if an email address was initially incorrectly entered), or the exchange computer may request additional pieces of information (such as by requesting six rather than the original four pieces of information). The verification process then reiterates until the customer has been verified at step 8014, or until the exchange computer quits the process and locks out the customer (which may occur if someone is trying to spoof the system without the proper customer identification). Parameters such as the number of allowed data entry attempts, the number of required pieces of information, the weights of the input data in a weighted embodiment, etc., may be established as may be desired by the exchange system designer.

The interactions in this process between the user computer, the exchange computer, and the linking service will operate in real time so that the data entry process by the user is seamless. The initial amount of customer identification data required by the system may be kept low whereby the exchange computer and linking service can attempt to verify the identity of the customer nearly instantaneously so that as soon as the customer has entered a given piece of data, the qualitative analysis is performed by the linking service and feedback is given to the exchange computer as more data is required. This process provides a simple and seamless registration process for the user.

With respect to the qualitative analysis of the customer identification data at step 8012, this may be performed by the linking service by referencing one or more databases that contain customer information that has been gathered, integrated and collated from many external sources. For example, the linking service may reference a customer identification database table 7920 as shown in FIG. 79. The table 7920 may be a separate table or it may be included in a customer database 7900, as well known in the art of relational database design. The customer identification data that has been provided by the portal site or entered by the user, passed the quantitative data analysis algorithm described above, and transmitted to the linking service by the exchange computer, is then used by the linking service in the qualitative data analysis to query the table 7920 in order to access the correct customer record for that particular customer. Assuming that enough correct unique information has been provided by the customer to identify him in the table 7920, then a matching customer key 7904 is retrieved for that customer and transmitted back to the exchange computer for storage at the exchange computer in association with the user's login name and password information (as well as optionally the other data that was provided by the portal site and/or the customer for identification purposes) at step 8020. The customer may also be informed that the registration process has succeeded and he is now a registered user of the exchange system.

Retrieval and Storage of Remote Login and Data

The customer key 7904 is unique to each customer and serves to easily and uniquely identify him to the linking service for subsequent data access by the exchange computer as described further below. That is, when the exchange computer requests certain user data from the linking service, the exchange computer need only send the customer key 7904 to the linking service, which will use that key to access the data requested for that customer. In the alternative, instead of sending the customer key to the exchange computer, the linking service may store in its database(s) the user name and password that was entered by the customer during this registration process so that is associated with the customer key at the linking service rather than at the exchange computer. In this case, when the exchange computer needs to access the customer database at the linking service, it can send the user name and password rather than the customer key. The user name and password is then readily matched to the appropriate key at table 7920, and then the key is retrieved and used to access the table 7900 as described herein.

As described above, the customer record set 7902 that is retrieved from the database 7900 includes transaction account fields 7906, 7908 that each store login credentials for a customer reward account that is stored in a transaction database 7802 at a reward server computer such as issuer computer 130 as shown in FIG. 1*b*.

Additionally, the customer record set 7902 includes information account fields 7910, 7912 that each store login credentials for a customer information account that is stored in an information database 7804. The data from the transaction account fields and the information account fields (and other customer-specific data, if present in the database 7900) is sent to the exchange computer.

Data Retrieval from Remote Databases

The exchange computer 102 uses the transaction account information received from the linking service 7810 to communicate with the remote transaction database(s) (i.e. reward account database(s)) specified in the record. By having the customer's account number and password, the exchange computer 102 is able to query that reward account database at step 8022 and retrieve customer information such as the number of reward points that customer has in the reward account at that database. The exchange system acts in this capacity on behalf of the customer, and may require the customer to provide authority to the exchange system via a set of terms and conditions that must be agreed to by the customer (for example during the registration process). By granting authority to the exchange system, the customer enables the exchange system to retrieve reward account balance information as well as register the customer in other reward programs as described below.

After the exchange computer has obtained the customer information from the remote databases, then a reward point account collation and display and automatic registration process may proceed via process flow A as will be further described below. Additionally, after the exchange computer has obtained the customer information from the remote databases, then a remote and local data promotional analysis process may proceed via process flow B as will also be further described below.

User Customer Data Entry

Figure 80B:
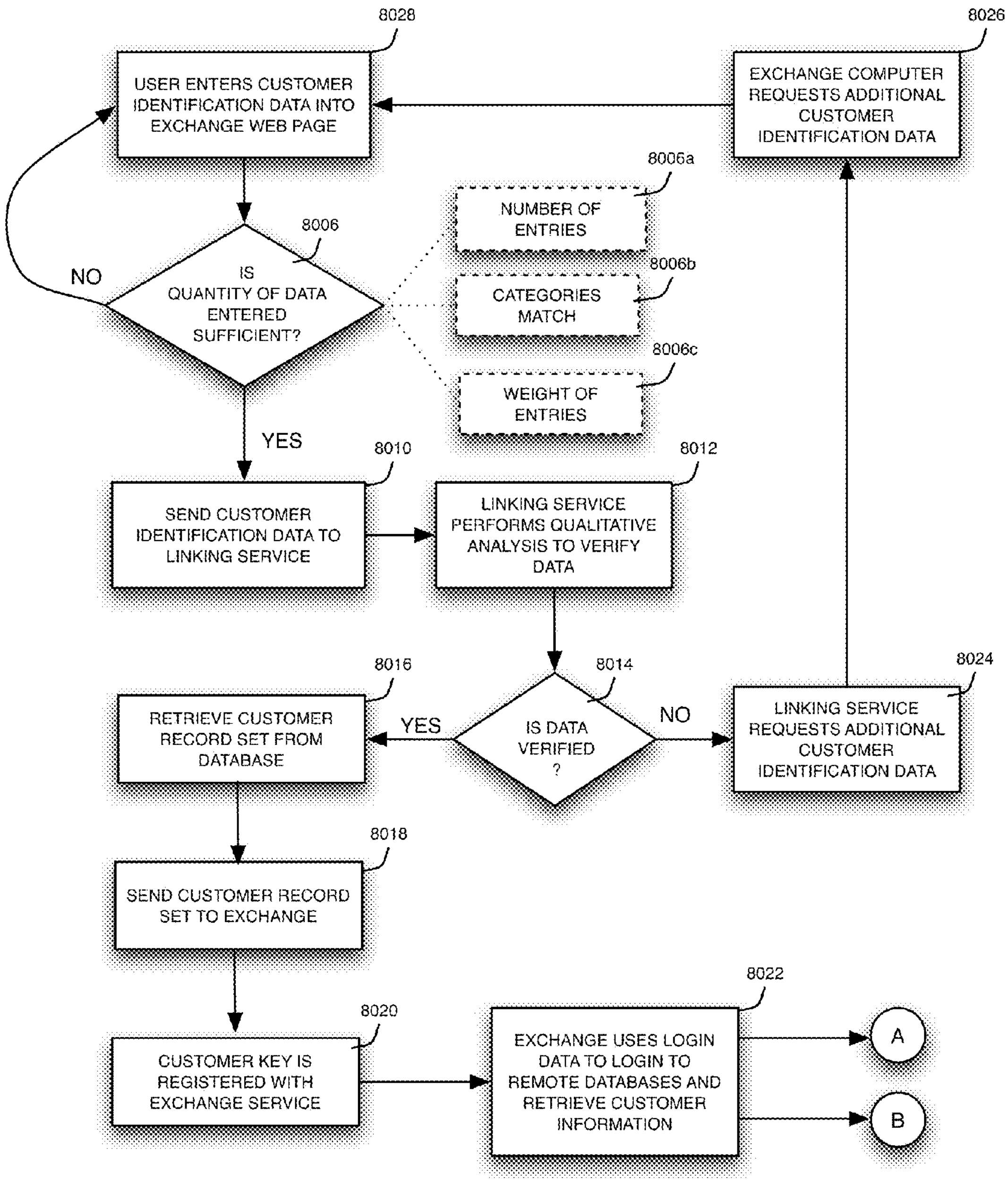

In an alternative embodiment, the user may be browsing the exchange web site directly, and may desire to register with the exchange system in order to interact with the exchange and gain the benefits of the exchange as described through this application. As shown in FIG. 80*b*, instead of linking to the exchange web site via the portal web site as described in the embodiment above, the operation of this embodiment allows the user to directly enter a small amount of customer identification data such as name, address, email address, and telephone number, at step 8028. This data is sent directly to the exchange computer 102 as part of the registration process. For example, this customer identification data may be entered into a new user registration web page, such as the web page 300 shown in FIG. 3.

The process then proceeds in the same manner as described above in the first embodiment. That is, the exchange computer 102 may implement a quantitative data analysis algorithm at step 8006 in order to operate on the customer identification data to help verify the identity of the customer. This may be accomplished by the quantitative data analysis algorithm shown at step 8006*a* which requires a minimum number of data entries, or at step 8006*b* to provide a subset of any four out of six possible pieces of information, or two specific required pieces of information and three optional pieces of information, etc., or at step 8006*c* where the quantitative data analysis algorithm is a weighted entry algorithm, in which each category of information that is input is weighted by assigning a numerical value that indicates the relative importance of that category in the verification process.

If the number of pieces of data entered has not satisfied the quantitative data analysis algorithm (implemented by the number of entries algorithm, the weight of entries algorithm, or any other similar quantitative analysis), then the exchange computer will request additional customer identification data. The request for additional data will be made by sending an appropriate message at step 8028 to the user computer.

Once the quantitative data analysis algorithm is satisfied, then the customer identification data that has been input will be analyzed on a qualitative basis by sending the customer identification data to the customer linking service at step 8010. The linking service will implement a qualitative data analysis algorithm at step 8012 to analyze the customer identification data to verify the identity of the customer, and if the verification passes at step 8014, then the corresponding customer record set is retrieved from the customer database at step 8016 and sent to the exchange at step 8018 along with a customer verification message, and the customer is now registered with the exchange system at step 8020. A user name and password for subsequent logging into the exchange system (which may have been entered by the user during the initial customer identification data input stage or anytime thereafter) may be stored in association with the customer data at the exchange computer and optionally at the linking service in order to make subsequent logins easier as well known in the art.

If, however, the verification process implemented with the qualitative data analysis by the linking service fails (e.g. one of the pieces of information entered by the customer does not match with the other information, as described below), then a verification failure message will be sent to the exchange computer at step 8024, and the exchange computer will inform the customer, by sending a message to the user computing device, that the verification has failed. At that point, the exchange computer may request additional customer identification data at step 8026, which may be to request re-entry of the same data (such as if an email address was initially incorrectly entered), or the exchange computer may request additional pieces of information (such as by requesting six rather than the original four pieces of information). The verification process then reiterates until the customer has been verified at step 8014, or until the exchange computer quits the process and locks out the customer (which may occur if someone is trying to spoof the system without the proper customer identification).

With respect to the qualitative analysis of the customer identification data at step 8012, this may be performed by the linking service by referencing one or more databases that contain customer information that has been gathered, integrated and collated from many external sources. For example, the linking service may reference a customer identification database table 7920 as shown in FIG. 79. The table 7920 may be a separate table or it may be included in a customer database 7900, as well known in the art of relational database design. The customer identification data that has been provided by the portal site or entered by the user, passed the quantitative data analysis algorithm described above, and transmitted to the linking service by the exchange computer, is then used by the linking service in the qualitative data analysis to query the table 7920 in order to access the correct customer record for that particular customer. Assuming that enough correct unique information has been provided by the customer to identify him in the table 7920, then a matching customer key 7904 is retrieved for that customer and transmitted back to the exchange computer for storage at the exchange computer in association with the user's login name and password information (as well as optionally the other data that was provided by the portal site and/or the customer for identification purposes) at step 8020. The customer may also be informed that the registration process has succeeded and he is now a registered user of the exchange system.

The customer key 7904 is unique to each customer and serves to easily and uniquely identify him to the linking service for subsequent data access by the exchange computer as described further below. That is, when the exchange computer requests certain user data from the linking service, the exchange computer need only send the customer key 7904 to the linking service, which will use that key to access the data requested for that customer. In the alternative, instead of sending the customer key to the exchange computer, the linking service may store in its database(s) the user name and password that was entered by the customer during this registration process so that is associated with the customer key at the linking service rather than at the exchange computer. In this case, when the exchange computer needs to access the customer database at the linking service, it can send the user name and password rather than the customer key. The user name and password is then readily matched to the appropriate key at table 7920, and then the key is retrieved and used to access the table 7900 as described herein.

As described above, the customer record set 7902 that is retrieved from the database 7900 includes transaction account fields 7906, 7908 that each store login credentials for a customer reward account that is stored in a transactional database 7802 at a reward server computer such as issuer computer 130 as shown in FIG. 1*b*. Additionally, the customer record set 7902 includes information account fields 7910, 7912 that each store login credentials for a customer information account that is stored in an information database 7804. The data from the transaction account fields and the information account fields (and other customer-specific data, if present in the database 7900) is sent to the exchange computer.

The exchange computer 102 uses the transaction account information received from the linking service 7810 to communicate with the remote transaction database(s) (i.e. reward account database(s)) specified in the record. By having the customer's account number and password, the exchange computer 102 is able to query that reward account database at step 8022 and retrieve customer information such as the number of reward points that customer has in the reward account at that database. The exchange system acts in this capacity on behalf of the customer, and may require the customer to provide authority to the exchange system via a set of terms and conditions that must be agreed to by the customer (for example during the registration process). By granting authority to the exchange system, the customer enables the exchange system to retrieve reward account balance information as well as register the customer in other reward programs as described below.

After the exchange computer has obtained the customer information from the remote databases, then a reward point account collation and display and automatic registration process may proceed via process flow A as will be further described below. Additionally, after the exchange computer has obtained the customer information from the remote databases, then a remote and local data promotional analysis process may proceed via process flow B as will be further described below.

An additional advantage of this invention provides for a seamless updating of the customer login credentials at the linking service whenever the user is logged into the exchange system and desires to change user information such as user name and password, email address etc. for one or more transaction accounts such as a reward account. That is, the user would be able to change for example his reward account password via the exchange, and the exchange would communicate this change to the remote database at the appropriate reward computer as well as the linking service computer (where the appropriate record in the customer database would be modified). Similarly, a change to account information while logged directly into a reward server web site would flow through to the linking service and the exchange. All of these entities would be able to keep their databases in sync for seamless communications with the user and amongst each other.

Customer Data Matching with Partner Web Sites

In an alternative embodiment, the linking service as described is not implemented in order to perform the qualitative tests on the customer identification data and provide the remote database login credentials. Instead, the customer identification data will be sent to each of a plurality of available partner web sites (e.g. merchants and issuers), and each of the partner web sites will perform its own qualitative analysis on the customer identification data to match that data to an already-registered user in its own database. Once the user has been matched, the login, password and other data for that customer is retrieved from its database and sent to the exchange computer for storage at the exchange computer as described above.

Figure 80C:
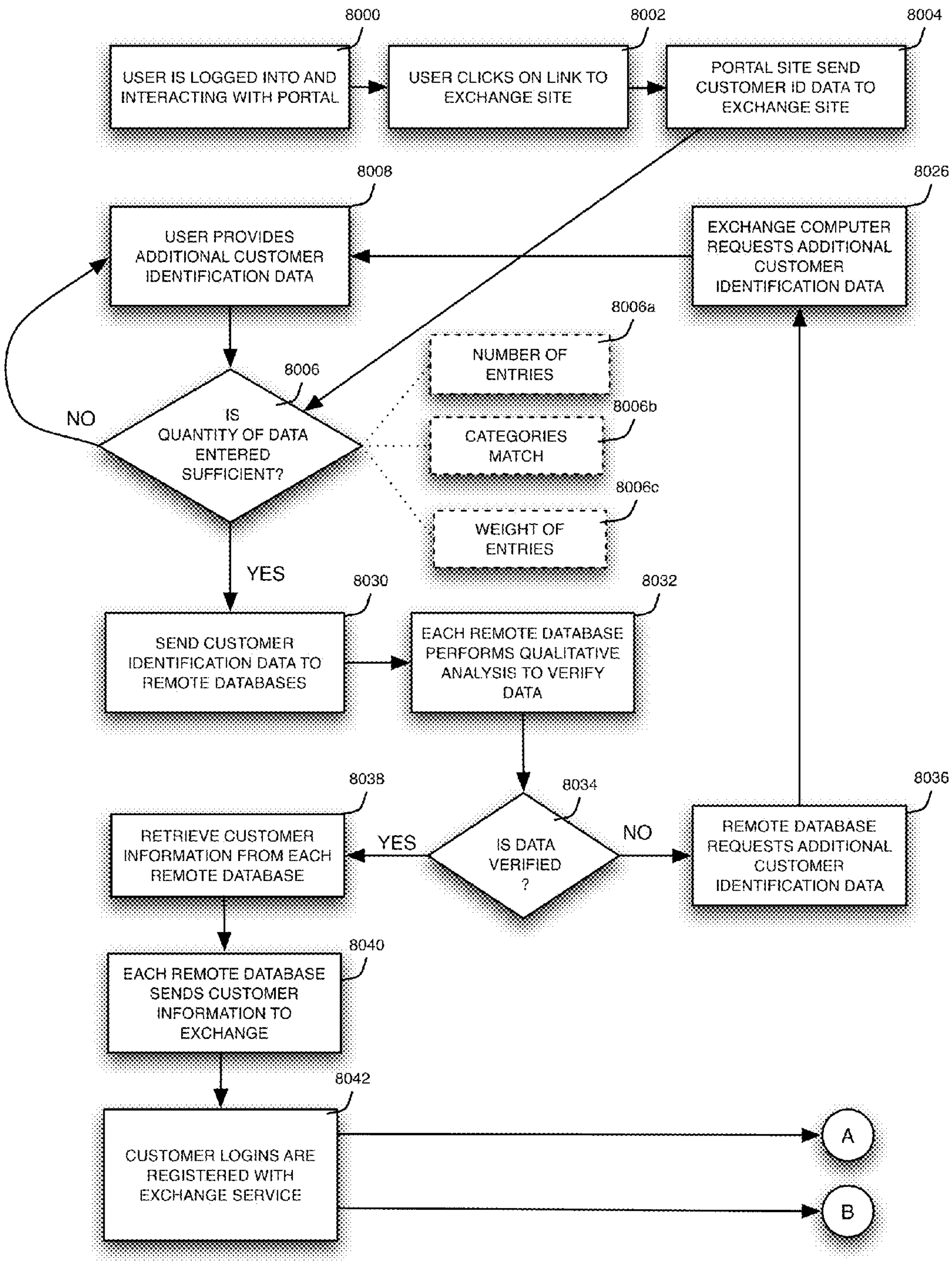

Thus, this alternative embodiment operates as follows with respect to FIG. 80*c*. In this process, the customer identification data is assumed to have originated with a partner portal web site as described with respect to FIG. 80*a*. That is, at step 8000, the user is logged into the partner portal web site and determines that he would like to click through on a link on the portal web site 7808 that will take him to the exchange web site. After the user clicks on the link to the exchange web site at step 8002, the portal web site enables the user computing device and the exchange web site to connect with each other for subsequent direct communications, and it will send customer identification data such as name, address, email address, etc. to the exchange web site at step 8004. After the exchange computer 102 has been provided with the customer identification data from the portal site, then the exchange computer 102 may implement a quantitative data analysis algorithm at step 8006 (e.g. test 8006*a*, test 8006*b*, and/or test 8006*c*) in order to operate on the customer identification data to help verify the identity of the customer. If the number of pieces of data entered has not satisfied the quantitative data analysis algorithm, then the exchange computer will request additional customer identification data by sending an appropriate message at step 8008 to the user computer, even though the initial set of data was provided by the portal site. Once the quantitative data analysis algorithm is satisfied, then the customer identification data that has been input will be analyzed on a qualitative basis by sending the customer identification data to each of the remote partner databases at step 8030 (instead of the centralized linking service as described in the previous embodiments).

After it has received a request for customer verification, which will include the customer identification data provided by the portal site and/or the user directly, the partner site 7806 will implement a qualitative data analysis algorithm at step 8032 to analyze the customer identification data to verify the identity of the customer, in the same manner as described above in the external linking service embodiment. If the verification passes at step 8034, then the user name and password that had been previously registered at that remote database is retrieved along with other customer information from a database and sent to the exchange computer at steps 8038 and 8040. For example, if the remote database is a reward account database, then the customer information sent back to the exchange computer will include the current number of reward points the customer may have in that account. At step 8042, the name and password login information for each remote database that has successfully completed the qualitative test on the customer identification data will be stored at step 8042 in the exchange computer for subsequent communications with each of those databases. A customer verification message may also be sent from the partner site to the exchange computer 102, and the customer is now registered with the exchange system.

If, however, the verification process implemented with the qualitative data analysis by the partner web site at steps 8032 and 8034 fails (e.g. one of the pieces of information entered by the customer does not match with the other information, as described below), then a verification failure message will be sent to the exchange computer, the remote database requests additional customer identification data at step 8036, and the exchange computer will inform the customer, by sending a message to the user computing device at step 8026, that the verification has failed. At that point, the exchange computer may request additional customer identification data, which may be to request re-entry of the same data (such as if an email address was initially incorrectly entered), or the exchange computer may request additional pieces of information (such as by requesting six rather than the original four pieces of information). The verification process then reiterates with the partner web site until the customer has been verified, or until the exchange computer quits the process and locks out the customer (which may occur if someone is trying to spoof the system without the proper customer identification). Parameters such as the number of allowed data entry attempts, the number of required pieces of information, the weights of the input data in a weighted embodiment, etc., may be established as may be desired by the exchange system designer.

The interactions in this process between the user computer, the exchange computer, and the partner web site will operate in real time so that the data entry process by the user is seamless. The initial amount of customer identification data required by the system may be kept low whereby the exchange computer and linking service can attempt to verify the identity of the customer nearly instantaneously so that as soon as the customer has entered a given piece of data, the qualitative analysis is performed by the partner web site and feedback is given to the exchange computer as more data is required. This process provides a simple and seamless registration process for the user.

With respect to the qualitative analysis of the customer identification data, this may be performed by the partner web site by referencing one or more databases that contain customer information that has been previously stored at that partner web site. For example, the partner web site may reference a partner customer identification database table that is similar to the customer identification database table 7920. The partner customer identification database table will store a user's name, address, telephone number, email address, etc. The table will also store the user name for that user and his password for logging into the account. In addition, in the case wherein the partner web site is for example a reward point issuer web site, the table will also have a field that stores the number of reward points that issuer has awarded to the user for prior transactions as discussed above.

Retrieval and Storage of Remote Login and Data

The customer identification data that has been provided by the portal site or entered by the user, passed the quantitative data analysis algorithm described above, and transmitted to the partner web site by the exchange computer, is then used by the partner web site in the qualitative data analysis to query the table in order to access the correct customer record for that particular customer. Assuming that enough correct unique information has been provided by the customer to identify him in the table, then the user name and password which is stored in the customer record at that partner site is retrieved for that customer and transmitted back to the exchange computer for storage at the exchange computer in association with the user's login name and password information (as well as optionally the other data that was provided by the portal site and/or the customer for identification purposes). The customer may also be informed that the registration process has succeeded and he is now a registered user of the exchange system.

This process will occur with all or a subset of all of the partner sites with which the exchange computer has a relationship. For example, in the case in which eleven issuer sites and ten merchant sites are registered as partner sites with the exchange computer, then the exchange computer could communicate with all 21 total partner sites in order to obtain the login credentials (user name and password) as well as other information such as available reward points for that partner site. All of the login credentials will be stored in the customer database at the exchange computer to enable the exchange computer to access those partner sites on behalf of the customer at any subsequent time.

Figure 80D:
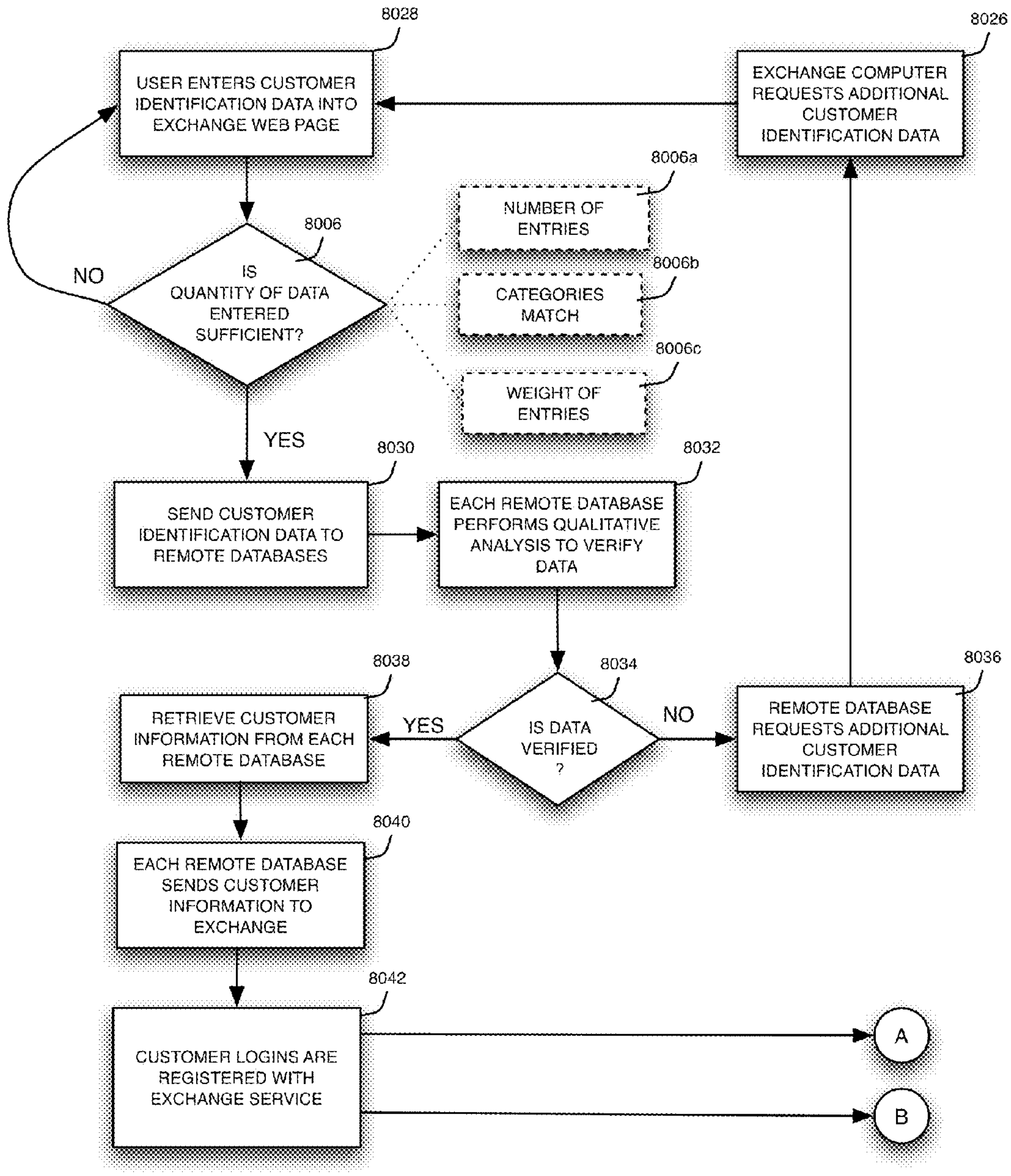

In a further alternative embodiment, the user may be interacting with the exchange computer and provide the customer identification data directly, rather than through a partner portal web site as previously described. This data flow is shown in FIG. 80*d*.

Reward Data Collation and Automated User Registration

Figure 81:
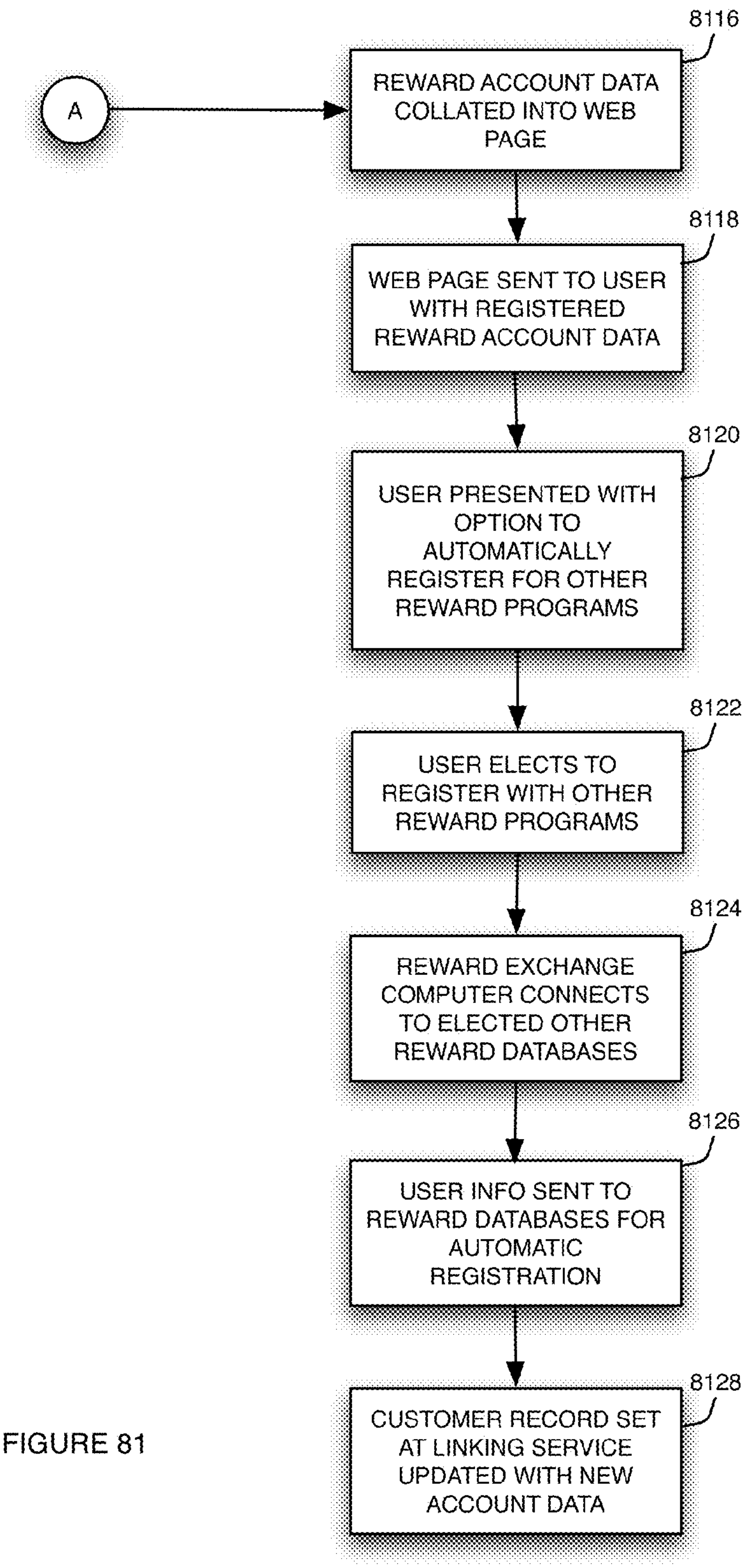
FIG. 81 is a flowchart that illustrates the process of the automatic login and account registration embodiment of the invention.
Figure 82:
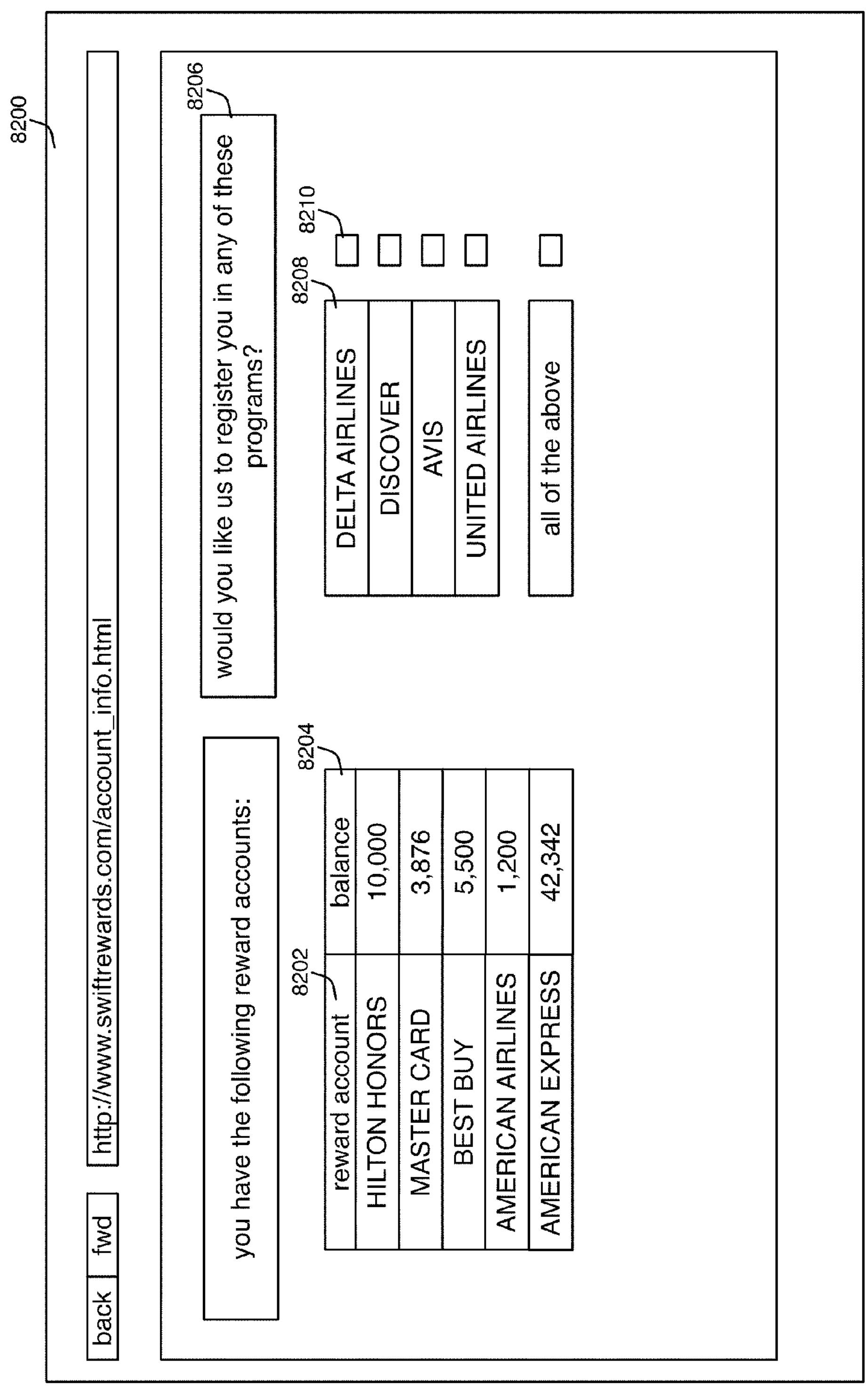
FIG. 82 is a web page presented to the user in the embodiment of FIG. 81.

In either the first embodiment that uses the linking service to identify the customer (FIGS. 80*a* and 80*b*) or the second embodiment that interacts directly with all of the remote databases to identify the customer (FIGS. 80*c*, 80*d*), the exchange computer will obtain the reward point balances for each of the user's accounts at the remote transaction databases that are reward account databases. As shown in process flow A in FIG. 81, this reward point balance information is collated into a reward account summary web page at step 8116, which is sent to the user computing device for display to the user at step 8118. In this manner, the reward account summary web page has a listing of the customer reward accounts that were accessed by the exchange computer for the customer and the number of reward points stored in the associated reward account for the customer. FIG. 82 illustrates the account web page 8200 that may be returned to the user computing device. On web page 8200 is shown a list of the reward accounts 8202 and the associated reward balances 8204 as determined by the communications between the exchange computer 102 and the various reward (transaction) databases 7802. Thus, by simply entering his name, address, telephone number and the like, the exchange computer 102 can quickly and expediently register the user with the exchange system, and then obtain the account balance information for all of the user's reward accounts without requiring the user to enter all of his account and password information separately.

In a further aspect of the invention, the exchange computer 102 may also present to the user a list of available reward accounts 8208 for which the user is currently not registered, and at step 8120 present an offer 8206 to register the user in one or more of those available accounts 8208 without requiring the user to enter any further information as in the prior art. Since the exchange computer 102 already has that user's name, address etc., it is expedient for the exchange computer to undertake the task of registering the user in whichever accounts are selected by the user. The user may elect to register at step 8122 by simply checking the desired accounts in check boxes 8210 as shown in FIG. 82, and then submit the web page to the exchange computer 102 for automatic registration with each selected reward program at steps 8124, 8126 and 8128. In step 8124 the reward exchange computer connects over the network to the reward databases that were elected for registration by the user. In step 8126 the user information (name, email, etc.) is sent to those databases for registration of the user. A user name and password may be generated by the reward database for return back to the user (and storage at the exchange computer). In the embodiment wherein the linking service keeps track of the user login credentials, then the user name and passwords provided to the exchange computer are also sent to the linking service at step 8128 for storage in the customer database.

In an alternative embodiment, a cluster of reward program may be defined, which would include various reward programs that agree amongst themselves to be in a particular cluster. For example, a cluster may defined by marketing partners HILTON HONORS, AVIS, DELTA AIRLINES, DISCOVER and UNITED AIRLINES. In this embodiment, the user may be surfing the Internet and be viewing a web page of one of the cluster partners, e.g. HILTON. A link may be provided to the exchange computer on the HILTON web site, which when clicked by the user would link him to the exchange web site. When the link is clicked, link source indication data that indicates the source of the link (the HILTON web site) will be sent to the exchange computer as known in the art. The exchange computer will then assemble the account web page 8200 after retrieving the reward account data as explained above, but will tailor the offer 8206 to only those members of the same cluster that the originating web site belongs (HILTON in this example).

Data Analysis and Customer Promotions

Figure 83:
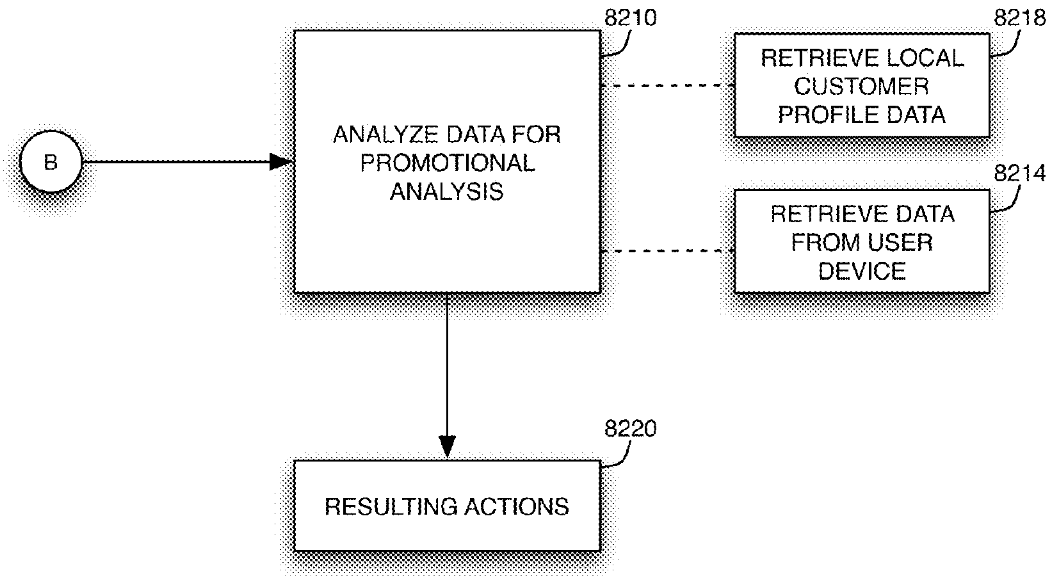
FIG. 83 is a flowchart that illustrates the process of the promotional data analysis embodiment of the invention.

In accordance with a further embodiment of the invention, the exchange system is used to collect data from the multiple disparate sources described above and perform various analytics on the collected data in order to better market and advertise products and services through the exchange. This aspect of the invention leverages the ability of the exchange computer 102 to interact with various remote databases such as the transaction databases 7802 and information databases 7804 described above, as well as with various local databases at the exchange computer 102 and data from the user computer 126 (as shown in FIG. 83), in order to analyze data associated with a particular customer or group of customers and make analyses that will be used for marketing and other purposes. The customer will be required to provide authorization to the exchange system for it to act on behalf of the customer, in accessing information on behalf of the customer and utilizing formulas to better serve the customer in the selection process of information, advertising and filtering. This authorization may be done during the registration process (such as agreeing to the terms and conditions of being a registered user) or any time thereafter.

Also as described above, the exchange computer 102 may then use the transaction account information received from the linking service 7810 to communicate with the transaction database(s) specified in the record. Transactional databases include data that has been recorded by various entities for transactions between the customer and that entity or other entities. For example, transaction databases may include reward or loyalty databases, which store reward accounts that keep track of reward points earned, aggregated and/or redeemed by the customer in connection with transactions with the customer, as well known in the art. These may include frequent flier mile account databases, credit card reward account databases, retail merchant reward account databases, and the like. Transaction databases may also include purchase history databases, which store information about purchases made by the customer with an entity such as a merchant, credit card issuer, etc. Transaction databases may also include credit databases that keep track of a customer's credit history and provide credit scores as well known in the art.

The exchange computer 102 may log into one or more transaction databases in order to retrieve pertinent information about the customer such as his reward point balance in the case of the reward account database, or the customer's credit score in the case of the credit database. In addition to retrieving reward account point balances, the exchange computer 102 may also retrieve additional transaction information such as purchase information that may be used for data analytic purposes as described herein.

The exchange computer 102 will also use the information account records received from the linking service 7810 to communicate with the information database(s) specified in the record. As explained above, an information database 7804 will contain general information on a customer or user that is not necessarily related to a specific transaction as in the case of transaction databases 7802. For example, an information database 7804 may be a personal, psychographic or demographic database that stores accumulated marketing or demographic data on a customer (general purchase habits, income level, marital status, gender, shopping preferences, education level, etc.). The exchange computer 102 may also interact with various databases that can provide travel history information about the customer, such as places visited, airlines and car rental companies used, etc.

As shown in FIG. 83, the exchange computer 102 will also access various local databases at step 8218 that store information at the exchange computer, such as customer profile database 116 and reward redemption history database 124 as also shown in FIG. **1*b*. As explained previously, user profile database 116 stores user information such as but not limited to reward program information such as program name and login information, user preferences that specify which of the reward programs the user wants to use for redemption, and other user information that is entered by the customer (user). The reward redemption history database 124** stores information regarding prior reward redemptions by the customer as well as product purchase data.

The exchange browsing history database 117 as shown in FIG. 78 also stores information that has been compiled as a result of the product browsing history of that user. For example, data will be stored that indicates which types of items the user has viewed, which price ranges the user has selected, which merchants the user tends to visit on the exchange, and which manufacturers the user seems to be interested in based on what he has viewed. This data that is collected and stored for each customer is valuable since it may be analyzed and used to market subsequent product offers (or block certain product offers), whether or not that user has actually purchased the products he is interested in. It may be determined for example that a user is interested in products from APPLE in the \$500-\$1,000 price range, even though he may not have actually purchased any such products through the exchange.

Additionally, data may be collected by the exchange computer from the user computer 126 at step 8214 of FIG. 83 as well as the information databases 7804, transaction databases 7802, and local databases 116, 124 and 117. In particular, the exchange computer may retrieve web browsing data and web purchasing history if authorized by the customer operating the user computer 126. Web purchasing history would indicate product purchases made via the web by the customer, which may be collected by a browser plug-in or other monitoring technology as known in the art. Likewise, web browsing data would indicate which web sites the customer has visited. The web purchasing history and the web browsing data would be used by the exchange computer to help in its analysis of all data being collected.

In the case where the user computer 126 is a mobile device such as a smartphone, tablet, cell phone or the like, the location services that are part of most of these types of mobile devices can provide location data to the exchange computer that indicates the location of the device (and of the user). For example, the user may be carrying an IPHONE device as the user computer 126, in which case the onboard GPS of the IPHONE device can provide location data to the exchange computer 102.

Thus the exchange computer 102 accesses the remote information databases 7804 and transaction databases 7802, the local databases 116, 124 and 8306, as well as customer-provided data from the user computer 126 in order to perform a promotional analysis by analysis block 119 as will be described below. The analysis block 119 is for example a standard computer microprocessor(s) programmed to perform the steps that will be described below.

The information retrieved from the remote databases (the transaction data and the information data) and the user device is then used along with the local customer profile data in a data analysis by the exchange computer at step 8210. A set of resulting actions 8220 will be generated by the data analysis step 8210 as will now be described.

The resulting actions 8220 may occur for example with respect to marketing actions undertaken with the exchange system. In one embodiment, merchants, manufacturers and/or issuers are able to push advertisements, offers, discounts, coupons and the like to various users via the exchange. For example, a merchant may be able to send a 10% discount coupon to all users on the exchange or to a targeted subset of users on the exchange. This may be done via an email campaign, or by displaying the coupon to the user via a web page at some point while the user is logged in, etc. In a similar manner, the user may opt to pull offers from selected merchants, issuers and/or manufacturers. In either scenario, access to the multitude of offers may be managed by the data analysis process such that the user is not inundated with offers and only receives offers that are targeted to him based on the data analysis.

Thus, the data that is collated from the remote databases, the local databases, and the user device is analyzed in various manners as illustrated by the following examples. In one simple example, the analysis determines that the credit score of a customer is below a certain threshold level, and the resulting action 8220 would be to filter out any offers for products that cost over a certain amount (e.g. $500). This can be filtered even further by applying an analysis of the exchange browsing history which determines that the customer is very interested in electronics and spends little time browsing sporting goods and equipment. The resulting action 8220 would then be to filter out everything but electronics, so that only promotions on electronic items costing under $500 would be offered to the customer. This can be filtered even further by applying an analysis of the customer's travel history which determines that this customer is a frequent traveler and often takes long flights for business and/or personal reasons. The resulting action 8220 would then be to filter out non-travel related promotions, so that only promotions on electronic items useful for a traveler and costing under $500 would be offered to the customer.

The user's location may be determined (in the case of a mobile user device 126) by analyzing the location data from the location services of the user device 126, and used to filter the promotions to merchants with a presence in proximity to the user so the user can visit the merchant's physical store to take advantage of the promotion. That is, merchants that interact with the system as previously described can use the exchange computer to push offers and promotions to users in proximity to their physical store, filtered as described above. Clusters of merchants may be defined in the system that are located in specified geographic regions. Clusters of merchants and/or other entities are described herein with respect to other embodiments and aspects of the exchange, but in this case clusters are in the same geographic region. For example, a cluster of merchants may be defined with the same shopping mall so that when the exchange computer determines via the location data that the customer is in the shopping mall, promotions for the merchants in the mall cluster will be pushed to the mobile device in order to drive the user to visit the merchants in that cluster. These promotions may be cross-promotions amongst members of the cluster, such as a cross-promotion between an electronic store and a music store, a clothing store and a shoe store, etc. The definitions of which merchants belong to which clusters, and the offers that the cluster merchants wish to push to certain filtered users, is all analyzed by the analysis step 8210 in order to generate the appropriate resulting action 8220 that pushes the desired cross-promotion materials to the user's mobile device when that user is located at the shopping mall.

In addition to automatically pushing promotions to users based on their location as described above, the exchange system will allow users to request or pull promotions from specified merchants that are in proximity to the user. For example, the user may enter shopping mall and use an interface on his mobile device (e.g. web site, web app, dedicated app, etc.) to request coupons or other promotional materials from all merchants in the mall that subscribe to the exchange system, which may be filtered out by the analysis section described above on order to better fit that particular user at that time. In this example, the user enters the shopping mall, logs into the exchange system on his mobile device, and requests the exchange system to send all pertinent coupons for merchants at that mall that are members of the exchange. The exchange computer determines that the user is at the mall (via the location data), which merchants at the mall have subscribed to this service, and what types of coupons should be sent to the user based on the analytics described above.

In addition to specifying location and/or desired merchants or products, the user is also able to obtain promotions that are based on his reward portfolio, which has been analyzed by the exchange computer as part of the transaction database data gathering process. Thus, the consumer might request promotions from merchants at the mall that will honor his reward points in making a purchase. The exchange computer 102 will perform the requested analysis and provide the results to the user via the mobile device, optionally with promotions relating to the reward points requested to be used by the user. This enables the user to advantageously redeem points from one program with other merchants that have previously agreed to redeem those points, and which have a presence at the location of the user (e.g. the shopping mall).

Additional criteria may be used in the analysis by the exchange computer in order to filter out desired promotions for presentation to the user. For example, issuers and/or merchants may assign different redemption values to their reward points, and the user may request to find merchants that will redeem his points for the greatest value in proximity to his location. This would be part of the request submitted by the user via his device to the exchange computer. Merchants may make offers to redeem points at multiples of their normal value, such that a user would get double the normal redemption value for certain reward points, or triple the normal redemption value for certain other reward points, etc. These reward value multipliers may be time-constrained (e.g. only for certain days or times of day), or location-constrained (e.g. only in certain regions), or customer-constrained (e.g. only for customers matching a specified profile such as a financial profile), etc. The reward value multipliers may be limited to a percentage of a certain purchase, such as allowing 50% of a purchase price to be paid with points at double their normal value, and the other 50% being paid with cash (or credit card or check).

What is claimed is:

1. A method of operating a data collection and analysis system comprising:

an exchange computer receiving customer identification data associated with a customer;

the exchange computer applying a quantitative analysis algorithm with the customer identification data, the quantitative analysis algorithm determining whether the exchange computer has received an amount of customer identification data sufficient for the customer to be uniquely identified;

if the quantitative analysis algorithm passes, then the exchange computer sending the customer identification data to a linking service computer;

the linking service computer applying a qualitative analysis algorithm with the customer identification data, the qualitative analysis algorithm determining if the customer identification data is sufficient for the customer to be uniquely identified by matching the customer identification data to a plurality of customer identification records;

if the qualitative analysis algorithm passes, then the linking service computer accessing a customer database to retrieve from said customer database a customer record set associated with the customer identification data, the customer record set comprising a plurality of account information records, each of the account information records comprising account login data suitable for logging into an associated database;

the linking service computer sending the customer record set to the exchange computer;

the exchange computer storing the customer record set; and the exchange computer using the account login data from each of the account information records from the customer record set to communicate with a remote database associated with the account login data and retrieve customer information from each of the remote databases.

2. The method of claim 1 wherein the exchange computer receives the customer identification data from a partner portal web site.

3. The method of claim 2 further comprising the steps of:

the partner portal web site receiving a request from a user computing device to link to an exchange web site associated with the exchange computer;

the partner portal web site enabling the user computing device and the exchange web site to connect for subsequent communications, and the partner portal web site sending the customer identification data to the exchange web site.

4. The method of claim 1 wherein the exchange computer receives the customer identification data from a user computing device.

5. The method of claim 1 wherein the quantitative analysis algorithm comprises a weighted entry algorithm in which each piece of the customer identification data is assigned a numerical value representing a relative weight, and wherein the total value of the relative weights must exceed a predetermined threshold in order for the quantitative analysis algorithm to pass.

6. The method of claim 1 wherein the quantitative analysis algorithm comprises a minimum number of entries algorithm in which a predetermined minimum number of pieces of customer identification data must be present in order for the quantitative analysis algorithm to pass.

7. The method of claim 1 wherein the quantitative analysis algorithm comprises assigning a category type to each piece of the customer identification data, and wherein there is a requirement that a predetermined minimum number of categories is satisfied by the customer identification data.

8. The method of claim 1 wherein if the quantitative analysis algorithm fails, then the exchange computer sending a request to a user computing device for additional customer identification data and re-applying the quantitative analysis algorithm with the customer identification data and the additional customer identification data until the quantitative analysis algorithm passes.

9. The method of claim 1 wherein a predetermined minimum number of pieces of the customer identification data must match a single customer identification record in order for the qualitative analysis algorithm to pass.

10. The method of claim 1 wherein if the qualitative analysis algorithm fails, then the linking service computer sending a request to the exchange computer for additional customer identification data;

the exchange computer obtaining additional customer identification data from a user computing device and sending the additional customer data to the linking service computer; and the linking service computer re-applying the qualitative analysis algorithm with the customer identification data and the additional customer identification data until the qualitative analysis algorithm passes.

11. The method of claim 1 wherein the customer record sent from the linking service computer to the exchange computer further comprises a customer key that uniquely identifies the customer record set in the customer database.

12. The method of claim 11 wherein the exchange computer retrieves the customer key from storage and sends the customer key to the linking service computer for periodic updating of the customer record set by the customer linking service.

13. The method of claim 1 further comprising the steps of:

collating the retrieved customer information into an account web page, and sending the account web page to a user computing device for display by the user computing device.

14. The method of claim 13 wherein at least one of the remote databases is a reward account database operated by an associated reward issuing entity and comprising a plurality of customer reward accounts, wherein at least one of the plurality of customer reward accounts is associated with the customer identified by the customer identification data, and wherein the retrieved customer information comprises reward account information for the customer comprising reward points previously accumulated by the customer, and wherein the account web page comprises a listing of a plurality of customer reward accounts accessed by the exchange computer for the customer and the number of reward points stored in the associated reward account for the customer.

15. The method of claim 14 wherein the exchange computer receives the customer identification data from a partner portal web site, wherein the partner portal web site is associated with a reward issuing entity that is a member of a predefined cluster of reward issuing entities; and wherein the account web page indicates which of the plurality of customer reward accounts accessed by the exchange computer for the customer are associated with a reward issuing entity that is a member of the cluster.

16. The method of claim 15 wherein the account web page further comprises a listing of reward issuing entities with which the customer does not have an associated reward account and that are members of the cluster.

17. The method of claim 16 further comprising the step of providing on the account web page an offer for the customer to register with at least one of the reward issuing entities with which the customer does not have an associated reward account and that are members of the cluster.

18. The method of claim 17 further comprising the step of receiving from the user computing device an instruction to register the customer with a designated at least one of the reward issuing entities with which the customer does not have an associated reward account and that are members of the cluster.

19. The method of claim 18 further comprising the step of the exchange computer sending a registration request on behalf of the customer to the reward account database associated with the designated reward issuing entity.

20. The method of claim 1 further comprising the step of performing a promotional analysis of the customer information retrieved from each of the remote databases, the promotional analysis for generating a plurality of offers to be made to the customer for items available via the exchange computer.

21. The method of claim 20 wherein the step of performing a promotional analysis of the customer information retrieved from each of the remote databases comprises accessing a local customer profile database to retrieve customer profile data to be used in the promotional analysis.

22. The method of claim 21 further comprising receiving user data from a user computing device; and wherein the step of performing a promotional analysis of the customer information retrieved from each of the remote databases further comprises analyzing the user data received from the user computing device with the customer profile data and the retrieved customer information.

23. The method of claim 22 wherein the user data received from the user computing device comprises web browsing data identifying web sites that have been loaded onto the user computing device.

24. The method of claim 23 wherein the user data received from the user computing device comprises web purchasing history data identifying items that have been purchased via the web on the user computing device.

25. The method of claim 24 wherein the user data received from the user computing device comprises location data identifying the location of the user computing device.

26. The method of claim 25 wherein the promotional analysis is based at least partially on the location data received from the user device.

27. The method of claim 26 wherein the promotional analysis is associated at least partially on at least one merchant in proximity to the user computing device.

28. The method of claim 27 wherein the promotional analysis results in an offer to the customer for an item from the at least one merchant in proximity to the user computer device that is determined by promotional analysis to be desired by the customer.

29. A method of operating a data collection and analysis system comprising:

an exchange computer receiving customer identification data associated with a customer;

the exchange computer applying a quantitative analysis algorithm with the customer identification data, the quantitative analysis algorithm determining whether the exchange computer has received an amount of customer identification data sufficient for the customer to be uniquely identified;

if the quantitative analysis algorithm passes, then the exchange computer sending the customer identification data to a remote database computer;

the remote database computer applying a qualitative analysis algorithm with the customer identification data, the qualitative analysis algorithm determining if the customer identification data is sufficient for the customer to be uniquely identified by matching the customer identification data to a plurality of customer identification records;

if the qualitative analysis algorithm passes, then the remote database computer accessing a customer database to retrieve from said customer database customer information associated with the customer identification data;

the remote database computer sending the retrieved customer information to the exchange computer; and the exchange computer storing the retrieved customer information.

30. The method of claim 29 wherein the exchange computer receives the customer identification data from a partner portal web site.

31. The method of claim 30 further comprising the steps of:

the partner portal web site receiving a request from a user computing device to link to an exchange web site associated with the exchange computer;

the partner portal web site enabling the user computing device and the exchange web site to connect for subsequent communications, and the partner portal web site sending the customer identification data to the exchange web site.

32. The method of claim 29 wherein the exchange computer receives the customer identification data from a user computing device.

33. The method of claim 29 wherein the quantitative analysis algorithm comprises a weighted entry algorithm in which each piece of the customer identification data is assigned a numerical value representing a relative weight, and wherein the total value of the relative weights must exceed a predetermined threshold in order for the quantitative analysis algorithm to pass.

34. The method of claim 29 wherein the quantitative analysis algorithm comprises a minimum number of entries algorithm in which a predetermined minimum number of pieces of customer identification data must be present in order for the quantitative analysis algorithm to pass.

35. The method of claim 29 wherein the quantitative analysis algorithm comprises assigning a category type to each piece of the customer identification data, and wherein there is a requirement that a predetermined minimum number of categories is satisfied by the customer identification data.

36. The method of claim 29 wherein if the quantitative analysis algorithm fails, then the exchange computer sending a request to a user computing device for additional customer identification data and re-applying the quantitative analysis algorithm with the customer identification data and the additional customer identification data until the quantitative analysis algorithm passes.

37. The method of claim 29 wherein a predetermined minimum number of pieces of the customer identification data must match a single customer identification record in order for the qualitative analysis algorithm to pass.

38. The method of claim 29 wherein if the qualitative analysis algorithm fails, then the remote database computer sending a request to the exchange computer for additional customer identification data;

the exchange computer obtaining addition additional customer identification data from a user computing device and sending the additional customer data to the remote database computer; and the remote database computer re-applying the qualitative analysis algorithm with the customer identification data and the additional customer identification data until the qualitative analysis algorithm passes.

39. The method of claim 29 further comprising the steps of:

collating the customer information retrieved from a plurality of remote database computers into an account web page, and sending the account web page to a user computing device for display by the user computing device.

40. The method of claim 39 wherein at least one of the remote databases is a reward account database operated by an associated reward issuing entity and comprising a plurality of customer reward accounts, wherein at least one of the plurality of customer reward accounts is associated with the customer identified by the customer identification data, and wherein the retrieved customer information comprises reward account information for the customer comprising reward points previously accumulated by the customer, and wherein the account web page comprises a listing of a plurality of customer reward accounts accessed by the exchange computer for the customer and the number of reward points stored in the associated reward account for the customer.

41. The method of claim 40 wherein the exchange computer receives the customer identification data from a partner portal web site, wherein the partner portal web site is associated with a reward issuing entity that is a member of a predefined cluster of reward issuing entities; and wherein the account web page indicates which of the plurality of customer reward accounts accessed by the exchange computer for the customer are associated with a reward issuing entity that is a member of the cluster.

42. The method of claim 41 wherein the account web page further comprises a listing of reward issuing entities with which the customer does not have an associated reward account and that are members of the cluster.

43. The method of claim 42 further comprising the step of providing on the account web page an offer for the customer to register with at least one of the reward issuing entities with which the customer does not have an associated reward account and that are members of the cluster.

44. The method of claim 43 further comprising the step of receiving from the user computing device an instruction to register the customer with a designated at least one of the reward issuing entities with which the customer does not have an associated reward account and that are members of the cluster.

45. The method of claim 44 further comprising the step of the exchange computer sending a registration request on behalf of the customer to the reward account database associated with the designated reward issuing entity.

46. The method of claim 29 further comprising the step of performing a promotional analysis of the customer information retrieved from each of the remote databases, the promotional analysis for generating a plurality of offers to be made to the customer for items available via the exchange computer.

47. The method of claim 46 wherein the step of performing a promotional analysis of the customer information retrieved from each of the remote databases comprises accessing a local customer profile database to retrieve customer profile data to be used in the promotional analysis.

48. The method of claim 47 further comprising receiving user data from a user computing device; and wherein the step of performing a promotional analysis of the customer information retrieved from each of the remote databases further comprises analyzing the user data received from the user computing device with the customer profile data and the retrieved customer information.

49. The method of claim 48 wherein the user data received from the user computing device comprises web browsing data identifying web sites that have been loaded onto the user computing device.

50. The method of claim 49 wherein the user data received from the user computing device comprises web purchasing history data identifying items that have been purchased via the web on the user computing device.

51. The method of claim 50 wherein the user data received from the user computing device comprises location data identifying the location of the user computing device.

52. The method of claim 51 wherein the promotional analysis is based at least partially on the location data received from the user device.

53. The method of claim 52 wherein the promotional analysis is associated at least partially on at least one merchant in proximity to the user computing device.

54. The method of claim 53 wherein the promotional analysis results in an offer to the customer for an item from the at least one merchant in proximity to the user computer device that is determined by promotional analysis to be desired by the customer.

55. A data collection and analysis system comprising:

an exchange computer interconnected with a linking service computer and a plurality of remote databases via a computer network, the exchange computer programmed to:

receive customer identification data associated with a customer;

apply a quantitative analysis algorithm with the customer identification data, the quantitative analysis algorithm determining whether the exchange computer has received an amount of customer identification data sufficient for the customer to be uniquely identified;

if the quantitative analysis algorithm passes, then send the customer identification data to the linking service computer;

the linking service computer is programmed to:

apply a qualitative analysis algorithm with the customer identification data, the qualitative analysis algorithm determining if the customer identification data is sufficient for the customer to be uniquely identified by matching the customer identification data to a plurality of customer identification records;

if the qualitative analysis algorithm passes, then access a customer database to retrieve from said customer database a customer record set associated with the customer identification data, the customer record set comprising a plurality of account information records, each of the account information records comprising account login data suitable for logging into an associated remote database; and send the customer record set to the exchange computer; and the exchange computer is further programmed to store the customer record set and use the account login data from each of the account information records from the customer record set to communicate with a remote database associated with the account login data and retrieve customer information from each of the remote databases.

56. The system of claim 55 further comprising a partner computer interconnected to the exchange computer via the network, wherein the exchange computer is programmed to receive the customer identification data from a partner portal web site executing on the partner portal computer.

57. The system of claim 56 further comprising a user computing device interconnected to the partner portal computer via the network, wherein the partner portal computer web site is programmed to:

receive a request from the user computing device to link to an exchange web site associated with the exchange computer;

enable the user computing device and the exchange web site to connect for subsequent communications, and send the customer identification data to the exchange web site.

58. The system of claim 55 further comprising a user computing device interconnected to the exchange computer via the network, and wherein the exchange computer is programmed to receive the customer identification data from the user computing device.

59. The system of claim 55 wherein the quantitative analysis algorithm comprises a weighted entry algorithm in which each piece of the customer identification data is assigned a numerical value representing a relative weight, and wherein the total value of the relative weights must exceed a predetermined threshold in order for the quantitative analysis algorithm to pass.

60. The system of claim 55 wherein the quantitative analysis algorithm comprises a minimum number of entries algorithm in which a predetermined minimum number of pieces of customer identification data must be present in order for the quantitative analysis algorithm to pass.

61. The system of claim 55 wherein the quantitative analysis algorithm comprises assigning a category type to each piece of the customer identification data, and wherein there is a requirement that a predetermined minimum number of categories is satisfied by the customer identification data.

62. The system of claim 55 wherein the exchange computer is further programmed, if the quantitative analysis algorithm fails, to:

send a request to a user computing device for additional customer identification data and re-apply the quantitative analysis algorithm with the customer identification data and the additional customer identification data until the quantitative analysis algorithm passes.

63. The system of claim 55 wherein a predetermined minimum number of pieces of the customer identification data must match a single customer identification record in order for the qualitative analysis algorithm to pass.

64. The system of claim 55 wherein the linking service computer is further programmed, if the qualitative analysis algorithm fails, to:

send a request to the exchange computer for additional customer identification data; and the exchange computer is further programmed to obtain additional customer identification data from a user computing device and send the additional customer data to the linking service computer; and the linking service computer is further programmed to re-apply the qualitative analysis algorithm with the customer identification data and the additional customer identification data until the qualitative analysis algorithm passes.

65. The system of claim 55 wherein the customer record sent from the linking service computer to the exchange computer further comprises a customer key that uniquely identifies the customer record set in the customer database.

66. The system of claim 65 wherein the exchange computer is further programmed to retrieve the customer key from storage and send the customer key to the linking service computer for periodic updating of the customer record set by the customer linking service.

67. The system of claim 55 wherein the exchange computer is further programmed to:

collate the retrieved customer information into an account web page, and send the account web page to a user computing device for display by the user computing device.

68. The system of claim 67 wherein at least one of the remote databases is a reward account database operated by an associated reward issuing entity and comprising a plurality of customer reward accounts, wherein at least one of the plurality of customer reward accounts is associated with the customer identified by the customer identification data, and wherein the retrieved customer information comprises reward account information for the customer comprising reward points previously accumulated by the customer, and wherein the account web page comprises a listing of a plurality of customer reward accounts accessed by the exchange computer for the customer and the number of reward points stored in the associated reward account for the customer.

69. The system of claim 68 wherein the exchange computer is further programmed to receive the customer identification data from a partner portal web site, wherein the partner portal web site is associated with a reward issuing entity that is a member of a predefined cluster of reward issuing entities; and wherein the account web page indicates which of the plurality of customer reward accounts accessed by the exchange computer for the customer are associated with a reward issuing entity that is a member of the cluster.

70. The system of claim 69 wherein the account web page further comprises a listing of reward issuing entities with which the customer does not have an associated reward account and that are members of the cluster.

71. The system of claim 70 wherein the exchange computer is further programmed to provide on the account web page an offer for the customer to register with at least one of the reward issuing entities with which the customer does not have an associated reward account and that are members of the cluster.

72. The system of claim 71 wherein the exchange computer is further programmed to receive from the user computing device an instruction to register the customer with a designated at least one of the reward issuing entities with which the customer does not have an associated reward account and that are members of the cluster.

73. The system of claim 72 wherein the exchange computer is further programmed to send a registration request on behalf of the customer to the reward account database associated with the designated reward issuing entity.

74. The system of claim 55 wherein the exchange computer is further programmed to perform a promotional analysis of the customer information retrieved from each of the remote databases, the promotional analysis for generating a plurality of offers to be made to the customer for items available via the exchange computer.

75. The system of claim 74 wherein the exchange computer is further programmed to perform a promotional analysis of the customer information retrieved from each of the remote databases by accessing a local customer profile database to retrieve customer profile data to be used in the promotional analysis.

76. The system of claim 75 wherein the exchange computer is further programmed to receive user data from a user computing device; and wherein the exchange computer is further programmed to perform a promotional analysis of the customer information retrieved from each of the remote databases further by analyzing the user data received from the user computing device with the customer profile data and the retrieved customer information.

77. The system of claim 74 wherein the user data received from the user computing device comprises web browsing data identifying web sites that have been loaded onto the user computing device.

78. The system of claim 77 wherein the user data received from the user computing device comprises web purchasing history data identifying items that have been purchased via the web on the user computing device.

79. The system of claim 78 wherein the user data received from the user computing device comprises location data identifying the location of the user computing device.

80. The system of claim 79 wherein the promotional analysis is based at least partially on the location data received from the user device.

81. The system of claim 80 wherein the promotional analysis is associated at least partially on at least one merchant in proximity to the user computing device.

82. The system of claim 69 wherein the promotional analysis results in an offer to the customer for an item from the at least one merchant in proximity to the user computer device that is determined by promotional analysis to be desired by the customer.

83. A data collection and analysis system comprising:

an exchange computer interconnected with a plurality of remote database computers via a computer network, the exchange computer programmed to:

receive customer identification data associated with a customer;

apply a quantitative analysis algorithm with the customer identification data, the quantitative analysis algorithm determining whether the exchange computer has received an amount of customer identification data sufficient for the customer to be uniquely identified;

if the quantitative analysis algorithm passes, then send the customer identification data to at least one of the plurality of remote database computers;

each of the remote database computers is programmed to:

apply a qualitative analysis algorithm with the customer identification data, the qualitative analysis algorithm determining if the customer identification data is sufficient for the customer to be uniquely identified by matching the customer identification data to a plurality of customer identification records;

if the qualitative analysis algorithm passes, then access a customer database to retrieve from said customer database customer information associated with the customer identification data, and send the retrieved customer information to the exchange computer; and the exchange computer is further programmed to store the retrieved customer information.

84. The system of claim 83 further comprising a partner computer interconnected to the exchange computer via the network, wherein the exchange computer is programmed to receive the customer identification data from a partner portal web site executing on the partner portal computer.

85. The system of claim 84 further comprising a user computing device interconnected to the partner portal computer via the network, wherein the partner portal computer web site is programmed to:

receive a request from the user computing device to link to an exchange web site associated with the exchange computer;

enable the user computing device and the exchange web site to connect for subsequent communications, and send the customer identification data to the exchange web site.

86. The system of claim 83 further comprising a user computing device interconnected to the exchange computer via the network, and wherein the exchange computer is programmed to receive the customer identification data from the user computing device.

87. The system of claim 83 wherein the quantitative analysis algorithm comprises a weighted entry algorithm in which each piece of the customer identification data is assigned a numerical value representing a relative weight, and wherein the total value of the relative weights must exceed a predetermined threshold in order for the quantitative analysis algorithm to pass.

88. The system of claim 83 wherein the quantitative analysis algorithm comprises a minimum number of entries algorithm in which a predetermined minimum number of pieces of customer identification data must be present in order for the quantitative analysis algorithm to pass.

89. The system of claim 83 wherein the quantitative analysis algorithm comprises assigning a category type to each piece of the customer identification data, and wherein there is a requirement that a predetermined minimum number of categories is satisfied by the customer identification data.

90. The system of claim 83 wherein the exchange computer is further programmed, if the quantitative analysis algorithm fails, to:

send a request to a user computing device for additional customer identification data and re-apply the quantitative analysis algorithm with the customer identification data and the additional customer identification data until the quantitative analysis algorithm passes.

91. The system of claim 83 wherein a predetermined minimum number of pieces of the customer identification data must match a single customer identification record in order for the qualitative analysis algorithm to pass.

92. The system of claim 83 wherein each of the remote database computers is further programmed, if the qualitative analysis algorithm fails, to:

send a request to the exchange computer for additional customer identification data;

the exchange computer is further programmed to obtaining additional customer identification data from a user computing device and send the additional customer data to the remote database computer; and the remote database computer is further programmed to re-apply the qualitative analysis algorithm with the customer identification data and the additional customer identification data until the qualitative analysis algorithm passes.

93. The system of claim 83 wherein the exchange computer is further programmed to:

collate the retrieved customer information into an account web page, and send the account web page to a user computing device for display by the user computing device.

94. The system of claim 93 wherein at least one of the remote databases is a reward account database operated by an associated reward issuing entity and comprising a plurality of customer reward accounts, wherein at least one of the plurality of customer reward accounts is associated with the customer identified by the customer identification data, and wherein the retrieved customer information comprises reward account information for the customer comprising reward points previously accumulated by the customer, and wherein the account web page comprises a listing of a plurality of customer reward accounts accessed by the exchange computer for the customer and the number of reward points stored in the associated reward account for the customer.

95. The system of claim 94 wherein the exchange computer is further programmed to receive the customer identification data from a partner portal web site, wherein the partner portal web site is associated with a reward issuing entity that is a member of a predefined cluster of reward issuing entities; and wherein the account web page indicates which of the plurality of customer reward accounts accessed by the exchange computer for the customer are associated with a reward issuing entity that is a member of the cluster.

96. The system of claim 95 wherein the account web page further comprises a listing of reward issuing entities with which the customer does not have an associated reward account and that are members of the cluster.

97. The system of claim 96 wherein the exchange computer is further programmed to provide on the account web page an offer for the customer to register with at least one of the reward issuing entities with which the customer does not have an associated reward account and that are members of the cluster.

98. The system of claim 97 wherein the exchange computer is further programmed to receive from the user computing device an instruction to register the customer with a designated at least one of the reward issuing entities with which the customer does not have an associated reward account and that are members of the cluster.

99. The system of claim 98 wherein the exchange computer is further programmed to send a registration request on behalf of the customer to the reward account database associated with the designated reward issuing entity.

100. The system of claim 83 wherein the exchange computer is further programmed to perform a promotional analysis of the customer information retrieved from each of the remote databases, the promotional analysis for generating a plurality of offers to be made to the customer for items available via the exchange computer.

101. The system of claim 100 wherein the exchange computer is further programmed to perform a promotional analysis of the customer information retrieved from each of the remote databases comprises accessing a local customer profile database to retrieve customer profile data to be used in the promotional analysis.

102. The system of claim 101 wherein the exchange computer is further programmed to receive user data from a user computing device and perform a promotional analysis of the customer information retrieved from each of the remote databases by analyzing the user data received from the user computing device with the customer profile data and the retrieved customer information.

103. The system of claim 102 wherein the user data received from the user computing device comprises web browsing data identifying web sites that have been loaded onto the user computing device.

104. The system of claim 103 wherein the user data received from the user computing device comprises web purchasing history data identifying items that have been purchased via the web on the user computing device.

105. The system of claim 104 wherein the user data received from the user computing device comprises location data identifying the location of the user computing device.

106. The system of claim 105 wherein the promotional analysis is based at least partially on the location data received from the user device.

107. The system of claim 106 wherein the promotional analysis is associated at least partially on at least one merchant in proximity to the user computing device.

108. The system of claim 107 wherein the promotional analysis results in an offer to the customer for an item from the at least one merchant in proximity to the user computer device that is determined by promotional analysis to be desired by the customer.

* * * * *